July 7, 1931.  B. WEINER  1,813,830
CALCULATING MACHINE
Filed Nov. 7, 1924  32 Sheets-Sheet 1
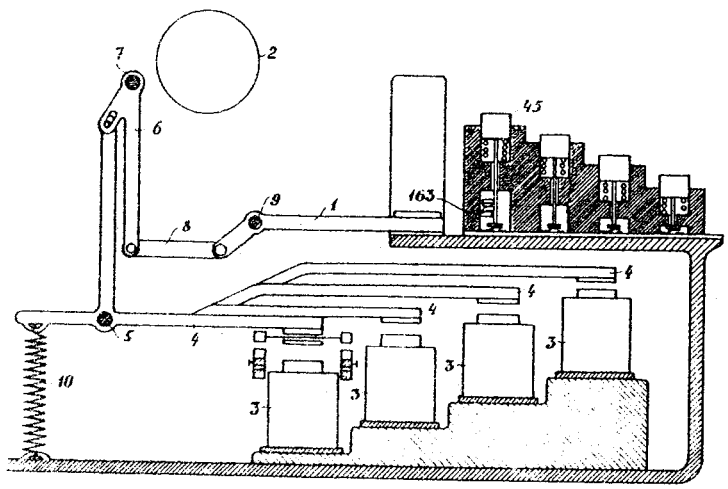
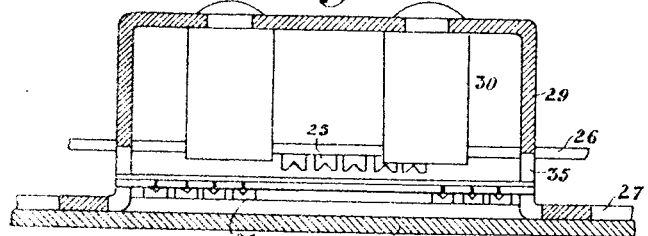
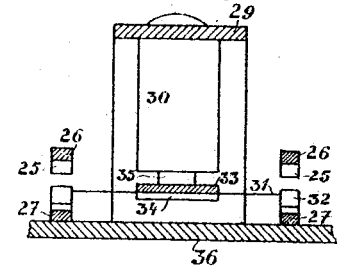
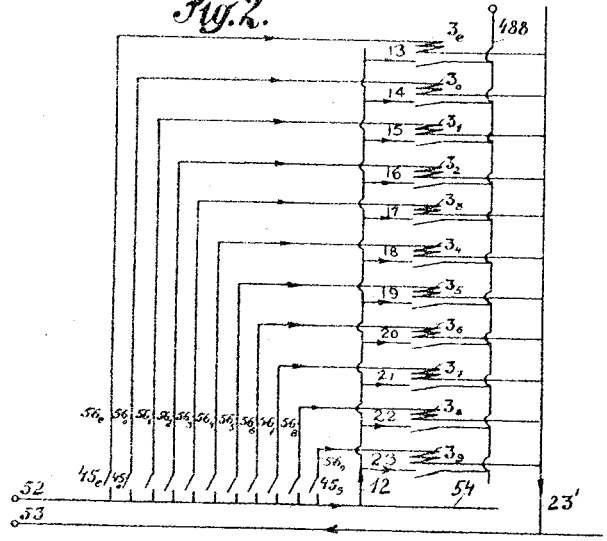
Inventor
Bernhard Weiner
By Marks & Clerk July 7, 1931.  B. WEINER  1,813,830
CALCULATING MACHINE
Filed Nov. 7, 1924  32 Sheets-Sheet 6

July 7, 1931.  B. WEINER  1,813,830
CALCULATING MACHINE
Filed Nov. 7, 1924   32 Sheets-Sheet 17

July 7, 1931.　　　　B. WEINER　　　　1,813,830
CALCULATING MACHINE
Filed Nov. 7, 1924　　32 Sheets-Sheet 18

July 7, 1931.  B. WEINER  1,813,830
CALCULATING MACHINE
Filed Nov. 7, 1924  32 Sheets-Sheet 19

July 7, 1931.  B. WEINER  1,813,830
CALCULATING MACHINE
Filed Nov. 7, 1924  32 Sheets-Sheet 28

July 7, 1931.  B. WEINER  1,813,830
CALCULATING MACHINE
Filed Nov. 7, 1924  32 Sheets-Sheet 29

July 7, 1931. B WEINER 1,813,830
CALCULATING MACHINE
Filed Nov. 7, 1924 32 Sheets-Sheet 31

Inventor
Bernhard Weiner
By Marks & Clerk

July 7, 1931.  B. WEINER  1,813,830
CALCULATING MACHINE
Filed Nov. 7, 1924   32 Sheets-Sheet 32

Inventor
Bernhard Weiner
By Marker Clerk

Patented July 7, 1931

1,813,830

UNITED STATES PATENT OFFICE

BERNHARD WEINER, OF PRAGUE-DEJVICE, CZECHOSLOVAKIA

CALCULATING MACHINE

Application filed November 7, 1924, Serial No. 748,439, and in Germany November 7, 1923.

All known calculating machines, more particularly the so-called automatic calculating types, make the calculations by means of relatively complicated movements of mechanical parts, which is not only a cause of the machine frequently getting out of order, but limits the extent to which the operations can be made automatic.

The machine according to the present invention contains only a series of groups of electromagnets (relays), which by their electric interaction carry out any calculation within the region of real numbers.

The principle is as follows: Some of the groups of relays are connected to the keyboard, i. e. they can be actuated from the keyboard, while other groups of relays close circuits through a typewriting apparatus, in which the result is typed.

In the groups of relays all fundamental or primary calculating operations (addition, subtraction, multiplication of all one digit numbers and division of all one and two digit numbers by all one digit numbers) are provided for as electric connections, the arrangement being such that, by the setting of one number, all these results are set up provisionally and, by depressing the key for carrying out the operation, the results in question are selected and are combined in the machine by auxiliary relays as partial results to form the final result.

The relays are hereinafter referred to as electromagnets.

The calculating machine consists of nothing but a plurality of groups of electromagnets, in which each separate electromagnet corresponds to a digit value of the numerals from zero to nine and in which every ten or eleven magnets are united to form a digit value sub-group. Each of these magnet groups is reserved during a single calculation for one "operand", viz., number upon which the operation is to be effected. while however for different calculations different "operands" may be set up in the same group. Thus for instance the multiplicand group is at the same time the group of terms of a sum, the product group is at the same time the sum group, the multiplier group is at the same time the quotient and root group and the dividend group is at the same time the difference and radicand group.

Each electromagnet in this group is so constructed that its armature both in the position of rest and when attracted closes or interrupts circuits leading over the windings of other electromagnets, so that by suitable connections being made a definite sequence of automatically consecutive closings of circuits and consequent attractions of magnet armatures is produced. Thus, when the "operands" are set up in the corresponding groups, i. e. when from the keyboard in the respective magnet groups in each digit value sub-group those magnet windings are successively made alive, which correspond to the numerical values of the corresponding digits of the numerals used in the operation, by closing a function key, such a coaction of circuit closures and circuit interruptions can be brought about (by the use of auxiliary magnets) that finally circuits are closed, which lead to the typewriter and in the latter effect the automatic typing of those figures which correspond to the successive digits of the particular result.

The many advantages of this method of calculation are obvious at the first glance. As no mechanical parts are to be set in motion and as none of the primary calculations have to be carried right through, this machine operates practically noiselessly and at a speed that could not be attained with any of the known machines. As, in addition to this, a number which is set in one group of relays can be transferred to another group by the attraction of a single magnet armature and a number set in one group can be cancelled by the attraction of one magnet armature, and as not only means for carrying out the primary arithmetical operations referred to above are provided for in the machine, but others as well, such as the automatic setting of the square root of a one-digit or two digit number in one group of magnets, when in another group this single one-digit or two digit number is set, or the automatic setting of the cube root of a one digit or two digit or three digit number, which has been set in another group, the machine is adapted to be used not only for the numerical calculation of all algebraic rational functions, but is also suitable for the automatic calculation of irrational algebraic functions, as after the selection of the first digit the extracting of a root is an operation which is entirely analogous to division, with the sole difference that the divisor is a different one in determining each term. That it is possible to carry out involution automatically is obvious from what has been already said, as the number set in the product group can be set over and over again in the multiplicand or multiplier group.

It is also obvious that, in carrying out involution, it is possible automatically to calculate series of ascending powers of the form $$\frac{x}{n_1} \pm \frac{x^2}{n_2} \pm \frac{x^3}{n_3} \pm \frac{x^4}{n_4} \ldots$$

($n$ representing any whole number or fraction), so that the numerical calculation can be carried out automatically of all those transcendent functions which may be converted into converging series of ascending powers. Thus all trigonometric and all cyclometric functions may be calculated automatically, as well as the logarithmic function ($ln\ x$) and the potential function $e^x$ and many other compound functions which are of technical importance. All these functions are calculated numerically in such a manner that a definite value of the independent variable of the function $y=f(x)$ is set in the machine and that, after depressing the key for carrying out the function in question, the value of the dependent variable corresponding to the determined value of the independent variable is transmitted to the typewriting apparatus after the calculation has been carried out automatically.

Thus it will be seen that the calculating machine may be used for practically the entire range of real numbers.

In the construction of the calculating machine the location of the separate electromagnets both relatively to one another and relatively to the machine is quite immaterial. Of real importance is the scheme of connection shown in the thirty-six accompanying figures. Obviously the arrangement adopted will be such that the magnets are arranged in banks one above the other with their corresponding conductors in such a manner that in any plane no conductor will cross another, so that the general arrangement having been fixed on, the connections may be made in a simple manner, for instance by means of sheet copper stampings in each separate bank, and it is only necessary to make the connection with the conductors connecting the separate banks and the connection with the magnet windings.

It is also quite immaterial, whether electromagnets or solenoids are used. Obviously in all cases in which, owing to provision being made in the machine for a great number of digits, the number of circuits to be closed by a single armature is too great, a single electromagnet may be replaced by any number of electrically parallel magnets.

It also follows from what has been said above, that the typewriting apparatus must not be mechanically connected either to the keyboard or to the calculating machine and that more than one typewriting apparatus may be connected to a single calculating machine, in which case all typewriting apparatus, which will themselves be coupled together, would be served from a single keyboard.

This fact is of importance for one field of use for the machine, namely, where it is used as a book-keeping machine. Since the machine, as is explained in greater detail below, is capable of forming both positive and negative differences between two numbers $u$ and $v$ or, according to which operating key is selected, only positive differences, that is, both the differences $u-v$ and $v-u$, according as $u>v$ or $u<v$, the machine is suitable to be used as a book-keeping machine, the various typewriting apparatus connected to a single calculating machine being adapted to be used for a number of simultaneous entries in any order or combination.

In the accompanying drawings the present invention is shown diagrammatically, namely the typewriting machine and the system of connections of the calculating machine, electromagnets being employed in the present instance, but the construction is analogous where solenoids are used.

Fig. 1 is a vertical section through the typewriting machine.

Fig. 2 shows the diagram of connections for the typewriting machine.

Fig. 3 shows the magnet in detail.

Fig. 4 is a section through the magnet shown in Fig. 3.

Fig. 5 is a detailed connection diagram for the magnets.

Figure 6:
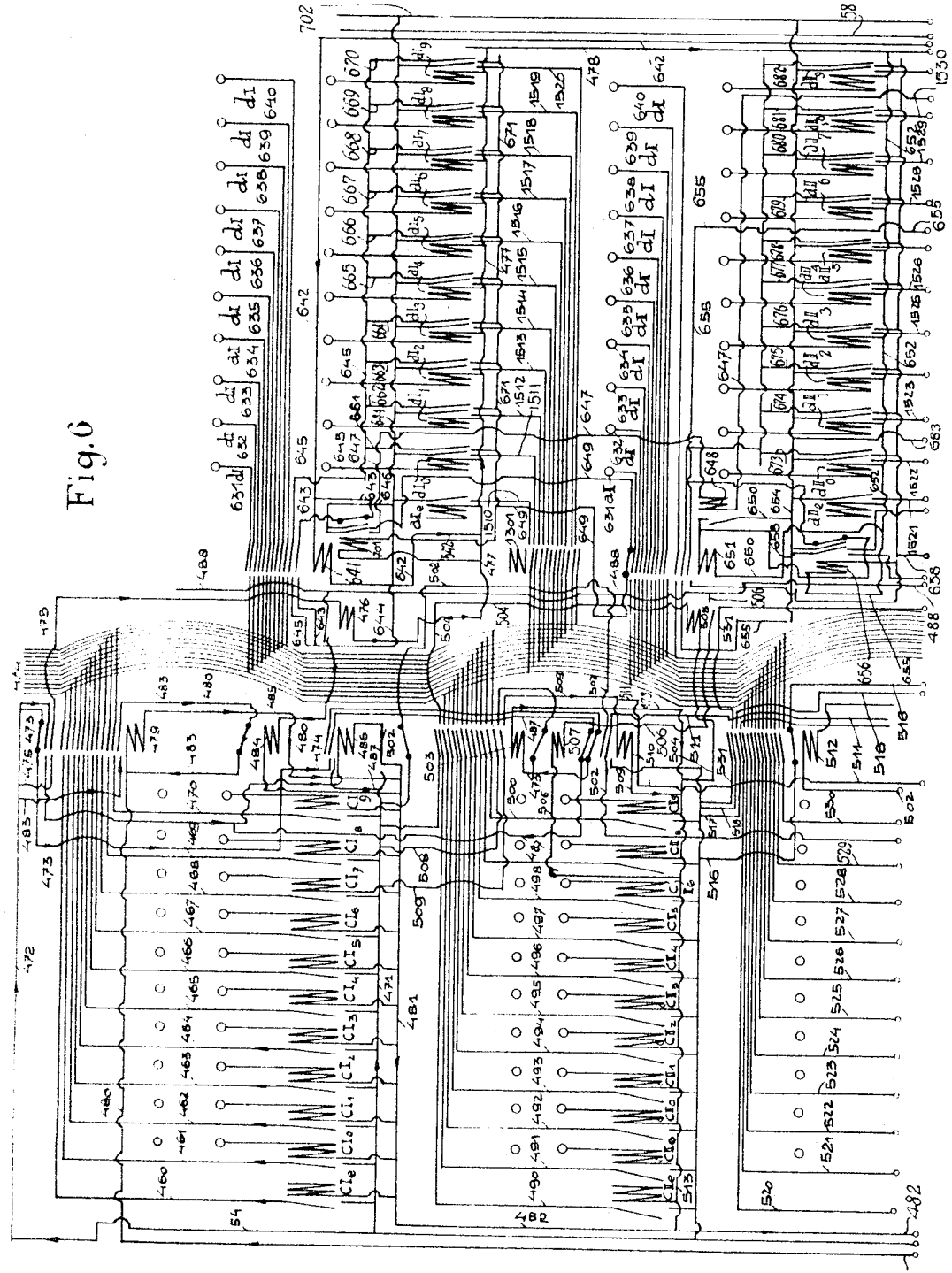
Figs. 6, 7, 8 and 9 show the system of connections for the entire calculating machine, all the details shown in the other figures being omitted.

In the following a detailed description of the machine and its mode of operation is given.

The machine consists of the following parts:—

(1) The source of current
(2) The keyboard
(3) The typewriting apparatus
(4) The calculating machine.

(1) The source of current is optional and may supply either direct or alternating current.

(2) The keyboard consists of separate spring actuated contact-making keys, as will be seen from Fig. 1.

(3) The typewriting apparatus is shown in Figs. 1 and 2.

*The typewriting machine*

Any electrically operated typewriting machine may be used, in which the actuation of the type levers is not effected directly by means of levers from the keyboard, but by electric circuits, which are closed by the depression of keys.

A constructional example is shown in Fig. 1. The type lever 1, which strikes against the platen 2, is actuated by electromagnets 3, the armatures of which are rigidly connected each to a lever 4. The levers 4 rock about a common axis 5 and are pivotally connected to the bell crank lever 6. All the levers 6 rock about a common axis 7 and are each linked by means of a bar 8 to a type lever 1.

The electromagnets 3 may be arranged in any suitable manner. The difference in their distance from the axis 5 can be equalized by the armatures being at different distances from the electromagnets 3 and by the ratio between the two arms of the cranked lever 6 being varied.

The construction of the platen and the means for traversing it is the same as in any of the well-known types of machines, as also is the ribbon feed. All these details are not shown in the drawings.

Fig. 2 shows a diagram of connections for the typewriting machine for the ten numeral keys and the empty key.

From the conductor 54 leading to the positive pole 52 of the source of current a conductor $56_e$, $56_0$, $56_1$ ... $56_9$ branches off by way of each key $45_e$, $45_0$, $45_1$ ... $45_9$ (and of course similarly by way of each letter key) to the winding of each electromagnet $3_e$ $3_0$, $3_1$ ... $3_9$, the armature of which, on being attracted, as described above causes the corresponding type lever to strike. On the key being released, the type lever is returned to its position of rest by the action of the spring 10.

The magnet armatures belonging to the numeral keys each close, when attracted, a circuit by way of the conductor 488 (through the conductor 12 and one of the conductors 13, 14, 15 ... 23), corresponding to the depressed key the function of which conductor 488 will be described in detail in connection with the calculating machine.

Before describing the calculating machine, the symbols adopted for the diagrams of connection shall be explained with reference to Fig. 5.

25′ is a magnet winding, with the armature of which the two conductors 26′ and 27′ are so associated that their circuits are closed at this point by the armature being attracted.

28′ is a magnet winding, with the armature of which the conductors 29′ and 30′ are so associated that, when the armature is not attracted, the circuits are closed and, when the armature is attracted, the circuits are broken.

31′ is a magnet winding, the armature of which, when at rest, closes the conductor 32′ and, when attracted, connects the conductor 32′ to the conductor 33′.

The conductor 36′ crosses over the conductor 34′ and the conductor 35′ branches off from the conductor 34′.

The conductor 44 crosses the conductors 40, 41 and 42 and branches off from the conductor 39.

The conductor 45′ crosses over the conductors 39, 40, 41 and 42 and branches off from the conductor 38.

The conductor 43 crosses over the conductors 37, 38, 39, 40, 41 and 42.

The conductor 47 crosses the conductors 41 and 42 and branches off from the conductor 40.

The conductor 48 branches off from the conductor 42.

*The calculating machine*

As was explained above, the calculating machine consists only of a series of groups of electromagnets, the separate electromagnets of which each corresponds to a definite numerical value, the arrangement being such that the winding of each magnet is always conductively connected to one and the same numeral key, when the group is connected to the keyboard, or that a circuit is closed by way of each armature, which circuit eventually in every case leads to the same winding of one of the typing magnets 3 which effect the typing of the numerals.

The calculating machine operates in the following manner:—

From the keyboard in the separate groups those electromagnet windings, of which in each case ten or eleven are combined to form a digit group, the numerical values of which correspond to the numbers of the operating number to be set, are rendered conductive. Each magnet armature closes or interrupts circuits, which lead through the windings of other electromagnets (either auxiliary magnets or magnets of other groups), so that, after the depression of an operating key, a set of circuit-making and circuit-breaking operations takes place, in which eventually in one or another group (according to the particular calculating operation) those electromagnet windings become live, the numerical values of which correspond to the successive numbers of the result.

After what has been said above, it is obvious that the placing of the magnets, both with respect to the machine as a whole and relatively to one another, is quite immaterial, as only the interconnection of the magnet windings is of importance.

The arrangement might be such that the separate groups of electromagnets are located one above the other in banks and the conductors connecting them are arranged in separate horizontal and vertical layers in such a manner that no conductor crosses any other conductor in the same layer. Thus, for instance, the separate layers might be stamped out of sheet copper and be attached to an insulating support (vulcanized fibre). It is then only necessary correctly to assemble the separate layers (horizontal and vertical) and to solder them at the points of connection of the conductors or connect them conductively in some other reliable manner.

A constructional example of such an electromagnet is shown in Figs. 3 and 4.

On a non-ferro-magnetic support 36 a magnet yoke piece 29 is fixed. The pole pieces 30 are riveted into the said yoke piece. The magnet armature 33 is provided on its lower side between two layers of insulation 34 with as many steel wires 31 (which, for the purpose of increasing the conductivity and for damping oscillations may be covered with fine copper wire) as there are circuits to be broken and closed.

Each steel wire 31 is provided at either end with a contact piece 32, which is made wedge-shaped and the sharp edges of which face downwards, where the armature, on being attracted, interrupts the conductor and upwards, where it closes the same. The contact pieces rest in corresponding contact pieces 28 arranged on a common supporting bar 27 (of insulating material) or strike against such contact pieces on a second bar 26.

The side portions of the yoke piece 29 are each provided with a guiding slot 35, in which the armature is guided.

Gravity is sufficient to bring the armatures into their position of rest.

The calculating machine must not be mechanically connected either to the typewriting machine or to the keyboard, which will be obvious from the foregoing.

This system of connections is shown diagrammatically in Figs. 6–36.

Figs. 6–9 show the general system of connections for the calculating machine, certain detail connections to all the other parts of the machine shown in the other figures being omitted.

The machine consists of the following groups of magnets:—

$$Aa$$

(1) The multiplicand group or summand group respectively, marked $$a_{1,0}, a_{1,1}, a_{1,2}, a_{1,3} \ldots a_{1,9},$$
$$a_{\text{II},0}, a_{\text{II},1}, a_{\text{II},2}, a_{\text{II},3} \ldots a_{\text{II},9},$$

(Figs. 7 and 8), the Roman index indicating the digit value (the denomination), viz. I the highest value and II the one next below it, and the Arabic index the numerical value (the particular numeral or figure), to which each separate magnet corresponds.

The magnets of the group $a_1$ are connected by the conductors 100, 101 ... 109 to the omnibus conductors 130, 131 ... 140. The conductors 100, 101 ... 109 lead over the armature of the electromagnet 110 (Fig. 7) in such a manner that the circuits are closed at this point, when the armature is attracted by the magnet, and are broken, when the armature is in its position of rest.

Similarly the electromagnets of the group $a_{\text{II}}$ are led over the armature of the electromagnet 121 (Fig. 8) to the omnibus conductors 130, 131 ... 140.

The omnibus conductors 130, 131 ... 140 lead over the armature of the electromagnet 141 (Fig. 9) in such a manner that the circuit is closed at this point, when the armature is attracted, and the circuit broken at this point, when the armature is in its position of rest.

Over the armature of the electromagnet 141, besides the omnibus conductors 130–140, there is also taken the conductor 142, which is closed at this point, on the armature being attracted, and starts from the conductor 54, which leads to the positive terminal 52 of the source of current. In its further course the conductor 142 also leads over the armature of the electromagnet 147 in such a manner that the circuit is broken at this point, on the armature being attracted. The conductor 142 leads thence to the conductor 143. The latter leads over the switch 144 to the conductor 54. The switch 144 is closed by a bar $s$, which is depressed by the keys 148, 149, 150, 151 and is indicated in the diagram of connections by a dot and dash line.

To recapitulate: On one of the keys 148, 149, 150, 151 being depressed, the switch 144 is closed and with it the following circuit:— 52—54—switch 144—conductor 143—electromagnet winding 141—145—55—53. On the armature of the electromagnet 141 being attracted, it closes the following circuit:— 52—54—142— over the attracted armature 141 to the open armature 147—142—143—electromagnet winding 141—145—55—53. Thus, on one of the keys 148, 149, 150, 151 being closed, a circuit is closed over the winding of the electromagnet 141, which remains closed, even after the key has been released, until the winding of the electromagnet 147 is energized, as the armature of the latter electromagnet, on being attracted in the direction of the arrow, breaks the circuit 142.

As the omnibus conductors 130, 131 ... 140 are connected over the conductors $56_e$, $56_0, 56_1, 56_2, 56_3 \ldots 56_9$ to the numeral keys $45_e, 45_0, 45_1, 45_2, 45_3 \ldots 45_9$, the conductive connection between the numeral keyboard and the omnibus conductors 130–140 is established, on one of the keys 148, 149, 150, 151 (the setting keys, as will be described below) being depressed.

As has already been stated, the conductors 100, 101 ... 109, which lead over the electromagnet 110 (Fig. 7), establish conductive connection between the omnibus conductors 131 ... 140 and the electromagnet windings $a_{I,0}, a_{I,1}, a_{I,2}, a_{I,3} \ldots a_{I,9}$. The conductor 152 leads to the electromagnet winding 110 from the key 151 (the multiplicand key or the summand key, Fig. 9). The conductor 152 (Fig. 7) leads thence to the conductor 122, to which are also connected all the conductors 100 to 109, after leaving the electromagnet windings $a_{I,0}, a_{I,1}, a_{I,2} \ldots a_{I,9}$. The conductor 122 leads to the conductor 124, which leads by way of the armature of the electromagnet 125 (Fig. 8), in such a manner that the latter breaks the circuit on being attracted. The conductor 124 is connected to the conductor 55.

Besides the conductors already referred to, the conductors 154 and 157 also lead over the electromagnet 110.

The conductor 154 branches off from the conductor 153, which is connected to the conductor 54 and consequently to the positive terminal 52 of the source of current. From the conductor 154 the conductors 165, 166, 167 ... 174 each lead over the armature of the electromagnets $a_{I,0}, a_{I,1}, a_{I,2}, \ldots a_{I,9}$, the arrangement being such that the circuits are closed at these points, when the armatures are attracted by the electromagnets. All the conductors 165, 166, 167 ... 174 are connected to the conductor 160.

The conductor 157, which also branches off from the conductor 153 leads over the armature of the electromagnet 110, so that it is closed by the armature, when the latter is attracted, and leads from this point to the armature of the electromagnet 121 (Fig. 8), which breaks the circuit at this point, when attracted. The conductor 157 leads thence to the conductor 152.

From the conductor 160 (Fig. 7) the conductor 159 branches off, which leads over the winding of the electromagnet 158 (Fig. 8) and thence over the armature of the electromagnet 162 (Fig. 9) in such a manner that at this point the circuit is broken, on the armature being attracted, and then leads to the conductor 161, which is connected over the conductor 145 and the conductor 55 to the negative terminal 53 of the source of current.

Starting from the conductor 153 the conductor 155 leads over the armature of the electromagnet 158 (Fig. 8) in such a manner that at this point the circuit is closed by the armature being attracted, and thence to the electromagnet 121 and, after leaving the winding of this magnet, to the conductor 123, which leads to the conductor 124, as did the conductor 122 referred to above.

As already stated, the conductors 111, 112 ... 120, which connect the windings of the electromagnets of the group $a_{II}$ to the omnibus conductors 130, 131 ... 140, lead over the armature of the electromagnet 121, such that at this point the circuit is closed by the armature, on the latter being attracted by the magnet. The two conductors 186 and 188 also lead over the armature of this electromagnet. The conductor 186 is conductively connected to the key 150 (Fig. 9) of the keyboard and, after leaving the armature of the magnet 121, (Fig. 8) leads to the conductor 190, which will be referred to below. The conductor 188 branches from the conductor 175, which leads to the conductor 54, and after leaving the armature of the magnet 121, leads over the armature of the electro-magnet 187, such that its circuit is broken at this point by the armature being attracted, and leads thence to the conductor 155.

From the conductor 175 conductors (176, 177 ... 185) branch off each over one of the armatures of the magnet group $a_{II}$, all of which conductors 176–185 are connected to the conductor 189 and are closed at these points, when the armatures of the electromagnets are attracted.

From the conductor 189 there is branched off the conductor 190 referred to above, which leads to the winding of the electromagnet 187 and thence to the conductor 123, to which the conductors 111, 112 ... 120 are also connected after leaving the windings of the magnet group $a_{11}$.

Figure 7:
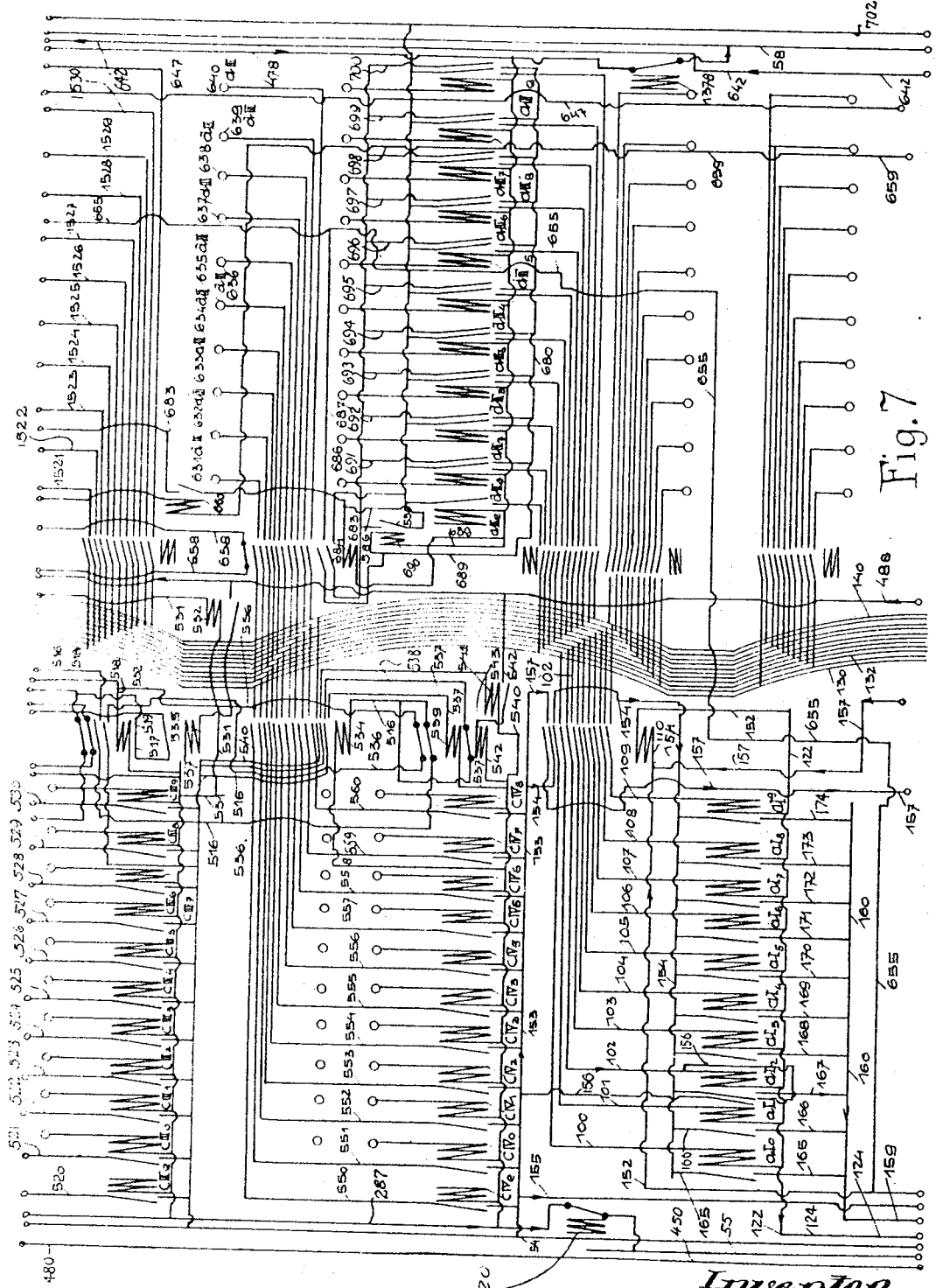

Over each armature of the magnet groups $a_1$ and $a_{11}$ there leads, besides the conductors already referred to, a conductor, such as is shown in Fig. 7 only in the case of the magnet $a_{1,2}$ in the conductor 156, which conductors all lead over the magnet armatures in such a manner that they are closed at this point, when the armatures are attracted, and which are connected to the corresponding conductors 100, 101 ... 109 and 111, 112 ... 120. The conductor 156 is connected correspondingly to the conductor 102.

The electromagnet 162 (Fig. 9) referred to above, is conductively connected to the switch 163 through the conductor 164, which after leaving the magnet winding 162 is connected to the conductor 161.

The switch 163 is closed by a bar, indicated in the diagram of connections by a dot and dash line, each time one of the numeral keys $45_e, 45_0, 45_1 \ldots 45_9$ is closed.

In order to enable the operation of the apparatus to be better understood the setting of a number in the multiplicand group shall now be described with reference to the conductors so far described.

By depressing the multiplicand key 151, the following circuit is closed:—positive terminal 52 (Fig. 9)—54—151—152—electromagnet winding 110 (Fig. 7)—152—122—124—55 (Fig. 8)—negative terminal 53. The armature of the electromagnet 110 temporarily closes the following circuit:—positive terminal 52—54—153—(Fig. 7)—157—armature of magnet 110—157—152—magnet winding 110—152—122—124—55—negative terminal 53. By closing this circuit the current passing over the winding of the electromagnet 110 is made independent of the depression of a key, that is, the magnet winding 110 remains energized through the circuit leading over its armature, as long as this circuit is not broken by the armature of the electromagnet 121, as the conductor 157 leads over this armature.

Simultaneously with the depression of the key 151 (Fig. 9) the switch 144 has been closed by the bar $s$ and thereby the following circuit:—positive terminal 52—54—144—143—electromagnet winding 141—143—145—55—negative terminal 53.

The armature of the magnet 141 closes the following circuit:—positive terminal 52—54—142—armature of the magnet 141—142—armature of the magnet 147—142—143—magnet winding 141—143—145—55—negative terminal 53.

Through this circuit the magnet winding 141 remains energized even after the key 151 has been released and the conductive connection of the omnibus conductors 130, 131 ... 140 to the keys $45_e, 45_0, 45_1, 45_2 \ldots 45_9$ is established.

A numeral key, say $45_2$, is thereupon depressed, whereby the following circuit is closed:—positive terminal 52—54—$45_2$—$56_2$—133—102 (Fig. 7)—armature of magnet 110—102—magnet winding $a_{1,2}$—122—124—55—negative terminal 53.

The armature of the magnet $a_{1,2}$ closes the following circuit:—positive terminal 52—54—153—156—102—winding of the magnet $a_{1,2}$—122—124—55—negative terminal 53. This latter circuit keeps the magnet winding $a_{1,2}$ energized and the armature attracted, even beyond the time during which the key is depressed.

Simultaneously with the above described closing of the circuit, however, the circuit over the typewriting apparatus has been closed, as was described above in connection with the typewriting machine, so that the numeral the key of which has been struck and which was set up in the calculating machine, was typed as well.

Also simultaneously with the depression of the key $45_2$ (Fig. 9) the switch 163 was closed and consequently the following circuit:—positive terminal 52—54—163—164—magnet winding 162—161—145—55—negative terminal 53. This circuit remains closed only as long as the key is depressed. The moment the key is released the following circuit is closed by the magnet $a_{1,2}$ (Fig. 7) :— positive terminal 52—54—153—154—armature of magnet 110—154—167 (over the armature $a_{1,2}$)—160—159—magnet winding 158 (Fig. 8)—159—released armature of magnet 162 (Fig. 9)—161—145—55—negative terminal 53. The magnet 158 (Fig. 8) actuated by the closing of this circuit closes the following circuit:—positive terminal 52 (Fig. 7)—54—153—155—magnet winding 121 (Fig. 8)—155—123—124—55—negative terminal 53.

By the armature of magnet 121 being attracted the magnet winding 110 (Fig. 7) is de-energized, as the conductor 157 becomes broken.

The armature of the magnet 121 (Fig. 8) then closes the following circuit:—positive terminal 52—54—175—188—armature of magnet 121—188—155—magnet winding 121—155—123—124—55—negative terminal 53. Through this circuit the winding of the electro-magnet 121 remains energized and its armature attracted as long as the magnet 187 is not energized.

On a numeral key being again depressed, a magnet of the group $a_{11}$ will be set in the same way over the conductors 130, 131 ... 140 and 111, 112 ... 120 according to which key is depressed, as above in group I.

The magnet 187, which breaks the circuit leading over the winding of magnet 121, becomes energized, as is obvious from what has been said above, at the moment, in which in group $a_{II}$ a digit, i. e. a magnet, is set.

Figure 10:
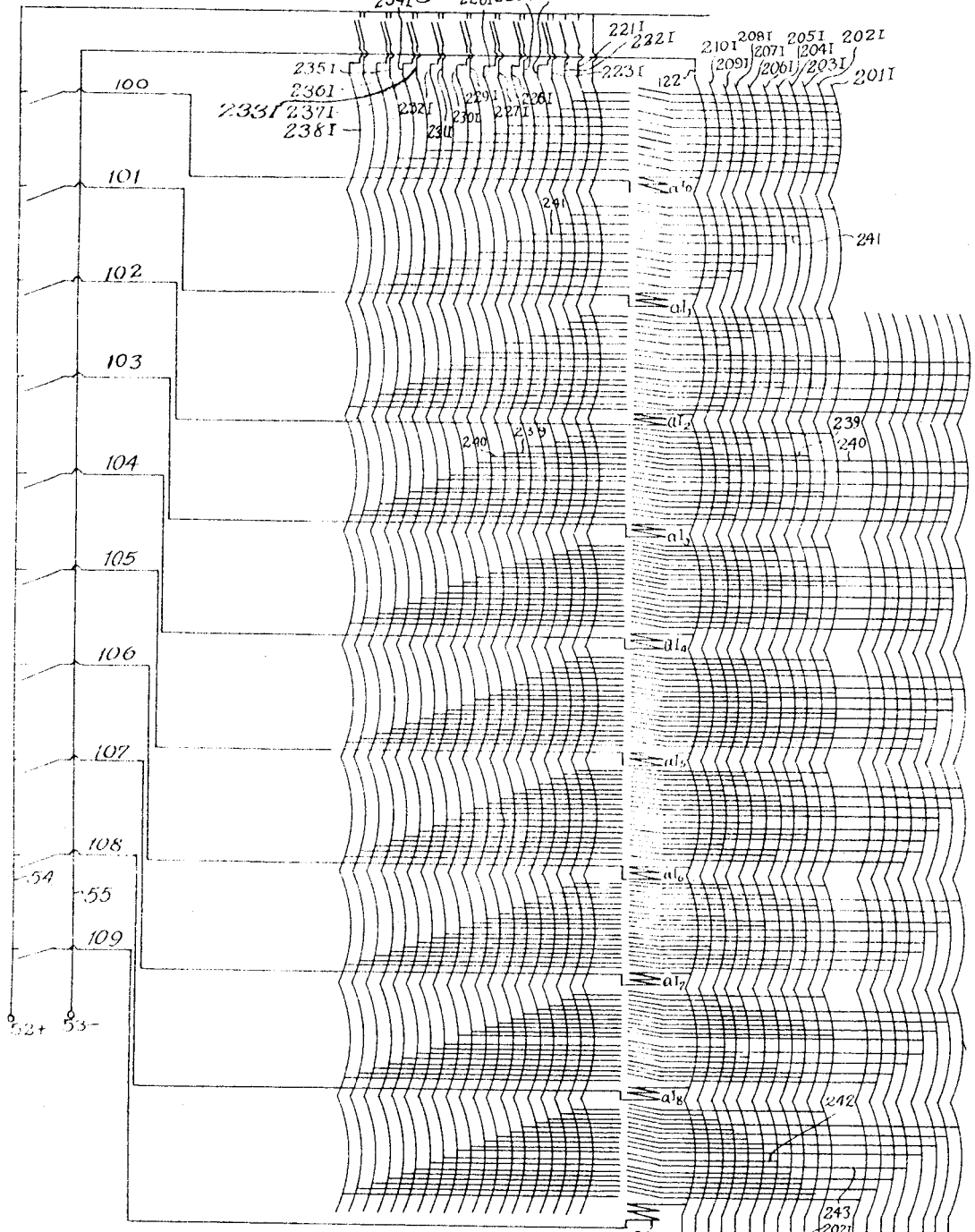
Fig. 10 shows the connections for a digit group of the multiplicand group.

The other circuits leading over the armatures of the magnets of the group $a$, which both establish the connection with the multiplier group $b$ and with the product group $c$, are shown in Fig. 10.

Ab

In Fig. 10 the magnets $a_{I,0}$, $a_{I,2}$ ... $a_{I,9}$ are shown with their leads 100, 101, 102 ... 109 and with the conductor 122. In this figure the course of the conductors 100, 101 ... 109 to the positive terminal 52, described above, is only indicated diagrammatically by switches. Over the armatures of these magnets of the group $a_I$ there lead as many conductors as is given by the number of digits of all the products of the one digit numbers 0 to 9 of the numerical value corresponding to the magnet in each case. Over the armature of the magnet $a_{I,1}$, for instance, there lead ten conductors, as the products of the numbers from 0 to 9 multiplied by 1 (to which numerical value the magnet $a_{I,1}$ corresponds, in accordance with what was stated above) result in the ten one digit numbers 0 to 9, that, is, altogether 10 digits. 16 conductors lead over the armature of the magnet $a_{I,3}$, as the products of the numbers from 0 to 9, when multiplied by the number 3, give 4 one-digit and 6 two digit numbers, that is, altogether 16 digits.

All these conductors establish connection between the 18 conductors $201_I$, $202_I$, $203_I$ ... $218_I$ on the one hand and the 18 conductors $221_I$, $222_I$, $223_I$ ... $238_I$ on the other hand.

The conductors $221_I$, $222_I$, $223_I$ ... $238_I$ correspond, as will be seen when the further course of these conductors is traced, to the numerical values of the digits 0 to 9 as follows:—

| Conductor | | Value of digit |
|---|---|---|
| $221_I$ | | 0 |
| $222_I$ | | 1 |
| $223_I$, $224_I$ | which are always jointly closed | 2 |
| $225_I$, $226_I$ | which are always jointly closed | 3 |
| . | | |
| . | | |
| . | | |
| $237_I$, $238_I$ | which are always jointly closed | 9 |

The conductors $201_I$, $202_I$ ... $210_I$ correspond, as will also be shown below, to the numerical values of the digits 0 to 9 and the conductors $211_I$, $212_I$ ... $218_I$ to the numerical values of the digits 1 to 8.

The conductors leading over the armatures of the magnets $a_{I,0}$, $a_{I,1}$, $a_{I,2}$ ... $a_{I,9}$ connect the two groups of 18 conductors each in such a manner that the conductors $221_I$ to $238_I$ are connected with those conductors of the groups $211_I$ to $218_I$ and $201_I$ to $210_I$, which correspond to the numerical values of the one-digit or two-digit products of the numerical values of the conductors $221_I$ to $238_I$ multiplied by the numerical values of the magnets $a_{I,0}$ to $a_{I,9}$.

Over the armature of the magnet $a_{I,3}$ for instance, there leads the conductor 239 from the conductor $227_I$ to the conductor $203_I$ and the conductor 240 from the conductor $228_I$ to the conductor $211_I$.

According to the table the conductors $227_I$ and $228_I$ correspond to the numerical value 4, the conductor $211_I$ to the numerical value 1 and the conductor $203_I$ to the numerical value 2. The conductors corresponding to the numerical value 4 are thus connected over the magnets corresponding to the numerical value 3 to conductors corresponding to the numerical values of the number 12.

Over the armature of the magnet $a_{I,1}$ there leads for instance the conductor 241, which connects the conductor $225_I$ having the numerical value 3 to the conductor $204_I$, which also has the numerical value 3.

Over the armature of the magnet $a_{I,9}$ with the numerical value 9 there lead the conductors 242 and 243, which connect the conductors $231_I$ and $232_I$ having the common numerical value 6 to the conductors $205_I$ having the numerical value 4 and to the conductor $215_I$ having the numerical value 5, that is, the numerical values of the number 54.

Figure 11:
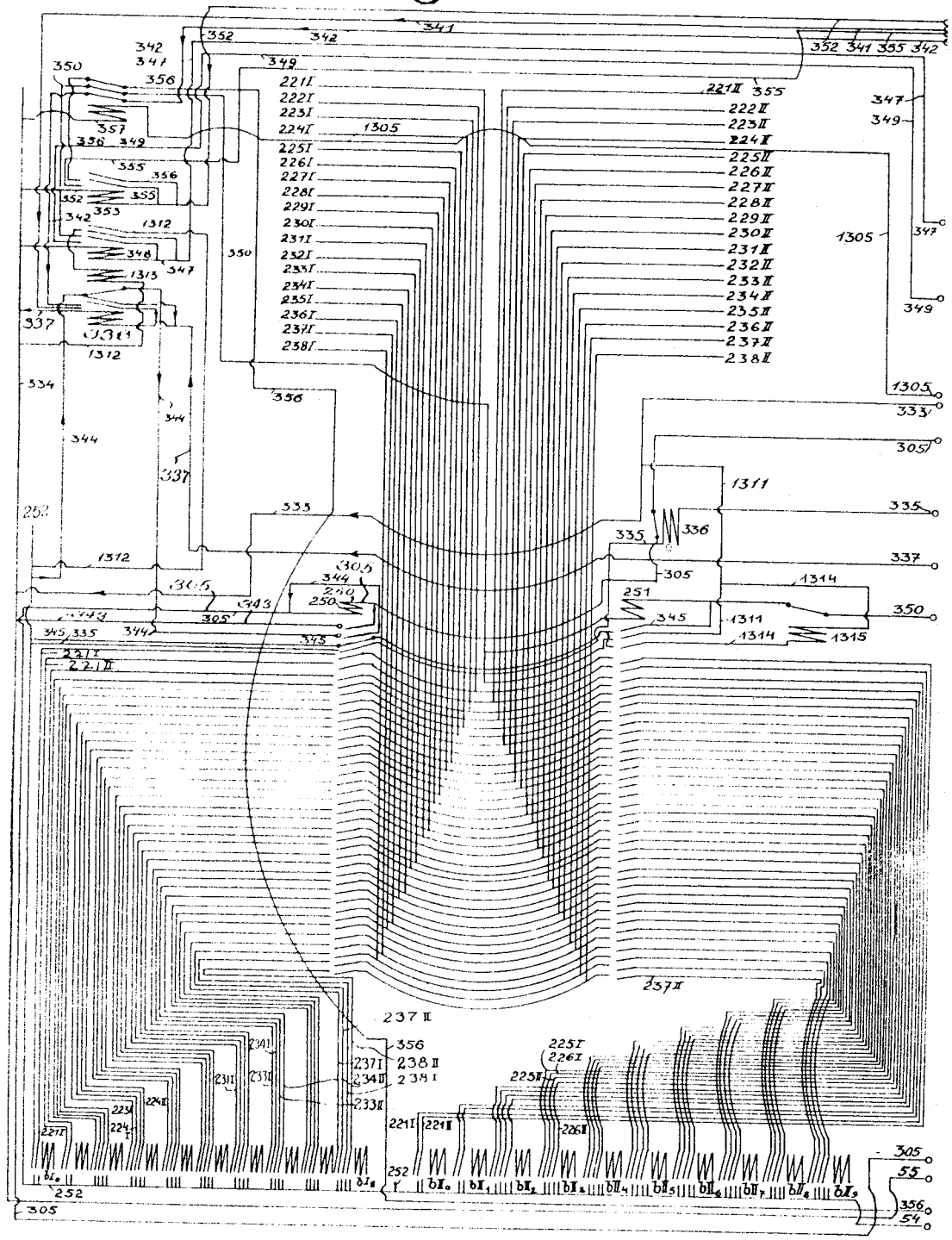
Figs. 11 and 12 show the connections between the multiplier group and multiplicand group and the connections for the auxiliary magnets for carrying out multiplication.
Figure 12:
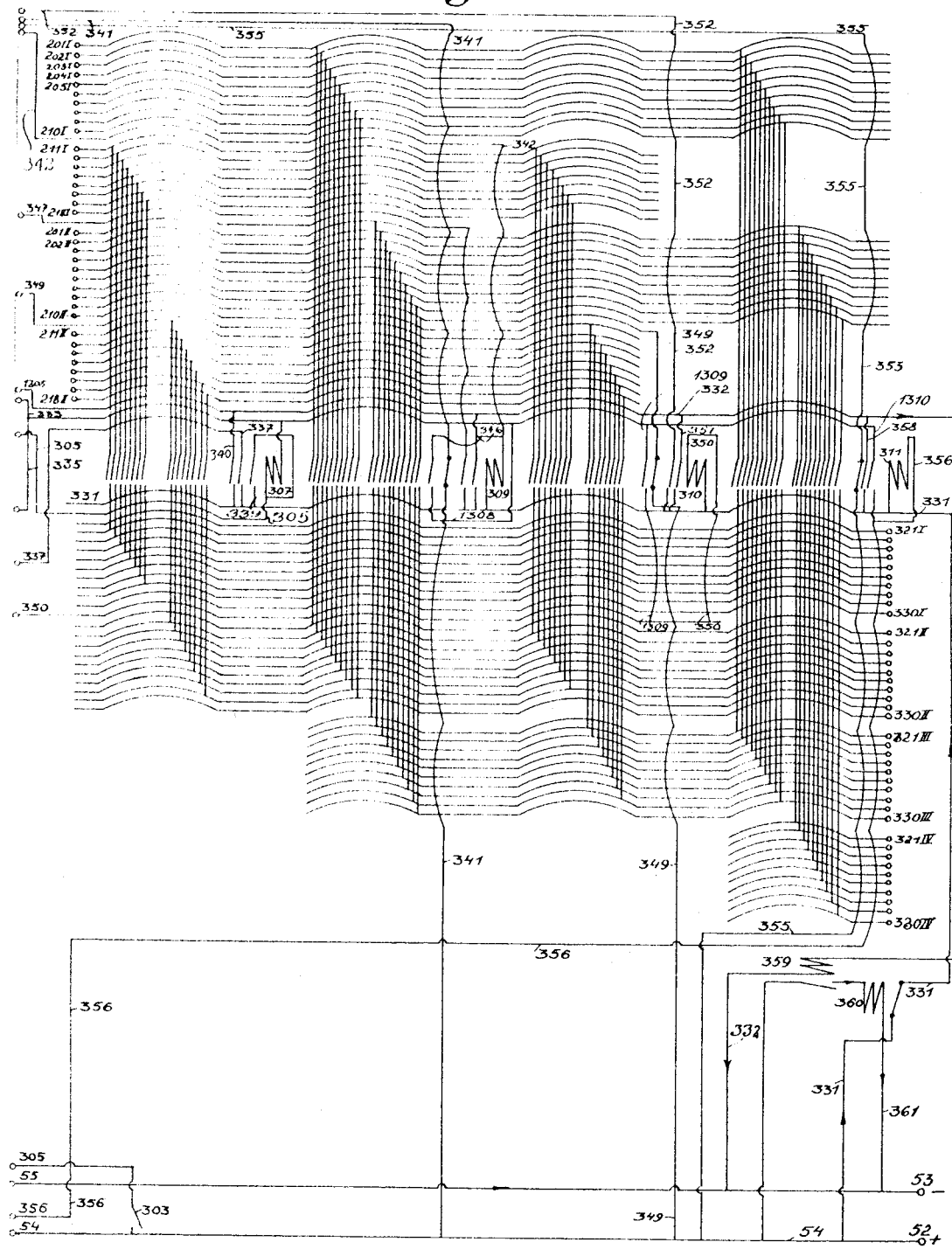

The further course of the conductors $221_I$ to $238_I$ and of the conductors $201_I$ to $218_I$ is shown in Figs. 11 and 12.

The system of connections over the armatures of the magnets $a_{I,0}$, $a_{I,1}$, $a_{I,2}$ ... $a_{I,9}$, described above, obviously applies in exactly the same manner to all the other magnets of the group $a$. The conductors co-ordinated to the magnets $a_{II,0}$, $a_{II,1}$, $a_{II,2}$ ... $a_{II,9}$ are correspondingly marked $201_{II}$, $202_{II}$, $203_{II}$ ... $210_{II}$, $211_{II}$, $212_{II}$ ... $218_{II}$ and $221_{II}$, $222_{II}$ ... $238_{II}$.

In Figs. 11 and 12 the conductors $221_I$, $222_I$ ... $238_I$ and $221_{II}$, $222_{II}$, $223_{II}$ ... $238_{II}$ are shown, also the conductors $201_I$, $202_I$ ... $210_I$, $211_I$, $212_I$ ... $218_I$ and $201_{II}$, $202_{II}$ ... $210_{II}$, $211_{II}$, $212_{II}$ ... $218_{II}$. The conductors leading over the armatures of the magnets of the group $a$ are left out in this case, as they have been described in detail with reference to Fig. 10 for a group corresponding to one digit value and are arranged in exactly the same way for all further digit values.

All the conductors $221_I$, $222_I$ ... $238_I$ and $221_{II}$, $222_{II}$ ... $238_{II}$ lead jointly on the one hand over the armature of the magnet 250 (Fig. 11) in such a manner that they are closed at this point, when the armature of the magnet is attracted, and on the other hand are branched off over the armature of the magnet 251. These branches are also closed at this point by the armature 251, when attracted.

The diagram of connections, as has already been stated, is only drawn out for two digit numbers; it is obvious that for each further digit a further branch of each conductor 221 to 238 must lead over another magnet armature.

The conductors leading over the armature of the magnet 250 lead over the armature of magnet group $b_{I,0}$, $b_{I,1}$, $b_{I,2}$ ... $b_{I,9}$, the arrangement being such, that the armature of the magnet $b_{I,0}$ closes all the conductors 221 at this point when it is attracted, thus in the present case which represents the multiplication of two digit numbers, the conductors $221_I$ and $221_{II}$, the armature of the magnet $b_I$ closes all the conductors 222, that is, in the present case $222_I$ and $222_{II}$, the armature of the magnet $b_{I,2}$, all the conductors 223 and 224, that is, $223_I$ and $223_{II}$ and $224_I$ and $224_{II}$ and so on to the magnet $b_{I,9}$, the armature of which closes the conductors $237_I$, $237_{II}$ and $238_I$, $238_{II}$. In exactly the same way the branches leading over the armature of the magnet 251 lead over the armature of the magnets $b_{II,0}$ $b_{II,1}$, $b_{II,2}$ ... $b_{II,9}$. All these conductors are connected in parallel from the conductor 252, which is connected to the conductor 54, and through the latter to the positive terminal 52 of the source of the current (Fig. 12).

To recapitulate:—When the magnet 250 is energized, all the conductors $221_I$ to $238_I$ and $211_{II}$ to $238_{II}$ are closed at this point. When a magnet of the group $b_I$ is also energized, in the two conductor groups $221_I$ to $238_I$ and $221_{II}$ to $238_{II}$ the conductors having the same numerical value are connected to the positive terminal of the source of current; for instance let us assume that the winding of the magnet 250 and of the magnet $b_{I,2}$ is energized. As will be readily seen from the drawing, both the conductors $223_I$ and $224_I$ as well as the conductors $223_{II}$ and $224_{II}$ are conductively connected to the conductor 252 and consequently to the positive terminal of the source of current.

The same applies to the branches leading over the armature of the magnet 251.

When the winding of the magnet 251 and the winding of one of the magnets of the group $b_{II}$ are energized, all the corresponding conductors of the same numerical value are connected to the positive terminal of the source of current.

*Ac*

Before describing the further course of the conductors 201, 202 ... 210, and 211, 212 ... 218, the connection of the magnet group $b$ to the keyboard shall first be described. (Figs. 6 to 9).

As this part of the system of connections is exactly equivalent to that of the magnet group $a$, a shorter description will suffice.

From the key 150 (Fig. 9) the conductor 186 leads over the armature of the magnet 121 (Fig. 8) to the conductor 190. Hence, if the winding of the magnet 121 is still energized, that is, if only one digit has been set up in the multiplicand group, the winding of the magnet 187 will be energized over the conductor 186, which, as already stated, is connected to the conductor 190, the armature of which magnet, when attracted, interrupts the conductor 188, so that the circuit closed over the winding of the magnet 121 is also interrupted.

From the conductor 186 the conductor 258 branches off to the winding of the magnet 253, over the armature of which the conductors 260, 261 ... 269 lead in a known manner, which establish the connection of the magnet windings $b_{I,0}$, $b_{I,1}$, $b_{I,2}$ ... $b_{I,9}$ with the omnibus conductors 131, 132 ... 140.

The conductor 259, which leads over the armature of the magnet 253 leads from the conductor 302, which branches off from the conductor 54, so that the conductor 259 is closed at this point by the said armature, when the latter is attracted, and thence over the armature of the magnet 254 (Fig. 9), by the attraction of which it is interrupted at this point and finally to the conductor 186. Thus, after the key 150 has been depressed, which closes a circuit over the winding of the magnet 253, a new circuit is closed over the said winding, which is independent of the depression of the key and remains closed until the armature of the magnet 254 is attracted.

From the conductor 302 (Fig. 8) there also leads the conductor 256 over the armature of the magnet 253 in the same manner as the conductor 259.

From the conductor 256 one of the conductors 281, 282 ... 290 leads over each armature of the magnet group $b_I$, so that the said conductors are closed at this point by the armatures, when attracted, which are all connected to the conductor 280, which leads over the winding of the magnet 292 and over the armature of the magnet 162 (Fig. 9), which interrupts it at this point on being attracted, to the conductor 161 and through the latter and the conductors 145 and 55 to the negative terminal 53 to the source of current.

Figure 8:
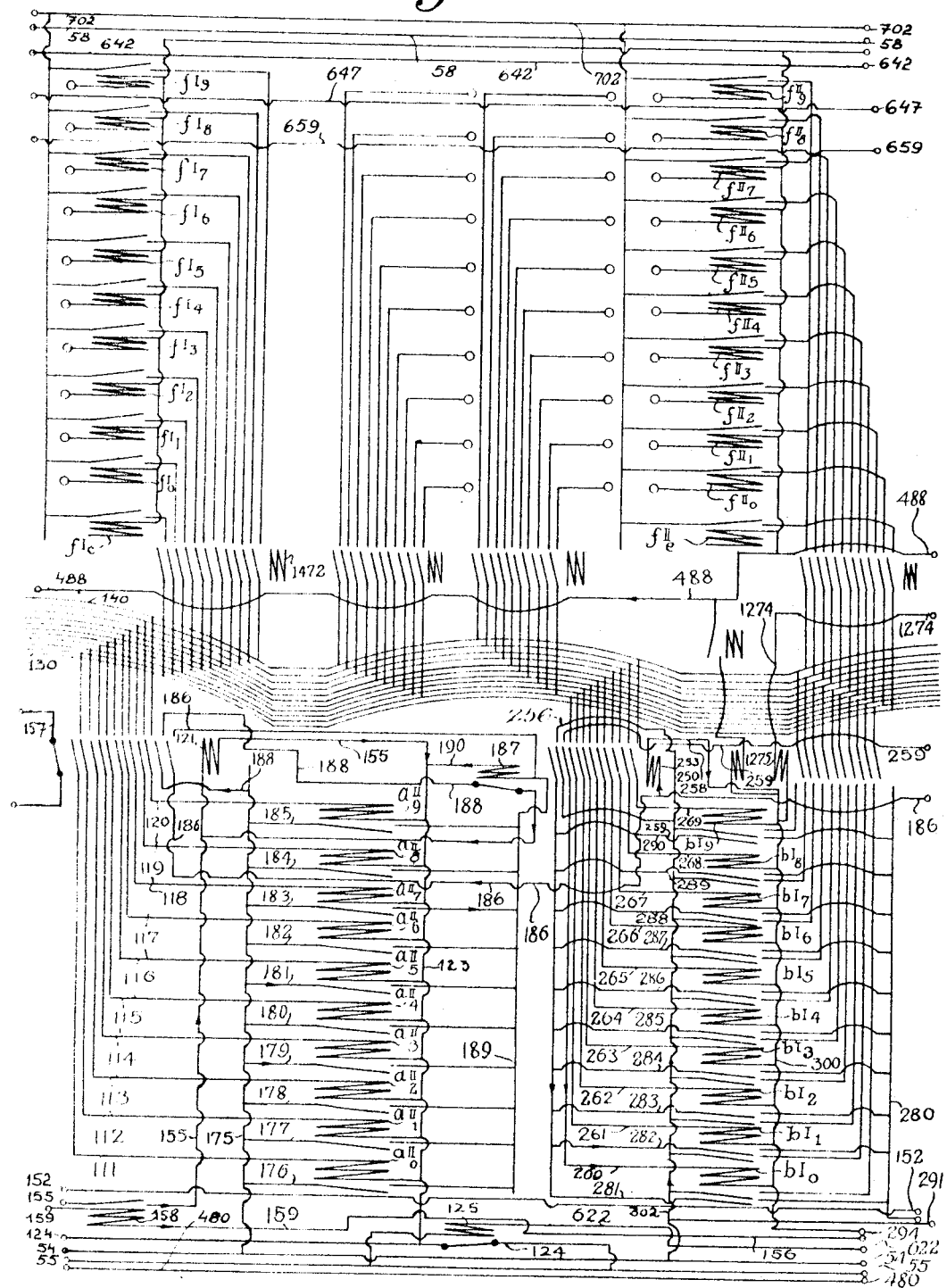
Figure 9:
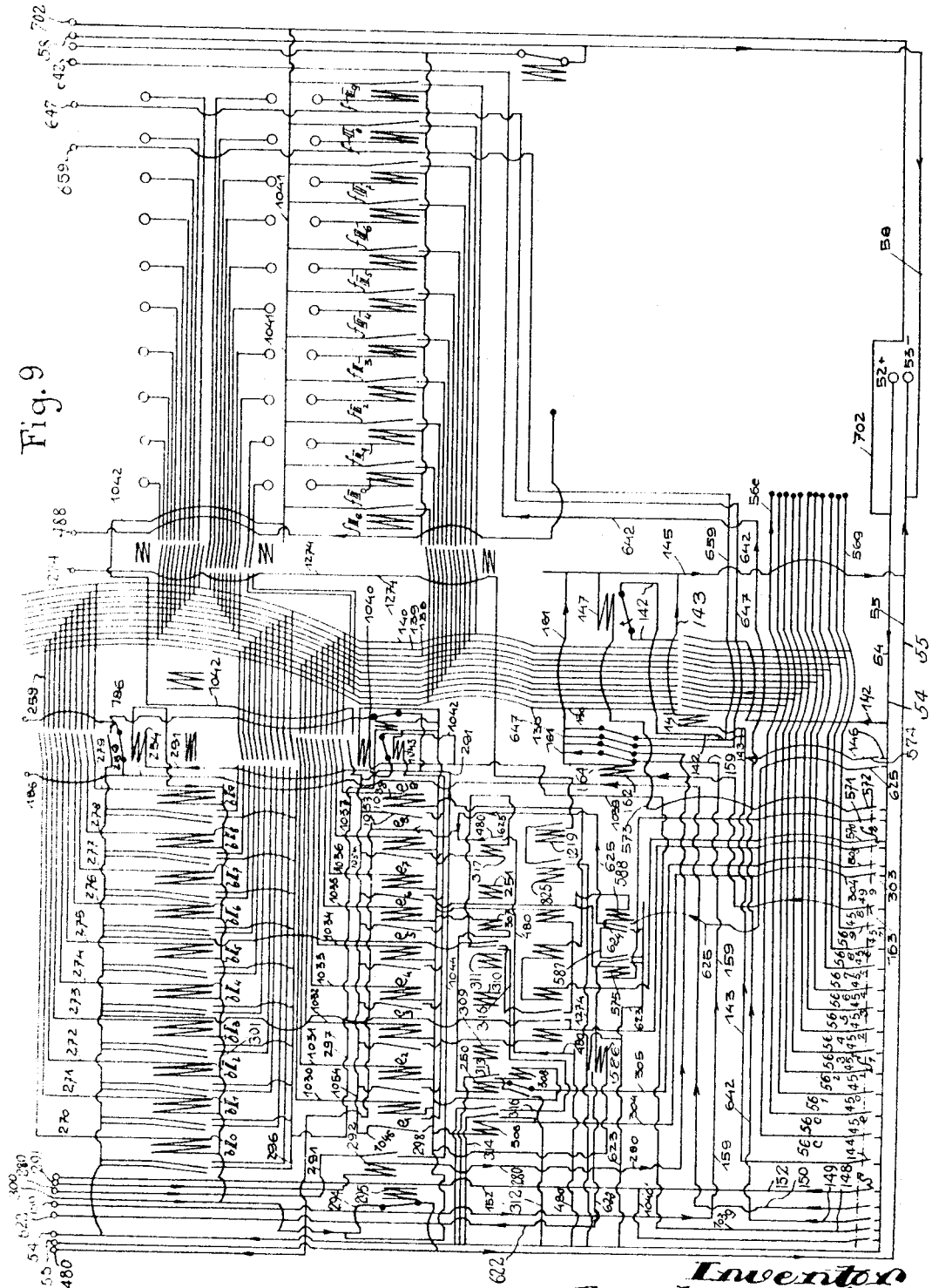

Over the armature of the magnet 292 there leads the conductor 291, which branches off from the conductor 302 (Fig. 8) and is closed at this point by the armature of the magnet 292, when the latter is attracted (Fig. 9). Thence the conductor 291 leads over the winding of the magnet 254 to the conductor 301, which is connected over the conductor 294 to the conductor 55 and consequently to the negative terminal 53 of the source of current. The conductor 294 is connected over the armature of the magnet 295, the function of which and the way it is connected is described below, the arrangement being such that the conductor 294 is interrupted at this point, on the armature being attracted.

The setting up of a number in the group $b$ (multiplier group) is effected in an exactly similar manner to the setting up of a number in the group $a$.

To recapitulate:—On the key 150, the multiplier key, being depressed, any connection between the omnibus conductors 130 to 140 and the group $a$ is broken and the connection of the said omnibus conductors and consequently the numeral keyboard to the group $b_I$ is established.

On a numeral key being depressed, the winding of the corresponding magnet of the group $b_I$ is energized and, after the key has been released (note conductor 280 and magnet 162), the connection is established between the omnibus conductors 130 to 140 and the magnet windings of the group $b_{II}$ and the connection to the group $b_I$ interrupted. A second numeral can now be set up on the group $b_{II}$ in exactly the same way as described above with respect to the group $a$.

The further connections of the magnets of the group $b$ will be described in detail below.

Before the further course of the conductors 201, 202 . . . 210 and 211, 212 . . . 218 referred to in sub "Ac" is described, a description shall be given of the following circuits, which are necessary for carrying out the multiplication of the numbers set up in the multiplicand group and the multiplier group.

From the double key 303 (Figures 9 and 12) there lead the conductors 304 and 305, the conductor 304 leading to the winding of the magnet 306 and being then connected to the conductor 298, which, as already stated, is connected over the conductors 294 and 55 to the negative terminal 53 of the source of current. The conductor 305 leads over the armature of the magnet 308, which interrupts it at this point, when attracted, to the winding of the magnet 250 and thence to the winding of the magnet 307. Over the armature of the magnet 306 there lead two circuits, which are closed at this point by the said armature being attracted, namely, the conductor 314, which in its subsequent course is connected to the conductor 304 and thus keeps closed the circuit closed by the depression of a key (key 303) over the winding of the magnet 306, as the said conductor leads from the conductor 54, and the conductor 316, which in its subsequent course leads over the armature of the magnet 311, so that it is closed at this point by the said armature, when attracted, and thence to the winding of the magnet 317 and to the conductor 298.

The conductor 313 leads over the armature of the magnet 250, so that it is closed at this point by the armature being attracted, and then leads to the winding of the magnet 308 and thence to the conductor 298.

Over the armature of the magnet 308 there leads a conductor 312, which is closed at this point by the armature, when attracted, and is connected to the conductor 313, so that it keeps the circuit closed over the winding of magnet 308, as it is connected to the conductor 54.

*Ad*

To recapitulate.—By closing the key 303 (the key for carrying out the multiplying operation) a circuit is closed through the conductors 304 and 305 over the windings of each of the magnets 306, 250 and 307.

The circuit over 306 remains closed by means of the conductor 314.

The armature of the magnet 250 closes a circuit over 308, which is kept closed by means of the conductor 312. The armature of 308 interrupts the conductor 305, so that the circuits over the windings of the magnets 250 and 307 are rendered independent of the depression of a key.

This need not apply to the armature 306, as the circuilt over its winding remains closed in any case to the end of the calculation.

The further connections of the magnets 307, 309, 310, 311 and 250 and 251 are shown in Figs. 11 and 12.

The connecting conductors lead between the conductors $201_I$, $202_I$ . . . $210_I$, $211_I$, $212_I$ . . . $218_I$ and $201_{II}$, $202_{II}$ . . . $210_{II}$, $211_{II}$, $212_{II}$ . . . $218_{II}$ on the one hand and the conductors $321_I$, $322_I$ . . . $330_I$, $321_{II}$, $322_{II}$ . . . $330_{II}$, $321_{III}$, $322_{III}$ . . . $330_{III}$, $321_{IV}$, $322_{IV}$ . . . $330_{IV}$ on the other hand lead over the armatures of the magnets 307, 309, 310 and 311 (Fig. 12), the arrangement being such that they are closed at this point, when the armatures are attracted.

Each of the conductors 321, 322 . . . 330 corresponds, as will be understood, when following out the further course of these conductors below, to one of the numerical values from 0 to 9 and each group having the same Roman index corresponds to one digit value.

The armature of the magnet 307, when attracted, connects, as will be readily seen from the drawing, the conductors $211_I$, $212_I$ . . . $218_I$ and $211_{II}$, $212_{II}$ . . . $218_{II}$ to the conductors $322_I$, $323_I$ . . . $329_I$ and $322_{II}$, $323_{II}$ . . . $329_{II}$.

The armature of the magnet 309, when attracted, connects the conductors $201_I$, $202_I$ . . . $210_I$ and $201_{II}$, $202_{II}$ . . . $210_{II}$ to the conductors $321_I$, $322_I$ . . . $330_I$ and $321_{II}$, $322_{II}$ . . . $330_{II}$.

The armature of the magnet 310, when attracted by the magnet, connects the conductors $211_I$, $212_I$ . . . $218_I$ and $211_{II}$, $212_{II}$ . . .

$218_{II}$ to the conductors $322_{II}$, $323_{II}$ ... $329_{II}$ and $322_{III}$, $323_{III}$ and $329_{III}$.

The armature of the magnet 311, when attracted by the magnet, connects the conductors $201_I$, $202_I$ ... $210_I$ and $201_{II}$, $202_{II}$ ... $210_{II}$ to the conductors $321_{III}$, $322_{III}$ ... $330_{III}$ and $321_{IV}$, $322_{IV}$ ... $330_{IV}$.

As was set forth in sub "Ab" and the following, the conductors 201, 202 ... 210 correspond to the numerical values from 0 to 9 and the conductors 211, 212 ... 218 to the numerical values from 1 to 8. If in the group $a$ (Figs. 6 to 10) in each sub-group of ten magnets corresponding to a numerical value one magnet winding is energized and in the group $b$ one magnet winding is energized, then in the groups of conductors 201, 202 ... 210 and 211, 212 ... 218 those conductors are connected in parallel, with the positive terminal of the source of current, which correspond to the numerical values of the one digit or two digit products and those numerical values, which correspond to the energized magnets of the groups $a$ and $b$. Thus, assuming that one magnet is energized in each of the groups $a_I$ and $a_{II}$ and one magnet in the group $b_I$, then in the group of conductors $201_I$, $202_I$ ... $210_I$ that conductor will be connected to the positive terminal of the source of current, which corresponds to the units digit of the product of the numerical values of the energized magnets of group $a_I$ and $b_I$; in the group of conductors $211_I$, $212_I$ ... $218_I$ that conductor, which corresponds to the tens digit of the said product, in the group of conductors $201_{II}$, $202_{II}$ ... $210_{II}$ that conductor is connected to the positive terminal of the source of current, which corresponds to the units digit of the product of the energized magnets of groups $a_{II}$ and $b_I$ and in the group of conductors $211_{II}$, $212_{II}$ ... $218_{II}$ that conductor, which corresponds to the tens digit of the said product.

When one magnet each of the groups $a_I$ and $a_{II}$ and one magnet of the group $b_{II}$ is energized, the same applies, with the exception that in each case $b_{II}$ must be substituted for $b_I$.

The conductors shall now be described which establish the connection between the magnets 250, 251 and 307, 309, 310 and 311.

From the key 303 (Fig. 12) there leads the conductor 305 first to the winding of the magnet 250 (Fig. 11) and thence over the armature of the magnet 336, which, when attracted, interrupts it at this point, to the winding of the magnet 307 (Fig. 12) and thence to the conductor 333, which is connected to the conductor 334 (Fig. 11), which is itself connected over the conductor 55 to the negative terminal 53 to the source of current.

That part of the conductor 305, which lies between the windings 250 (Fig. 11) and 307 (Fig. 12) must consist of resistance wire, the total resistance of which is at least as great as that of a magnet coil. Over this conductor at the moment, in which the two amatures 307 and 250 are closed, the terminals of the source of current are short-circuited for a brief moment until the armature 336 is attracted (Fig. 11) E I.

Besides the conductors already referred to the following conductors also lead over the armature of the magnet 250, so that they are closed at this point, on the armature being attracted:—

(1) The conductor 344 leading from the conductor 252 and over the armature of the magnet 1313, which, on being attracted, interrupts it at this point, and thence over the armature of the magnet 250 in the manner already described and to the conductor 305;

(2) The conductor 343, which leads from the conductor 305 to the conductor 334, which as already stated, is connected to the negative terminal of the source of current;

(3) The conductor 335, which leads from the conductor 252 over the winding of the magnet 336 to the conductor 333 (Fig. 12), which as already stated leads to the conductor 334 (Fig. 11), that is, is also connected to the negative terminal 53 of the source of current.

Thus, after the armature of the magnet 250 has been attracted, not only is the connection between the magnet 250 and the key 303 (Fig. 12) broken, as described in sub "Ad", but also the connection between 250 and 307 by the armature of the magnet 336. Over the conductors 344 and 343 however the circuit over the winding of the magnet 250 remains closed until the armature of the magnet 1313 is attracted.

Besides the circuits already mentioned, the following circuits also lead over the armature of the magnet 307:—

(1) The conductor 340 (Fig. 12) which starting from the conductor 331 leads to the conductor 332. The latter leads over the winding of the magnet 359 to the conductor 55, which is connected to the negative terminal 53 of the source of current. From the conductor 332 the conductor 1305 is branched off, which leads over the magnet winding 357 (Fig. 11) to the conductor 334, which as already stated is connected over the conductor 55 to the negative terminal 53 of the source of current. The conductor 331 (Fig. 12) starts from the conductor 54 and is therefore connected by the latter to the positive terminal 52 of the source of current and leads over the armature of the magnet 360, the arrangement being such that it is interrupted by the closing of the armature.

(2) The conductor 337, which starts from the conductor 331 and leads over the winding of the magnet 338 (Fig. 11) and finally to the conductor 334, which is connected over the conductor 55 to the negative terminal of the source of current.

(3) The conductor 339, which starts from the conductor 331 and leads to the conductor 305 and energizes the winding of the magnet 307, even after the conductor 305 has been interrupted by the magnet 336, until the conductor 331 is interrupted.

(Re 1) The armature of the magnet 359 (Fig. 12), when energized, closes the conductor 361, which starts from the conductor 54 and leads over the winding of the magnet 360 to the conductor 55. Thus, when the armature of the magnet 307 is attracted, it will remain so until the armature of the magnet 360 interrupts the conductor 331, that is, just as long as is necessary for attracting the armature of a second magnet. In the next moment the circuit over the winding of the magnet 307 is interrupted and the armature leaves the magnet again.

(Re 2) Over the armature of the magnet 338 (Fig. 11) there lead two circuits, namely, the conductor 341, which starts from the conductor 54 and leads over the armature of the magnet 309 (Fig. 12), the arrangement being such that it is interrupted at this point by the armature being attracted and leads thence over the armature 338 (Fig. 11) to the conductor 337.

The winding of the magnet 338 is thus kept energized by the conductor 341 (Fig. 12), even after the conductor 337 has been interrupted by the armature 307 being released and will remain so until the armature of the magnet 309 is attracted.

There also leads over the armature of the magnet 338 (Fig. 11) the conductor 342, which starting from the conductor 331 (Fig. 12) leads to the winding of the magnet 309 and thence over the armature of the magnet 357 (Fig. 11) in such a manner that it is interrupted at this point by the armature, when attracted, and also leads finally to the conductor 337.

Thus, after the winding of the magnet 357, the connections and the function of which will be described below, has become deenergized, the magnet winding 309 will be energized by the conductor 342 and the circuit over the magnet 338 will remain closed, in spite of the conductor 341 being interrupted.

Over the armature of the magnet 309 there lead in an entirely analogous manner, besides the conductors already described, three further conductors, viz, the conductor 346, which again leads to the conductor 332 and actuates the magnets 359, 360 and 357, in the same manner as did the conductor 340 in the case of the magnet 307, and the conductor 347, which closes the circuit over the magnet 348, and the conductor 1308, which starts from the conductor 342 and leads to the conductor 333, which keeps the circuit leading over the winding 309 closed, even after the armature 357 has been attracted, until the armature 360 is attracted.

Over the armature 318 (Fig. 11) there leads the conductor 1312, which starts from the conductor 252 and leads over the winding 1313 to the conductor 334 and is closed by the armature 348, when the latter is attracted. It should be noted, that the armature of the magnet 1313, when attracted, interrupts the conductor 344 and thereby deenergizes the winding of the magnet 250. The winding of the magnet 348 remains energized by the conductor 349, which leads over the open armature of the magnet 310, even when the circuit leading over the winding of the magnet 309 is deenergized by the conductor 331, (magnet 360) being interrupted. Over the armature of the magnet 348 there leads the conductor 350, which leads successively over the windings of the magnets 310 (Fig. 12) and 251 (Fig. 11) and leads also over the armature of the magnet 357 in such a manner that it is first closed at this point when the winding of the magnet 357 is deenergized. The part of the conductor 350 lying between the windings 310 and 251 must again be made of resistance wire, as was the case with the conductor 305.

The winding of the magnet 251 remains energized by the conductors 345 and 1311, the conductor 345 starting from the conductor 252 and leading over the armature of the magnet 250 in such a manner that it is interrupted, on the armature being attracted, and the conductor 1311 branching from the conductor 350 and leading to the conductor 333, so that the circuit leading over 251 remains closed, even after the armature 357 has been attracted. The armature 251, when attracted, closes, besides the conductors 345 and 1311 just referred to, the conductor 1314 as well, which starts from the conductor 345 and leads over the winding 1315 to the conductor 1311. The armature 1315, on being attracted, interrupts the conductor 350.

The conductors 351, 352, and 1309 lead over the armature of the magnet 310 (Fig. 12) in an exactly analogous manner. The function of the conductor 351 is the same as in the previous cases that of the conductors 340 and 346. The function of the conductor 1309 is the same as in the previous cases that of the conductors 339 and 1308. The conductor 352 leads to the winding of the magnet 353 (Fig. 11), over the armature on which the conductor 335 is taken, which starting again from the conductor 54 (Fig. 12) leads over the armature of the magnet 311 in such a manner that it is interrupted at this point by the armature being attracted. The conductor 356 leads in an analogous manner to the conductors 342 and 350 over the winding of the magnet 311 and over the armature of the magnet 353 and is then closed when the magnet 357 becomes deenergized. The circuit 358 leading over the armature of the magnet 311 (Fig. 12) has the same function as the conductors 340, 346 and 351.

Ae

To recapitulate:—On the key 303, the key for carrying out the operation of multiplication, being closed, the windings of the magnets 307, 309, 310 and 311 are energized successively and remain energized for as long a time as is necessary, after their armatures have been attracted, to attract the armature of a second magnet, the winding of which only becomes energized after their armatures have been attracted.

Simultaneously with the winding 307, the winding 250 becomes energized. This winding is deenergized again simultaneously with the winding 309. The winding 251 is energized simultaneously with the winding 310.

Figure 13:
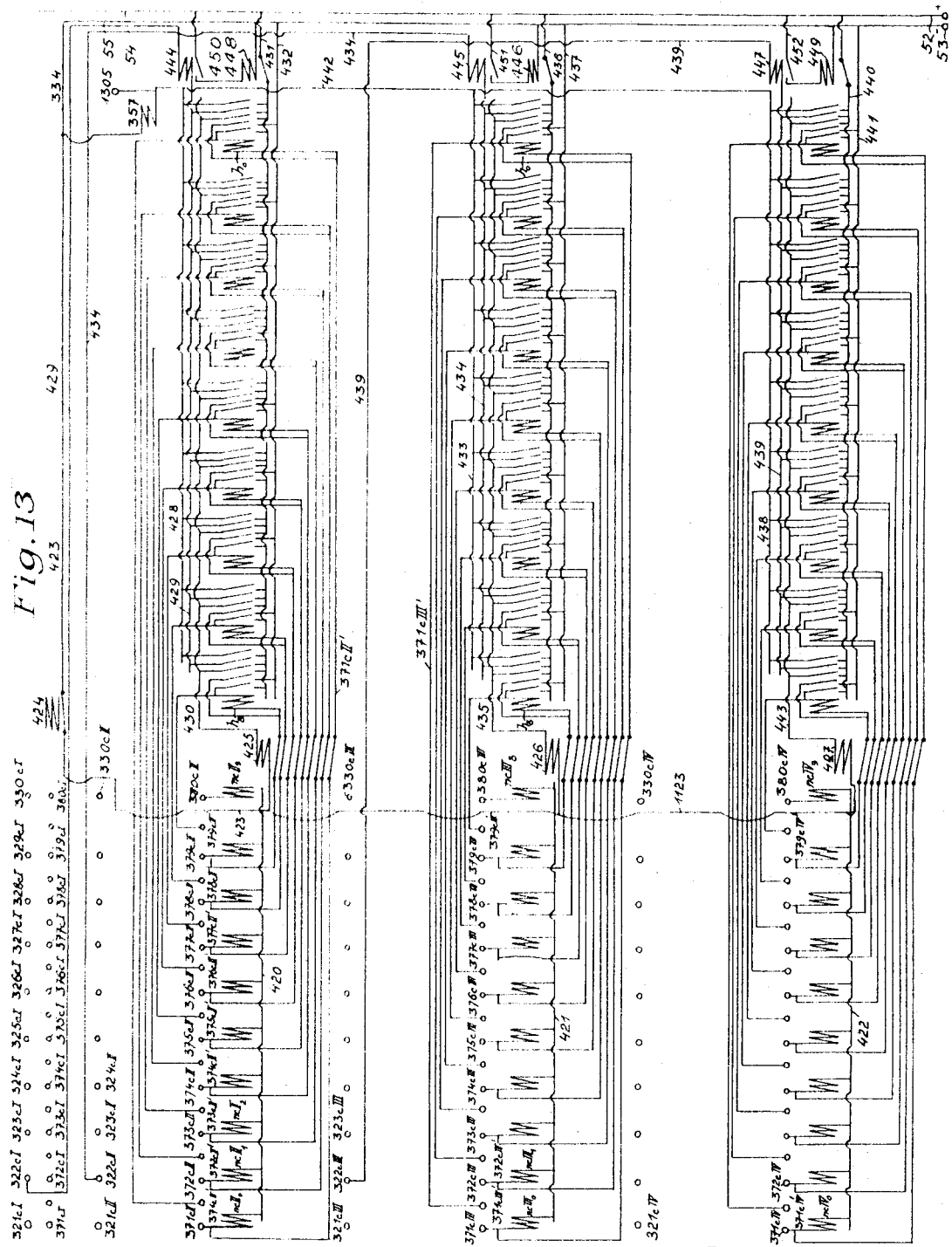
Fig. 13 shows the connections for carrying over the tens in the operations of addition and multiplication.

Before tracing the further course of the conductors $321_I, 322_I \ldots 330_I, 321_{II}, 322_{II} \ldots 330_{II}, 321_{III}, 322_{III} \ldots 330_{III}, 321_{IV}, 322_{IV} \ldots 330_{IV}$ to the magnets of the group $c$ in Fig. 13, let us consider a group of 11 magnets of the said group $c$ corresponding to one digit value (Figs. 14–17).

Figs. 14–17 do not show the connections of the magnets of the group $c$ (Figs. 6, 7), but those of the group $f$. As, however, a portion of this system of connections is identical with the connections of the magnets of the group $c$, the system of connections of the latter shall now be discussed with reference to these figures. Everything stated below in connection with the electromagnets $f_e, f_o, f_1, f_2 \ldots f_9$, applies equally to the magnets $c_e, c_o, c_1, c_2 \ldots c_9$.

The conductors 321, 322, 323 ... 330 are in these figures shown without indices, since everything that is said with respect to them in this connection applies for all sub-groups of 11 magnets each corresponding to one digit value. What is said below with respect to the magnets $f_e, f_o, f_1, f_2 \ldots f_9$ applies equally to the magets $c_{I,e}, c_{I,o}, c_{I,1} \ldots c_{I,9}; c_{II,e}, c_{II,o}, c_{II,1} \ldots c_{II,9}; c_{III,e}, c_{III,o}, c_{III,1} \ldots c_{III,9}$ and so on.

From each of the conductors 321, 322 ... 330 over each armature of the magnet group $f$ (hence also of the group $c$) a conductor branches off in such a manner that it is closed at this point by the armature, when attracted, and leads to one each of the conductors of the groups 371, 372 ... 380 and 371′, 372′ 373′, 374′ ... 380′, the arrangement being such that over the armature of the magnet $f_o$, which corresponds to a space, the conductor 321 is connected to the conductor 371, the conductor 322 to the conductor 372 ... and the conductor 330 to the conductor 380; over the armature $f_o$, which corresponds to the numerical value 0, as will be seen below, in exactly the same manner; over the armature $f_1$, having the numerical value 1, in such a manner that the conductor 321 is connected to the conductor 372, the conductor 322 to 373 ... the conductor 330 to the conductor 371′, in short, assuming that the conductors 321, 322 ... 330 correspond to the numerical values from 0 to 9, similarly the conductors 371, 372 ... 380 and the conductors 371′, 372′ ... 380′ in such a manner that each conductor of the group 321, 322 ... 330 is connected over each attracted armature of the magnet group $f$ to that conductor of the groups 371, 372 ... 380 or 371′, 372′ ... 380′, which corresponds to the units digit of the one-digit or two-digit sum resulting from the addition of the numerical values of the particular conductors of the group 321, 322 ... 330 and of the particular magnet, the connection being established to a conductor of the group 371, 372 ... 380, if the sum has only one digit and to a conductor of the group 371′, 372′ ... 380′, if the sum has two digits.

The conductors 371′, 372′, 373′ ... 380′ are connected over the winding of the auxiliary magnets $h_0, h_1, h_2 \ldots h_9$ (Fig. 17) to the equivalent conductors 371, 373 ... 380. The auxiliary magnets $h_0, h_1, h_2 \ldots h_9$ effect the carrying-over of the tens in a manner to be described below.

From each of the conductors 371, 372 ... 380 a conductor namely the conductors 392, 393, 394 ... 401, leads to the windings of the magnets $n_0, n_1, n_2 \ldots n_9$ all leading thence to the conductor 402, which is connected to the conductor 55, which as repeatedly stated, is connected to the negative terminal 53 of the source of current. The said conductors 392, 393, 394 ... 401 must be made of resistance wire, each resistance being as great as that of a magnet coil, since, as will be shown below when discussing the tens carrying-over arrangement, the terminals of the source of current are short-circuited for a brief moment over these conductors.

Over each armature of the magnets $n_0, n_1, n_2 \ldots n_9$ and also over $n_e$ (in Figs. 14–17) the conductors shown to the left of each magnet winding belonging to the corresponding magnets) a conductor, namely, the conductors 381, 382, 383 ... 391, leads in such a manner that each is closed at this point by the armature, when attracted, to the winding of the magnets $f_e, f_o, f_1 \ldots f_9$ and thence to the conductor 404, which is connected to the conductor 55.

Besides the above conductors, 11 other conductors, which are connected in parallel, namely the conductors 405, 406, 407 ... 415 lead over the armatures of the magnets of the group $n$ starting from the conductor 403 (Fig. 17) in series with all the armatures starting from the armature $n_o$, the arrangement being such that, on the armature being attracted, ten conductors are in each case interrupted at this point and the eleventh is closed, and lead thence one after the other to the conductors 392, 393, 394 ... 401, which as already stated, lead to the magnets $n_0, n_1, n_2 ... n_9$.

Only the conductor 414 leads directly to the winding of the magnet $n_e$ and is the only one of the 11 conductors, which is not closed by any of the armatures, when attracted. The remaining 10 of the 11 conductors are each closed by the attraction of that armature, to the magnet winding of which they lead.

Figure 14:
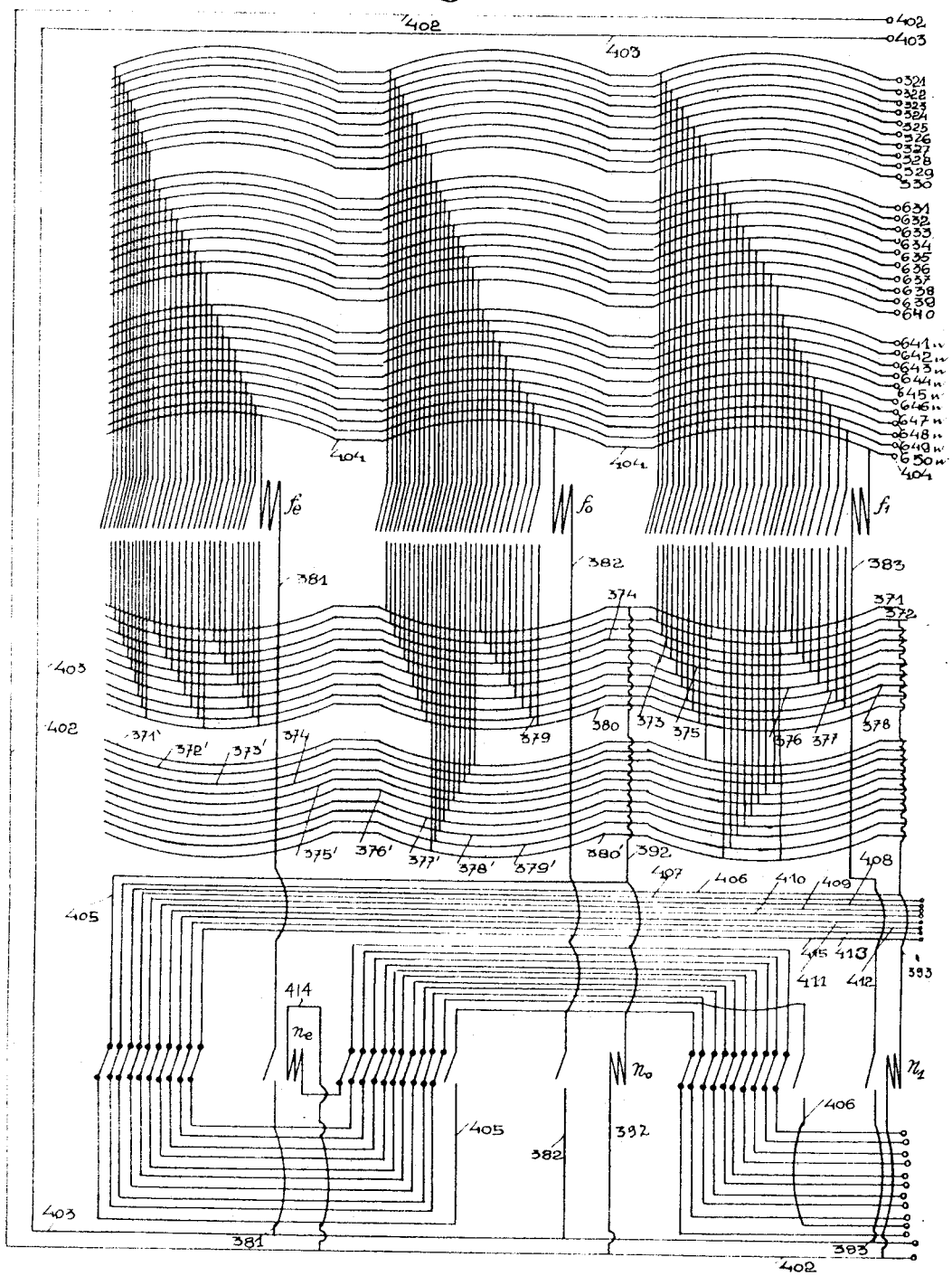
Figs. 14, 15, 16 and 17 show the connections of a digit sub-group of the sum and difference group.
Figure 15:
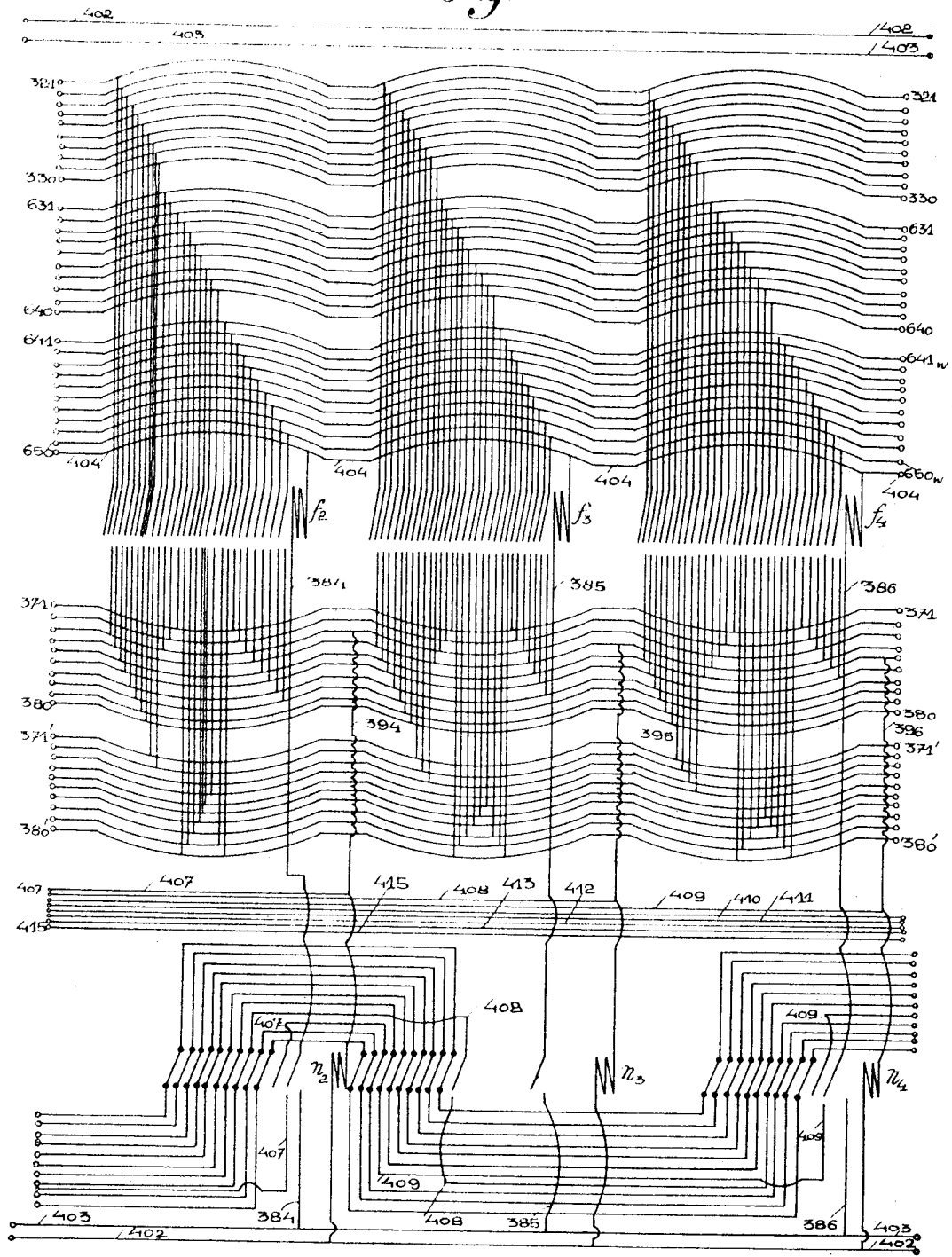
Figure 16:
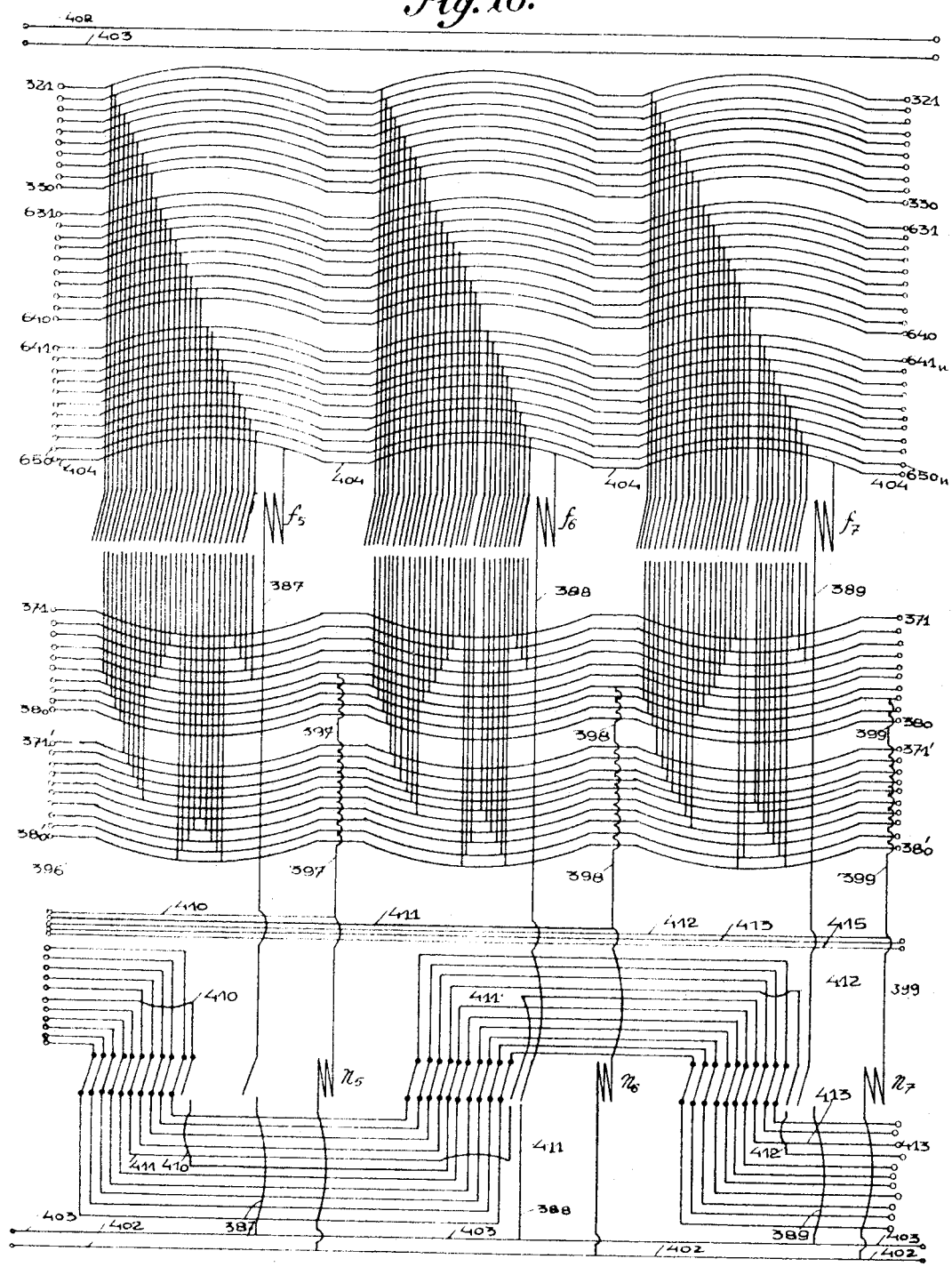
Figure 17:
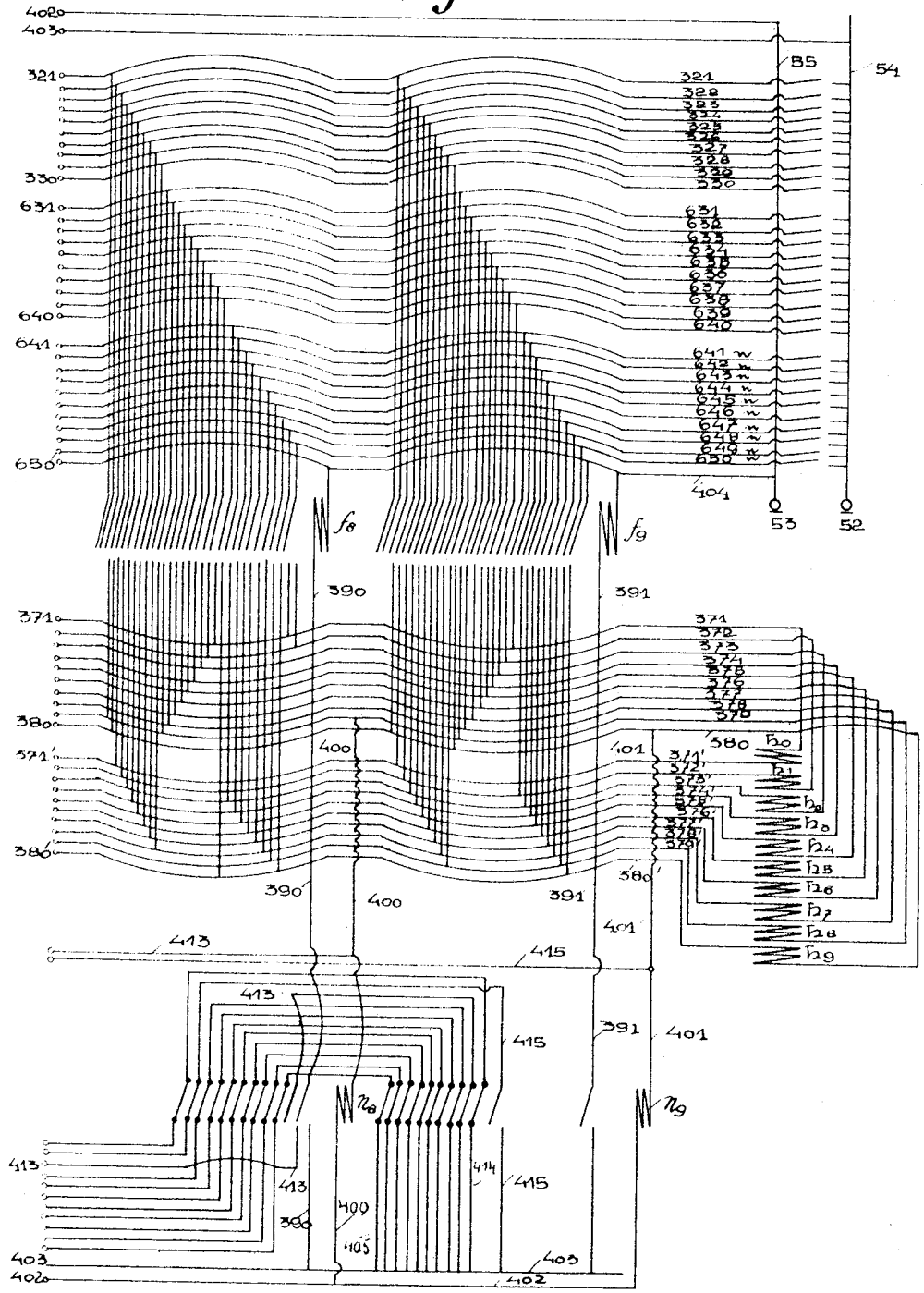

Hence, when none of the magnet windings $n_0, n_1 ... n_9$ is energized, one conductor of the group 405, 406 ... 415 is interrupted by each armature, all but the conductor 414, which is not broken at any point and starting from the conductor 403 leads over all the armatures $n_0, n_1 ... n_9$ and finally over the winding $n_e$ to the conductor 402 (Fig. 14). The magnet winding $n_e$ (and consequently the magnet winding $f_e$ through the conductor 381) is always energized and its armature is always attracted, when no other winding of this magnet group is energized.

When one of the conductors 321, 322 ... 330 is connected to the positive terminal of the source of current, the circuit is closed over the armature $f_e$ and the conductor groups 371, 372 ... 380 and 393, 394 ... 401 corresponding to this conductor, and one of the windings $n_0, n_1 ... n_9$.

If, for instance, the conductor 323 having the numerical value 2 were connected to the positive terminal of the source of current, a circuit is closed over 323 the armature of the magnet $f_e$—373—394—$n_2$—402—55—53.

When, however, one of the armatures $n_0, n_1 ... n_9$ is attracted, all the conductors of the group 405, 406 ... 415 are interrupted, except the conductor leading to the winding of the corresponding magnet, in the present example the conductor 407.

The circuit closed over the winding of a magnet of the group $n_e, n_0, n_1 ... n_9$ remains closed until another winding of the same digit value magnet group becomes energized. The magnet last energized remains energized and all the others become de-energized.

Returning to the example under discussion we thus find that, after the conductor 323 with the numerical value 2 has been connected to the positive terminal of the source of current, the armature of the magnet $n_2$ will be attracted and that the magnet winding $f_2$ will have become energized over the conductor 384, its armature being attracted. The armature $f_e$ is released, since that of $n_e$ is also released.

If, therefore, for instance the conductor 325 having the numerical value 4 be connected to the positive terminal of the source of current, the following circuit is closed:—

Positive terminal—325—armature of magnet $f_2$—377—398—winding $n_4$—402—55—53. $n_4$ remains energized through the conductor 411 and $f_4$ is energized (through the conductor 388) and its armature is attracted.

This sequence of operations can be repeated any number of times, that magnet always remaining closed, which corresponds to the units digit of the sum of the numerical values, to which the conductors of the group 321, 322 ... 330 correspond, which are successively connected to the positive terminal of the source of current.

Fig. 13 shows the course of all the conductors $321_I, 322_I ... 330_I; 321_{II}, 322_{II} ... 330_{II}; 321_{III}, 322_{III} ... 330_{III}, 321_{IV}, 322_{IV} ... 330_{IV}$ and also the arrangement for carrying over the tens.

In Fig. 13 the conductors of the group 321, 322 ... 330 are again provided with indices I, II, III and IV according to their digit values. Their connections over the armatures of the magnets of the group $c$, which were described in detail for one digit value with reference to Figs. 14–17, are not shown in this figure nor the magnets of the group $c$. In this figure only the magnets $n$ and $h$ are shown, the magnets of the group $n$ being provided with the indices $c$, so as to indicate that they belong to the group $c$ as in Figs. 14–17 they belong to the group $f$. They are also provided with the indices II, III and IV, for indicating their digit value.

As in connection with Fig. 13 only the tens transfer is to be discussed and as it is not possible to carry over a ten from the group corresponding to the first digit value as the highest value, the first group $n_c$, I, O. $n_{c\ I, I} ... n_{c\ I, 9}$ is also not included in this figure.

According to what was stated at the beginning under "Ae" a tens transfer to the next column is necessary, when a conductor of the group 321, 322 ... 330 is connected to a conductor of the group $371', 372', 373' ... 379'$ over an armature of the group $c$. The conductors provided with the numeral $380'$ do not apply in connection with the group $c$, which is only arranged for addition, as the sum of two one digit numbers can never result in 19. Hence the magnets $h_9$ are also not required.

As already stated, the conductors of the groups $371', 372' ... 379'$ (in the present instance $371_{cII'}, 372_{cII'}, 373_{cII'} ... 379_{cII'}, 371_{cIII'}, 372_{cIII'} ... 379_{cIII'}$ and so on) lead over the windings of the magnets $h_0, h_1, h_2 ... h_8$ to the conductors 371, 372 ... 379 (in the present case to the conductors $371_{cII}, 372_{cII} ... 379_{cII}$ and so on). The magnets of the groups $h$ all have the same function, as will be made clear below, and it is so obvious to which separate digit values they belong that the provision of indices for the separate groups has been omitted.

Five conductors lead over each armature of the group $h$ in such a manner that they are closed at this point by the armatures, when attracted, namely, in the group belonging to the magnet group $n_{cII}$ in their sequence from left to right, the first conductor starting from the conductor 431 leads to the corresponding conductor of the group $371_{cII}'$, $372_{cII}'$ ... $379_{cII}'$ before reaching the winding of the corresponding magnet $h$, the second conductor starting from the conductor 432 leads to the same conductor after leaving the corresponding magnet winding, the third conductor leads to the conductor 430, the fourth to the conductor 429 and the fifth to the conductor 428. The third, fourth and fifth conductors each start like the first one from the conductor 431.

The conductor 430 mentioned above leads to the magnet winding 425 and to the conductor 423, which is connected over the conductor 55 to the negative terminal 53 of the source of current. The parts of the conductor group $371_{cII}'$, $372_{cII}'$, $373_{cII}'$ ... $379_{cII}'$ coming from the magnet windings $h$ lead over the armature of the magnet 425 in such a manner that they are interrupted at this point by the armature being attraced.

The conductor 429 leads to the winding 444 and thence to the conductor $322_{cI}$, that is, to the conductor 322 having the numerical value 1, the next higher digit group. The armature of the magnet 444 having been attracted closes the conductor 450, which starts from the conductor 54 and leads to the winding of the magnet 448 and thence to the conductor 55. The armature of the magnet 448, when attracted, interrupts the conductor 431, which starts from the conductor 54.

It now becomes clear, why the conductors 392, 393, 394 ... 401 (Figs. 14–17) must be made of resistance wire. After one of the armatures $h$ and one of the armatures $n$ has been attracted, which occurs simultaneously, in the short period of time until the armature 425 is attracted the circuit leading over the winding $n$ connects the branch leading over one of the said conductors and thence over one of the conductors 371, 372 ... 380 and over one of the armatures $h$ to the conductor 432, so that a short circuit would be established between the two terminals of the source of current if sufficient resistances were not inserted.

The conductor 428 leads to the conductor 442, which leads to the winding of the magnet 357 referred to in sub "Ad" and thence to the conductor 423.

The system of connections for the other digit value groups is exactly the same, 428, 429 and 430 corresponding to the conductors 433, 434, 435 and 438, 439, 443; the magnets 444 and 448 to the magnets 445, 446 and 447, 449; the conductors 431 and 432 to the conductors 436, 437 and 440, 441. Thus, after a magnet winding of the group $h$ has been energized, the 5 conductors just described are closed. A short description shall now be given of the way in which they function. The first two close a circuit over the winding of the corresponding magnet, which remains closed, even when the magnet 425 interrupts the conductors 371', 372' ... 379', the third closes a circuit over the same magnet 425, the fourth closes a circuit over the magnet 444, which itself closes a circuit over the winding 448, which interrupts the circuit 431, so that the circuit closed by the first two conductors over the magnets $h$ is also interrupted. The fourth conductor leads at the same time to the next higher group of digit values, where it adds one in the manner described with reference to Figs. 14–17. The fifth conductor finally closes a circuit over the magnet 357, which prevents a fresh addition of the partial products being made as long as it is energized, as is explained in sub "Ad" and the following.

*Af*

To recapitulate:—On the multiplication key 303 (Fig. 12) being depressed, the windings of the magnets 250 and 307 (Figs. 11 and 12) become energized and close a series of circuits described in detail above, which cause to be connected to the positive terminal of the source of current those conductors in the conductor groups $201_I$ ... $210_I$, $211_I$ ... $218_I$ and $201_{II}$ ... $210_{II}$, $211_{II}$ ... $218_{II}$, which correspond to the units and tens digits of the partial products obtained from the numerical values of the magnets actuated in the group $a_I$ and $a_{II}$ on the one hand and the numerical value of the magnet actuated in the group $b_I$.

By the armature 307 being attracted the conductors corresponding to the tens digits are connected to the equivalent conductors, that is, the conductors corresponding to the same numerical value of the conductor groups $321_I$ ... $330_I$ and $321_{II}$ ... $330_{II}$. The latter lead over the armatures of the magnets $c_{Ic}$ and $c_{IIc}$ (as was explained with reference to the magnets $f$, Figs. 14–17) to the windings of those magnets in the two groups $c_I$ and $c_{II}$ corresponding each to one digit value, which corresponds to the numerical values of the above mentioned conductors.

These magnets remain energized until by a fresh addition being carried out another magnet winding of the same group is energized (for the operation described hitherto is nothing else than the addition of the two tens digits of the partial product to zero.

As was shown in sub "Ae" the magnet 307 remains closed only as long as is necessary for the armature of a second magnet to be attracted, the winding of which has only been energized by the attraction of the magnet 307.

As no tens transfer operation could take place so far in the addition of the partial products, since in the group $c$ the tens were only set up in two successive groups of digit values, the winding of the magnet 357 becomes deenergized on the armature 307 being deenergized and in the next moment the magnet winding 309 is energized, the armature of which, after being attracted transfers the units of the above-mentioned partial products to the corresponding groups $c$ corresponding to the second and third digit values.

After the armature has been attracted, the addition operation is carried out in the following periods of time, which follow one another at short intervals (Fig. 13):—

(1) Energizing of the corresponding magnet windings of the groups $n$ and $h$.

(2) Energizing of the corresponding windings $c$ and interruption of the conductors 371′ ... 379′, addition of the numeral 1 in the previous group of digit values and energizing of the windings 357 and 444 or of the windings corresponding thereto in the other digit value groups.

(3) Energizing of the winding 448 or of that corresponding thereto in the other groups and the consequent breaking of the circuits leading over the magnet windings $h$ and of the circuits closed by the armatures $h$, consequently of that closed over 357.

As 357 is deenergized, the circuit over 310 (Figs. 11 and 12) is closed and the sequence of operations continues up to the last digit.

It should be mentioned, that a group of 9 magnets $h$ corresponding to one digit value can only come into operation once during such a partial addition, so that the tens transfer to the next higher column takes place actually in the second period of time.

Although numerical examples are given at the end of the specification, a numerical example of the operation of multiplication shall be inserted here.

```
     72 × 36
 2 tens digits of the partial products 3 × 7 and 3 × 2
16 ones digits of the partial products 3 × 7 and 3 × 2
41 tens digits of the partial products 6 × 7 and 6 × 2
22 ones digits of the partial products 6 × 7 and 6 × 2
─────
2592
```

In sub "Ae" it was stated that the winding of the magnet 306, which was energized by the depression of the key 303 (Figs. 6–9), remains energized to the end of the multiplication operation.

It may further be stated that the keys 303, 570 and 571 (the keys for carrying out the operations) close the switch 572 over a bar $s$, which is depressed by each of the keys, from which switch the conductor 573 starts, which leads over the winding of the magnet 147, which as described in sub "Aa", interrupts the circuit leading over the winding of the magnet 141.

$Ag$

When the product set up in the magnet group $c$ is to be typed, it is first necessary for the connection to be re-established between the omnibus conductors 130, 131 ... 140 and the typewriting machine over the armature of the magnet 141. This is effected by depressing the key 146, the typing key, which closes a circuit through the conductor 574 leading to the conductor 143 over the winding of the magnet 141.

The conductor 316 branching off from the conductor 54 leads over the armature of the magnet 306 in such a manner that, on the armature being attracted, the conductor is closed at this point, and leads thence over the armature of the magnet 311 in exactly the same manner, leads thence to the winding of the magnet 317 and to the conductor 298, which is connected over the conductor 55 to the negative terminal 53 of the source of current.

Over the armature of the magnet 317 there leads the conductor 480, which starts from the conductor 54 and which leads over the winding of the magnet 479 (Fig. 6) to the conductor 481, which leads to the conductor 482, which is connected over the conductor 55 to the negative terminal of the source of current.

The conductors 460, 461 ... 470 lead over the armature of the magnet 479 in such a manner that they are closed at this point, when the armature is attracted. Each of the conductors 460, 461 ... 470 leads over an armature of the magnet group $c_1$ in such a manner that it is closed at this point, when the armature is attracted and all these conductors start from the conductor 471, which leads to the conductor 54. Each of these conductors leads, after leaving the armature 479, to the corresponding omnibus conductor of the group 130, 131 ... 140.

The armature 479, when attracted, also closes at this point the conductors 474, 475 and 483 and interrupts the conductor 473.

The conductor 474 starts from the conductor 472, which is connected to the conductor 54, leads first over the armature 479 and thence over the magnet winding 486 to the conductor 481, which is connected over the conductor 482 to the conductor 55.

The conductor 475 also starts from the conductor 472 and leads first over the armature 479 to the magnet winding 476 and thence to the conductor 477, which is connected over the conductors 478 and 58 (Fig. 7) to the conductor 55 (Figs. 7 and 8).

The conductor 483 also starts from the conductor 472 and leads over the armature 479 and over the armature of the magnet 484 in such a manner that, on the latter armature being attracted, the conductor is interrupted at this point, and leads finally to the conductor 480.

The conductor 473, which is interrupted by the armature 479 being attracted, also starts from the conductor 472 and leads thence over the armature of the magnet 486 in such a manner as to be closed at this point, on the armature being attracted, thence over the armature of the magnet 510 in such a manner as to be interrupted at this point, on the armature being attracted, thence over the winding of the magnet 503 to the conductor 513, which itself is connected to the conductor 482, and thence over the conductor 55 to the negative terminal 53 of the source of current.

The conductor 485 leads over the armature of the magnet 476 in such a manner as to be closed at this point, on the armature being attracted, and leads thence over the winding of the magnet 484 to the conductor 481.

The conductor 485 branches from the conductor 488 (Figs. 6-9), which leads to the typewriting machine and is always connected to one terminal of the source of current, when a typing magnet is attracted and the numeral to be printed has been typed, as was described in connection with the typewriting machine.

Besides the conductor 473, the conductor 487 also leads over the armature of the magnet 486, branches off from the conductor 471 and thence over the armature 486 and the armature of the magnet 510 in such a manner that, on the latter being attracted, it is interrupted at this point, after which it leads to the conductor 474.

The magnets described above co-act, after the armature 479 has been attracted, at short successive intervals as follows:—

(1) Attraction of the armature 479.

The following circuits are closed:—A circuit 483, which keeps the magnet winding 479 energized until the armature 484 is attracted; the circuit 474, which leads over the winding 486, and the circuit 475, which leads over the winding 476. The connection between the magnet group $c_1$ and the typewriting machine is established.

(2) The armatures of the magnets 476 and 486 are attracted.

The winding 476 remains energized as long as the armature 479 is attracted. The winding 486 remains energized until the armature 510 is attracted, as the conductor 487, which keeps 486 energized, is then interrupted. The magnet 476 closes the conductor 485, which for the time being remains de-energized.

(3) Over the armature of the actuated magnet of the group $c_1$ a circuit is closed through the corresponding conductor of the group of conductors 460, 461 . . . 470, and the corresponding omnibus conductor of the group 130, 131 . . . 140 over the winding of the typing magnet $3_e, 3_0, 3_1, 3_2 \ldots 3_9$, corresponding to the actuated magnet of the group $c_1$ and the numeral set up in $c_1$ is typed.

The attracted typing magnet closes, on being attracted, one of the conductors 13, 14 . . . 22 and connects the conductor 488 to the positive terminal 52 of the source of current.

The energizing of the conductor 488 represents the fourth short period of time:

(4) The winding 484 is energized and its armature attracted.

The conductor 483 is interrupted and the winding 479 is de-energized.

(5) The released armature 479 thereupon closes the circuit over 473, as the armature 486 is still attracted, and the winding 503 becomes energized.

(6) The armature 503 is attracted:—

Among other circuits the circuit over the conductor 509 starting from the conductor 471 and leading over the winding 510 to the conductor 513 is closed.

(7) The armature 510 is attracted:—

The winding 486 is de-energized, as the conductor 487 is interrupted; the windings 484 and 476 had already become de-energized after the release of the armature 479.

After the armature 503 has been attracted, which establishes the connection between the group $c_{II}$ and the typewriting machine, the sequence of operations continues in exactly the same manner until each of the numerals set up has been typed.

It should be stated that in the second highest group of digit values ($c_{II}$) the magnet 507 corresponds exactly to the magnet 484, the magnet 510 to the magnet 486 and magnet 505 to the magnet 476;

In the third group of digit values $c_{III}$ (Figs. 6 and 7) in the same sequence the magnets 519, 535 and 532 and so on.

B

Figure 18:
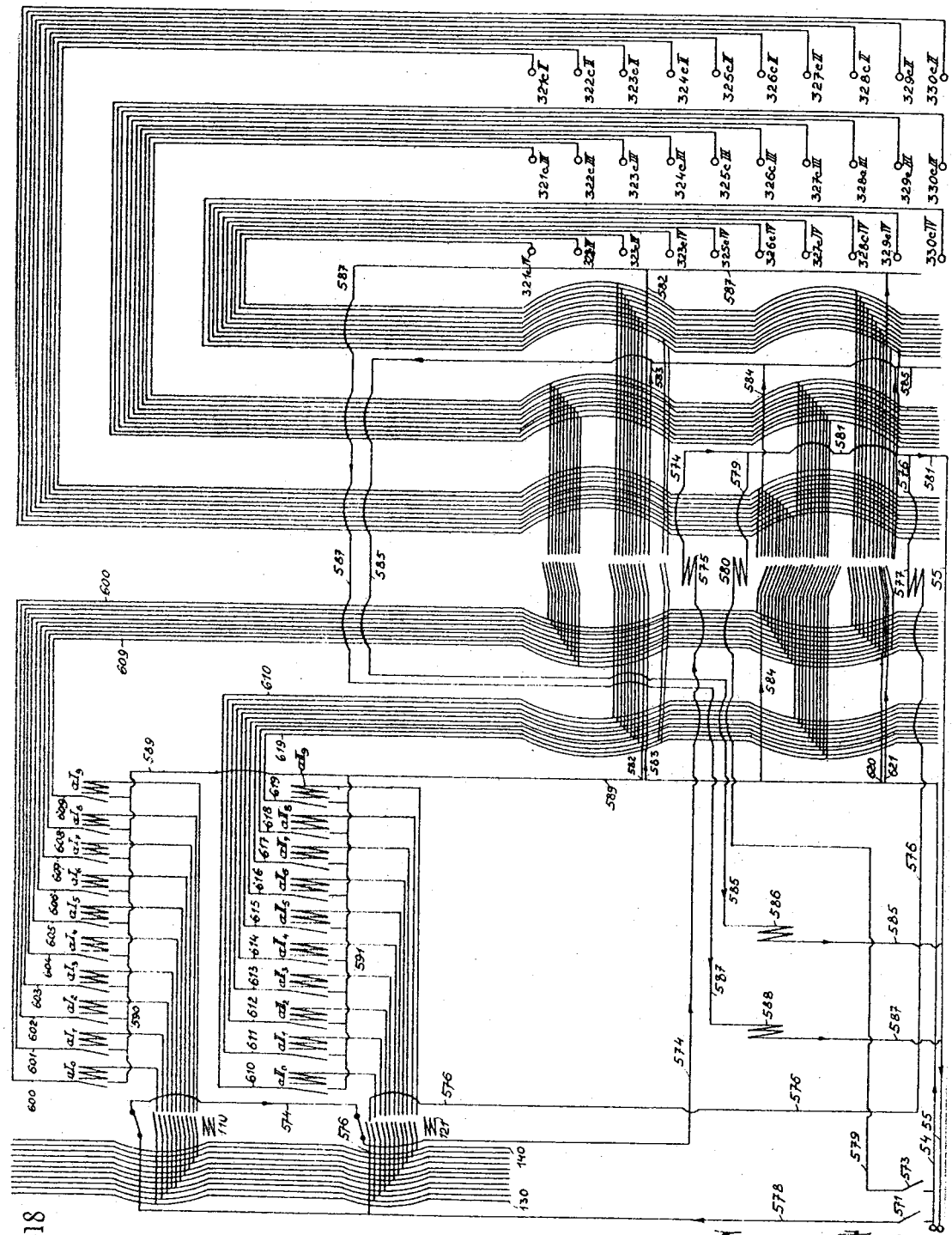
Fig. 18 shows the system of connections between the group for setting the numbers to be added (multiplied) and the sum group.

A further connection between the magnet group $a$ and the magnet group $c$ is shown in Fig. 18, this representing the system of connections for addition.

Fig. 18 shows the omnibus conductors 130, 131 . . . 140, however, in the present instance without their connection to the keyboard and to the typewriting machine. Also the magnets 110 and 121 together with the conductors leading over their armatures to the windings of the group $a$ are shown disconnected. Also the conductors of the groups $321_{cII}$, $322_{cII}$ . . . $330_{cII}$: $321_{cIII}$, $322_{cIII}$ . . . $330_{cIII}$: $321_{cIV}$, $322_{cIV}$ . . . $330_{cIV}$ are shown disconnected.

From the key 571, the addition key, there leads the conductor 578, from which the conductor 574 branches successively over the armatures of the magnets 110 and 121, the conductor 574 leading over the armatures 110 and 121 in such a manner that it is interrupted at each of the two points, on the armature being attracted. The conductor 574 leads to the armature winding 575 and finally to the conductor 581, which leads to the conductor 55, and is consequently connected to the negative terminal 53 of the source of current.

The conductor 576 branches off over the armature of the magnet 121 from the conductor 578, leading thence to the magnet winding 577 and finally also to the conductor 581. The conductor 576 leads over the armature 121 in such a manner that it is closed at this point, on the armature being attracted.

From the key 573 the conductor 579 leads to the magnet winding 580 and thence to the conductor 581.

20 conductors lead over the armature 575, which connect the conductors of the group 600, 601 . . . 609 to the conductors of the group $321_{cIII}$, $322_{cIII}$ . . . $330_{cIII}$ and the conductors of the group 610, 611 . . . 619 to the conductors of the group $321_{cIV}$, $322_{cIV}$ . . . $330_{cIV}$, the arrangement being such that in each case only two conductors of the same numerical value are connected together. These twenty conductors are closed at this point, when the armature 575 is attracted.

The conductors of the group 600, 601 . . . 609 start from the conductor 590, each leading over an armature of the magnet group $a_I$, so that they are closed, on the armature being attracted.

The same applies to the conductors of the group, 610, 611 . . . 619, which start from the conductor 591 and lead over the armatures of the group $a_{II}$.

In a similar manner the two conductors 582 and 583 lead over the armature 575 both branching off from the conductor 589, which itself leads to the conductor 54. The conductor 582 leads to the conductor 587, which leads over the magnet winding 588 to the conductor 55.

The conductor 583 leads to the conductor 585, which leads over the winding of the magnet 586 to the conductor 55.

Over the armature of the magnet 577 there lead ten conductors, which establish the connection between the conductors of the group 600, 601 . . . 609 and the conductors of the group $321_{cIV}$, $322_{cIV}$ . . . $330_{cIV}$.

The two conductors 620 and 621, of which the conductor 620 leads to the conductor 587 and the conductor 621 to the conductor 585, also lead over the armature 577.

Over the armature of the magnet 580, as in the case of 575 and 577, there lead 20 conductors, which establish the connection between the conductors of the group 600, 601 . . . 609 and the conductors of the group $321_{cII}$, $322_{cII}$ . . . $330_{cII}$ and between the conductors of the group 610, 611 . . . 619 and the conductors of the group $321_{cIII}$, $322_{cIII}$ . . . $330_{cIII}$; also the conductor 584, which branches off from the conductor 589 and terminates in the conductor 585.

The circuits established by the armatures of the magnets 586 and 588 are shown in Fig. 9. In this figure the key 571 is shown together with the conductor 578, which in this figure for the sake of clearness is shown as leading direct to the magnet winding 575. The magnet 588 is shown above it and the magnet 586 below it.

Over the armature of the magnet 586 the conductor 622 leads in such a manner that it is closed at this point, on the armature being attracted. The conductor 622 starts from the conductor 623, which is connected to the conductor 54 and leads thence over the magnet winding 125 (Fig. 8) and terminates in the conductor 55.

Over the armature of the magnet 588 are taken two conductors, namely the conductor 624, which starts from the conductor 623 and is closed by the armature of the magnet 588 at this point, on the latter being attracted, and then terminates in the conductor 587, and the conductor 625, which starts from the typing key 146, which is constructed as a double key, and, after passing the armature 588, terminates in the conductor 480.

The operation when adding is as follows:—

The number to be added is set up in the magnet group $a$ in the same way as in the case of multiplication, that is, the multiplicand key 151 is depressed and thereupon each digit of the number starting from the highest place.

We have now the three following possibilities:—

(1) The number to be added has as many digits as the magnet group $a$ is capable of taking up.

(2) The number to be added has less digits and (3) The number to be added has more digits.

(Re. 1.) After the number has been set up, as was explained in connection with the multiplying operation, the two magnet windings 110 and 121 (Fig. 18) will be de-energized, that is, on depressing the addition key 571, the magnet 575 is energized over the conductors 578—574—, its armature is attracted and the number set up in the group $a$ is transferred over the conductors $321_{cIII}$, $322_{cIII}$ . . . $330_{cIII}$ and $321_{cIV}$, $322_{cIV}$ . . . $323_{cIV}$ . . . $330_{cIV}$ to the magnets of the groups $c_{III}$ and $c_{IV}$, or, should a number already have been set up there, the sum of the new and old number is set up in the magnets of the groups $c_{III}$ and $c_{IV}$ as was described in connection with the multiplication operation. Simultaneously, the magnet winding 588 is energized over the conductors 582 and 587 and the magnet winding 586 over the conductors 583 and 585. After the magnet armature 586 has been attracted, the magnet winding 125 (Fig. 8) is energized over the conductor 622 (Fig. 9), the armature of which magnet interrupts the conductor 124 and by this means de-energizes all the magnet windings of the group $a$.

The action of $a$ on $c$ thus again only lasts for as long a time as is necessary for attracting a second magnet armature, the magnet winding of which becomes energized after the magnets of the group $c$ have been acted on, irrespective of how long the key 571 is depressed.

As all magnets of the group $a$ have become de-energized, a new number can be set up, i. e. the key 151 is again depressed, and the new number is typed.

It shall now be assumed that for instance the second of the above-mentioned cases takes place.

(Re. 2.) If the number to be added has fewer digits than the group $a$ is capable of taking up (in the present case only a single digit, as the diagram is shown for two digit numbers), the winding 121 (Fig. 18) will still be energized, after the number has been set up, that is, its armature is attracted, the conductor 574 interrupted and the conductor 576 leading to the magnet 577 closed. The one digit number set up will thus be correctly transferred to the group $c_{IV}$. The rest of the operation is exactly as in the previous case.

When, after the addition of all the numbers to be added, the sum is to be typed, it is sufficient to depress the typing key 146 (Fig. 9), which energizes the magnet winding 141 and also energizes the magnet winding 479 over the conductors 625 and 480.

The sum set up in the group $c$ is thereupon typed in exactly the same manner as described in connection with multiplication.

(Re. 3.) The consideration that normally the product group $c$ has more digits than the multiplicand group $a$ suggests the desirability of being able to add summands having a greater number of digits than the multiplicand group is capable of taking up. Thus, for instance, assuming that in the present case a three digit number is to be added, in the first place the first two digits of the number are set up in the group $a$. Thereupon the key 573 (Fig. 18) is depressed, so that the magnet winding 580 will be energized over the conductor 579. Hence, these first two digits are transferred to the magnet groups $c_{II}$ and $c_{III}$ and the group $a$ again becomes deenergized, as in the previous cases. It is then only necessary to set up the third digit in $a$ and to transfer it to $c_{IV}$, as was described in paragraph Re. 2.

The connections for groups $a$ having more than two digits is naturally the same as described above. It is only necessary to have as many magnets corresponding to the magnets 575 and 577 as there are digits in the group $a$. The conductor 574 must in that case lead over all the armatures corresponding to the armatures 110 and 121.

Each of these armatures (575 and 577 etc. Fig. 18) carries out the transfer operation in such a manner that the lowest digit of the number set up in $a$ is transferred to the lowest digit position of $c$, each of the magnets carrying out the transfer operation being energized by a conductor (for instance 576), which leads over the armature of the setting up magnet (121), which is still closed.

Ca

The fourth group of electromagnets is the subtraction or dividend group (Figs. 6-9) with the references $d_{I,\,e}, d_{I,\,0}, d_{I,\,1}, d_{I,\,2} \ldots d_{I,\,9}$; $d_{II,\,e}, d_{II,\,0}, d_{II,\,1}, d_{II,\,2}, \ldots d_{II,\,9}$; $d_{III,\,e}, d_{III,\,0}, d_{III,\,1}, d_{III,\,2} \ldots d_{III,\,9}$, the Roman index again indicating the digit value and the Arabic index the numerical value of the magnets. The index $e$ signifies the magnets, which function in connection with a space. The connection of these magnet groups to the keyboard shall first be described. From the key 149 (Fig. 9) the conductor 642 leads to the magnet winding 641 and thence to the conductor 477, which leads to the conductor 478, which is itself connected over the conductor 58 to the conductor 55 and consequently to the negative terminal 53 of the machine.

Ten conductors $631_{dI}$, $632_{dI}$, $633_{dI}$, $634_{dI}$, ... $640_{dI}$ lead over the armature of the magnet 641 in such a manner that they are closed at this point, on the armature being attracted. These ten conductors start from the omnibus conductors 131, 132, 133 ... 140. Figs. 14-17 show how they are connected to the magnets of the group $d_I$.

In Figs. 14-17 as already stated, the system of connections of the group $f$ is shown. With reference to this diagram of connections the scheme of connections of the group of magnets $c$ has already been discussed, which is identical with a portion of this system of connections. As regards the remainder the connections are identical to those of the group $d$.

In Figs. 14-17 the conductors 631, 632, 633 ... 640 are shown without indices as what is said about them in the following applies both to all differences group $d_I$, $d_{II}$, $d_{III}$ and also to all the groups $f_I$, $f_{II}$, $f_{III}$. The significance of the indices (for instance $631_{dI}$ in Figs. 6-9) will be readily understood. As already stated, each of the conductors 631, 632 ... 640 is connected to one of the omnibus conductors 131, 132 ... 140, which are themselves connected to the numeral keys. Thus each conductor 631, 632 ... 640 corresponds to a definite numerical value of the numerals from 0 to 9.

Over each of the armatures of the magnets of the group $d$, as was described with reference to the magnets of the group $c$, a conductor is taken, each of which is connected to an omnibus conductor of the group 130, 131, 132 ... 140, hence also to a type of the numeral types of the typewriting machine. Each magnet of the group $d$ thus also corresponds to a definite numerical value.

Setting up in the minuend group (the particulars given in the following paragraphs are described in detail in sub "Cb").

The main magnet connects the omnibus conductors and therefore the keyboard to the group $d$. By actuating the setting-up key the first main magnet 641 (Fig. 6) becomes energized. This magnet closes two circuits, namely, one circuit over its own winding and one circuit over the first auxiliary magnet (701), the latter however, only after a numeral has been set up in the first digit value group. The first auxiliary magnet interrupts the circuit over the first main magnet and closes a circuit over its own winding and over the winding of the second auxiliary magnet (648), the latter circuit however only till the key is released, by a switch 144 (Fig. 9) being closed simultaneously with the numeral key, which switch closes a circuit over a magnet, the armature of which, on being attracted, interrupts the circuit over the second auxiliary magnet.

This second auxiliary magnet 68 closes a circuit over the second main magnet, the armature of which interrupts the circuit over the first auxiliary magnet and also the second auxiliary magnet (see sub "Cb").

Over each armature of the magnets of the group $d$ (in Figs. 14–17 of the group $f$) connecting conductors lead from the conductors 631, 632 ... 640 on the one hand and the conductors 371, 372 ... 380 and the conductors 372' ... 380' on the other hand, the arrangement being such that they are closed at this point, on the armature being attracted, so that each of the conductors 631, 632 ... 640 is connected over each magnet armature to that conductor of the group 371, 372 ... 380 or 371', 372' ... 380', which corresponds to the numerical value of the difference obtained from the numerical value of the corresponding magnet and of the corresponding conductor of the group 631, 632 ... 640, the connection being established with a conductor of the group 371, 372 ... 380, when the numerical value of the magnet is greater than that of the corresponding conductor and with a conductor of the group 371', 372' ... 380', when it is smaller than that of the said conductor, hence, when the next higher digit is required for carrying out the subtraction.

Figure 27:
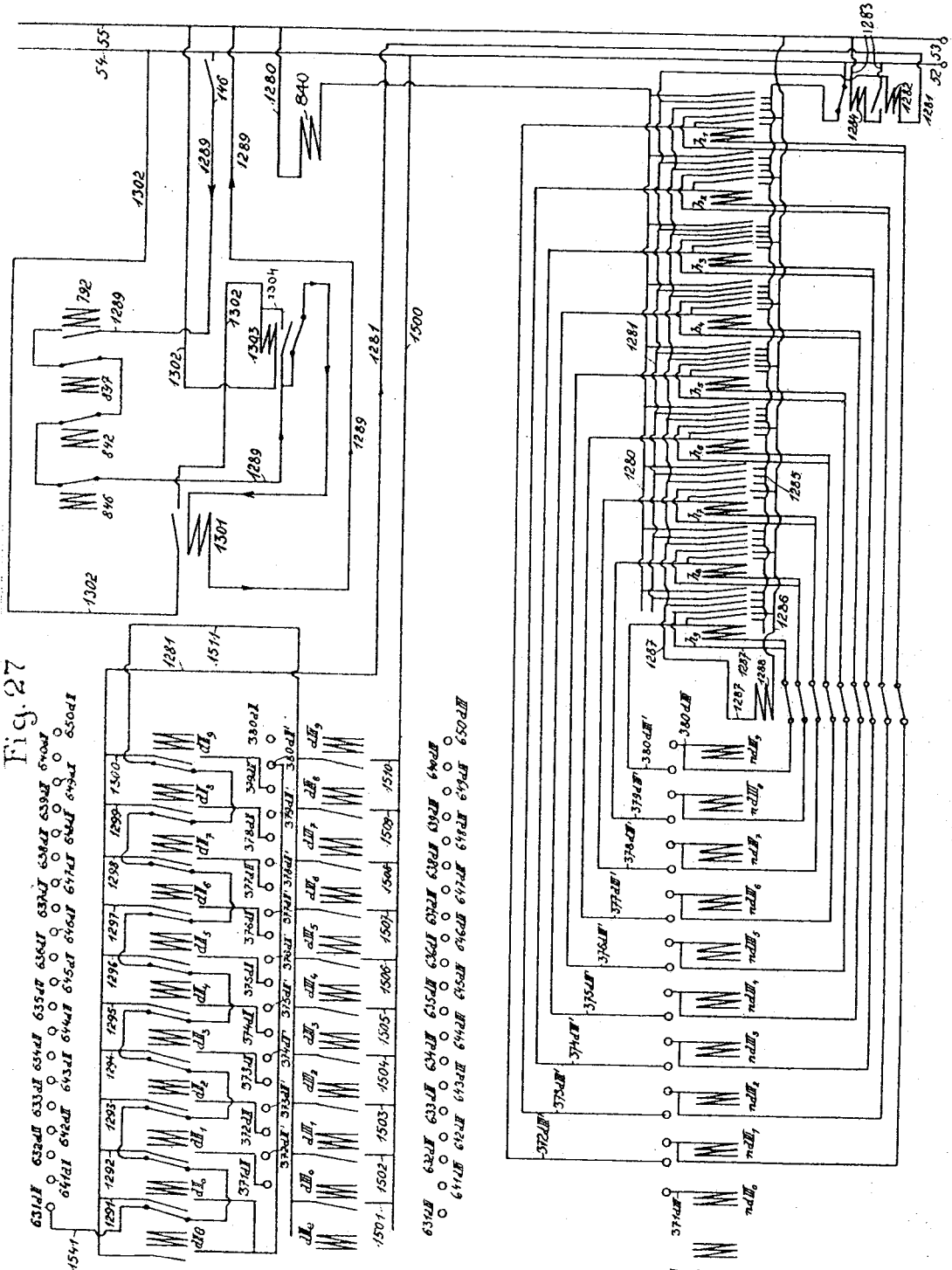
Fig. 27 shows the tens carrying-over device for subtraction and division.

In addition thereto a conductor leads over each armature of the group $d$ with the exception of the first digit value group $d_I$ and with the exception of the magnets $d_e$, such as are shown in Fig. 27 for the magnets of the group $d_{III}$ in the conductors 1501, 1502 ... 1510, which all lead to a common conductor (in this case the conductor 1511), which leads over all the magnet armatures of the previous digit value group with the exception of the magnet $d_e$ in series in such a manner that it is interrupted at these points, on one of the said armatures being attracted, and which terminates in the conductor 631 of the said digit value group (in Fig. 27 in $631_{dII}$).

All the conductors (1501, 1502 ... 1510) start from one conductor (in the present instance 1500), which is connected to the positive terminal 52 of the source of current.

The result of this is that, when subtracting numbers of an unequal number of digits, in which the number having the smaller number of digits has first been set up in the group $d$, a digit of the second number exceeding the highest digit of the first number cannot be set up in a previous group over the space armature of this digit value group, but is caused to act over the zero armature of this group.

The function of the magnets $n$ is again exactly the same as was described in connection with the group $c$, the tens transfer, however, being effected in the different manner described below.

Fig. 27 shows the connections for the tens transfer in the group $d$ for the two digits.

Over each armature of the magnets $h$ there lead five conductors, as was described in connection with the group $c$ with reference to Fig. 13, which have the same function as the five conductors there described. The only difference in this case being that the conductor 1281, in which all the fourth conductors counting from the left terminate, does not lead to the conductor 632 (in Fig. 27, 632 $d_{II}$), for carrying out the subtraction of one over this conductor in a known manner, but conductors branch from it, each over an armature of the group $d_{II}$, (this of course applies to all digit value groups), the arrangement being such that the conductors are closed at this point, on the armature being attracted, which all lead to that conductor of the group 371, 372 ... 379, the numerical value of which corresponds to the numerical value less 1 of the particular magnet of the group $d$, except the conductors leading over $d_e$ and $d_o$, which both lead to the conductor 380' (in the example shown $380d_{II}'$).

In Figs. 14–17, a third group of conductors is shown, which are marked $641_n$, $642_n$ ... $650_n$. Where they are again shown with reference exclusively to the group $d$, they are given the indices $d_I$, for instance $642d_I$, $d_{II}$, for instance $650d_{II}$ and so on (as will be seen below with reference to Figs. 19 and 20), which are connected just as the conductors 631, 632 ... 640 over the armatures of the magnets $d$ (in Figs. 14–17, the magnets $f$) to the conductors 371, 372 ... 380; 371', 372' ... 380', the only difference being, that they are connected to that conductor, which corresponds to the numerical value of the difference of the numerical value of the particular conductor of the group $641_n$, $642_n$ ... $650_n$ and that of the particular magnet.

Thus, if L indicates the numerical value of a conductor of the groups 631, 632 ... 640 and $641_n$, $642_n$ ... $650_n$ and $m$, the numerical value of the magnets, on the conductors 631 ... 640 coming into operation the difference $m - L$ is formed and, on the conductors $641_n$, $612_0$ ... $650_0$ coming into operation, the difference $L-m$. The connection of the magnet group $d$ to the keyboard shall now be described with reference to Figs. 6-9.

$Cb$

Over the armature of the magnet 641 (Fig. 6) there lead, besides the conductors already referred to, two further conductors, viz. the conductors 643 and 645.

The conductor 643 branches off from the conductor 644, which terminates in the conductor 702, which is connected over the conductor 54 to the positive terminal 52 of the source of current. After leaving the armature of the magnet 641, the conductor 643 terminates in the conductor 642, but is previously taken over the armature of the magnet 701 in such a manner that it is interrupted at this point, on the armature being attracted.

The conductor 645 also branches off from the conductor 644.

From the conductor 645 there branches over each armature of the magnets $d_{1,0}$, $d_{1,1}$ ... $d_{1,9}$ a conductor 661, 662 ... 670 in such a manner that it is closed at this point by the armature when attracted. All these conductors 661, 662 ... 670, after leaving the magnet armatures, terminate in the conductor 671, which leads to the winding of the magnet 701 and, after leaving this winding, terminates in the conductor 477, which, as already remarked, is connected over the conductors 478—58—55 to the negative terminal 53 of the source of current.

Over the armature of the magnet 701 there lead, besides the conductor 643 already referred to, the two conductors 647 and 649 in such a manner that they are closed at this point, on the armature being attracted.

The conductor 647 branches off from the conductor 646, which leads to the conductor 644 already referred to, and leads thence to the winding of the magnet 648. After leaving this magnet winding the conductor leads over the armature of the magnet 162 (Fig. 9) in such a manner that it is interrupted at this point, on the armature being attracted, and terminates in the conductor 161, which as already stated, is connected over the conductors 145—55 to the negative terminal 53 of the source of current.

The conductor 649 (Fig. 6) also branches off from the conductor 646 and, just as the conductor 647, leads over the armature of the magnet 701 and thence over the armature of the magnet 651 in such a manner that it is interrupted at this point, on the armature being attracted, and finally terminates in the conductor 671.

The setting up of a numeral in the magnet group $d_1$ may now be followed out with reference to the system of connections described:—

By depressing the key at 149 (Fig. 9) the following circuit is closed. The positive terminal 52—54—149—642, the magnet winding 641—642—477—478—58—55—negative terminal 53. By depressing the key 149, the switch 144 is closed by the bar $s$, as already described above, which switch closes a circuit over the winding of the magnet 141 and thus establishes in a known manner the connection between the omnibus conductors 130, 131, 132 ... 140 and the numeral keys $45_e$, $45_0$, $45_1$, $45_2$ ... $45_9$. On one of the numeral keys being depressed, say the numeral key $45_2$, the following circuit is closed:—positive terminal 52—54—$45_2$—$56_2$—133—$633_{d1}$— (see Figs. 14-17) over the armature of the magnet $d_{1,2}$—373—394—magnet winding $n_{d,2}$—402—55—negative terminal 53.

In the same way as described in connection with the magnet group $c$ the magnet winding $d_{1,2}$ is now energized and remains energized, until another winding of the same group $d_1$ is energized.

By the armature of the magnet $d_{1,2}$ being attracted the following circuit is closed (Fig. 6):—Positive terminal 52—54—702—644—645—663—671—magnet winding 701—477—478—58—55—negative terminal 53.

After the magnet winding 641 had become energized and the armature thereof attracted, the following circuit was closed:—Positive terminal 52—54—702—644—643—642—magnet winding 641—477—478—58—55—negative terminal 53.

By this circuit the energizing of the magnet winding 641 was made independent of the depression of the key 149.

By the energizing of the magnet winding 701 this circuit is interrupted by the winding 641 deenergized.

The depression of the key $45_2$ can be continued for any length of time, as the circuit closed through it only remains closed until the armature of the magnet $d_{1,2}$ is attracted.

As has already been stated, simultaneously with the closing of a numerical key the switch 163 was closed, which closes a circuit over the magnet winding 162.

By the armature 701 being attracted, the following two circuits were closed:—

(1) Positive terminal 52—54—702—644—646—649—671—magnet winding 701—477—478—58—55—negative terminal 53. This circuit, however, keeps the magnet winding 701 energized, even after the armature 641 has been released, until the magnet winding 651 becomes energized, as the armature of this magnet, on being attracted, interrupts the conductor 649.

(2) Positive terminal 52—54—702—644—646—647—magnet winding 648—647—over armature 162—161—145—55—negative terminal 53. This second circuit is only closed at the moment, in which the magnet winding 162 becomes deenergized, that is, when the key $45_2$ has been released.

The armature of the magnet 648, after being attracted, closes the following circuit:—Positive terminal 52—54—702—654—650—magnet winding 651—650—652—478—58—55—negative terminal 53, in other words the magnet 651 effecting the connection between the omnibus conductors 130, 131, 132 ... 140 and the windings of the magnet group $d_{II}$ only becomes energized, when the depression of the key, which effected the setting up of a number in the magnet group $d_I$, has ceased.

The sequence of operations is repeated through all the digit value groups of the group $d$.

Cc

Figs. 19, 20 and 23, 24 show the connection of the magnets of the group $d$ to the other groups. In Fig. 10 the group $c$ with its digit value groups II, III and IV is shown.

Over each armature of the magnet group $c_{II}$ (Fig. 20) there leads a conductor of the conductor group 710, 711, 712 ... 719 in such a manner that it is closed at this point, on the armature being attracted. All these conductors start from the conductor 740, which is connected over the conductor 743 to the conductor 54 and consequently to the positive terminal 52 of the source of current.

The conductor group 710, 711, 712 ... 719 leads over the armature 755 in such a manner that all these conductors are closed at this point, on the armature being attracted. After leaving the armature they all terminate separately in the conductor group 761, 762, 763 ... 770.

This group of conductors leads over the armature of the magnet 800 (Fig. 19) in such a manner that the latter, when at rest, establishes the connection between the conductor group 761, 762, 763 ... 770 on the one hand and the conductor group $631_{d,I}$, $632_{d,I}$, $633_{d,I}$ ... $640_{d,I}$ on the other hand and, when attracted, the connection between the first-named group of conductors and the conductor group $641_{d,I}$, $642_{d,I}$, $643_{d,I}$ ... $650_{d,I}$.

The connection between the conductor groups $631_{d,I}$, $632_{d,I}$, $633_{d,I}$ ... $640_{d,I}$ and $641_{d,I}$, $642_{d,I}$, $643_{d,I}$ ... $650_{d,I}$ on the one hand and the magnet windings $n_{d,I,0}$, $n_{d,I,1}$, $n_{d,I,2}$ ... $n_{d,I,9}$ on the other hand was explained with reference to Figs. 14–17, but without the indices given here.

As was stated in the passage referred to, this connection passes over the conductors $371_{d,I}$, $372_{d,I}$, $373_{d,I}$, $374_{d,I}$ ... $380_{d,I}$.

The following points should, however, be noticed:—The conductor $371_{d,I}$ is not connected in this group, which is the highest digit value group, to the magnet winding $n_{d,I,0}$, but through the conductor 810 to the magnet winding 798. The conductor 810 terminates, after leaving this magnet winding, in the conductor 812, which branches off from the conductor 831. The conductor 831 leads to the conductor 744 (Fig. 20), which starts from the conductor 55 and leads over the armatures of the magnets 828 and 920 one after the other in such a manner that by attracting the same it is interrupted at this point, The conductor group $372_{d',I}$, $373_{d',I}$, $374_{d',I}$ ... $380_{d',I}$ belonging to the magnet group $n_{d,I}$ (Fig. 19) leads in this digit value group to none of the auxiliary magnets $h$ effecting the tens transfer, but all terminate together in the conductor 794, the function of which will be described below.

Over each armature of the magnet group $c_{III}$ (Fig. 20) there leads a conductor 720, 721, 722, 723 ... 729, so that it is closed at this point by the armature, when attracted. All these conductors start from the conductor 741, which again terminates in the conductor 743.

The conductors of the group 720, 721, 722, 723 ... 729 lead over the armature of the magnet 756 in such a manner that they are separately closed at this point, on the armature being attracted, and terminate separately in the conductor group 771, 772, 773 ... 780.

This latter conductor group again leads over the armature of the magnet 799 (Fig. 19) similarly to the conductor group 761, 762, 763 ... 770 over the armature of the magnet 800, the arrangement being such that the armature, when not attracted, establishes the connection with the conductor group $631_{d,II}$, $632_{d,II}$, $633_{d,II}$ ... $640_{d,II}$; and, when attracted, with the conductor group $641_{d,II}$, $642_{d,II}$, $643_{d,II}$ ... $650_{d,II}$.

The connection between the conductors $631_{d,II}$, $632_{d,II}$, $633_{d,II}$ ... $640_{d,II}$ and $641_{d,II}$, $642_{d,II}$, $643_{d,II}$ ... $650_{d,II}$ on the one hand and the conductor group $371_{d,II}$, $372_{d,II}$, $373_{d,II}$, $374_{d,II}$ ... $380_{d,II}$ on the other hand is again the same as described with reference to Figs. 14–17.

The following should, however, be noted:— The conductor $371_{d,II}$ is not connected directly to the magnet winding $n_{d,II,0}$, but leads over the armature of the magnet 798 in such a manner that the armature, when not attracted, keeps it closed at this point and the armature, when attracted, establishes the connection with the conductor 811, which leads to the magnet winding 795 and, after leaving the latter, terminates in the conductor 812. The conductors $372_{d'II}$, $373_{d'II}$, $374_{d'II}$ ... $380_{d'II}$ are connected over the armature of the magnet 798, when not attracted, to the windings of the auxiliary magnet $h$, which effect the tens transfer to the next higher digit in exactly the same manner as was described in connection with the magnet group $c$ with reference to Fig. 13.

When the armature of the magnet 798 is attracted, it establishes connection between the conductors $372_{d',II}$, $373_{d',II}$, $374_{d',II}$ ... $380_{d'II}$ on the one hand and the conductors 801, 802, 803 ... 809 on the other hand. The latter conductors again terminate in the conductor 794.

Over each armature of the magnet group $c_{IV}$ (Fig. 20) one each of the conductors 730, 731, 732 ... 739 lead in such a manner that they are closed at this point, on the armature being attracted, all the said conductors branching off from the conductor 742, which again terminates in the conductor 743.

The conductor group 730, 731, 732 ... 739 leads over the armature of the magnet 757 in such a manner that all the conductors are closed at this point by the armature, when attracted, and are connected separately to the conductor group 781, 782, 783 ... 790. The last-named conductor group leads over the armature of the magnet 796 (Fig. 19) in such a manner that the armature, when not attracted, establishes connection between the said group of conductors and the conductor group $631_{d,III}$, $632_{d,III}$, $633_{d,III}$ ... $640_{d,III}$ and the armature, when attracted, establishes the connection between the conductors 781, 782 ... 790 and the conductor group $641_{d,III}$, $642_{d,III}$, $643_{d,III}$ ... $650_{d,III}$.

The connection between the conductor groups $631_{d,III}$, $632_{d,III}$, $633_{d,III}$ ... $640_{d,III}$, $641_{d,III}$, $642_{d,III}$, $643_{d,III}$ ... $650_{d,III}$ on the one hand and the conductors $371_{d,III}$, $372_{d,III}$, $373_{d,III}$ ... $380_{d,III}$ on the other hand is again exactly the same as in the previous digit group values $d_I$ and $d_{II}$.

The connection between the conductor group $372_{d'III}$, $373_{d'III}$, $374_{d'III}$ ... $380_{d'III}$ and the auxiliary magnets $h$ or the conductor 794 respectively is exactly the same over the armature of the magnet 795 as in the previous digit value group over the armature of the magnet 798.

From the conductor 794 there are branched off two conductors namely:—

(1) The conductor 850, which leads over the armature of the magnet 792 in such a manner that it is closed at this point, on the armature being attracted. From the conductor 850 the conductor 862 branches off over the magnet winding 796 to the conductor 812, the conductor 861 over the magnet winding 799 and the conductor 860 over the magnet winding 800 also to the conductor 812:—

(2) The conductor 921, which leads over the armature of the magnet 923 (Fig. 20) in such a manner that it is closed at this point, on the armature being attracted, and which leads thence over the winding of the magnet 922.

To the winding of the above-mentioned magnet 792 (Fig. 19) there leads from the key 745 the conductor 791, which, after leaving the magnet winding, terminates in the conductor 55. Over the armature of the magnet 792 there also leads the conductor 793 in such a manner that it is closed at this point, on the armature being attracted. The conductor 793 starts from the conductor 54 and terminates in the conductor 791 and therefore keeps the magnet winding 792 energized, even when the pressure on the key 745 has ceased.

Over the armatures of the magnets 800, 799, 798, 796, 795, referred to above, there lead, besides the conductors referred to, the following conductors as well in such a manner that they are closed at this point, on the armature being attracted:—

(1) Over the armature of the magnet 800 the conductor 923', which starts from the conductor 748 and terminates in the conductor 860.

(2) Over the armature 799 the conductor 751, which also starts from the conductor 748 and terminates in the conductor 861.

(3) Over the armature 798 the conductor 864, which starts from the conductor 751 and terminates in the conductor 810, and the conductor 865, which starts from the conductor 813 and leads to the magnet winding $n_{d,I,o}$. The conductor 813 starts from the conductor 814 (Fig. 20) and leads over the armature of the magnet 825 in such a manner that it is closed at this point, on the armature being attracted. The conductor 814 branches off from the conductor 54 and is therefore connected to the positive terminal 52 of the machine.

(4) Over the armature of the magnet 796 (Fig. 19) the conductor 750, which again starts from the conductor 748 and terminates in the conductor 862.

(5) Over the armature of the magnet 795 the conductor 863, which starts from the conductor 750 and terminates in the conductor 811, and the conductor 866, which again starts from the conductor 813 and terminates in the conductor $371_{d,II}$, and is therefore connected to the winding of the magnet $n_{d,II,o}$.

Between the conductors of the groups 710, 711, 712 ... 719, 720, 721, 722 ... 729, 730, 731, 732 ... 739 (Fig. 20) on the one hand and the conductors of the groups 761, 762, 763 ... 770, 771, 772, 773 ... 780, 781, 782 ... 790 on the other hand there are, besides the connections over the magnet armatures 755, 756, 757 already described, further connections in exactly the same way over the armatures of the magnets 752, 753, 754 and so on: over the armature 752 between the conductor group 710, 711, 712 ... 719 on the one hand and the conductor group 781, 782, 783 ... 790 on the other hand, over the armature 753 between 720, 721, 722 ... 729 on the one hand and 781, 782, 783 ... 790 on the other hand and over the armature 754 between 710, 711, 712 ... 719 on the one hand and 771, 772, 773 ... 780 on the other hand.

Over the armatures of the magnets 752, 753, 754, 755, 756 and 757 there lead besides the connecting conductors already referred to the following conductors:—

(1) Over the magnet armature 752, the conductors 924, 821 and 925, all starting from the conductor 822, the conductor 924 terminating in the conductor 834, the conductor 821 in the conductor 815 and the conductor 925 in the conductor 935. The conductor 834 leads to the magnet winding 835 and terminates in the conductor 831; the conductor 815 leads to the magnet winding 816 and terminates in the conductor 55. Over the armature 816 the conductor 823 starting from the conductor 814 and leading over the magnet winding 824 to the conductor 815, leads in such a manner that it is closed at this point by the armature, when attracted. Over the armature of the magnet 824 the conductor 822 referred to above leads in such a manner that it is interrupted at this point, on the armature being attracted. From the conductor 815 the conductor 1307 branches off, which leads over the magnet winding 840 (Fig. 19) to the conductor 831. The conductor 935 will be discussed below.

(2) Over the armature of the magnet 753 there leads the conductor 927, which starts from the conductor 742 and thence over the armature of the magnet 934 in such a manner that it is closed at this point by the armature, when attracted, and finally terminates in the conductor 933, in such a manner that, on the armature 753 being attracted it is interrupted at this point; and also the two conductors 820, 929 in such a manner that they are closed at this point by the armature, when attracted. The two conductors 820 and 929 again start from the conductor 822 and lead:—the conductor 820 to the conductor 815 and the conductor 929 to the magnet winding 930 and thence to the conductor 831.

(3) Over the armature 754 the four conductors 931, 932, 933 and 819, which all again start from the conductor 822, in such a manner that they are closed at this point, on the armature being attracted, the conductor 931 terminating in the conductor 928, the conductor 932 in the conductor 834, the conductor 819 in the conductor 815 and the conductor 933 in the magnet winding 934 and thence to the conductor 831.

(4) Over the armature 755 the four conductors 818, 832, 833 and 836, which all again start from the conductor 822, in such a manner that they are closed at this point, on the armature being attracted, the conductor 818 terminating in the conductor 815, the conductor 832 in the conductor 834, the conductor 833 in the conductor 830 and the conductor 836 in the winding 837 and, after leaving the latter, in the conductor 831.

(5) Over the armature of the magnet 756 are the four conductors 838, 841, 817 and 1320, the conductor 838 branching off from the conductor 748, and, after leaving the armature 756, leading to the armature of the magnet 837 in such a manner that it is closed at this point, on the armature being attracted, and terminating in the conductor 836 in such a manner that it is interrupted by the armature 756, when attracted; and the conductors 817 and 841, which both branch off from the conductor 822, and the conductor 1320, which branches off from the conductor 839, in such a manner that they are closed at this point by the armature, when attracted, the conductor 817 terminating in the conductor 815 and the conductor 841 in the magnet winding 842, from which it leads to the conductor 831, and the conductor 1320 in the conductor 831.

(6) Over the armature 757 are the four conductors 843, 845, 946 and 1321, the conductor 843—which branches off from the conductor 748 and, after leaving the armature 757, leads over the armature of the magnet 842 in such a manner that it is closed at this point, on the armature being attracted, and terminates in the conductor 841—in such a manner that it is interrupted by the armature 757 being attracted, and the conductors 845, 946 and 1321 in such a manner that they are closed, on the armature 757 being attracted. The conductors 946 and 845 start from the conductor 822 and terminate:—the conductor 946 in the conductor 815 and the conductor 845 in the magnet winding 846, from which it leads to the conductor 831, and the conductor 1321, which starts from the conductor 844, in the conductor 831.

To the magnet windings 752, 753, 754, 755, 756, 757 there lead the following circuits:—

(1) To the magnet winding 752 the conductor 935, which starts from the conductor 747 and leads over the armature of the magnet 759 in such a manner that it is closed at this point, on the armature being attracted, and after leaving the magnet winding 752 terminates in the conductor 831.

(2) To the winding of the magnet 753 the conductor 926, which branches off from the conductor 822 and after leaving the magnet winding 753 leads over the armature of the magnet 840 in such a manner that it is interrupted at this point, on the said armature being attracted, and thence over the armature of the magnet 934, which closes it at this point, on being attracted, to the conductor 933.

(3) To the winding of the magnet 754 there leads the conductor 928, which starts from the conductor 747 and leads in such a manner over the armature of the magnet 760 that it is closed at this point, on the armature being attracted, and after leaving the magnet winding 754 terminates in the conductor 831.

(4) To the winding of the magnet 756 (Fig. 20) the conductor 839, which starts from the conductor 822 and, after leaving the magnet winding 756, leads over the armature of the magnet 840 (Fig. 19), which interrupts it at this point, on being attracted and over the armature of the magnet 837

(Fig. 20), which closes it at this point, when attracted, and terminates in the conductor 836.

(5) To the winding of the magnet 755 there leads the conductor 830, which starts from the conductor 747 and leads successively over the armatures of the magnets 758, 759 and 760 in such a manner that it is interrupted by any of these armatures being attracted and, after leaving the magnet winding 755, terminates in the conductor 831.

(6) To the winding of the magnet 757 there leads the conductor 844, which starts from the conductor 822 and after leaving the said magnet winding leads over the armature of the magnet 840 (Fig. 19) in such a manner that it is interrupted at this point, on the armature being attracted, and thence over the armature of the magnet 842 (Fig. 20), which closes it at this point, on being attracted, and thence to the conductor 841.

Over the armature of the magnet 840 (Fig. 19) there leads the conductor 827 in the same manner as the conductors 839, 926 and 844, which starts from the conductor 814 and leads over the armature of the magnet 825 in such a manner that it is closed at this point, on the armature being attracted, and thence over the magnet winding 828.

From the conductor 827 there branch off two conductors, namely, the conductor 849, which leads over the armature of the magnet 930 in such a manner that the latter closes it at this point, on being attracted, and terminates in the conductor 829, and the conductor 847, which leads over the armature of the magnet 846 in the same manner and terminates in the conductor 845.

Before the subtraction of the two numbers is described with reference to the connections just described, the following shall be premised. In the subtraction of two numbers $u$ and $v$ there are two possibilities:

(1) The algebraic sum $u-v$ is required, irrespective of the relative values of $u$ and $v$, that is, negative differences are also required and (2) Only positive differences are sought, that is:—should it be found in carrying out the calculation $u-v$ that $u<v$, the machine shall not indicate a difference.

Since the second case would appear to have been sufficiently discussed in connection with division, the first case only shall be gone into here, which occurs for instance, where the machine is used as a book-keeping machine.

If the difference of two numbers $u-v$ is to be formed, in the first place the separate digits of the number $v$ are set up in the groups $c_{II}$, $c_{III}$, $c_{IV}$ and so on (Fig. 20), by means of the magnets 758, 759, 760, in the same manner as was described in connection with the magnet group $d$.

The magnets 758, 759 and 760 have in this case the same function and are interconnected in the same manner as the magnets 641, 651 and 684 in Figs. 6–9.

If the positive or negative algebraic sum $u<v$ is required, the key 745 (Fig. 19) is depressed, which over the conductor 791 energizes the magnet winding 792, which keeps the armature attracted, when it has once been attracted, as the winding remains energized over the conductor 793, even after the key has been released. The attracted armature 792 closes the conductor 850 at this point and thereby establishes the connection between the conductors 794 and 850. Over the armature 792 there also leads the conductor 1289 (as shown in Fig. 27), which starts from the key 146 (the typing key) and after leaving the armature 792 passes successively over the armatures 837, 842 and 846, so that it is interrupted at these points, on one of these armatures being attracted, and leads over the armature 1303, which interrupts it, on being attracted, and terminates over the winding 1301 in the conductor 55.

On the subtraction key 746 (Fig. 19) being depressed and if a three digit number has been set up, that is, if none of the three armatures 758, 759 and 760 are still attracted (the same applies in this case as in the addition described with reference to Fig. 18), the following circuit is closed:—52 (Fig. 19)—54— 746—747—830 (Fig. 20)—magnet winding 755—831 (Figs. 19, 20)—744—55—53.

After the armature 755 (Fig. 20) has been attracted, the connection between the conductor group 710, 711 . . . 719 on the one hand and 761, 762, 763 . . . 770 on the other hand is established and over the conductor group $631_{d,1}$, $632_{d,1}$, $633_{d,1}$ . . . $640_{d,1}$ (Fig. 19) the numeral set up in the group $c_{II}$ (Fig. 20) is transferred to the group $d_1$ (over the magnet armature $d_1$, as was described above with reference to Figs. 14–17). At the same time the following circuits are closed:—

(1) 52—54—814—822—833—830—magnet winding 755—831—744—55—53. This circuit keeps the magnet winding 755 energized.

(2) 52—54—814—822—832—834—magnet winding 835—834—831—744—55—53.

(3) 52—54—814—822—836—magnet winding 837—836—831—744—55—53.

(4) 52—54—814—822—818—815—magnet winding 816—815—55—53 and (5) 52—54—814—822—818—815—1307—winding 840 (Fig. 19)—1307—831—744 (Fig. 20)—55—53.

(Re 1) This circuit keeps the magnet winding energized until the conductor 822 is interrupted.

(Re 2) On the magnet armature 835 (Fig. 20) being attracted, the conductor 747 is interrupted, so that the connection between the key 746 (Fig. 19) and the magnet winding 755 is broken.

Through the circuit 52—54—746—747—945—834—magnet winding 835—834—831—

744—55—53 the armature winding 835 is kept energized as long as the key is depressed.

Hence, the key may be depressed any length of time; after the armature 755 has been attracted, it has no further effect on the carrying out of the calculation.

(Re 3) The armature 837 (Fig. 20) closes the following circuit:—

52—54—748 (Fig. 19)—838 (Fig. 20)—armature 837—magnet winding 837—836—831—744—55—53.

The magnet winding 837 thus remains energized until the conductor 838 is interrupted.

(Re 4) The armature 816 (Fig. 20) closes the following circuit:—

52—54—814—823—magnet winding 824—815—55—53.

On being attracted, the armature 824 interrupts the conductor 822 and thereby all the circuits leading over this conductor. Hence, only the winding 837 remains energized. 824 also becomes deenergized again, whereby the conductor 822 is again closed.

(Re 5) The armature 840 (Fig. 19) interrupts, besides other conductors, the conductor 839, so that the circuit leading over the winding 756 can only be closed when the winding 840 becomes deenergized, that is, at the earliest, after the attraction of the magnet 824, which interrupts the conductor 822.

At the moment, in which the magnet winding 840 becomes deenergized, that is, in which the armature 840 assumes its position of rest (the magnet 840 has exactly the same function and connections as the magnet 357 (Figs. 11 and 13) in the group $c$), that is, until any tens transfer is completed, which does not apply in the case of the first numeral, the following circuit is closed (Fig. 20) :—

52—54—814—822—839—magnet winding 756—839—836—magnet winding 837—836—831—744—55—53. Thus, while, on the armature 756 being attracted, the conductor 838 is interrupted, the magnet winding 837 will remain energized, as the same circuit, which flows round 756, will now lead over the winding 837.

The armature 756 now establishes connection between the conductor group 720, 721, 722 . . . 729 on the one hand and 771, 772, 773 . . . 780 on the other hand and the numeral set up in the group $c_{III}$ is transferred to the group $d_{II}$.

By the circuits:—52—54—814—822—817—815—magnet winding 816—815—55—53 and 52—54—814—822—841—magnet winding 842—841—831—744—55—53 the same sequence of operations as above is initiated until through the circuit:—

52—54—814—822—844—magnet winding 757—844 (Fig. 19)—841 (Fig. 20)—magnet winding 842—841—831—744—55—53 the magnet 757 becomes energized and by its armature the connection is established between the conductor group 730, 731, 732 . . . 739 and 781, 782, 783 . . . 790, so that the transfer of the numeral set up in the group $c_{IV}$ to $d_{III}$ is carried out.

The armature 757 also closes the following circuits:—

(1) 52—54—814—822—845—magnet winding 846—845—831—744—55—53.

(2) 52—54—814—822—946—815—magnet winding 816—815—55—53.

(Re 1) The magnet 846 closes the following two circuits:—

(I) 52—54—829—848—845—magnet winding 846—845—831—744—55—53. The magnet winding 846 thus remains energized, even after the interruption of the conductor 822 initiated by the circuit given in (2). At the moment, in which the armature 840 (Fig. 19) assumes its position of rest (i. e. any tens transfer is completed) the following circuit is closed by the armature 846 (Fig. 20) :—

(II) 52—54—814—822—826—magnet winding 825—826—827—847—845—magnet winding 846—845—831—744—55—53.

The armature 825 connects the conductor 813, described below, over 814 and 54 to 52 and closes the following circuit:— 52—54—814—827—magnet winding 828—827—847—845—magnet winding 846—845—831—744—55—53.

The armature 828 interrupts the conductor 744, on being attracted and thereby interrupts all the circuits closed during the subtraction operation with the exception of those leading over the armature of the magnet group $d$. All the windings of the group $c$ are thereby also deenergized and a fresh number can be set up in $c$.

This new number is transferred to $d$ in the same manner, but we have the following possibilities:—

(1) If each numeral of $u$ is greater than each equivalent numeral of $v$, nothing more need be said about the carrying out of the subtraction than has already been said above:—

(2) If only the first numeral of $u$ is greater than the first numeral of $v$ the subtraction is carried out by means of the auxiliary magnets $h$ effecting the tens transfer, nothing further need be said on this point.

(3) The first numeral of $u$ is smaller than the first numeral of $v$, that is, $u<v$.

In this case, as already described above, the connection is established by the armature of the magnet group $d_1$ corresponding to the numerical value of the first numeral of $u$ between the conductor, which corresponds to the numerical value of the first numeral of $v$, of the group $631_{d,I}$, $632_{d,I}$, $633_{d,I}$ . . . $640_{d,I}$ (Fig. 19) and the conductor group $372_{d,I}$, $373_{d,I}$ . . . $380_{d,I}$, which would correspond to the numerical value of the difference of the two numerical values with the aid of one unit of the next higher digit column. Since in the group $d_1$ the conductors $372_{d'I}$, $373_{d'I}$ ... $380_{d'I}$ are not connected to the conductors $371_{d,I}$, $373_{d,I}$ ... $380_{d,I}$, and therefore also not with the magnet windings $n_{d,I,0}$, $n_{d,I,1}$, $n_{d,I,2}$ ... $n_{d,I,9}$, but all terminate in the conductor 794, the subtraction of the two first digits is not carried out, but, after the armature 755 (Fig. 20) has been attracted, the circuit over the conductor 794 (Fig. 19)—850 and over the three conductors 860, 861, 862 and over the three magnet windings 800, 799 and 796 is closed.

By the armatures 800, 799 and 796 being attracted, as was described in sub "Cc", the connection is interrupted between the conductors 761, 762, 763 ... 770; 771, 772, 773 ... 780; 781, 782, 783 ... 790 on the one hand and the conductors $631_{d,I}$, $632_{d,I}$, $633_{d,I}$ ... $640_{d,I}$; $631_{d,II}$, $632_{d,II}$, $633_{d,II}$ ... $640_{d,II}$; $631_{d,III}$, $632_{d,III}$, $633_{d,III}$ ... $640_{d,III}$ on the other hand and the connection is established between the conductors $641_{d,I}$, $642_{d,I}$, $643_{d,I}$ ... $650_{d,I}$; $641_{d,II}$, $642_{d,II}$ ... $650_{d,II}$; $641_{d,III}$, $642_{d,III}$, $643_{d,III}$ ... $650_{d,III}$.

By this means the subtraction $v-u$ is initiated and the case 3 is referred back to the case 1 or the case 2.

It should be noted, that after the armature 755 (Fig. 20) has been attracted, magnet windings 800 (Fig. 19) 799, 796 and 816 are energized simultaneously, so that the magnet winding 755 (Fig. 20) remains energized just long enough for the subtraction in the column $d_I$ of the first digit of $v$ and of the first digit of $u$ to be carried out.

(4) The first digit of $u$ and the first digit of $v$ are equal and the second digit of $u$ is smaller than the second digit of $v$.

In this case, after the armature 755 has been attracted, the conductor $371_{d,I}$ (Fig. 19) is energized. This conductor, however, as already described, is not connected to the magnet winding $n_{d,I,0}$, but over the conductor 810 to the magnet winding 798.

The armature 798 is attracted and effects a connection between the conductors $372_{d'II}$, $373_{d'II}$ ... $380_{d'II}$ on the one hand and the conductors 801, 802, 803 ... 809 on the other hand, all of which terminate in the conductor 794.

In this way case 4 is reduced to case 3.

As the assumption in that case 4 was the first digit of $u$ and the first digit of $v$ should be equal, the magnet winding $d_{I,0}$ must be energized in the group $d_I$ after the completion of the subtraction.

The subtraction is completed when the armature 825 (Fig. 20) is attracted; the latter therefore closes the following circuit: 52—54—814—813—865—(Fig. 19) magnet winding $n_{d,I,0}$ and thence in a known manner to the negative pole 53 of the source of current.

(5) The case that the two first digits of $u$ are equal to the first two digits of $v$ can easily be understood and be reduced to the preceding case, since the conductor $371_{d,II}$ is connected with the winding $n_{d,II,0}$ over the non-attracted armature 798; however, as regards the attracted armature the said conductor is connected over it with the conductor 811, which leads to the magnet winding 795, which has the same function in the third position as the magnet 798 in the second position.

In this case, after the completion of the subtraction, also the magnet winding $n_{d,II,0}$ becomes energized over the conductor 866 which is branched off the conductor 813.

The subtraction of two numbers having a different number of digits is entirely analogous to the addition described with reference to Figure 18. The operation of the diagram of connections over the magnet armature 752, (Fig. 20) 753, 754 and the conductors 928 and 935 will be easily understood from the explanation given in sub "Cc".

It is also to be pointed out that the diagram of connections for the subtraction is in no way changed when the numbers used in the operation are set in the group $a$ of magnets instead of in the group $c$ of magnets, if conductors entirely analogous to the conductors 710—739 are led over the armatures of the group $a$ of magnets.

There are three possible ways of setting the numbers to be subtracted from one another:

1. The minuend is set in the group $d$ from the keyboard in the same manner as the dividend in the case of division, and the subtrahend is set in the group $c$. This setting has the disadvantage that when the minuend is set, there must be inserted before the actual number a number of zeros in the group $d$ equal to the difference between the number of the groups of digit values present in the machine and the number of digits to be set.

The setting has the advantage that the two numbers to be set can be set one after the other without a pause.

2. The two numbers to be subtracted from one another are set in the group $c$ and are transferred one after the other to the group $d$.

This manner of setting has the advantage that the setting of the zeros before the number may be dispensed with. It has, however, the disadvantage that between the setting of the first and the second number there must be made a very short pause, since the transmission from $c$ to $d$ takes place digit by digit and the second number can be set, only after the first number has been transferred to $d$.

3. The setting of the two figures takes place in the group $a$. After the setting of the first number, the latter is transferred to $c$, as in the case of addition, by actuating the key effecting the addition operation, and is transmitted from $c$ to $d$ by a subsequent operation of the key 746 (Fig. 19) which effects the operation of subtraction.

As the transmission from $a$ to $c$ does not take place digit by digit, but all the digits are transmitted in the time that is required for the successive attraction of two magnet armatures, a pause between the settings corresponding to the time that is required for the pressing down of the two keys 571 and 746 will in any case suffice. Thus the second number can be set immediately after the first number without a pause, and no setting of possible zeros takes place, since the number is transmitted from $a$ to $c$ with the right digit values.

Obviously, in this case care must be taken that after the transmission from $a$ to $c$ has taken place, the armature 588 shall not be attracted, which armature, as will be seen from the example of addition, initiates the writing of the number set in $c$, that is to say the conductor 587 must be led over the armature 792 (Fig. 19) in such a manner, that it is interrupted when this armature is attracted.

Cd

For the purpose of writing the difference set in the group $d$, the typing key 146 is pressed down (Fig. 27). The typing key 146 closes in addition to the circuit illustrated in Figures 6 to 9, the following circuit: 52—54—1289—winding 1301—1289—55—53. The armature 1301 (Fig. 6) initiates in a known manner the writing of the number set in the group $d$ and in addition thereto closes the following circuit: 52—54—1302—winding 1303—1302—55—53. The armature 1303 closes the following circuit: 52—54—key 146—1289—1304—1302—winding 1303—1302—55—53.

That is to say, if the key 146 is pressed down, the circuit over 1301 is closed only after all the armatures 837, 842, and 846 have come to their position of rest, that is to say after the subtraction has been completed, so that the typing key 146 must remain closed until the first figure of the difference has been written; however, it may remain closed for a longer period of time, since after the attraction of the armature 1301 the armature 1303 is attracted, which latter armature interrupts the connection between the key 146 and the winding 1301, and remains attracted as long as the key is kept pressed.

The armature 1301 is thus made independent of the key 146 and remains closed only until the figure set in $d_1$ is written.

Da

The fifth group of magnets viz., the quotient selecting group $e$, will now be described.

The setting of a figure in the group $e$ of magnets is shown in Figs. 6 to 9.

From the double key 148, viz. the divisor key, the conductor 1040′ leads to the conductor 152, which connects in a known manner the group $a$ of magnets with the bus-conductors 130, 131 ... 140. Further, the conductor 1039 leads from this key to the magnet winding 1040 and thence to the conductor 298. The conductors 1030, 1031, 1032 ... 1038 lead over the armature of the magnet 1040 in such a manner that when the armature is attracted they establish a connection between the bus-conductors 132, 133, 134 ... 140 on the one hand and the magnet windings $e_1, e_2 ... e_9$ on the other hand. Further, over the armature 1040 there passes the conductor 1042 which comes from the conductor 1041, the latter being connected over the conductor 702 with the conductor 54, and thus with the positive pole 52 of the source of current, in such a manner that it is closed at this point by the attracted armature 1040.

After leaving the armature 1040, the conductor 1042 passes over the armature 1043, which interrupts it at this point when attracted, to the conductor 1039.

From the conductor 1042 there branches off the conductor 1054, from which a conductor 1045, 1046, 1047 ... 1053 passes over each armature of the group $e$, in such a manner that it is closed at this point by the attracted armature. All the conductors 1045, 1046 ... 1053 end in the conductor 1044 which leads over the magnet winding 1043 to the conductor 298.

The operation of this diagram of connections will be clear. When the divisor key is pressed down, the conductor 1040′ connects in a known manner the group $a$ to the bus-conductors 130, 131 ... 140 and at the same time the conductor 1039 effects the connection between the group $e$ and the bus-conductors 132, 133 ... 140. The circuit 52—54—702—1041—1042—1039 magnet winding 1040—298 keeps the magnet 1040 energized until the armature 1043 is attracted. This comes into action as soon as a figure is set in the group $e$.

Thus when a number is set after the divisor key has been pressed down, the number is set in the group $a$ of magnets (the group of multiplicands) and the first figure of this number which is not a zero is set in the quotient selecting group $e$. The figure zero cannot be set in this group, since the bus-conductor 131 is not connected with this group.

Figure 21:
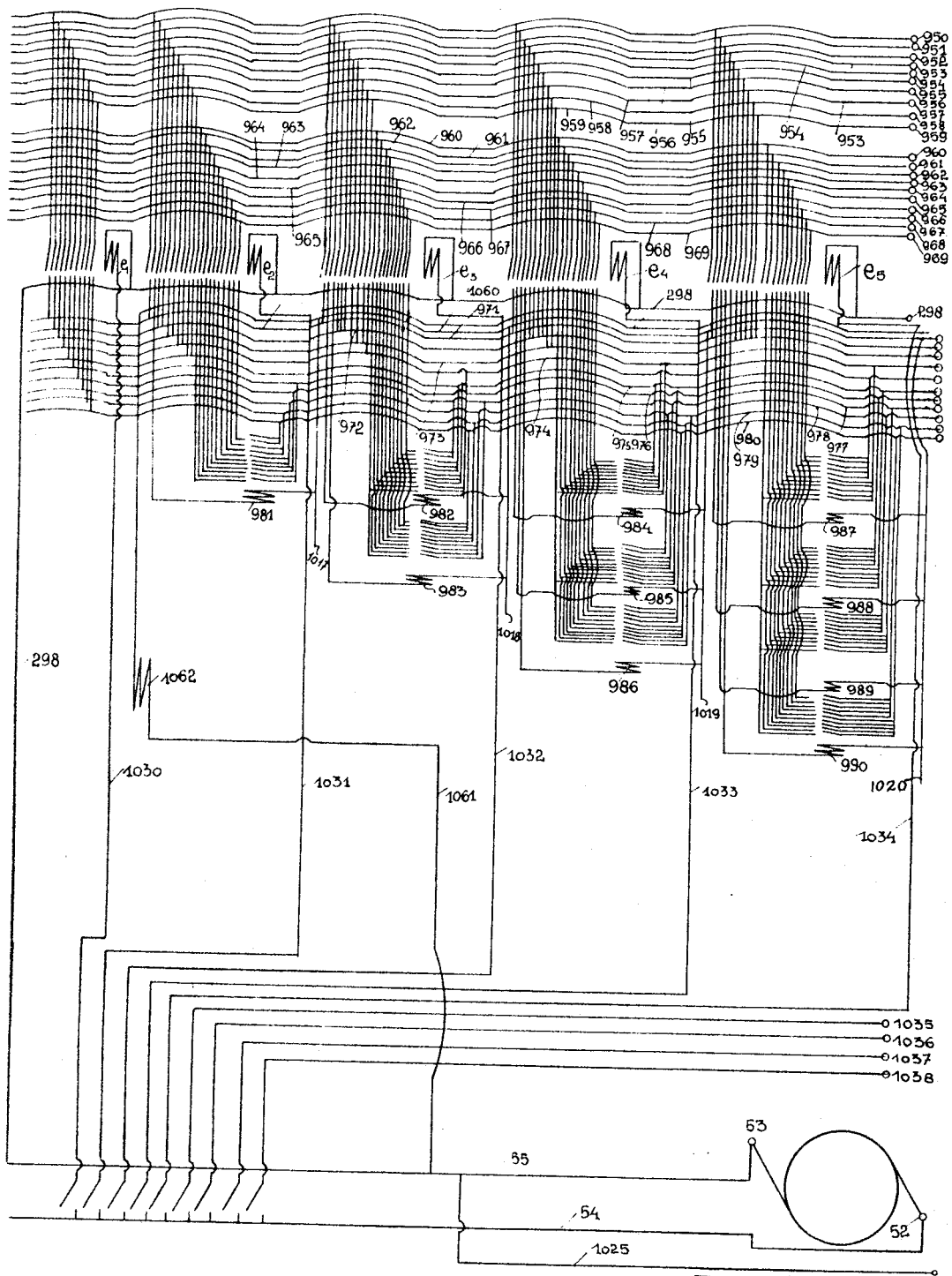
Figs. 21 and 22 show the connections for the quotient selector.
Figure 22:
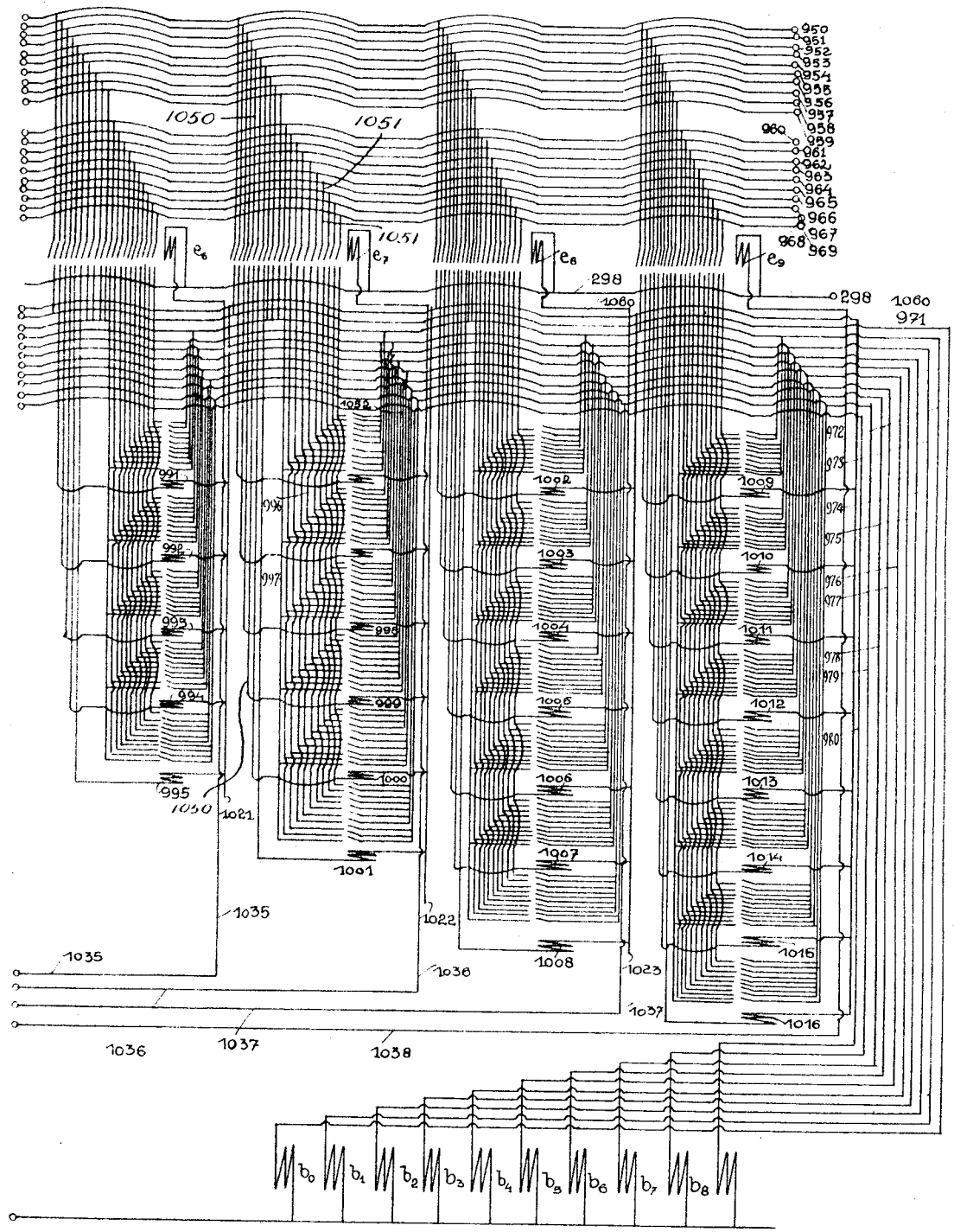

The further connections of the group $e$ are illustrated in Figures 21, 22.

Figures 21 and 22 show the magnets $e_1, e_2, e_3 ... e_9$ together with their auxiliary magnets 981, 982, 983 ... 1016.

Over each armature of the group $e$ of magnets, there are provided connecting conductors which are closed at this point by the attracted armatures $e$, in such a manner that they connect in the following manner the groups of conductors 950, 951, 952 ... 959 in which each conductor corresponds to a figure value between 0 and 9 and 960, 961, 962 ... 969, in which similarly each conductor corresponds to a figure value, on the one hand with the group of conductors 971, 972, 973 ... 980 and on the other hand with the group in which again each conductor corresponds to a figure value 0–9.

Each conductor of the group 950, 951 ... 959 is connected over each armature of the group $e$, the figure value of which is smaller than, or at the utmost equal to, the figure value of the corresponding conductor, with that conductor of the group 971, 972 ... 980, the figure value of which corresponds to the figure value of the integer of the quotient of the figure value of the conductor and the figure value of the magnet; each conductor of the group 950, 951 ... 959 is connected over each armature of the group $e$, the figure value of which is greater than the figure value of the corresponding conductor, with the winding of an auxiliary magnet 981, 982 ... 1016, over the attracted armature of which, connection is established between the group of conductors 960, 961 ... 969 on the one hand and the group of conductors 971, 972 ... 980 on the other hand, in such a manner that each conductor of the first group is connected with that conductor of the second group, the figure value of which corresponds to the figure value of the integer of the quotient between the two digit numbers represented by the figure value of the corresponding conductor of the group 950, 951 ... 959 and of the corresponding conductor of the group 960, 961 ... 969—in which the figure value of the conductor of the group 950, 951 ... 959 represents the tens digit—and the figure value of the magnet $e$.

It is to be pointed out that the conductor 950 with the figure value 0 is connected without exception over each armature $e$ with the conductor 971, which has again the figure value 0.

According to this description there belongs to the magnet $e_2$ with the figure value 2 one auxiliary magnet, since only the conductor 951 with the figure value 1 has a smaller figure value than that of the magnet $e_2$. The figure values of all other conductors of this group are equal to or greater than the figure value of the magnet $e_2$ and thus are connected over the armature $e_2$ direct with the corresponding conductors of the group 971, 972, 973 ... 980. The conductor 954 with the figure value four is thus connected with the conductor 973 with the figure value 2.

Thus two auxiliary magnets appertain to the magnet $e_3$ the numerical value of which is three etc. and eight auxiliary magnets to the magnet $e_9$.

An example will be given in order to make the above point quite clear.

Assuming that of the group of conductors 950, 951 ... 959 the conductor 954 with the numerical value four is connected in a manner to be hereinafter more particularly described, and of the group of conductors 960, 961 ... 969 the conductor 966 with the numerical value six is connected with the positive pole of the source of current. Let us also assume that the magnet winding $e_7$ also carries current so that the armature $e_7$ is attracted. Now, the conductor 954 is connected with the magnet winding 999 through the conductor 1050 and the said winding is connected over the conductor 1022 and the conductor 1060 with the negative pole of the source of current, in a manner hereinafter more particularly described. The armature 999 will now be attracted and effect the following connection: positive pole—966 (assumption in this example)—1051—1052—977—winding $b_6$—1025. Thus the conductor 977 with the numerical value 6(46:7) is connected with the positive pole of the source of current.

It is also to be pointed out that the conductors 1017, 1018, 1019 ... 1024, each of which is connected with a winding of the auxiliary magnet of each magnet in the group $e$ are all connected with the conductor 1060, which leads over the magnet winding 1062 and conductor 1061 to the conductor 55.

Figure 23:
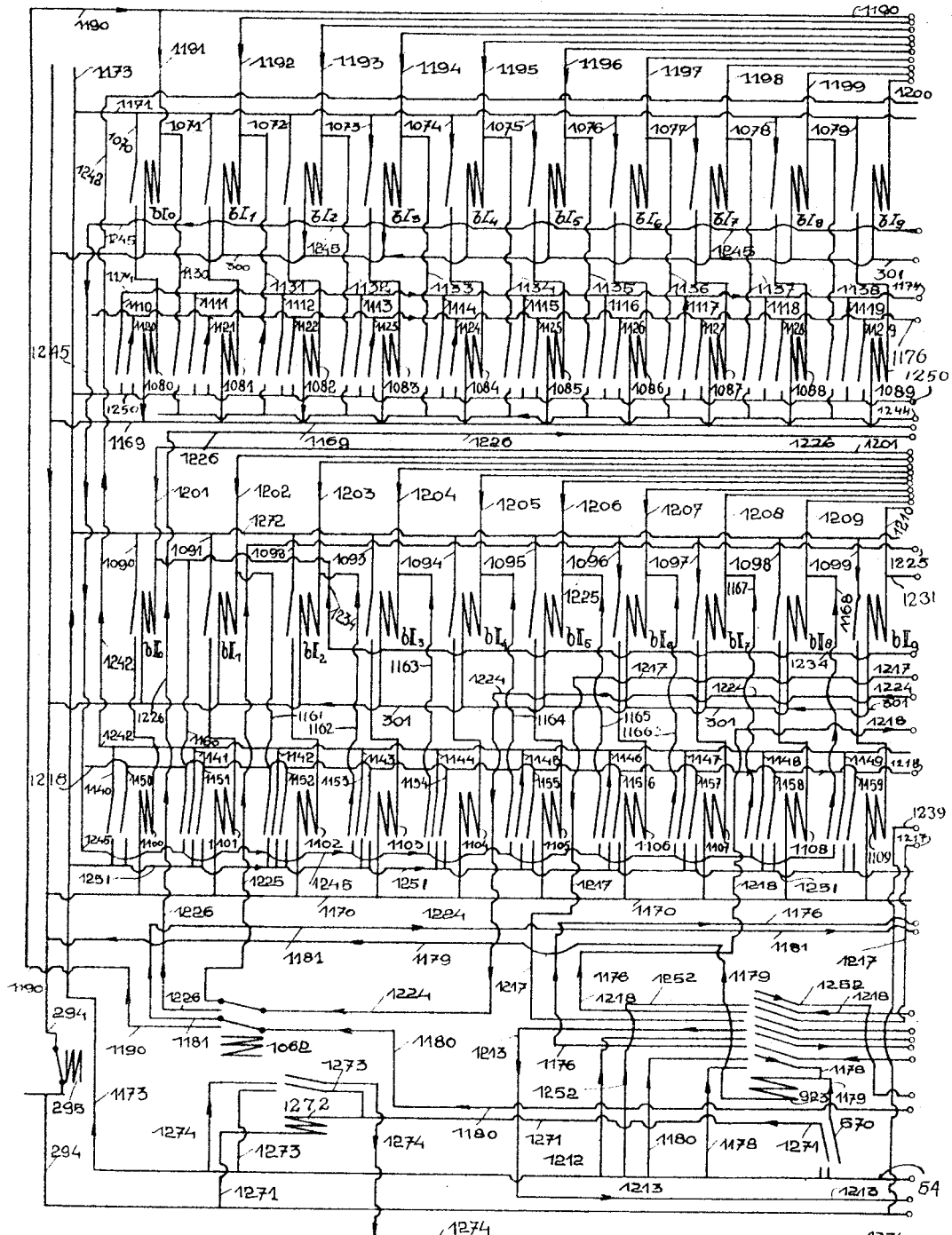
Figs. 23 and 24 show the connections for the quotient group with all the auxiliary magnets required for division.
Figure 24:
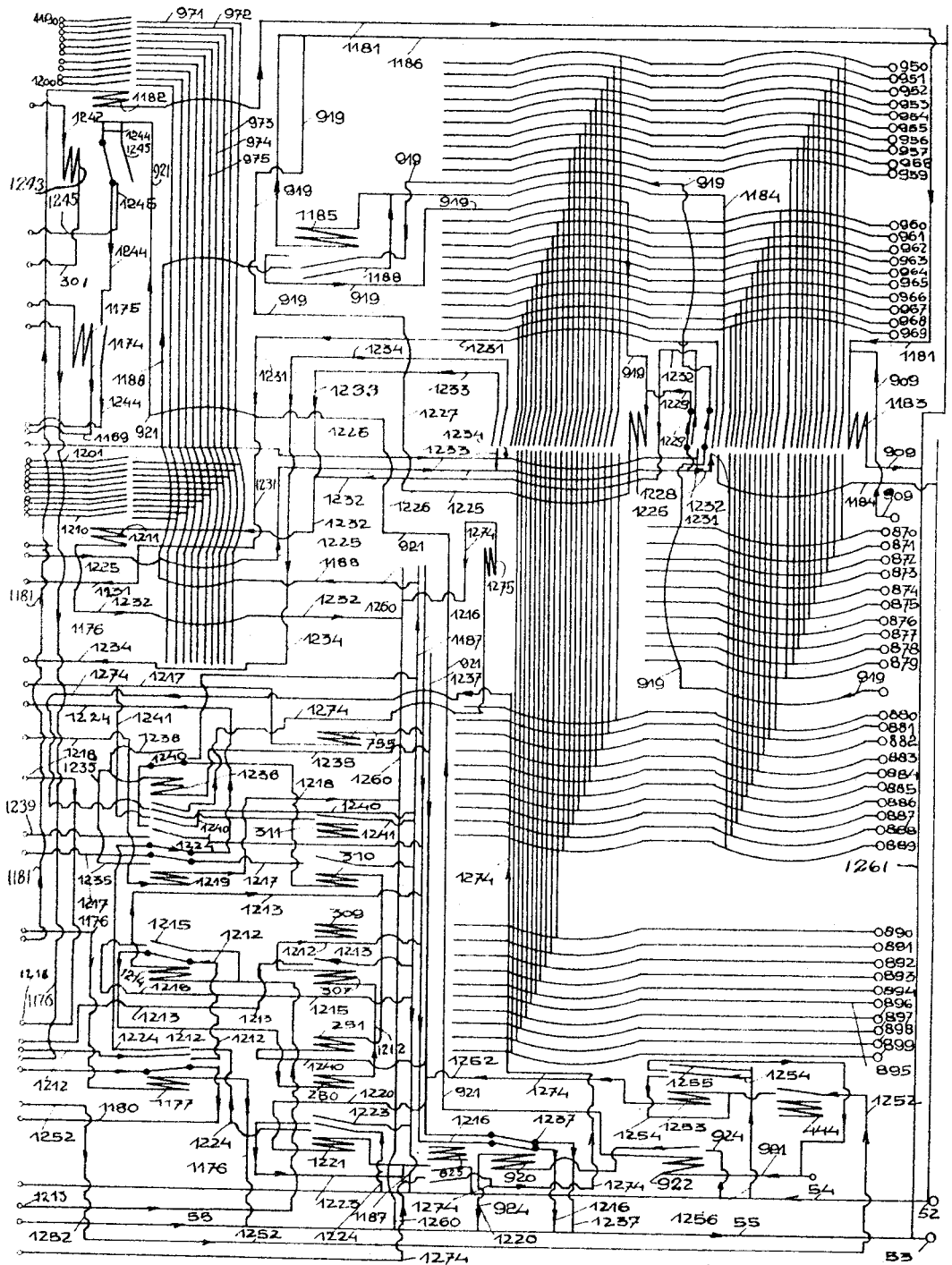

The further course of the conductor 971, 972 ... 980, that is to say the connection of the quotient selecting group $e$ with the other groups of magnets, as well as the whole of the connections for the division, are illustrated in Figs. 23 and 24.

Figure 19:
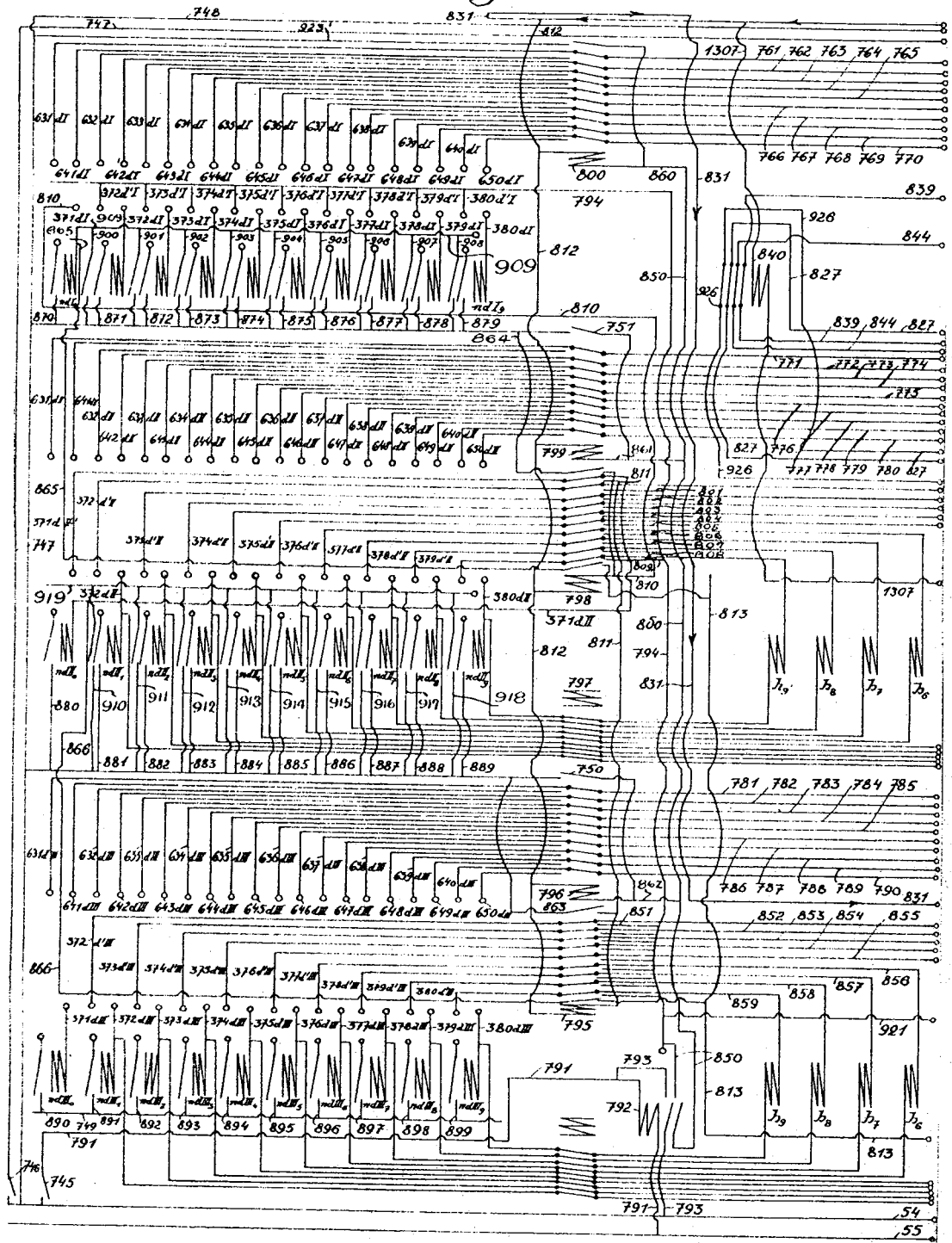
Figs. 19 and 20 show the connections for the difference group with all the auxiliary magnets required for carrying out subtraction.

Figs. 23 and 24 illustrate the connection between the groups of conductors 870, 871, 872 ... 879, 880, 881 ... 889, 890, 891, 892 ... 899, on the one hand and the groups of conductors 950, 951, 952 ... 959, 960, 961, 962 ... 969, leading to the quotient selector, on the other hand. The group of conductors 870, 871 ... 879 is led, as indicated in Figure 19, over the magnets of the group $n_{d,I,0}$, $n_{d,I,1}$, $n_{d,I,2}$ ... $n_{d,I,9}$ in such a manner that each conductor of this group is closed at this point by a corresponding attracted armature of this group of magnets. All these conductors 870, 871 ... 879 start from the conductor 751 and thus are connected over the conductor 748 with the conductor 54 and consequently with the positive pole 52 of the source of current. In Fig. 19 these conductors are enclosed by small circles, which, as an indication that these conductors are continued from these points, are again indicated in Fig. 24.

In the same manner a second group of nine conductors lead over the armatures of the group of magnets $n_{d,I,0}$, $n_{d,I,1}$ ... $n_{d,I,9}$, (again Fig. 19), with the exception of the magnet $n_{d,I,0}$, viz., the conductors 900, 901, 902 ... 908 all of which start from the conductor 751 and end in the conductor 909.

The conductor 909 is again indicated in Fig. 24 and leads to the winding of the magnet 1183 and terminates in the conductor 1186.

The conductors of the group 880, 881, 882 ... 889 pass over the armatures of the group of magnets $n_{d,II,0}, n_{d,II,1} \ldots n_{d,II,9}$ (Fig. 19) in the same way as the conductors of the group 870, 871 ... 879 over the armature $n_{d,I,1}, n_{d,I,2} \ldots n_{d,I,9}$ and are indicated in the same way in Fig. 24. In the same way, the group of nine conductors 910, 911 ... 918, all of which end in the conductor 919, lead over the armatures of the same group of magnets $n_{d,II,1}, n_{d,II,2} \ldots n_{d,II,9}$.

The conductor 919 is again indicated in Fig. 24 and leads over the armature of the magnet 1183, which interrupts it when attracted, and over the armature of the magnet 1185 which closes it at this point, in the attracted position, to the winding of the magnet 1228 and ends in the conductor 1186.

The conductors of the group 890, 891, 892 ... 899 are led over the armatures of the group of the magnets $n_{d,III,0}, n_{d,III,1} \ldots n_{d,III,9}$ in a manner entirely similar to that just described, the group of conductors being again indicated in Fig. 24.

Connecting conductors between the groups 870, 871 ... 879 880, 881 ... 889 on the one hand and the groups 950, 951 ... 959 960, 961 ... 969 on the other hand are led over the armature of the magnet 1183, in such a manner that each conductor of the first group is connected with a corresponding conductor in the second group by the attracted armature.

As according to the statements hereinbefore made, each conductor of the groups 870 ... 879, 880 ... 889, 890 ... 899 corresponds to a numerical value, since it is led over a magnet armature with a definite numerical value, it follows that also each conductor of the groups 950 ... 959, 960 ... 969, corresponds to a definite numerical value; in this way the assumption that was made in the description of Fig. 22 (of the quotient selector) is justified.

Connecting conductors are led over the armature of the magnet 1228 between 880 ... 889, 890 ... 899 on the one hand and 950 ... 959, 960 ... 969 on the other hand, in the same manner as over 1183.

Each connection during the setting of a figure in the quotient selector between the conductors 950 ... 959, 960 ... 969 on the one hand, and the group of conductors 971, 972 ... 980 on the other hand, is illustrated in Figs. 21, 22, and therefore has not been transferred to Figs. 23, 24. In these figures only the conductors 971, 972 ... 980 have been shown.

From the conductor 971 ... 980 the conductors 1191, 1192 ... 1200 are branched off over the attracted armature of the magnet 1182, each of which conductors leads to a winding of the magnets of the group of multipliers $b_{I,0}, b_{I,1} \ldots b_{I,9}$.

The magnet windings of this group are connected with one another in the same manner, as has been indicated in connection with the magnets $n_0, n_1 \ldots n_9$ in Figs. 14–17, that is to say each magnet of this group always remains traversed by a current so long as another magnet of the same digit value group is not traversed by a current.

This diagram of connections has not been indicated in Fig. 23, as it does not contain anything new and as it will take too much space.

In addition to the conductors which have been described in connection with the case of multiplication, conductors 1070, 1071 ... 1079 are led over the armatures of the group $b_I$ of magnets, in such a manner that they are closed at these points by the attracted armatures and they lead to the magnet windings of the group 1080, 1081 ... 1089, and after leaving the latter, end in the conductor 1169.

Two conductors are led over each of the armatures of the magnets 1080 ... 1089, which conductors are closed at these points by the attracted armatures, and are branched off from the conductor 1250. Of these conductors, the conductors 1110, 1111 ... 1119 terminate in the conductor 1174 which in its turn passes over the magnet winding 1175 (Fig. 24) and terminates in the conductor 1169, and the conductors 1120, 1121 ... 1129 (Fig. 23) terminate in the conductor 1176 (Figs. 23, 24) which is continued over the armature of the magnet 923 in such a manner that it is closed at this point by the attracted armature, and leads from this armature and over the magnet winding 1177 (Fig. 24) to the conductor 55.

Figure 20:
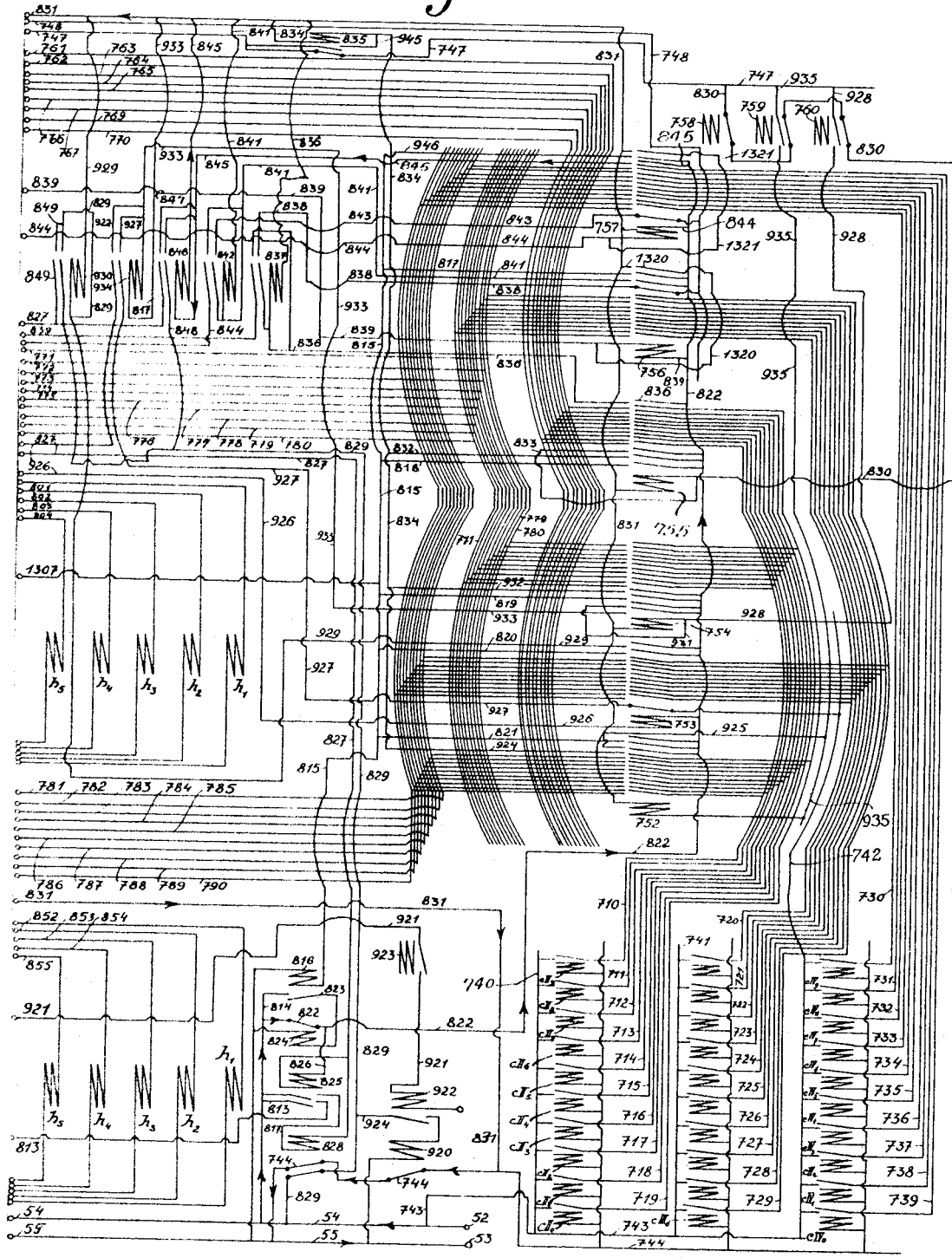

The magnet winding 923 has already been mentioned in Figs. 19 and 20. The conductor 1179 leads to this magnet winding from the key 570 (Fig. 23) viz. the key which carries out the operation of division, which conductor after leaving this magnet winding terminates in the conductor 294.

The following three conductors which start from the conductor 54 lead over the armature 923 in such a manner that they are closed at this position by the attracted armature:

1. The conductor 1178 which after leaving the armature terminates in the conductor 1179.

2. The conductor 1180 (Figs. 23, 24) which after leaving the armature 923 leads over the armature of the magnet 1177 in such a manner that it is interrupted at this point by the attraction of the same and is continued in such a manner over the armature 1062 that the latter establishes in its position of rest the connection between 1180 and 1181, and when it is attracted the connection between 1180 and 1190.

3. The conductor 1212 (Fig. 23) which after leaving the armature 923 passes over the armature 1177 which closes it at this point in the attracted position, leading in its further course over the armature 1214 which interrupts it at this point when attracted and then successively to the magnet windings 250 and 307, to terminate in the conductor 1216.

The magnets 250 and 307 have already been mentioned in connection with Figs. 11 and 12; the portion of the conductor 1212 which lies between these magnet windings as well as the last end of the part leading to the conductor 55 is thus identical with the conductor 305; however, for the sake of clearness, the reference 1212 has been retained on this sheet of drawing, since, as will be seen later on, it is entirely immaterial how this conductor is connected with the negative 53 of the source of current.

In addition to the conductors described with reference to Figs. 11 and 12, and which have not been again reproduced here, the conductor 1213 is led over the armature of the magnet 307 in such a manner that it is closed at this point by the attracted armature; the conductor 1213 starts from the conductor 1187 which is connected with the conductor 54, and leads after leaving the armature 307, over the armature 923 (Fig. 23) in such a manner that it is closed at this point by the attracted armature and leads from that point over the magnet windings 1214 to the conductor 1216.

The conductor 1216 leads over the armature of the magnet 920, which is interrupted at this point when attracted, to the conductor 55.

The conductor 1217 leads from the conductor 1187, over the armature of the magnet 310 which has already been described with reference to Figs. 11 and 12, in such a manner that it is closed at this point by the attracted armature. The conductor 1217 is successively led over the armature of the magnet 1219 (Fig. 24), which interrupts it when attracted, and over the armature of the magnet 923 (Fig. 23) which closes it at this point in the attracted position to the winding of the magnet 755 (Fig. 24), the operation of which has been described with reference to Figs. 19 and 20.

Of the magnets described with reference to Figs. 19 and 20, magnet 825 has been indicated in Figs. 23 and 24. The conductor 1220 which starts from the conductor 54 is led over the armature of this magnet in such a manner that it is closed at this point by the attracted armature and it goes from that point to the magnet winding 1221, terminating in the conductor 1237. This conductor 1237 starts from the conductor 55 and is led over the armature 920 in such a manner that it is interrupted at this point by its attraction. Two circuits pass over the armature 1221 in such a manner that they are closed at this point by the attracted armature:

1. The conductor 1223 which starts from the conductor 1187 and terminates in the conductor 1220 and 2. The conductor 1224 which starts from the conductor 54 and thence over the armature 1177, which closes it at this point in its attracted position, and over the armature 1219 which interrupts it when attracted, to the armature 1062 (Fig. 23), in such a manner that the latter establishes in its position of rest the connection between 1224 and 1225 and in the attracted position the connection between 1224 and 1226.

The conductors 1201, 1202 . . . 1210 lead from the group of conductors 971, 972 . . . 980 to the windings of the group of magnets $b_{II}$ over the armature of the magnet 1211 in such a manner that they are closed at this point by the attracted armature.

Conductors 1090, 1091 . . . 1099 leading from the conductor 1272 pass over each armature of the magnets $b_{II,0}$ $b_{II,1}$ . . . $b_{II,9}$, which are connected with one another in the same manner as the magnets of the group $b_I$, to one of the magnet windings 1100, 1101 . . . 1109. All the conductors 1090, 1091 . . . 1099 terminate in the conductor 1170, which in its turn terminates in the conductor 294.

Over each armature 1100, 1101 . . . 1109 there pass two conductors, all of which conductors start from the conductor 1251, in such a manner that they are closed at this point by the attracted armature, the conductors 1150, 1151 . . . 1159 terminating in the conductor 1218, which leads over the armature 923 which closes it at this point in its attracted position, to the magnet winding 1219, and thence to the conductor 1260, whilst the conductors 1140, 1141 . . . 1149 terminate in the conductor 1242 which leads over the magnet winding 1243 (Fig. 24) to the conductor 301.

As already pointed out the armature 1219 interrupts when attracted the conductors 1217 and 1224 and establishes in its attracted position the following circuits:

1. It connects the conductor 1217 with the conductor 1235, which leads over the winding 1236 to the conductor 1237.

2. It closes the conductor 1239, which leads from the conductor 1216 to the conductor 55.

3. It closes the conductor 1240, which starts from the conductor 1187 and leads over the armature of the magnet 1236 which interrupts it when attracted, and over the windings of the magnets 310 and 251 to the conductor 1237. The part of the conductor lying between the conductors 310 and 251 is identical with the conductor 350 illustrated in Figs. 11 and 12.

4. The conductor 1241 which starts from the conductor 1187 and is closed at this point by the attracted armature 311 and after passing over the armature 1219 terminates in the conductor 1217.

Over the armature of the magnet 1236 there passes in addition to the conductor 1240, already mentioned, the conductor 1238 which starts from the conductor 1187 and terminates in the conductor 1235, in such a manner that it is closed at this point by the attracted armature.

Figs. 23 and 24 also illustrate the following:

The conductor 921 shown in Figs. 19 and 20, the continuation of which is shown in these figures. This conductor leads over the magnet winding 922 and two conductors are branched off from it: the conductor 1244 which is led over the magnet armature 1243, which interrupts it at this point, and over the armature 1175 which in its attracted position closes it at this point. From this conductor there branch off the nine conductors 1130, 1131 ... 1138 each of which is closed at these points by one of the attracted armatures 1081, 1082 ... 1089, and which respectively lead to the winding of the group $b_1$ corresponding to the digit value of its appertaining magnet of the group $b_1$ minus one.

From the conductor 1245, which similarly branches off the conductor 921 and is closed at this point by the attracted armature 1243, there branch off in a similar manner the conductors 1160, 1161 ... 1168 over the armatures 1101, 1102 ... 1109, which conductors go to the windings of the group $b_{11}$, as is the case with the conductors 1130, 1131 ... 1138 in the group $b_1$.

Fig. 24 also shows the magnet 444 indicated in Fig. 13 (viz. the magnet which is traversed by current during the transmission of the tens from $c_{11}$ to $c_1$). Over this magnet armature there passes a conductor 1252 which starts from the conductor 54 (Fig. 23) and which is closed by the attracted armature 923, and after passing over the armature 444 (Fig. 24) it terminates over the magnet winding 1253 into the conductor 1237, in such a manner that it is closed at this point by the attracted armature 444.

Two circuits pass over the armature 1253 in such a manner that they are closed by the attracted armature viz:

1. The conductor 1254 which starts from the conductor 1256 and terminates in the conductor 1252, and
2. The conductor 1255 which starts from the same conductor and terminates in the conductor 921.

It has already been pointed out that the armature 1062 (at the lower left corner in Fig. 23) effects in its position of rest the connection between the conductors 1180 and 1224 on the one hand and the conductors 1181 and 1225 on the other hand, and in its attracted position the connection between 1180 and 1224 on the one hand and 1190 and 1226 on the other hand.

We will now follow the conductors 1190, 1181, 1226 and 1225 in their further course.

The conductor 1190 terminates in the conductor 1191. The conductor 1181 leads over the magnet winding 1182 (Fig. 24) and terminates in the conductor 909. The conductor 1225 (Fig. 23) is not continued over any armature and over any winding. Three conductors are branched off from it, viz:

1. The conductor 1231 (Fig. 24) which leads over the armature 1183 in such a manner that it is closed at this point by the attracted armature and terminates in its further course in the conductor 1210 (Fig. 23).
2. The conductor 1229 (Fig. 24) which leads over the armature 1183 in such a manner that when the same is attracted it is interrupted and terminates in the conductor 919.
3. The conductor 1233 which passes over the armature 1228 in such a manner that it is closed at this point by the attracted armature and terminates in the conductor 1232.

From the conductor 1226 there branch off two conductors viz.

1. The conductor 1232 which passes over armature 1183 in such manner that it is closed at this point by the attracted armature and leads over the winding 1211 to the conductor 1260.
2. The conductor 1234 which is closed at this point by the attracted armature 1228 and terminates in the conductor 1201 (Fig. 23).

Over the armature 1183 (Fig. 24) there passes in addition to the mentioned conductors the conductor 1184 in such manner that it is closed at this point by the attracted armature, the conductor starting from the conductor 54 and after passing over the winding 1185 terminates in the conductor 1186.

Over the armature 1185 there passes in addition to the mentioned conductor 919 the conductor 1188 in such manner that it is closed at this point by the attracted armature, the conductor starting from the conductor 1187 and terminating in the conductor 1184.

*Db*

Before describing the operation of division according to the diagram just described, we will describe this operation broadly in order to render the matter that follows more easily understood.

The dividend is set in the group $d$ of magnets, the whole divisor in the group $a$ of multiplicands and the first figure of highest denomination of the divisor that is different from zero in the quotient selecting group $e$. The two highest digits of the dividend are transferred to the quotient selector, from which the first digit of the quotient is selected, which digit is set in the multiplier group $b$, whereupon the product of the divisor set in the group $a$, with the figure that is set in the first digit value group of the magnet group $b$ is obtained, which product is set in the group $c$. After the multiplication is completed, $c$ and $d$ are connected together, that is to say the product is subtracted from the dividend; when this subtraction is completed and the result is such that the product set in the group $c$ is greater than the dividend, the new two highest digits are connected with the quotient selector and the newly selected digit of the quotient is set in the group $b_{II}$, and the multiplication of this digit (not of the whole quotient) with the divisor is initiated.

The set of operations is continued up to the last quotient digit of the machine. If in the subtraction of a product of a quotient digit with the divisor, from the dividend the latter is smaller than the product, the product in the group $c$ is cancelled and a new product is formed with the figure value of the quotient digit minus one, and the subtraction is then effected.

In this way the quotient is set in the group $b$ and the possible remainder in the group $d$, both of which can be transferred on the typewriter in a known manner.

I will now describe all the operations which take place in the machine with reference to the diagram of connections. By pressing down the key 149 and the numeral keys corresponding to the figures of the dividend, the dividend is set in the group $d$ of magnets in the manner already described.

By subsequently pressing down the double key 148 and the keys corresponding to the figures of the divisor, the latter is set in the magnet group $a$, and the first figure of the divisor that is different from zero is set in the quotient selecting group $e$.

If a figure different from zero is set in the magnet group $d_I$, the following circuit is closed (Figs. 19 to 20): 52—54—748—751—one of the conductors 900—901 ... 908-909 (Figs. 23, 24) —909— magnet winding 1183—909—1186—55—53.

The armature of the magnet 1183 connects the conductors 870, 871 ... 879, 880, 881 ... 889 on the one hand with the conductors 950, 951 ... 959, 960, 961 ... 969 on the other hand. Now the following two cases are possible;

(1). The first digit of the dividend is equal to or greater than the figure set in the quotient selector and (2). The same is smaller than the figure set in the quotient selector.

(Re 1). In the first instance no new circuit is closed and the quotient selector remains inoperative as long as the connection between the conductors 971, 972 ... 980 and the magnet windings of the group $b$ is not effected. The criterion for this in the machine is that the magnet winding 1062 (Figs. 21 to 24) is not traversed by a current.

(Re 2). The following circuit is closed; (Figs. 19, 20) 52—54—748—751—one of the conductors 871 ... 879—the corresponding conductor of the group 950, 951 ... 960— (Figs. 21, 22)—one of the conductors leading over the magnet windings 981, 982 ... 1016 —the corresponding conductor of the group 1017, 1018 ... 1024—1060—1061—magnet winding 1062—1061—55—53. The magnet winding 1062 thus becomes energized and its armature is attracted.

If a zero is set in the first digit of the dividend the magnet winding 1183 becomes de-energized, since the conductor 909 is de-energized and consequently also the magnet winding 1062 is de-energized.

Now, if upon the setting of the dividend and divisor, the key 570 (the key that effects the operation of division) is pressed down, the following circuit is closed: 52—54 key 570—1179—magnet winding 923—1179—294—55—53.

The armature 923 is attracted and amongst others closes the following circuit: 52—54—1178—1179—magnet winding 923—1179—294—55—53.

The armature 923 remains attracted also after the release of the key 570 and until the armature 295 is attracted, or until the whole of the machine is set to zero.

If the armature 1062 is in its position of rest, that is to say, if a zero or a numeral that is greater or at least equal to the figure set in the quotient selector is set in the first digit of the dividend the armature 923 closes the following circuit: 52—54—1180—1181—magnet winding 1182—1181—909—magnet winding 1183—909—1186—55—53. Thus the first quotient digit selected in the quotient selector is now transferred to the magnet group $b_I$, since connection is established over the armature of the magnet 1182 between the conductors 971, 972 ... 980 on the one hand and the conductors 1191, 1192 ... 1200 on the other hand.

The circuit comprising the magnet winding 1182 remains closed, until the conductor 1180 is interrupted by the attraction of the armature 1177.

If the armature 1062 is attracted that is to say, if a figure is set in the first digit of the dividend which is smaller than the figure set in the quotient selector and is not equal to zero, the armature 923 closes the following circuit: 52—54—1180—1190—1191—magnet winding $b_{1,0}$—300—294—55—53.

Thus in this case, zero is set as the first digit of the quotient, without the quotient selector having come into operation.

Thus the machine effects the division with respect to the digit value always in such a manner as if a number with only one integer digit was set in the dividend, that is to say, the quotient has always a zero as its first digit, when the first digit of the dividend is smaller than the first digit of the divisor.

However, it sets in the quotient only so many zeros as if the first digit of the divisor would correspond to the unit digit, since the quotient selector comes always in operation—when determining the second quotient digit—when a numeral different from zero is set in the first digit of the dividend, without taking into consideration the possible higher or lower digit value of the first figure of the divisor.

This property is important as regards the numerical determination of transcendental functions, as will be described further below.

If the first figure of the quotient is set in the group $b_I$, the following circuits are closed:

1. 52—54—1173—1171—one of the conductors 1070, 1071 ... 1079—the magnet winding of the group 1080, 1081 ... 1089 connected with the said conductor 1169—294—55—53.

2. Those of the circuits not illustrated which, in a manner entirely similar to that described with reference to the magnets of the group $n$ illustrated in Figs. 14 to 17, maintain energized that magnet winding of the group $b_I$ which became energized during the setting of this first digit, viz. until a new figure is set in the group $b_I$.

The attraction of one of the armatures 1080, 1081 ... 1089 is associated with the closing of the following circuits:

1. 52—54—1173—1250—one of the conductors 1110, 1111 ... 1119—1174—magnet winding 1175—1169—294—55—53 and 2. 52—54—1173—1250—one of the conductors 1120, 1121 ... 1129—1176—armature 920—magnet winding 1177—55—53.

The two windings 1175 and 1177 remain energized so long as a figure is set in the group $b_I$.

As has already been pointed out, the armature 1177 interrupts the conductor 1180 when attracted, so that the circuit that may exist over the magnet winding 1182 is interrupted as soon as its function, viz. the setting of the first quotient digit, is completed.

The armature 1177 now closes the following circuit 52—54—1212—magnet winding 250—magnet winding 307—1216—55—53.

That is to say, after the first quotient digit has been set in the group $b_I$, the armature 1177 is attracted and closes the circuit through the magnets 250 and 307 which initiates the multiplication of the divisor set in the group $a$ with the first digit of the quotient set in the group $b_I$.

The circuit through the windings 250 and 307 remains closed only as long as the armature 1214 is not attracted, since the latter interrupts the conductor 1212 when attracted.

The armature 307 now closes in addition to the circuits already described in connection with multiplication operation the following circuit which includes the magnet 1214: 52—54—1187—1213—magnet winding 1214—1213—1216—55—53.

The armature 1214 closes the circuit: 52—54—1187—1215—1213—magnet winding 1214—1213—1216—55—53 which maintains the winding 1214 energized as long as the conductor 1216 is not interrupted.

The multiplication of the divisor with the first digit of the quotient may result in that the highest digit of this product is set in the group $c_I$ by the tens transmission. The following consideration shows why this setting of a figure in the group $c_I$ is rendered possible only by the tens transmission from the group $c_{II}$ and why it is not due to the fact that the part product of the figure set in $a_I$ with the one set in $b_I$ is a two digit number, that is to say that the tens digit of this part product is set in $c_I$: if the part product were a two digit number, the figure set in $b_I$ would have been obtained only as a quotient between a two digit number and the figure set in the quotient selector, that is to say, the first digit of the dividend would have to be smaller than the first digit of the divisor; if this were the case, the armatures 1062 would have been attracted, and zero would have been set in $b_I$.

Thus, if in this multiplication, a figure is set in the group $c_I$, this first digit of the quotient is too high.

The criterion that a figure has been set in $c_I$, lies in the magnet winding 444 becoming energized.

The armature 444 now closes the following circuit over the armature 923; 52—54—1252—magnet winding 1253—1252—1237—55—53.

The armature 1253 now closes the following two circuits:

1. 52—54—1256—1254—1252—magnet winding 1253—1252—1237—55—53. This circuit keeps the winding 1253 energized, also after 444 has become de-energized, until the conductor 1237 is interrupted.

2. 52—54—1256—1255—921—magnet winding 922—921—1244—over open armature 1243—over closed armature 1175—over closed armature of the group 1080, 1081 ... 1089—magnet winding $b_I$ which corresponds to the next lowest digit value—300—294—55—53.

The attraction of the new armature of the group $b_I$ causes the one hitherto set to be released. Thus we have now a figure set in $b_I$ which is smaller by one.

The armature 922 now closes the following circuit: 52—54—924—magnet winding 920—924—55—53.

The armature 920 interrupts when attracted, according to Figs. 19 and 20, the conductor 744 and thereby all the circuits that include the windings of the group $c$, that is to say it cancels the set partial product and at the same time interrupts, according to Figs. 23 and 24, the conductors 1216 and 1237 and therewith also the circuit that includes the winding 1214.

Thus, the circuit which passes over the armature 1177 which remains closed and which extends over 52—54—1212—armature 923—magnet winding 250—winding 307—1216—55—53 is now again closed since together with the conductor 1216, also the circuit that includes the winding 1253 and the subsequent circuit that passes over 922 and then 920, was interrupted so that the conductor 1216 is finally no longer interrupted. The multiplication of the divisor with the corrected digits of the quotient is again initiated.

A criterion for the fact that the multiplication has been completed is that the winding 310 becomes energized.

The armature 310 now closes the following circuit; 52—54—1187—1217—armature 1219—magnet winding 755—1216—55—53.

The armature 755 is attracted whereby the subtraction of the product set in $c_{II}$, $c_{III}$, $c_{IV}$ . . . from the dividend is initiated, as has been described with reference to Figs. 19 to 20.

It was mentioned in detail at that place that the conductor 794 from which corresponding to the two kinds of subtraction (that in which the positive differences only are taken into consideration and that in which also the negative differences are considered) the conductor 850 is branched off over the armature 792 and conductor 921 over the armature 923, which is shown also in Figs. 23 and 24 is always connected with the positive pole 52 of a source of current when the minuend (here in the case of division, the dividend) is smaller than the subtrahend (in the division, the product of the divisor with one digit of the quotient).

As in the case of division, the armature 923 comes into operation, the conductor 921 comes in such a case into action, the effect of which conductor has already been described (cancellation of the number set in $c$ and reduction by one of the figure set in $b$). A sign that the subtraction has been completed is that the winding 825 has become energized.

The armature 825 now closes in addition to the circuits described in Figs. 19 and 20, the following circuit: 52—54—1220—magnet winding 1221—1220—1237—55—53.

The armature 1221 closes the circuit 52—54—1187—1223—1220—magnet winding 1221—1220—1237—55—53, which circuit keeps the winding 1221 energized also after the armature 825 has returned to its position of rest, and in addition thereto closes one of the following circuits.

1. When the armature 1062 is in its position of rest and the armature 1183 is attracted: a circuit 52—54—1224—1225—1231—1210—magnet winding $b_{II,0}$, 301—294—55—53 is closed.

That is to say, if the armature 1183 is attracted and the armature 1062 is in its position of rest, that is if a figure is also set in the group $d_I$ which is equal to the first digit of the divisor (it can no longer be greater), nine is set in the magnet group $b_{II}$.

2. If the armature 1062 is attracted and likewise the armature 1183, the circuit: 52—54—1224—1226—1232—magnet winding 1211—1232—1260—55—53 is closed.

That is to say if in the magnet group $d$ there is also set a figure which is however smaller than the first digit of the divisor, then the armature 1211 effects a connection between the quotient selector and the quotient group $b_{II}$, and the second digit of the quotient is selected.

3. If the armature 1062 and similarly 1183 and 1228 are in their position of rest: 52—54—1224—1225—1229—919—magnet winding 1228—919—1186—55—53 and after the attraction of the armature 1228: 52—54—1224—1225—1233—1232—magnet winding 1211—1232—1260—55—53, this being a circuit connected in parallel with the former circuit.

That is to say, if zero is set in $d_I$ and likewise in $d_{II}$ (if a figure different from zero were set in $d_{II}$, the winding 1228 would be energized by the conductor 919 and thus its armature would be attracted) the connection of the magnet group $d$ with the quotient selector is first effected and there upon that between the latter and the group $b_{II}$ viz. zero is set in this way in $b_{II}$.

4. If the armature 1062 is in its position of rest and the armature 1228 is attracted, then the second mentioned circuit under 3 is closed.

That is to say, if a figure is set in $d_{II}$ which is different from zero, and is greater than or at least equal to the first digit of the divisor, then the connection between the quotient selector and the quotient group is also effected, and the second digit of the quotient is selected.

5. If the armature 1062 is closed and likewise the armature 1228, then the following circuit is closed: 52—54—1224—1226—1234—1201—magnet winding $b_{II,0}$—301—294—55—53.

That is to say, if a figure is set in the group $d_{II}$ which is different from zero and smaller than the first digit of the divisor, then zero is set in the second digit of the quotient (in $b_{II}$), without the quotient selector having come into operation.

Now if the second digit of the quotient is set by one of the five circuits just described, then the following circuits are closed:

1. 52—54—1173—1251—one of the conductors 1140, 1141 . . . 1149—1242—magnet winding 1243—1242—300—294—55—53.

The armature 1243 interrupts the conductor 1244 which, as described with reference to the group $b_1$, in conjunction with the conductor 921 effects possible corrections of the selected first quotient digit and closes the conductor 1245, which branching from the conductor 921 effects the possible correction in the group $b_{II}$.

2. 52—54—1173—1251—one of the conductors 1150, 1151 ... 1159—1218—magnet winding 1219—1218—1260—55—53.

The armature 1219 interrupts the conductors 1224 and 1217, and probably with the conductor 1224 a circuit which may pass over 1211, and closes the following circuits:

1. 53—55—1216—1239—55—53.

With the conductor 1239 which is now closed, the conductor 1216 is connected not only over the armature 920, but also direct with the negative pole 53 of the source of current; a possible attraction of the armature 920 no longer affects the circuit of the conductor 1216, and thus no longer the circuit passing over the winding 1214 so that 1214 remains energized until the division is completed when the second digit of the quotient is set.

2. 52—54—1187—1240—magnet winding 310—magnet winding 251—1237—55—53.

The multiplication of the divisor with the second digit of the quotient is initiated with this circuit which is in part identical with the circuit over 310 and 251 described with reference to the operation of multiplication, and the set of operations (multiplication—subtraction—selection of the third quotient digit) is repeated.

It is to be taken into consideration that the conductor 1217 passing over 310 no longer leads to the magnet winding 755, since it is interrupted by the armature 1219, but that it is connected with the conductor 1235 which leads to the winding 1236, which has the same function for the second quotient digit as 1214 for the first one.

The criterion that the division is completed (in the present scheme for a two digit quotient) is that the armature 1219 as well as the armature 825 is attracted.

When the double key 570 (the key that initiates the operation of division) was closed, in addition to the circuit passing through the winding 1923, also the following circuit was closed; 52—54—570—1271—magnet winding 1272—1271—55—53.

The armature 1272 closes the following circuit: 52—54—1273—1271—magnet winding 1272—1271—55—53. The armature 1272 thus remains closed also after the release of the key 570 and when the division is completed it closes the following circuit: 52—54—1274—magnet winding 1275—1274—1260—55—53.

As will be seen from Figs. 6 to 9, the armature 1275 effects the connection between the conductors passing over the armatures of the magnet group $b_I$ and the bus-conductors 131, 132 ... 140.

Now, if the typewriter key 146 is closed at the desired moment, the number set in the quotient group will be transferred in a known manner after the completion of the division to the typewriter.

We will now explain the matter hereinbefore described more fully with reference to a few numerical examples.

E
Addition

Let us assume that we want to add together the numbers 76 and 53.

A. *Operations*.—The following keys are pressed down at any desired speed in the following sequence (Figs. 6 to 9):

(I) 151, (II) $45_7$, (III) $45_6$, (IV) 571, (V) 151, (VI) $45_5$, (VII) $45_3$, (VIII) 571, (IX) 146.

B. *Circuits*

(Re I) 52—54—151—152—magnet winding 110—152—122—124—55—53 and 52—54—144—143—magnet winding 141—143—145—55—53.

The armature 110 first of all closes the following circuit: 52—54—153—157—152—magnet winding 110—152—122—124—55—53.

(Re II) 52—54—$45_7$—$56_7$—138—over the armature 110—107—magnet winding $a_{I,7}$—122—124—55—53.

The armature $a_{I,7}$ closes the following circuit: 52—54—153—154—172—160—159—magnet winding 158—159—over the armature 162—161—145—55, however, only after the key contact has been interrupted, since simultaneously with the key $45_7$, the switch 163 was closed, which closes the following circuit: 52—54—163—164—magnet winding 162—161—145—55—53.

In addition thereto, the key $45_7$ closes the following circuit: 52—54—$45_7$—$56_7$—magnet winding $3_7$—$23'$—55—53 which circuit actuates the type 7 of the typewriter, as has been described with reference to the typewriter. The armature 158 closes the following circuit: 52—54—153—155—over the magnet armature 158—magnet winding 121—155—123—124—55—53.

The armature 121 interrupts the conductor 157, whereby the winding 110 is de-energized and closes the following circuit: 52—54—175—188—155—winding 121—155—123—124—55—53. The winding 121 thus remains energized.

(Re III) 52—54—$45_6$—$56_6$—137—117—magnet winding $a_{II,6}$—123—124—55—53.

In the same manner as above referred to the winding $a_{II,6}$ in the group $a_{II}$ becomes energized.

It is to be pointed out that the windings $a_{I,7}$ and $a_{II,6}$ remain energized, since in the same manner as is indicated in the case of the magnet $a_{I,2}$, there pass over their armatures conductors similar to the conductor 156 that has been described in connection therewith, which conductors keep the winding energized until the conductor 124 is interrupted by the attraction of the armature 125.

(Re IV) (Fig. 18, Figs. 13 to 17.)
52—54—571—578—574—magnet winding 575—574—581—55—53.

The armature 575 closes the following circuits electrically connected in parallel:

(1) 52—54—589—590—607—over the armature 575—328$_{c,III}$ (Figs. 14 to 17. In this case the group and digit indices have been left out, since this figure holds good for several groups as has already been described)—over the armature $c_{III,e}$ (in Figs. 14 to 17, $f_e$) 378$_{c,III}$—399$_{c,III}$—magnet winding $n_{c,III,7}$ (in Figs. 14 to 17 $n_7$)—402—55—53. The armature $n_{c,III,7}$ closes the following circuits: (a) 52—54—403—389$_{c,III}$—magnet winding $c_{III,7}$ (in Figs. 14 to 17 $f_7$)—404—53 and (b) 52—54—403—412—399$_{c,III}$—magnet winding $n_{c,III,7}$—402—55—53 and interrupts the conductor 414, so that the winding $n_{cIIIe}$ (in Figs. 14 to 17) becomes de-energized.

It is to be pointed out in this case that the connections of the magnet winding of the group $c$ with the negative pole 53 of the source of current really take place over another path, as can be seen from Figs. 6 to 9 and Fig. 13; however, for the sake of simplicity, those which have been illustrated in Figs. 14 to 17 associated to the magnets of the group $f$ have been assumed to hold good for $c$, since the understanding of the operation is facilitated, if the interruption of the diagrams of connections required by the size of the separate sheets is not introduced also in the description, where entirely unimportant connections of conductors come into question. As a matter of fact it is immaterial whether the connection of the winding $c_{III,7}$ is effected with 53 over the conductors 404—55, or as indicated in Figs. 6 to 9 over the conductors 515—482—55. As a matter of fact, the connection shown in Figs. 6 to 9 holds good. Naturally, this also applies to all other magnet groups and their connections with 53, for which Figs. 6 to 9 come into question.

(2) (Closed through 575).
52—54—589—591—616—over the armature 575—327$_{c,IV}$ (Figs. 14 to 17)—over the armature $c_{IV,e}$ (in Figs. 14 to 17, $f_e$) 377$_{c,IV}$, 398$_{c,IV}$—magnet winding $n_{IV,6}$ (in Figs. 14 to 17, $n_6$) 402—55—53.

The armature $n_{c,IV,6}$ closes a circuit passing over its winding (over the conductor 411) and a circuit that passes over the winding $c_{IV,6}$ (in Figs. 14 to 17 $f, _6$). Thus we have "seven" already set in $c_{III}$ and "six" in $c_{IV}$.

However, the armature 575 (Fig. 18) closes simultaneously with the circuits described also the following two circuits:

(3) 52—54—589—583—585—magnet winding 586—585—55—53 and (4) 52—54—589—582—587—magnet winding 588—587—55—53.

The armature 586 closes the following circuit (Figs. 6 to 9) : 52—54—623—622—magnet winding 125—55—53. The armature 125 interrupts the conductor 124 and thus all the circuits which pass over the windings of the group $a$. In this way the number 76 that has been set is cancelled.

The circuit that passes over the winding 588 is unimportant as long as the typing key 146 is not closed.

(Re V, VI, VII) Repetition of the preceding operation, that is to say setting of the number 53 in the group $a$.

(Re VIII) The same as Re IV.

The armature 575 now closes the following circuits:

(Fig. 18) 52—54—589—590—605—over the armature 575—326$_{c,III}$—(Figs. 14 to 17) over the armature $c_{III,7}$ (in Figs. 14 to 17 $f,_7$) 373$_{c,III}$—magnet winding $h_2$—373$_{c,III}$—394$_{c,III}$—magnet winding $n_{c,III,2}$—(in Figs. 14 to 17 $n_2$)—402—55—53.

The armature $n_{c,III,2}$ now closes the two circuits that pass over its own winding and over the winding $c_{III,2}$, and interrupts, amongst others, the conductor 412 which kept the winding $n_{c,III,7}$ energized (Fig. 13). At the same time the armature $h_2$ closes five conductors and altogether four circuits:

(I) 52—54—436—the fifth conductor counted from the left to the right—433—442—winding 357—334—55—53. This circuit is entirely unimportant in the addition and is in no way disturbing.

(II) 52—54—436—the fourth conductor—434—magnet winding 445—434—322$_{c,II}$ (Figs. 14 to 17)—over the armature $c_{II,1}$ (in Figs. 14 to 17 $f,_1$)—372$_{c,II}$—393 winding $n_{c,II,1}$—402—55—53.

Thus this circuit sets "one" in $c_{II}$, that is to say it effects the transmission of the tens from $c_{III}$.

(III) (Fig. 13). 52—54—436—third conductor—435—magnet winding 426—423—334—55—53.

The armature 426 interrupts the connection between the magnet windings $h$ and the magnet windings $n_{c,III}$.

(IV) 52—54—436—first conductor—winding $h_2$—second conductor 437—55—53.

Thus the following armatures are attracted simultaneously 426 which interrupts the connections between the windings $h$ and the windings $n_{c,III}$, 445 and $n_{c,II,1}$.

The armature 445 closes the circuit: 52—54—451—magnet winding 446—55—53.

The armature 446 interrupts the conductor 436 and therewith all the circuits that pass over the armature $h_2$.

The second circuit passing through 575: (Fig. 18) 52—54—589—591—613—over the armature 575—324$_{c,IV}$, (Figs. 14 to 17)—over the armature $c_{IV}$,—(in Figs. 14 to 17 $f$, $_e$)—380$_{c,IV}$—401—magnet winding $n_{c,IV,9}$—402—55—53.

The armature $n_{c,IV,9}$ again closes in a known manner the two circuits that pass over its own winding and over the winding of the magnet $c_{IV,9}$ and interrupts, amongst others, the conductor 411 which maintains the winding $n_{c,IV,6}$ energized.

Of the magnets of the group $c$ the following magnets are thus energized: in $c_I$, the magnet $c_{I,e}$, in $c_{II}$ the magnet $c_{II,1}$, in $c_{III}$ the magnet $c_{III,2}$, in $c_{IV}$ the magnet $c_{IV,9}$.

Naturally the armature 575 closes again—as in the first instance—the circuits passing through the magnet windings 588 and 586.

The armature 586 releases again the number set in $a$. (Re IX) If now the key 146 is pressed down, the following circuits are closed:

1. (Figs. 6/9) 52—54—146—574—143—magnet winding 141—143—145—55—53.

2. 52—54—625—over the armature 588—480—magnet winding 479—480—481—482—55—53.

The armature 479 closes the following circuit:

52—54—471—over the attracted armature $c_{I,1}$—460, over the attracted armature 479—460—130—56$_1$—magnet winding 3$_1$—23—55—53—and thus initiates the writing of the number set in the group $c$ in the manner described sub Ag.

F

*Subtraction*

Let us assume that the two numbers 326 and 934 have to be subtracted from one another, and that the smaller one has been set first.

A. *Operations*

The following keys are pressed down in the following succession at any desired speed:
(I) 745 (Figs. 19, 20), (II) 151 (Figs. 6–9). (III) 45$_3$, (IV) 45$_2$, (V) 45$_6$, (VI) 571. (VII) 746 (Figs. 19, 20), (VIII) 131, (IX) 45$_9$. (X) 45$_3$, (XI) 45$_4$, (XII) 571, (XIII) 746, (XIV) 146.

B. *Circuits*

(Re I) (Figs. 19, 20) 52—54—745—791—magnet winding 792—791—55—53. The armature 792 closes the following circuit: 52—54—793—791—winding 792—791—55—53.

The armature 792 thus remains attracted also after the pressure on the key 745 has ceased.

(Re II to VI) Setting of the number 326 in the group $a$ and transmission to $c_{II}$, $c_{III}$ and $c_{IV}$, as has been described in the case of addition.

(Re VII) (Figs. 19, 20). 52—54—746—747—830—magnet winding 755—831—744—55—53.

The armature 755 closes the following circuits:—

(1) 52—54—743—740—over the armature $c_{II,3}$—716—over the armature 755—764—over the non-attracted armature 800—634$_{d,I}$ (Figs. 14 to 17)—over the armature $d_{I,e}$ (in Figs. 14 to 17 $f$, $_e$)—734$_{d,I}$—395$_{d,I}$, magnet winding $n_{d,I,3}$—402—55—53.

The armature $n_{d,I,3}$ again closes the two circuits that pass over its own winding and over the winding $d_{I,3}$, and interrupts 414$_{d,I}$ so that the winding $n_{d,I,e}$ and therewith the winding $d_{I,e}$ is de-energized, whilst the winding $d_{I,3}$ becomes energized.

(2) (Again Figs. 19, 20) 52—54—814—822—over the armature 755—818—815—magnet winding 816—815—55—53.

(3) 52—54—814—822—over the armature 755—832—834—magnet winding 835—834—831—744—55—53.

(4) 52—54—814—822—833—830—magnet winding 755—831—744—55—53.

(5) 52—54—814—822—836—magnet winding 837—836—831—744—55—53.

At the same time the following armatures are attracted: (1) $n_{d,I,3}$; (2) 816; (3) 835; (4) 837.

The armature 816 closes the following circuit: 52—54—814—823—winding 824—815—55—53.

The armature 835 closes the following circuit: 52—54—key 746—747—945—834—magnet winding 835—834—831—744—55—53—and interrupts the conductor 747. Thus the armature 835 remains closed after the armature 755 has been attracted as long as the pressure on the key 746 is maintained, but the action of the pressed down key on the winding 755 ceases at the moment at which the armature 755 is attracted. The pressure upon the key 746 (the key that carries out the operation of subtraction) may thus last as long as desired, without disturbing the operation of subtraction. The armature 837 closes the following circuit: 52—54—748—over the open armature 756—838—836—magnet winding 837—836—831—744—55—53.

The armature 824 interrupts, when attracted, the conductor 822 and therewith all the circuits passing over this conductor. Thus the following become de-energized one after the other: winding 755, by the release of this armature the winding 816 and finally 824. When the armature 824 is again in its position of rest, the following circuit is closed over the armature 837 (which remained attracted by the circuit passing over the conductor 838): 52—54—814—822—839—magnet winding 756—839—over the open armature 840—839—over the attracted armature 837—836—magnet winding 837—836—831—744—55—53.

The armature 756 closes the following circuits:

(1) 52—54—743—741—over the armature $c_{\text{III},2}$—727—over the armature 756—773—over the open armature 799—633$_{d,\text{II}}$ (Figs. 14 to 17)—over the armature $d_{\text{II},e}$—373$_{d,\text{II}}$—394$_{d,\text{II}}$—magnet winding $n_{d,\text{II},2}$—402—55—53.

(2) 52—54—814—822—817—815—magnet winding 816—815—55—53.

(3) 52—54—814—822—841—magnet winding 842—841—831—744—55—53.

Thus the armature $n_{d,\text{II},2}$, 816—and 842 are attracted simultaneously.

The armature $n_{d,\text{II},2}$ again closes the two circuits passing over its own winding and the winding $d_{\text{II},2}$ and interrupts the circuit passing over the winding $n_{d,\text{II},e}$.

The armature 816 similarly closes again the circuit passing over the winding 824 and the armature 842 the following circuit: 52—54—748—843—841—magnet winding 842—841—831—744—55—53.

When the armature 824 is attracted the winding 756 and 837 become de-energized and after the armature 824 has come again to its position of rest (after the release of the armatures 756 and 816 one after the other) the following circuit is closed: 52—54—814—822—844—magnet winding 757—844—over the open armature 840, 841,—winding 842—841—831—744—55—53.

The armature 757 closes the following circuits:

(1) 52—54—743—742—over the armature $c_{\text{IV},6}$ 733—over the armature 757—787—over the open armature 796—637$_{d,\text{III}}$ (Figs. 14 to 17) — over the armature $d_{\text{III},e}$ — 377$_{d,\text{III}}$ — 398$_{d,\text{III}}$—magnet winding $n_{d,\text{III},6}$—402—55—53.

(2) 52—54—814—822—946—815—magnet winding 816—815—55—53.

(3) 52—54—814—822—845—magnet winding 846—845—831—744—55—53.

The armature $n_{e,\text{III},6}$ again closes the two circuits passing over its own winding and over the winding of the magnet $d_{\text{III},6}$ and the armature 816 the circuit passing over the winding 824. The armature 846 closes the following circuit: 52—54—829—848—845—magnet winding 846—845—831—744—55—53.

After the armature 824 has again come into its position of rest, the following circuit is closed:—52—54—814—822—826—magnet winding 825—826—827—over the open armature 840, 847—845—magnet winding 846—845—831—744—55—53. The armature 825 closes the following circuit:—52—54—814—827—magnet winding 828—827—as before up to —53.

The armature 828 when attracted interrupts the armature 744 and therewith all the circuits passing over this conductor. The winding 825—828 and 846 become de-energized.

(Re VIII to XII) Setting of the number 934 in the group $a$ and transmission to $c$ as in the case of addition.

(Re XIII) The key 746 closes again the circuit passing over the armature 755. The armature 755 closes again five circuits:

(1) 52—54—743—740—over the armature $c_{\text{II},9}$—710—over the armature 755'—770—over the open armature 800—640$_{d,1}$ (Figs. 14 to 17)—over the armature $d_{1,3}$—375$_{d,1'}$ (Fig. 10)—794—850—over the closed armature 792—in three electrically parallel branches (a) over the conductor 862 and winding 796,
(b) over the conductor 861 and winding 799,
(c) over the conductor 860 and winding 800 to the conductor 812—831—744—55—53. The armature 800 closes the following circuit: 52—54—743—740—710—over the armature 755—770—over the attracted armature 800—650$_{d,1}$ (Figs. 14 to 17)—over the armature $d_{1,3}$—377$_{d,1}$—398$_{d,1}$—magnet winding $n_{d,1,6}$—402—55—53. The second, third, fourth and fifth circuits closed by the armature 755 are again the same circuits as those that came into question when the armature 755 was first attracted. It is to be mentioned here 800 and 816 are attracted simultaneously and similarly the armatures $n_{d,1,6}$ and 824. As the winding 755 after the attraction of the armature 824 must first become de-energized, the armature 755 remains closed a short period of time after the attraction of the armature 824, that is to say also after the attraction of $n_{d,1,6}$ so that the armature $n_{d,1,6}$ is attracted with certainty.

The armatures 800, 799, and 796 remain attracted after they have been attracted under the action of the following circuits: the armature 800; 52—54—748—923'—860—winding 800—812—831—744—55—53. The armature 799; 52—54—748—751—861—winding 799—812—831—744—55—53. The armature 796; 52—54—748—750—862—winding 796—812—831—744—55—53.

The armature 756 is attracted in exactly the same manner as in the first instance, as soon as the windings 824 and 840 become de-energized and closes the following circuit, 52—54—743—741—over the armature $c_{\text{III},3}$—726—over the armature 756—774 over the attracted armature 799—644 (Figs. 14 to 17)—over the armature $d_{\text{II},2}$ 372$_{d,\text{II}}$—393$_{d,\text{II}}$—$n_{d,\text{II},1}$—402—55—53.

The circuits closed by $n_{d,\text{II},1}$ and the further circuits closed by 746 are again the same ones as those already described, so that "one" is set in $d_{\text{II}}$ and finally the armature 757 is attracted, and closes the following circuit:—52—54—743—742—over the armature $c_{\text{IV}}$,—735—over the armature 757—785 over the attracted armature 796—645$_{d,\text{III}}$ (Fig. 14 to 17)—over the armature $d_{\text{III},6}$—379$_{d,\text{III}}$ (Fig. 27)—magnet winding $h_{d,\text{III},8}$—379$_{d,\text{III}}$ (Figs. 14 to 17)—400$_{d,\text{III}}$,—$n_{d,\text{III},8}$—402, 55—53.

The armature $h_{d,III,8}$ (Fig. 27) closes five conductors and therewith four circuits:

(1) 52—54—1285—the first conductor from the left-winding $h_{d,III,8}$—second conductor 1286—55—53.

(2) 52—54—1285—third conductor—1287—magnet winding 1288—1287—1286—55—53.

(3) 52—54—1285—fourth conductor—1281—winding 1282—1281—1292—over the armature $d_{II,1}$—371$_{d,II}$ (Figs. 14 to 17)—392—$d_{,II}$—$n_{d,II,0}$—402—55—53.

(4) 52—54—1285—fifth conductor—1280—winding 840—1280—55—53.

The armature 1282 closes the circuit: 52—54—1283—winding 1284—55—53. The armature 1284 interrupts the conductor 1285 and therewith all the circuits passing over the armature $h_{d,III,8}$. Thus we have now set in $d_I$ "six", in $d_{II}$ "zero", and in $d_{III}$ "eight", (that is to say the armatures corresponding to these numerical values are attracted).

The further circuits closed over 757 are the same as those hereinbefore referred to, so that finally the armature 828 is attracted, which interrupts the conductor 744 and there with all the circuits passing over the same.

(Re XIV) The circuits are closed in the manner described in sub "Cd" and the typing of the difference set in the group $d$ is initiated.

G

3. Multiplication

Let us assume that the two numbers 56 and 73 are to be multiplied with one another.

A. Operations

The following keys are pressed down at any desired speed and in the following succession (Figs. 6 to 9):

(I) 151, (II) 45$_5$, (III) 45$_6$, (IV) 150, (V) 45$_7$, (VI) 45$_3$, (VII) 303, (VIII) 146.

B. Circuits (Re I to III) Setting of the number 56 in a known manner in the group $a$.

(Re IV to VI) Setting of the number 73 in the group $b$.

(Re VII) The double key 303 closes the following circuits:

(1) (Figs. 6 to 9) 52—54—303—304—winding 306—298—55—53.

(2) (Figs. 11 and 12) 52—54—303—305—armature 308 winding 250—305—winding 307—333—334—55—53.

The armature 306 closes the following circuit: 52—54—314—304—winding 306—298—55—53—which maintains the armature 306 in an attracted position.

The armature 250 closes the following circuits: (1) 52—54—252—344—over the open armature 1313—344—305—winding 250—343—334—55.

The armature 250 thus remains attracted until the armature 1313 is attracted. However, the conductor 305, which effects the connection between the windings 250 and 307, is interrupted under the action of the circuit:

(2) 52—54—252—335—winding 336—335—333—334—55—53. The armature 336 interrupts the conductor 305.

The armature 307 closes the following circuits:

(1) 52—54—331—339—305—winding 307—333—334—55—53. Thus the armature 307 remains attracted in spite of the attraction of the armature 336 which interrupts the conductor 305. This, however, only until the armature 360 is attracted, which then interrupts the armature 331.

(2) 52—54—331—337—magnet winding 338—337—334—55—53.

(3) 52—54—331—340—332—winding 359—332—55—53.

(4) 52—54—331—340—332—1305—winding 357—1305—334—55—53.

The armature 359 closes the following circuit: 52—54—361—winding 360—361—55—53.

The armature 360 interrupts, when attracted, the conductor 331 and therewith all the circuits passing over it. The armatures 307 and 357 are released, likewise 359 and subsequently the armature 360. Only the armature 338 remains closed viz. over the following circuit 52—54—341—337—winding 338—337—334—55—53.

As long as the two armatures 250 and 307 are attracted, they close the following circuits:

(1) 52—54—252—over the armature $b_{I,7}$—234$_I$ (Fig. 10)—over the armature $a_{I,5}$—213$_I$ (Figs. 11 and 12)—over the armature 307—324$_I$ (Figs. 14 to 17)—over the armature $c_{I,e}$ 374—$_{c,I}$—395$_{c,I}$—winding $n_{c,I,3}$—402—55—53.

(2) 52—54—252—over the armature $b_{I,7}$—234$_{II}$ (Fig. 10)—over the armature $a_{II,6}$ (Fig. 10, illustrates the diagram of a digit value group $a$ and holds good, as has already been stated, for all the digit value groups, so that for the other group $a_{II}$ only the indices of the conductors are altered)—214$_{II}$ (Figs. 11 and 12)—over the armature 307—325$_{II}$ (Figs. 14 to 17)—over the armature $c_{II,e}$—375$_{c,II}$—396$_{c,II}$—winding $n_{c,I,4}$—402—55—53.

Each of the armatures $n_{c,I,3}$ and $n_{c,II,4}$ closes in a known manner two circuits over their own windings and the windings of the corresponding magnets $c_{I,3}$ and $c_{II,4}$ and interrupts the circuits passing over the windings $n_{c,II,e}$ and $n_{c,II,e}$ so that now "three" is set in $c_I$ and "four" in $c_{II}$ viz., the tens digits of the partial products 7×5 and 7×6.

At the moment at which the armature 357 has reached again its position of rest, the following circuit is closed (Figs. 11, 12): 52—54—331—winding 309—342—337—winding 338—337—334—55—53.

The armature 309 closes the following circuits:

(1) 52—54—331—346—332—winding 359—332—55—53.

(2) 52—54—331—346—332—1305—winding 357—334—55—53.

The armature 357 interrupts the circuit passing over the windings 309 and 338, but the winding 309 remains energized by the following circuits:

(3) 52—54—331—winding 309—342—1308—333—334—55—53.

(4) 52—54—331—347—winding 348—347—334—55—53.

The armature 359 closes again as previously the circuit leading over the winding 360 and armature 360 interrupts the conductor 331 and therewith the circuit passing in succession over the windings 309 and 348. The armature 348 however remains attracted under the action of the following circuit: 52—54—349—347—winding 348—334—55—53, and closes the following circuit:—52—54—252—1312—magnet winding 1313—1312—334—55—53.

The armature 1313 interrupts the conductor 344 and thereby de-energizes the winding 250.

Whilst the two armatures 250 and 309 were attracted (in the intervals of time following the attraction of the armature 309) the following two circuits were closed:—

(1) 52—54—252—over the armature $b_{I,7}$—233$_I$ (Fig. 10) over the armature $a_{I,5}$—206$_I$ (Figs. 11 and 12)—over the armature 309—326$_{II}$ (Figs. 14 to 17)—over the armature $c_{II,4}$, 380$_{c,II}$—401$_{c,II}$—winding $n_{c,II,9}$—402—55—53 and (2) 52—54—252—over the armature $b_{I,7}$—233$_{II}$ (Fig. 10)—over the armature $a_{II,6}$—203$_{II}$ (Figs. 11, 12)—over the armature 309, 323$_{II}$ (Figs. 14 to 17)—over the armature $c_{III,6}$—373$_{c,III}$—394$_{c,III}$—magnet winding $n_{c,III,2}$—402—55—53.

The two armatures $n_{c,II,9}$ and $n_{c,III,2}$ close the circuits over their own windings and over those of the magnets $c_{II,9}$ and $c_{III,2}$. Thus, we have now set in $c_I$ "three", in $c_{II}$ "nine" and in $c_{III}$ "two", that is to say, the product of 56×7.

After the armature 357 has reached again its position of rest, the following circuit is closed: 52—54—331—winding 310—350—winding 251—350—347—winding 348—334—55—53.

The armature 251 closes the following circuits:—

(1) 52—54—252—345—winding 251—350—(after the attraction of the armature 357)—1311—333—334—55—53.

(2) 52—54—252—345—1314—winding 1315—1314—1311—333—334—55—53.

The armature 251 thus remains attracted also after the attraction of the armature 1315 (which interrupts the conductor 350) and 357.

The armature 310 closes the following circuits:

(1) 52—54—331—351—332—winding 359—332—55—53.

(2) 52—54—331—352—winding 353—352—334—55—53.

(3) 52—54—331—351—332—1305—winding 357—1305—334—55—53.

(4) 52—54—331—winding 310—350—1309—333—334—55—53.

The armature 359 closes again the circuit over the winding 360 and the armature 310 remains attracted until the armautre 360 interrupts the conductor 331. During the time that the armatures 251 and 310 were closed, the following two circuits were closed:—

(1) 52—54—252—over the armature $b_{II,3}$ 226$_I$ (Fig. 10), over the armature $a_{I,5}$—211$_I$ (Figs. 11, 12)—over the armature 310, 322$_{II}$ (Figs. 14 to 17)—over the armature $c_{II,9}$—371$_{c,II}$ (Fig. 13)—magnet winding $h_0$—371$_{c,II}$ (Figs. 14 to 17)—392$_{c,II}$—magnet winding $n_{c,II,0}$—402—55—53.

The armature $n_{c,II,0}$ closes again the two circuits passing over its own winding and the winding $c_{II,0}$ and interrupts the circuit passing over $n_{c,II,9}$.

The armature $h_0$, closes four circuits:

(I) (Fig. 13) 52—54—431—the first conductor passing over the armature $h_0$—winding $h_0$—second conductor—432—55—53.

(II) 52—54—431—third conductor—430—winding 425—423—55—53.

(III) 52—54—431—fourth conductor—429—winding 444—429—322$_I$ (Figs. 14 to 17)—over the armature $c_{I,3}$, 375$_{c,I}$—396$_{c,I}$—$n_{c,I,4}$—402—55—53.

(IV) 52—54—431—fifth conductor—428—442—winding 357—423—55—53. (The part of this circuit from the winding 357 up to 53 is naturally identical with the conductors shown in Figs. 11 and 12: 1305—334—55—53.)

The armature $h_0$ thus remains closed also after the interruption of the connecting conductors between the windings $h$ and $n_{c,II}$, also after the attraction of the armature 425 by the circuit II. The circuit III effects in the position $c_I$ the addition of a unit, that is to say the setting of $c_{I,4}$ and the attraction of the armature 444.

The circuit IV keeps energized the winding 357 also after the attraction of the armature 360 (Figs. 11 and 12).

The armature 444 now closes the following circuit: 52—54—450—winding 448—55—53. The armature 448 interrupts the conductor 431 and therewith the circuits I, II, III and IV. Only the armature $n_{c,I,4}$ and therewith $c_{I,4}$ remains attracted. The transmission of the tens is thus effected.

(2) 52—54—252—over the armature $b_{II,3}$—226$_{II}$ (Fig. 10)—over the armature $a_{II,6}$—211$_{II}$ (Figs. 11, 12)—over the armature 310—322$_{III}$ (Figs. 14 to 17)—over the armature $c_{III,2}$—374$_{c,III}$—395$_{c,III}$—winding $n_{c,III,3}$—402—55—53.

The armature $n_{c,III,3}$ again closes the two known circuits over its own winding and the winding of the magnet $c_{III,3}$.

We have now set in the group $c$; "four" in $c_I$, "zero" in $c_{II}$ and "three" in $c_{III}$.

After the armature 357 is again in its position of rest, the following circuit is closed: 52—54—331—356—winding 311—356—352—winding 353—352—334—55—53.

The armature 311 closes the following circuits:

(1) 52—54—331—winding 311—356—1310—333—334—55—53.

(2) 52—54—331—358—332—winding 359—332—55—53.

(3) 52—54—331—358—332—1305—winding 357—1305—334—55—53.

The armature 359 closes again the circuit over the winding 360 and the armature 360 interrupts the conductor 331. As long as the two armatures 251 and 311 are attracted the following two circuits are closed:—

(1) 52—54—252—over the armature $b_{II,3}$—225$_I$ (Fig. 10)—over the armature $a_{I,5}$—206$_I$ (Figs. 11, 12)—over the armature 311—326$_{III}$ (Figs. 14, 17)—over the armature $c_{III,3}$ 379$_{c,III}$—400$_{c,III}$—winding $n_{c,III,8}$—402—55—53.

(2) 52—54—252—over the armature $b_{II,3}$—225$_{II}$ (Fig. 10)—over the armature $a_{II,6}$—209$_{II}$ (Figs. 11 and 12)—over the armature 311—329$_{IV}$ (Figs. 14–17)—over the armature $c_{IV,1}$—379$_{c,IV}$—400$_{c,IV}$—winding $n_{c,IV,8}$—402—55—53.

Each of the armatures $n_{c,III,8}$ and $n_{c,IV,8}$ closes two circuits over their own windings and the windings $c_{III,8}$ and $c_{IV,8}$, so that finally the following is set in the group $c$: in $c_I$ "four", in $c_{II}$ "zero", in $c_{III}$ "eight" and in $c_{IV}$ also "eight", that is to say the number 4088; this is the product 56×73.

The following circuit was also closed over the armature 311 (Figs. 6 to 9) : 52—54—316—winding 317—298—55—53.

The armature 317 closes the following circuit: 52—54—480—winding 479—480—481—482—55—53.

(Re VIII) The key 146 closes the following circuit: 52—54—146—574—143—winding 141—143—145—55—53.

The armature 141 and the armature 479 close the following circuit: 52—54—471—over the attracted armature $c_{I,4}$—465—135—56$_4$—3$_4$—23—55—53, and in this way initiate in a known manner the typing of the number set in $c$.

H

4. Division

Let us assume that the following division 876 : 45 has to be carried out.

A. Operations

The following keys are pressed down at any desired speed in the following succession:

(Figs. 6 to 9) (I) 149 (II) 45$_8$, (III) 45$_7$, (IV) 45$_6$, (V) 148, (VI) 45$_4$, (VII) 45$_5$, (VIII) 570, (IX) 146.

B. Circuits (Re I to IV) Setting of the number 876 in the divided group $d$. In addition thereto Re II:

After the armature $n_{d,I,8}$ has been attracted, the following circuit is closed (Figs. 19 to 20) 52—54—748—751—907—909—(Figs. 23, 24) 909—magnet winding 1183—1186—55—53.

(Re V to VII) Setting of the number 45 in the group $a$ and of the numeral 4 in the group $e$.

(Re VIII) (Figs. 23, 24) The double key 570 closes the following two circuits:

1. 52—54—570—1179—magnet winding 923—1179—294—55—53.

2. 52—54—570—1271—magnet winding 1272—1271—55—53.

The armature 1272 closes the following circuit:—52—54—1273—magnet winding 1272—1271—55—53.

The armature 1272 thus remains attracted until the operation is completed.

The armature 923 closes the following circuits: (1) 52—54—1178—1179—magnet winding 923—1179—294—55—53. The armature 923 thus likewise remains attracted until the armature 295 is attracted, or until the operation is completed.

(2) 52—54—1180—1181—magnet winding 1182—1181—909—magnet winding 1183—909—1186—55—53.

The armature 923 closes the following circuit: (Figs. 19, 20) 52—54—748—751—878—over the armature $n_{d,I,8}$—878—(Figs. 23–24) : over the armature 1183—958—(Figs. 21, 22) : over the armature $e_4$—973—(Figs. 23, 24) : over the armature 1182—1193—magnet winding $b_{I,2}$—300—294—55—53.

We now have set in group $b_I$ "two" as the first digit of the quotient.

The armature $b_{I,2}$ closes the following circuit: 52—54—1173—1171—1072—magnet winding 1082—1169—294—55—53.

The armature $b_{I,2}$ closes in the same manner as the armature of the groups $n$ in the case of the magnet groups $c$ and $d$ (it may be referred to as $n_{b,I,2}$) the circuit passing over its own winding and the armature 1082, the following circuit: 52—54—1173—1250—over the armature 1082—1174—magnet winding 1175—1174—1169—294—55—53.

The armature 1175 remains attracted so long as a figure is set in $b_I$.

In addition thereto the armature 1082 closes the third circuit passing over the armature 923:

(3) 52—54—1173—1250—over the armature 1082—1176—over the armature 923,—1176—magnet winding 1177—1176—55—53.

The armature 1177 interrupts the conductor 1180 and therewith the circuit described under (2) and passing over 1182. The armature 1182 is thus released after the first digit of the quotient has been set.

The armature 1177 remains attracted as long as a figure is set in $b_\mathrm{I}$ and closes the fourth circuit that passes over the armature 923.

(4) 52 — 54 — 1212 — over the armature 923—1212—over the armature 1177—over the open armature 1214—1212—magnet winding 250—magnet winding 307—1212—1216—55—53.

When the armatures 250 and 307 have been attracted the multiplication of the divisor 45 set in the group $a$ with the first quotient digit 2 set in the group $b_\mathrm{I}$ is initiated, and the operation of multiplication is effected in a manner already described with reference to Figs. 10 to 17, that is to say "nine" is set in the group $c_\mathrm{II}$ and "zero" in the group $c_\mathrm{III}$, as if the multiplication had been initiated from the keyboard. Naturally (since the key 303 (Figs. 6 to 9) has not been depressed), the circuit passing over the magnet winding 306 is not closed and therefore the typing of the product set in $c$ is not initiated. On the other hand the following has to be borne in mind:

As soon as the armature 307 is attracted, it closes the fifth circuit passing over the armature 923:

(5) 52—54—1187—1213—over the armature 307—1213—over the armature 923—1213—magnet winding 1214—1213—1216—55—53.

The armature 1214 interrupts the conductor 1212 and therewith the circuit passing over 250 and 307, and thus renders the co-operation of the magnets 250—251—307—309—310—311 independent of the connections for the division and remains attracted by the following circuit: 52—54—1187—1215—1213—magnet winding 1214—1213—1216—55—53. Thus, it remains attracted until the conductor 1216 is interrupted.

The multiplication of the divisor 45 with the first quotient digit 2 is terminated as soon as the armature 310 is attracted. This armature thus closes the following circuit:

(6) 52—54—1187—1217—over the armature 310—1217—over the open armature 1219—1217—over the armature 923—1217—magnet winding 755—1216—55—53.

The armature 755 closes the following circuits (Figs. 19, 20):

(I) 52—54—814—822—818—815—winding 816—815—55—53.

(II) 52—54—814—822—818—815—1307—winding 840—1307—831—744—55—53.

(III) 52 — 54 — 814 — 822 — 832 — 834 — winding 835—834—831—744—55—53.

(IV) 52—54—814—822—833—830—winding 755—831—744—55—53 (according to Figs. 23, 24), or winding 755—1217—1216—55—53, which is exactly the same, since it is only a question of connecting the winding 755 with the negative pole of the source of current, which connection is naturally established only once and not twice, and only for the sake of clearness has been referred to differently in the figures.

(V) 52—54—743—740—over the armature $c_\mathrm{II,9}$—710—over the armature 755—770—over the open armature 800—640$_\mathrm{d,I}$ (Figs. 14 to 17)—over the armature $d_\mathrm{I,8}$—380$_\mathrm{d,I'}$ (Figs. 19, 20)—794—921—over the armature 923 (Figs. 23, 24)—921—magnet winding 922—921—1244—over the open armature 1243—over the attracted armature 1175—1344—over the armature 1082—1131—1192—winding $b_\mathrm{I,1}$—300—294—55—53.

The armature $b_\mathrm{I,1}$ closes the following circuit: 52—54—1173 — 1171 — 1071—winding 1081—1169—294—55—53.

The armature $b_\mathrm{I,1}$ closes in addition thereto, the circuit passing over its own winding (like the magnets in the group $n$ in the case of the magnet groups $c$ and $d$) and interrupts the circuit passing over the winding $b_\mathrm{I,2}$.

Simultaneously with the armature 1081, the armature 920 was attracted by the following circuit: 52—54—924—over the armature 922—winding 920—924—55—53.

The armature 920 interruts the conductors 1216, 1237, and (Figs. 19, 20), the conductor 744. The interruption of the conductor 1216 was accompanied by the interruption of the circuit passing over the winding 1214 and that of the conductor 744 by that of all the circuits passing over the same and over the conductor 831, that is to say also the circuits passing over the magnet windings $c_\mathrm{II,9}$ and $c_\mathrm{III,0}$, as well as all the circuits passing over the windings 837, 842, 846.

That is to say, as the products of the first digit of the quotient and the divisor was greater than the dividend, this product was cancelled in $c$ and the first digit set in the quotient had a value reduced by one, viz. "one" instead of "two".

Naturally the release of the armature $c_\mathrm{II,9}$ and $c_\mathrm{III,0}$ was accompanied by the de-energization of the circuit passing over the conductor 921 and the armatures 922 and 920 were returned to their position of rest.

After the armature 1214 has reached its position of rest, the fourth circuit passing over the armature 923 (now over the armature 1081) was closed, and the multiplication of the first digit of the quotient with the diviser is again started.

After the product of 1 with 45, that is to say 45, has been set in the groups $c_\mathrm{II}$ and $c_\mathrm{III}$ and the sixth circuit passing over the armature 923 has been closed by the armature 310, the armature 755 closes (Figs. 19, 20) the circuits described under I to IV, and in addition thereto the following circuits: 52—54—743—740—over the armature $c_{II,4}$ 715—over the armature 755—765—over the open armature 800—635$_{d,I}$ (Figs. 14 to 17)—over the armature $d_{,I,8}$—375$_{d,I}$—396$_{d,I}$ magnet winding $n_{d,I,4}$—402—55—53.

The armature $n_{d,I,4}$ closes the two circuits passing over its own winding and the winding $d_{I,4}$, and interrupts the circuit passing over $n_{I,8}$.

The co-operation of the magnets 755, 756, 757, 837, 842, 846, 816, 824 (all in Figs. 19, 20) is the same as in the case of subtraction, that is to say, the figure "five" set in $c_{III}$ is subtracted from the figure "seven" set in $d_{II}$, so that the remainder set in the group $d$ is 426.

The criterion that the subtraction has been completed is that the armature 825 is attracted.

The armature 825 closes the following circuits: (Figs. 19 to 20) 52—54—814—827—magnet winding 828—827—over the armature 846—845—winding 846—845—831—744—55—53, and (Figs. 23 to 24) 52—54—1220—winding 1221—1220—1237—55—53.

The armature 1221 closes the following circuits 52—54—1187—1223—1220—winding 1221—1220—1237—55—53. The armature 1221 thus remains attracted, also after the armature 828 interrupts the conductor 744, that is to say, also after the armature 825 has come to its position of rest. Further the armature 1221 closes the following circuit: 52—54—1224—over the armature 1221—over the armature 1177—over the open armature 1219—1224—over the open armature 1062—1225—over the still closed armature 1183—1231—1210—magnet winding $b_{II,9}$—301—294—55—53.

Thus we now have set as second quotient digit "nine".

The armature $b_{II,9}$ closes the two circuits that pass over its own winding and over the winding 1109.

The armature 1109 closes the following circuits: 52—54—1173—1251—over the armature 1109—1149—1242—magnet winding 1243—300—294—55—53, and the seventh circuit passing over the armature 923:

(7) 52—54—1173—1251—1159—1218—over the armature 923—1218—magnet winding 1219—1218—1260—55—53.

The armature 1219 interrupts the conductors 1217 and 1224 and therewith the circuit passing over the armature 1221, which effects the setting of the second quotient digit, and closes the following two circuits:—

(1) 53—55—1216—1239—over the armature 1219—1239—55—53, that is to say, if in the course of the division the armature 920 is again attracted (if a correction of the quotient is to be effected), the circuits passing over the conductor 1237 are now interrupted, since the circuits passing over the conductor 1216 over this new path are connected with the negative pole 53 of the source of current. Any correction that may be effected no longer applies to the first digit but only to the second digit of the quotient.

(2) 52—54—1187—1240 over the armature 1219—1240—over the open armature 1236—magnet winding 310—magnet winding 251—1237—55—53. Thus the multiplication of the divisor with the second digit of the quotient has now been initiated and the product of 45 with 9, that is to say 405 is set in a known manner in the group $c$. In connection therewith it is to be pointed out:

The armature 310 closes in addition to the known circuits, the following circuits: 52—54—1187—1217—over the armature 1219 which is now attracted—1235—magnet winding 1236—1235—1237—55—53. The armature 1236 interrupts the conductor 1240 and therewith the circuit passing over the windings 310 and 251 so that the co-operation of the magnets effecting the multiplication is not disturbed by the connections for the division.

The armature 311 closes in addition to the known circuits of the multiplication, the following circuits: 52—54—1187—1241—over the armature 311—over the armature 1219—1241—1217—winding 755—1216—55—53.

In this way the subtraction of the number 405 set in the group $c$ from the remainder 426 set in the group $d$ is initiated, and the former set of operations is repeated, until the armature 825 closes the following circuit: 52—54—1274—over the armature 1272—1274—over the armature 825—1274—over the armature 1219—1274—magnet winding 1275—1260—55—53.

The armature 1275 (Figs. 6 to 9) effects the connection between the ten conductors which pass in a known manner over the armature of the group $b_I$ and the bus-conductors 131, 132, 133 . . . 140, that is to say, in our case, between the conductor leading over the armature $b_{I,1}$ and the conductor 132.

Re IX) The pressing down of the key 146 initiates the writing down of the quotient set in the group $b$ (in this case 19).

It has been shown in the case of addition how a number that has been set in a group of magnets is transferred to another group of magnets viz. by actuating a single magnet armature. This transference may be connected with any desired displacement of digits.

In the case of division it has been shown, how by the operation of a key (the key 570 which energized the magnet 923) a succession of calculating operations (addition, multiplication, subtraction) can automatically be effected.

It will now be seen that in this way a series of further calculations may be effected automatically by the machine, more particularly the numerical calculation of all rational algebraic functions, by the actuation of an operating key.

If we wish to calculate, for instance, $x^n$ for a definite $x$ and a definite $n$, it would be necessary (as will be shown later on in connection with another function) first of all to set the number $x$ in a magnet group, from which after the operation of the operating key corresponding to the function $x^n$, it is transferred to the groups $a$ and $b$ (naturally we must have as many operating keys as the desired number of powers it is desired to obtain with the machine); after the completion of the transmission a circuit will have to be closed over the magnets 307 and 250, which initiates the multiplication; after the completion of the multiplication a circuit will have to be closed over the winding 295 (Figs. 6 to 9 and Figs. 23, 24), the armature of which interrupts the circuits passing over the windings of the group $b$, so that the multiplier is cancelled; thereupon the product $x^2$ set in $c$ would have to be transferred to $b$ and cancelled in $c$ (for instance, by the operation of the magnet 920), (Figs. 19, 20), and thereupon the circuit will have to be closed over the winding 307 and 250, which initiates the multiplication of the $x^2$ set in $b$ with the $x$ set in $a$. This operation can be repeated as many times as desired.

It is, however, also possible numerically to calculate non-algebraical (transcendental) functions viz., in exactly the same manner by the operation of a single operating key, when these transcendental functions can be resolved into series of converging powers. We will show this by way of an example.

*J*

Let us assume that it is desired to calculate the function $\sin x$ for a definite $$x < \frac{\pi}{4},$$

and let us assume that the machine has to operate in such a manner that $x$ (in arc measure) is set in the machine from the keyboard and that only a single operating key shall be pressed down; the result shall then be automatically typewritten.

The Taylor series for $\sin x$ gives:

$$\sin x = x - \frac{x^3}{1.2.3} + \frac{x^5}{1.2.3.4.5} \cdots$$

that is to say, $$\sin x = x - \frac{x^3}{6} + \frac{x^5}{120}$$

If the series is broken at the third member, the result that is obtained for $$x < \frac{\pi}{4}$$

is exact up to four decimals, that is to say, an accuracy which is sufficient for practical purposes.

Figure 25:
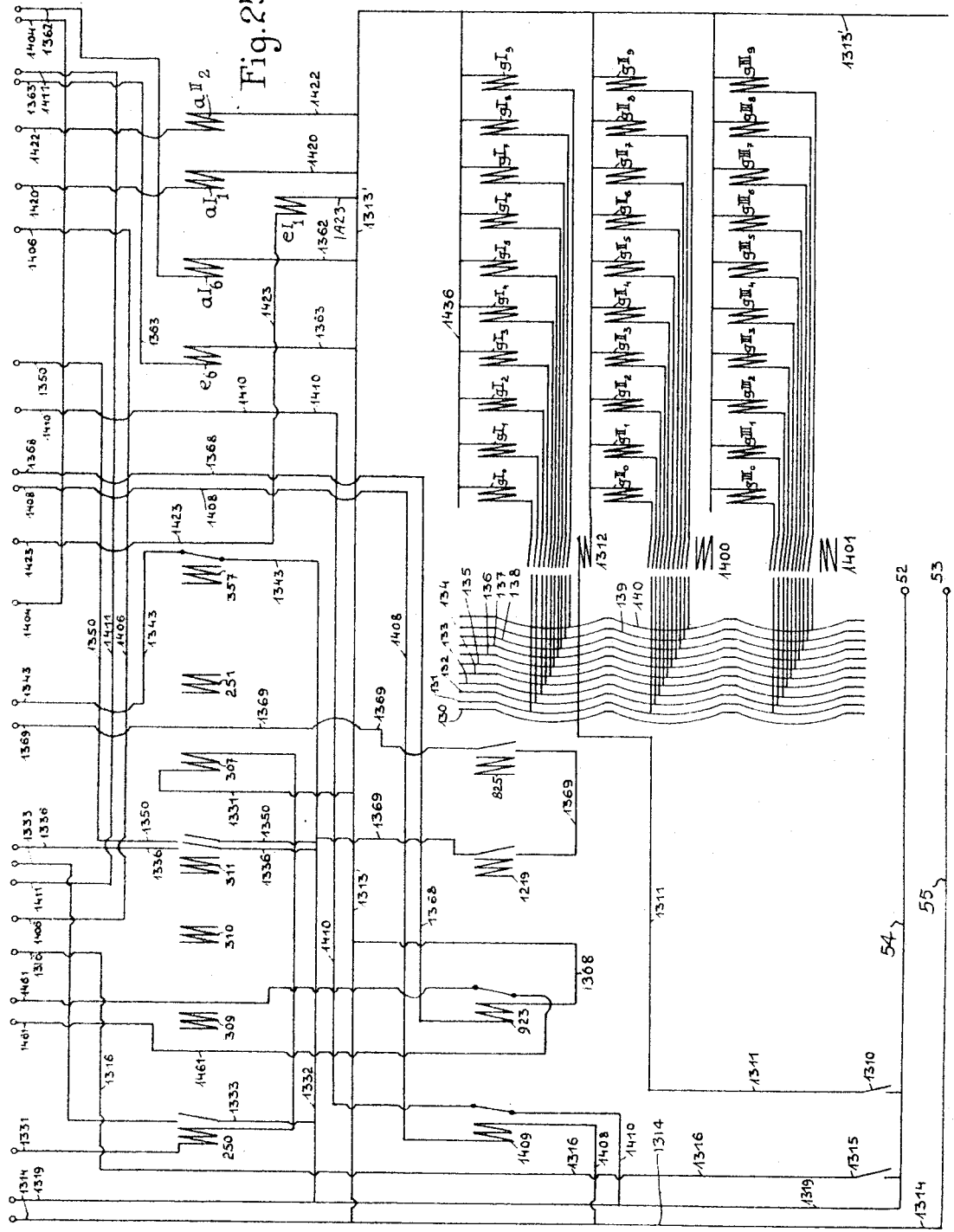
Figs. 25 and 26 show the connections of the auxiliary magnets required for calculating the sine function.
Figure 26:
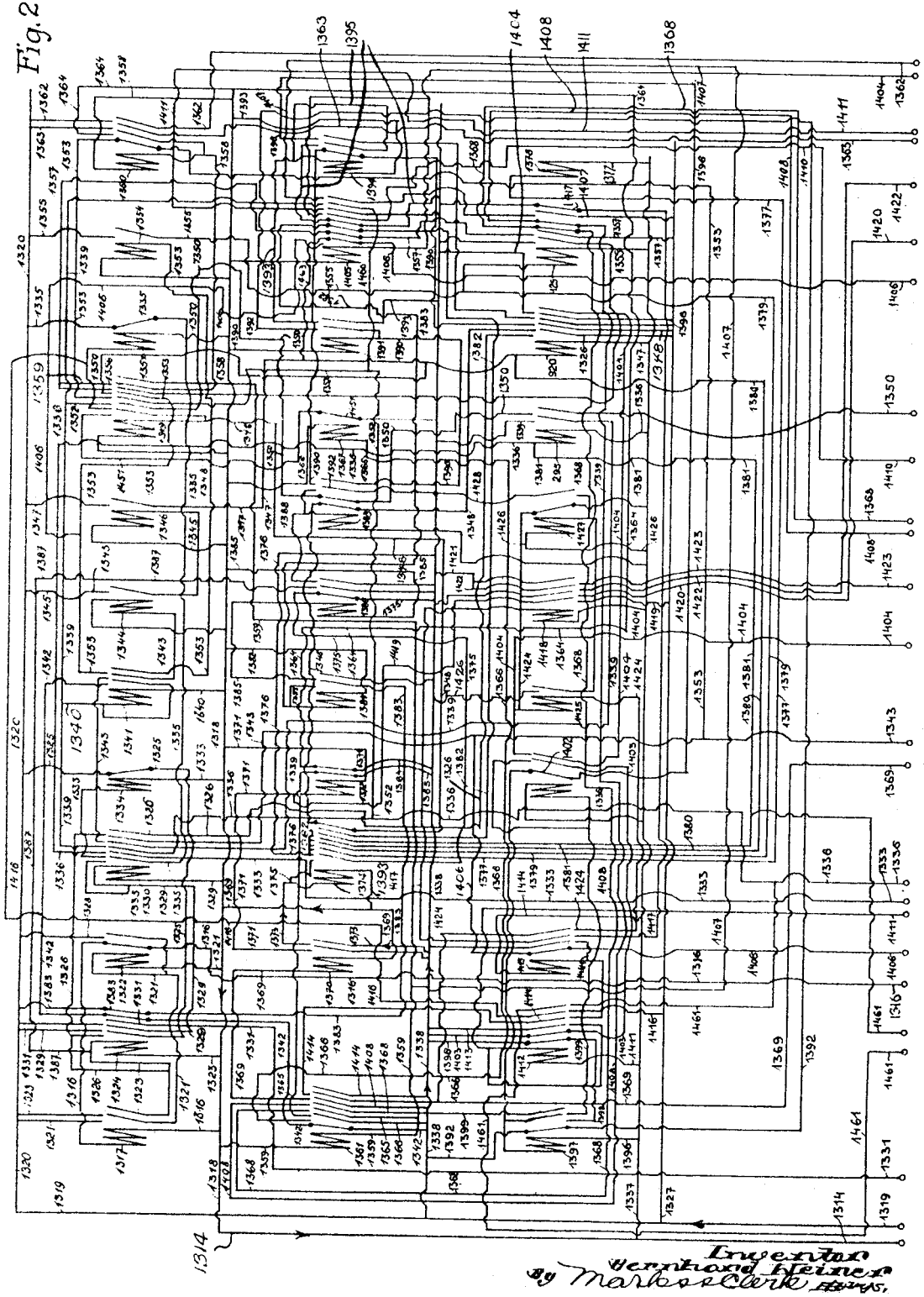

The diagram of connections required for this function is illustrated in Figs. 25, 26.

The setting key 1310 closes the following circuit:
52—54—1310—1311—winding 1312—1435—1313'—1314—55—53.

Over the armature 1312 there pass in a known manner connecting conductors between the bus-conductors 131, 132 . . . 140 and the windings of the group $g_I$.

Similarly the armature 1400 connects these bus-conductors with the windings of the group $g_{II}$, and the armature 1401 with those of the group $g_{III}$, and so on. The setting of a number from the keyboard in the group $g$ takes place in exactly the same manner as it has been described with reference to the group $a$ and also the second connections are the same.

I will now point out the following: The assumption for the carrying out of the operation was that the angle, the sine of which has to be calculated is smaller than or at the most equal to $\frac{\pi}{4}$. In arc measures, this angle is smaller than 1, so that the first digit of the number to be set is in any case "zero".

The operating key 1315 closes the following circuit:
52—54—1315—1316—over the open armature 1322—1316—magnet winding 1317—1316—1318—1314—55—53.

(1) The armature 1317 closes the following circuits: 52—54—1319—1320—1321—winding 1322—1321—1318—1314—55—53—and 52—54—1319—1320—1323—winding 1324—1323—1318—1314—55—53.

In addition thereto, the armature 1317 connects, in exactly the same manner as is the case with the armature 575 (Fig. 9), in the course of the addition, as regards the conductors passing over the armature of the group $a$ and the magnet windings of the group $c$, the conductors which pass over the armatures of the group $g$ on the one hand and the windings of the magnet group $a$, $b$ and $f$ on the other hand. That is to say, the number which is now set in the group $g$ has been transferred to the group of multiplicands the group of multipliers and a group $f$ which shall be referred to as the sum group.

The connections of a digit value group of this group $f$ are illustrated in Figs. 14–17. Its various parts have been described with reference to the discussion of the addition and the subtraction.

In this group $f$ a number can be set additively and subtractively, according as to whether the connection is effected with the conductors 321, 322 . . . 330 or with the conductors 631, 632 . . . 640.

The connection just described has not been shown in the diagram of connections (Figs. 25, 26), as the diagram would not show anything new and would take so much space that the new part could not possibly be illustrated in Figs. 25, 26.

The armature 1322 closes the following circuit:

52—54—1319—1320—1328—1321—winding 1322—1321—1318—1314—55—53, and interrupts the conductor 1316 and therewith the circuit passing over the armature 1317. The armature 1322 thus remains attracted until the calculation is completed, and the duration of the key operation has no effect upon the carrying out of the calculation.

(2) The armature 1324 closes the following circuits:

(I) 52—54—1319—1320—1325—over the open armature 1334—1325—1326—1323—winding 1324—1323—1318—1314—55—53. The armature 1324 thus remains attracted until the armature 1334 is attracted.

(II) 52—54—1319—1320—1329—winding 1330—1329—1318—1314—55—53.

(III) 52—54—1319—1320—1331—winding 250—winding 307—1331—1313—1314—55—53.

Now the multiplication of the number set in the group $a$ with that set in the group $b$ (let us refer to it as $x$) has been initiated.

(3) The armature 1330 closes the following circuit:

(I) 52—54—1319—1320—1335—over the open armature 1351—1335—over the attracted armature 1330—1335—1329—winding 1330—1329—1318—1314—55—53.

The armature 1330 thus remains attracted until the armature 1351 is attracted. The armature 250 thus closes in addition to the circuits that have been described in the case of multiplication, the following circuits:

(II) 52—54—1319—1332—1333—over the attracted armature 1330—1333—winding 1334—1333—1318—1314—55—53.

The armature 1334 interrupts, when attracted, the conductor 1325 and therewith the circuit leading over the winding 1324.

The multiplication follows the course previously described, that is to say, the armatures 307, 309, 310 and 311 are attracted in succession (in the case of numbers with a plurality of digits two armatures for each further digit). In this diagram of connections, the armature 311 has been indicated as the last one in agreement with the other figures. It closes in addition to the circuit that has been described in the case of multiplication the following circuits:

(4) 52—54—1319—1332—1336—over the attracted armature 311—1336—over the attracted armature 1330—1336—winding 295—1336—1337—1314—55—53.

The armature 295 interrupts, as will be seen from Figs. 6 to 9, all the circuits passing over the winding of the group $b$ and closes the following circuit:

(5) 52—54—1319—1338—1339—over the attracted armature 295—1339—over the attracted armature 1330—1339—1340—winding 1341—1340—1318—1314—55—53.

The armature 1341 remains closed by the following circuit:

52—54—1319—1338—1342—over the open armature 1361—1342—over the open armature 1324—1342—over the attracted armature 1341—1342—1340—winding 1341—1340—1318—1314—55—53.

The multiplication of $x.x$ is completed when the armature 357 is again in its position of rest; the number $x$ set in the group $b$ is cancelled when the armature 295 is attracted; correspondingly the armature 1341 closes the following circuit, however, only after the armature 357 has come again into its position of rest:

(6) 52—54—1319—1332—1343—over the open armature 357—1343—over the attracted armature 1330—1343—winding 1344—1343—1318—1314—55—53.

The armature 1344 effects the connection (not shown) between the product group $c$ on the one hand and the multiplicator group $b$ on the other hand, thus transmitting the number $x^2$ set in the product group to the multiplicator group $b$.

The following is to be pointed out in connection therewith. As, hitherto, two numbers were multiplied with one another, both of which were smaller than 1, the zero corresponding to the integer part is set in $c_{II}$, or in general in the case of numbers having a plurality of digits, in the second highest active digit value group of $c$, if by active digit value groups we understand such groups, in which the part products of multiplicand and multiplier are set directly, in contradistinction to the digit value groups required only for the tens transmission, in the case of numbers having a plurality of digits (within practical limits for which a calculating machine is constructed, two such groups at the most). The transmission from $c$ to $b$ thus takes place in such a manner that the conductors passing over the armatures of the second highest active digit value group of the group $c$ (in our case $c_{II}$) are connected with the conductors leading to the windings of the group $b_I$, and so on (that is to say $c_{III}$ with $b_{II}$, $c_{IV}$ with $b_{III}$ and so on).

The armature 1344 now closes the following circuit, in addition to the circuit just mentioned;

(7) 52—54—1319—1320—1345—winding 1346—1345—1318—1314—55—53.

Thus this armature is closed simultaneously with the armatures of the group $b$ which correspond to the numerals of $x^2$.

The armature 1346 closes the following circuit: 52—54—1319—1320—1347—over the attracted armature 1346—1347—winding 920—1337—1314—55—53.

The armature 920 interrupts, as has repeatedly been pointed out, and as follows from Figs. 6 to 9, all the circuits that pass over the windings of the group $c$, thus cancelling the product $x^2$ set in $c$ and closes the following two circuits:

(8) (I) 52—54—1319—1327—1326 over the attracted armature 920—1326—over the attracted armature 1330—1326—1323—winding 1324—1323—1318—1314—55—53.

(II) 52—54—1319—1327—1348—over the attracted armature 920—1348—over the open armature 1389—1348—over the open armature 1374—1348—winding 1349—1348—1318—1314—55—53.

The armature 1349 remains closed by the following circuit: 52—54—1319—1338—1451—over the open armature 1367—1451—over the attracted armature 1349—1348—winding 1349—1348—1318—1314—55—53.

The armature 1324 closes the circuits described under (2) and the set of operations is repeated up to (4), that is to say until the multiplication of $x^2$ with $x$ has been carried out and $x^3$ has been set in the group $c$ instead of the circuit described under (5); however, the following circuits are closed owing to the attracted armature 1349:

(9) (I) 52—54—1319—1332—1336—over the attracted armature 311—1336—1352—over the attracted armature 1349—1352—1339—1340—winding 1341—1318—1314—55—53. (II) 52—54—1319—1332—1350—over the attracted armature 311—1350—over the attracted armature 295—over the open armature 1389—1350—over the attracted armature 1349—1350—winding 1351—1350—1318—1314—55—53.

The armature 1351 interrupts, when attracted, the conductor 1335, so that the circuit passing over the winding 1330 is interrupted and together with the interruption of the armature 1330, also all the circuits which happen to pass over it.

Consequently the armature 1341 no longer closes the circuit described under (6) but the following circuit as soon as the armature 357 is again in its position of rest that is to say, until the multiplication $x^2 \cdot x$ has indeed been completed.

(10) 52—54—1319—1332—1343—over the open armature 357—1343—1353—over the open armature 1360—1353—over the attracted armature 1349—1353—over the attracted armature 1341—1353—winding 1354—1353—1318—1314—55—53.

The armature 1354 establishes again the connection (not shown, but in a known manner) between the dividend group $d$ and the product group $c$, that is to say, the product $x^3$ set in the group $c$ is transferred to the dividend group $d$, namely beginning again from the second active digit value group $c_{II}$.

In addition thereto the armature 1354 closes the following circuit:

(11) 52—54—1319—1320—1355—over the attracted armature 1354—1355—winding 125—1355—1337—1314—55—53.

The armature 125 interrupts all the circuits passing over the winding of the group $a$, thus cancelling the multiplicand $x$ and closes the following circuits:

(12) (I) 52—54—1319—1338—1356—over the attracted armature 125—1356, over the attracted armature 1349—1356—1347 winding 920—1347—1337—1314—55—53.

(II) 52—54—1319—1327—1357—over the attracted armature 125—1357—1358—over the attracted armature 1349—1358—winding 1360—1358—1318—1314—55—53.

(III) 52—54—1319—1327—1357—over the attracted armature 125—1357—1359—over the attracted armature 1349—1359—winding 1361—1359—1318—1314—55—53.

(Re I) The armature 920 cancels the product $x^3$ set in the product group $c$ and closes this time only the circuit described under (8) (II), which is, however, entirely immaterial, since the armature 1349 is attracted in any case.

(Re II) The armature 1360 remains closed by the following circuit: 52—54—1319—1338—1364—over the open armature 1372—1364—over the attracted armature 1360—1358—winding 1360—1358—1318—1314—55—53—and interrupts the conductor 1353, so that the circuit described under (10) is interrupted and the winding 1354 is de-energized, and subsequently by the release of the armature 1354 also the windings 125 and then the winding 920 becomes de-energized.

As soon as the armature 125 has come again to its position of rest (that is to say a number can again be set in the group $a$) the armature 1360 closes the following two circuits:

(A) 52—54—1319—1320—1363—over the attracted armature 1360—1363—winding $e_6$ 1363—1313—1314—55—53.

(B) 52—54—1319—1320—1362—over the armature 1360—1362—winding $a_{I,6}$ 1313—1314—55—53.

Properly, according to Figs. 6 to 9, this circuit does not lead over 1313'—1314 ... but over 106—122—124—55—53; this however, is without importance for the whole of connections, because the question here is only the connection with the negative pole of the source of current, which has been shown in Figs. 25 and 26 over the conductor 1313.

Naturally the exact connection from $e_6$ to the negative pole of the source of current is the circuit, which is illustrated in Figs. 6 to 9 and passes over the conductor 294. We now have set in the group $a_1$ (divisor group) and in the quotient selector "six".

(Re 12) (III) The armature 1361 remains closed through the following circuit: 52—

54—1319—1338—1365—over the open armature 1372—1365—1359—winding 1361—1359—1318—1314—55—53—and interrupts the conductor 1342 so that the winding 1341 becomes de-energized and closes the following circuits:

(13) (I) 52—54—1319—1338—1366—over the attracted armature 1361—1366—winding 1367—1366—1318—1314—55—53. The armature 1367 interrupts, when attracted, the conductor 1451 so that the circuit that passes over the winding 1349 is interrupted (see (8) (II) and the following). The armature 1349 is thus now released.

(II) 52—54—1319—1338—1368—over the attracted armature 1361—1368—over the open armature 125—1368—winding 923—1368—1313'—1314—55—53. (As a matter of fact again according to Figs. 23 and 24): winding 923—1179—294—55—53.

When the armature 923 is attracted, the division of the dividend $x^3$ by six is initiated in the group $d$, which division takes its normal course, since all the multiplications that are necessary during the division have no effect on this part of the connections because none of the two armatures 1330 and 1349 is now attracted.

When the division is completed and the two armatures 1219 and 825 are attracted, the following circuit is closed:

(14) 52—54—1319—1332—1369—over the attracted armature 1219—1369—over the attracted armature 825—1369—over the attracted armature 1361—1369—winding 1370—1369—1318—1314—55—53.

The armature 1370 effects the connection between the conductors passing over the armatures of the magnet group $b$ and the conductors 631, 632 . . . 640 of the group $f$, thus transferring the quotient $$\frac{x^3}{6}$$

set in $b$ subtractively to $f$. In addition thereto it closes the following circuits:

(15) (I) 52—54—1319—1338—1371—over the attracted armature 1370—1371—winding 1372—1318—1314—55—53.

(II) 52—54—1319—1338—1373—over the attracted armature 1370—1373—winding 1374—1373—1369—1318—1314—55—53.

(Re I) The armature 1372 interrupts the conductors 1364 and 1365 and therewith the circuits passing over the windings 1360 and 1361.

(Re II) The armature 1374 remains attracted under the action of the following circuit: 52—54—1319—1338—1375—over the open armature 1386—1375—over the attracted armature 1374—1373, winding 1374—1373—1369—1314—55—53, viz., until the armature 1386 is attracted and closes the following circuits:

(16) (I) 52 — 54 — 1319 — 1338—1376—1377—over the attracted armature 1374—1377—winding 1378—1377—1337—1314—55—53.

(II) 52—54—1319—1338—1376—1379—over the armature 1374—1379—1355—winding 125—1355—1337—1314—55—53.

(III) 52—54—1319—1338—1376—1380—over the armature 1374—1380—1347—winding 920—1347—1337—1314—55—53.

(IV) 52—54—1319—1338—1376—1381—over the armature 1374—1381—1336—winding 295—1336—1337—1314—55—53.

(V) 52 — 54 — 1319 — 1338 — 1376 — 1382—over the armature 1374—1382—over the open armature 1405 — 1382 — winding 1384 — 1382—1318—1314—55—53.

(Re. I to IV) All the circuits passing over the windings of the groups $a$, $b$, $c$ and $d$ are interrupted and no circuit is closed, since the circuit described under 5 passes over the attracted armature 1330 and thus it is not closed now, since the armature 1330 is not attracted, further the circuit described under (9) (II) leads over the attracted armature 1349, the circuit described under (8) (I) leads over the attracted armature 1330, and the circuit described under (8) (II) leads over the open armature 1374 and finally the circuits described under (12) (I, II, III) lead over the attracted armature 1349.

(Re. V) The armature 1384 remains attracted under the action of the following circuit: 52—54—1319—1320—1383—over the open armature 1324—1383—over the attracted armature 1384—1383—1382—winding 1384—1382—1318—1314—55—53 viz. until the armature 1324 is attracted and closes the following circuit:

(17) 52—54—1319—1338—1385—over the attracted armature 1384 — 1385 — winding 1386—1385—1318—1314—55—53.

The armature 1386 interrupts the conductor 1375 and therewith the circuit passing over the winding 1374 and establishes the connection between the setting group $g$ on the one hand, and the groups $a$ and $b$ on the other hand, that is to say it transmits the number $x$, that has been set in $g$, $a$ and $b$ and closes in addition thereto the following circuits:

(18) (I) 52 — 54 — 1319 — 1338 — 1388—over the attracted armature 1386—1388—winding 1389 — 1388 — 1337—1314—55—53.

(II) 52 — 54 — 1319 — 1338—1387—over the attracted armature 1386—1387—1323—winding 1324 — 1323 — 1318—1314—55—53.

(Re. I) The armature 1389 remains attracted under the action of the following circuits until the calculation is completed: 52—54—1319—1338—1392—over the attracted armature 1389 — 1392 — 1388 — winding 1389—1388—1337—1314—55—53 and interrupts the conductors 1348 and 1350.

(Re. II) When the armature 1324 is attracted the conductor 1383 is interrupted and at the same time the winding 1384 is de-energized, and in addition thereto the circuit described under (2) is closed; the operations are repeated up to (8) (I).

The circuit (8) (II) is not closed, since it passes over the open armature 1389 which is now attracted. However, the following circuit is closed:

(19) 52—54—1319—1327—1390—over the attracted armature 920—1390—over the open armature 1394—1390—over the attracted armature 1389—1390—winding 1391—1390—1318—1314—55—53. The armature 1391 remains closed through the following circuit: 52—54—1319—1338—1392—over the open armature 1397—1392—over the attracted armature 1391—1390—winding 1391—1390—1318—1314—55—53—and closes the following circuit:

(20) 52—54—1319—1338—1393—over the attracted armature 1391—1393—winding 1394—1393—1318—1314—55—53. The armature 1394 remains attracted under the action of the following circuit: 52—54—1319—1338—1395—over the open armature 1405—1395—over the attracted armature 1394—1395—1393—winding 1394—1393—1318—1314—55—53. The armature 1324 is attracted by the circuit described under (8) (I) and therewith the circuit described under (2) is closed. The set of operations is now repeated up to (8) (I) and in this way the multiplication of $x^2$ with $x$ is carried out and the multiplication of $x^3$ with $x$ is prepared. The circuit described under (8) (II) as well as that described under (19) is not closed since now the armature 1389 as well as the armature 1394 is attracted; however, the following circuit is now closed:

(21) 52—54—1319—1327—1396—over the attracted armature 920—1396—over the attracted armature 1394—1396—over the open armature 1402—1396—winding 1397—1396—1337—1314—55—53.

The armature 1397 remains attracted under the action of the following circuit: 52—54—1319—1338—1398—over the open armature 1412—1398—over the attracted armature 1397—1398—1396—winding 1397—1396—1337—1314—55—53, and interrupts the conductor 1392, and thus the circuit passing over the winding 1391 and closes the following circuit:

(22) 52—54—1319—1338—1399—over the attracted armature 1397—1399—winding 1402—1399—1337—1314—55—53.

The armature 1402 interrupts the conductor 1396 (circuit 21) and remains attracted under the action of the following circuit: 52—54—1319—1338—1403—over the open armature 1412—1403—over the attracted armature 1402—1403—1399—winding 1402—1399—1337—1314—55—53. The circuit described under (2) was closed by the circuit (8) (I), and by the repeated set of operations up to (8) (I) the multiplication $x^3.x$ was effected and the multiplication of $x^4.x$ initiated. Now, neither the circuit described under (8) (II) nor that described under (19) or that under (21) is closed, since the armature 1389 as well as the armature 1394 and the armature 1402 are still attracted; however, the following circuit is closed:

(23) 52—54—1319—1338—1404—over the attracted armature 920—1404—over the attracted armature 1402—1404—winding 1405—1404—1318—1314—55—53.

The armature 1405 interrupts the conductors 1357—1382 and 1395 and therewith all the circuits passing over these conductors and thus also the circuit passing over the winding 1394 and remains attracted under the action of the following circuit:

52—54—1319—1410—over the open armature 1409—1410—over the attracted armature 1405—1410—1404—winding 1405—1404—1318—1314—55—53 and closes the following circuit:

(24) 52—54—1319—1338—1411—over the attracted armature 1405—1411—winding 1412—1411—1337—1314—55—53.

The armature 1412 remains attracted under the action of the following circuit: 52—54—1319—1338—1413—over the attracted armature 1412—1413—1411—winding 1412—1411—1337—1314—55—53, and interrupts the conductors 1403 and 1398 and closes the following circuit:

(25) 52—54—1319—1327—1416—over the attracted armature 1412—1416—1350—winding 1351—1350—1318—1314—55—53.

The armature 1351 interrupts the conductor 1335.

Simultaneously with the circuits described under (23) (24) and (25) also the circuits described under (2) and (3) were closed whilst the circuit described under (4) is not closed owing to the interruption of the conductor 1335 and the subsequent release of the armature 1330; however, the following two circuits are closed:

(26) (I) 52—54—1319—1332—1336—over the attracted armature 311—1336—1352—1460—over the attracted armature 1405—1460—1339—1340—winding 1341—1340—1318—1314—55—53.

(II) 52—54—1319—1332—1336—over the attracted armature 311—1336—1461—over the attracted armature 1412—1461—over the open armature 923—1461—1381—1336—winding 295—1336—1337—1314—55—53.

The armature 1341 remains attracted until the armature 1361 or the armature 1324 is attracted and closes at the termination of the multiplication $x^4.x$, that is to say, until $x^5$ is set in the group $c$, viz. until the armature 357 is again in its position of rest, the following circuit:

(27) 52—54—1319—1332—1343—over the open armature 357—1343—1406—over the open armature 1415—1406—over the attracted armature 1405—1406—1353—over the attracted armature 1341—1353—winding 1354—1353—1318—1314—55—53.

The armature 1354 effects—as already pointed out above—the connection between the group $c$ and the group $d$, thus transferring $x^3$ which is set in the group $c$ to the dividend group $d$ and closes the circuit described under (11) over the winding 125.

The armature 125 cancels the multiplicand $x$ in the group $a$.

The circuits described under (12) (I, II, and III) are not now closed, since the armature 1349 is not attracted; however, the following circuits are closed:

(28) (I) 52—54—1319—1327—1407—over the attracted armature 125—1407—over the attracted armature 1405—1407—1359—winding 1361—1359—1318—1314—55—53.

(II) 52—54—1319—1327—1357—over the attracted armature 125—1357—over the attracted armature 1405, which interrupts the conductor 1357 and connects it with the conductor 1463—1463—1347—winding 920—1347—1337—1314—55—53.

Now, the armature 1361 closes the following circuits:

The circuit described under (13) (I) which is now entirely immaterial, since the armature 1349 was not attracted, and the circuit described under (13) (II); the latter one, however, only after the armature 1215 has come into its position of rest, that is to say, until the armatures 1341 and 1354 have been released one after the other. (The armature 1341 was released by the interruption of the conductor 1342 when the armature 1361 was attracted).

The circuit (13) (II) thus attracted the armature 923 (see division).

In addition to the circuits (13) (I) and (13) (II) the following circuits are closed:

(29) (I) 52—54—1319—1338—1414—over the attracted armature 1361—1414—over the attracted armature 1412—1414—winding 1415—1414—1337—1314—55—53.

(29) (II) 52—54—1319—1338—1408—over the attracted armature 1361—1408—over the open armature 125—1408—winding 1409—1408—1314—55—53.

The armature 1409 interrupts the conductor 1410 and therewith the circuit passing over the winding 1405.

The armature 1415 remains closed under the action of the following circuit: 52—54—1319—1338—1464—over the attracted armature 1415—1464—1414—winding 1415—1414—1337—1314—55—53, and closes the following circuit:

(30) 52—54—1319—1338—1417—over the open armature 125—1417—over the attracted armature 1415—1417—winding 1418—1417—1337—1314—55—53.

The armature 1418 closes the following circuits:

(31) (I) 52—54—1319—1327—1419—over the attracted armature 1418—1419—1371—winding 1372—1371—1318—1314—55—53.

The armature 1372 interrupts the circuit passing over the winding 1361.

(II) 52—54—1319—1338—1420—over the attracted armature 1418—1420—winding $a_{1,1}$—1420—1313—1314—55—53.

(III) 52—54—1319—1338—1421—1422—over the attracted armature 1418—1422—winding $a_{11,2}$—1422—1313—1314—55—53.

(IV) 52—54—1319—1338—1421—1423—over the attracted armature 1418—1423—winding $e_1$—1423—1313—1314—55—53.

Now, $x^5$ is set in the dividend group, "twelve" in the group $a$ and "one" in the quotient selector. As the armature 923 is also attracted, the divisor $$\frac{x^5}{12}$$

takes its normal course, as none of the armatures 1330—1349—1361—1405 is attracted and also the conductor 1461 is interrupted by the attracted armature 923, so that all the multiplications that are effected during the division have no effect on the magnet windings which do not belong to the division.

At the termination of the division, that is to say, when the armatures 1219 and 825 are attracted, the following circuit is closed.

(32) 52—54—1319—1332—1369—over the attracted armature 1219—1369—over the attracted armature 825—1369—1424—over the attracted armature 1415—1424—winding 1425—1424—over the open armature 1427—1424—1337—1314—55—53.

The armature 1425 establishes the connection between the group $b$ and the group $f$ in such a manner that the quotient $$\frac{x^5}{12}$$

set in the group $b$ is transferred to $f$ additively viz. the numeral set in $b_1$ is transferred to $f_{111}$, the figure set in $b_{11}$ is transferred to $f_{1V}$ and so on.

This displacement of digits corresponds to the requirement that $$\frac{x^5}{120}$$

shall be transferred to the group $f$, as according to what has been said in connection with the division, the quotient $x^5 : 1, 2$ is set in $b$.

Now, the following circuit passes over the armature 1425:

(33) 52—54—1319—1338—1426—over the attracted armature 1425—1426—winding 1427—1426—1337—1314—55—53.

The armature 1427 effects—as is shown in Figs. 6 to 9—the connection between the conductors passing over the armatures of the group $f$ and the bus-conductors 130—131 . . . 140, and initiates in a known manner after the closing of the typewriting key, the writing of the number set in the group $f$:

$$x - \frac{x^3}{6} + \frac{x^5}{120}$$

that is to say $\sin x$.

In exactly the same manner, it is possible to effect the connections for the automatic calculation of the other trigonometrical functions ($\cos x$, $\tan x$, $\cot x$) as well as the cyclometric functions (arc sin $x$, arc cos $x$, arc tan $x$, arc cot $x$), since all these functions can be resolved into converging series of powers.

It is clear that similarly complex functions can be automatically calculated, if the connections for the partial functions are given. Such a complex function is for instance the series $$a^x = 1 + \frac{x}{1} \ln a + \frac{x^2}{1.2}(\ln a)^2 + \frac{x^3}{1.2.3}(\ln a)^3 + \cdots$$

If in this function $x$ is a proper fraction, the numerator of which is one, and the position of the digit $a$ is properly selected, the series of $a^x$ becomes necessarily and rapidly converging to serve for the calculation of any desired root.

K

However, before giving the connections for these series, we will show how the square and cube root can be calculated automatically in the machine also in another shorter way.

As has already been pointed out in the introduction, the evolution represents after the determination of the first digit of the root, a division, in which the divisor varies from digit to digit.

The connections for the obtention of the cube root are described with reference to Figs. 28 to 34, since the connection for the square root is entirely analogous except that it can be effected in a correspondingly simple manner.

The general operation of the machine when obtaining the cube root is as follows:

After the radicand has been set in the setting group $g$ and after the corresponding operating key has been pressed down the radicand is transferred onto the group $d$ (which is at the same time a dividend and a radicand group). The first digit of the root is selected from the first three digits of the radicand group and is transferred onto the group $b$. The group $b$ is thus simultaneously a quotient and a root group. Corresponding to the number set in $b$, the figure corresponding to the first figure of the product $3x^2$ is set in the quotient selector, the power $x^3$ is subtracted from the radicand, and the remainder and the figure set in the quotient selector form the next root digit, which effects automatically the correction of the figure set in the quotient selector; thereupon the power $x^3$ is formed again and is subtracted from the radicand newly set in the radicand group, and the new root digit is formed from the remainder and the figure set in the quotient selector, and the set of operations is repeated.

Figure 34:
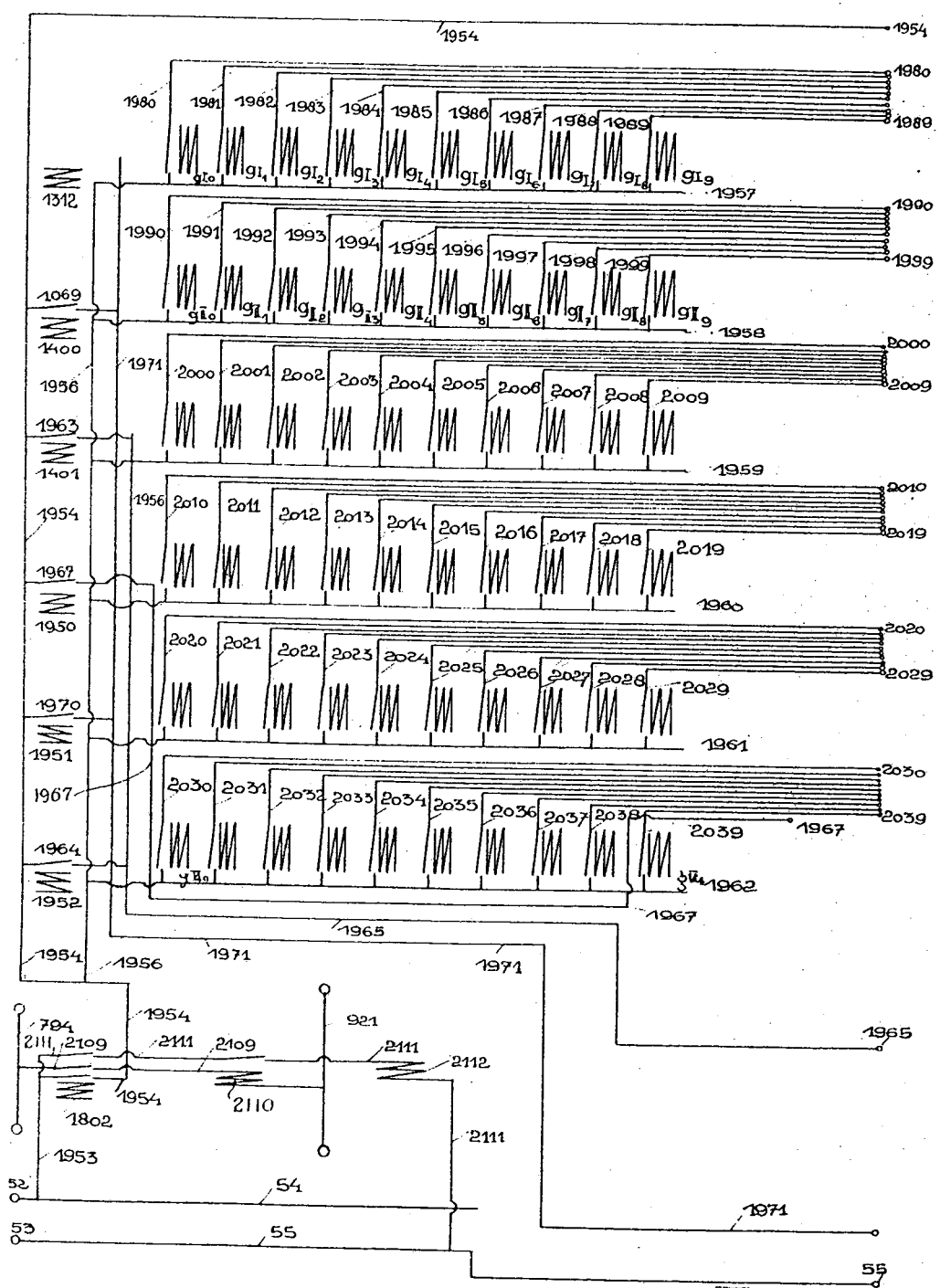

In addition to the connections over the magnet group $g$ $d$ $c$, and $b$, previously described, we get the following:

1. The setting group (Fig. 34).

A conductor is led over each armature of a magnet of the group $g$ corresponding to a numerical value, in such a manner that it is connected at this point by the attracted armature. All its conductors (Fig. 34) 1980 . . . 1989, 1990 . . . 1999, 2000 . . . 2009 etc. start from the conductors 1957, 1958, 1959, etc., all of which are branched off a conductor 1956 which leads to the conductor 1954; the conductor 1954 passes over the armature of the magnet 1802 in such a manner that it is closed at this point by the attracted armature and terminates in the conductor 54. From the conductors 1980 . . . 1989, 1990 . . . 1999 . . . 2000 . . . 2009 etc., (Fig. 33) there branch off over the armatures of the magnets 1968, 1966, 1972 connecting conductors, which lead to the conductors 631 . . . 640 of the group $d$ (Fig. 32), in such a manner that over the attracted armature 1968 (Fig. 33) the digit value group $g_I$ is connected with the digit value $d_I$, the group $g_{II}$ with a group $d_{II}$ etc. and over the armature of the magnet 1966, the first digit value group $g_I$ with a group $d_{II}$ the second group $g_{II}$ with $d_{III}$ etc. and over the armature of the magnet 1972 the first digit value group $g_I$ with the third digit value group $d_{III}$ and the group $g_{II}$ with the group $d_{IV}$ etc.

The armature of the magnets 1312, 1400, 1401, 1950, 1951 etc. effect in an attracted position the connections between the bus-conductors 130 . . . 140 and the magnet windings of the group $g$, in a known manner.

Figure 33:
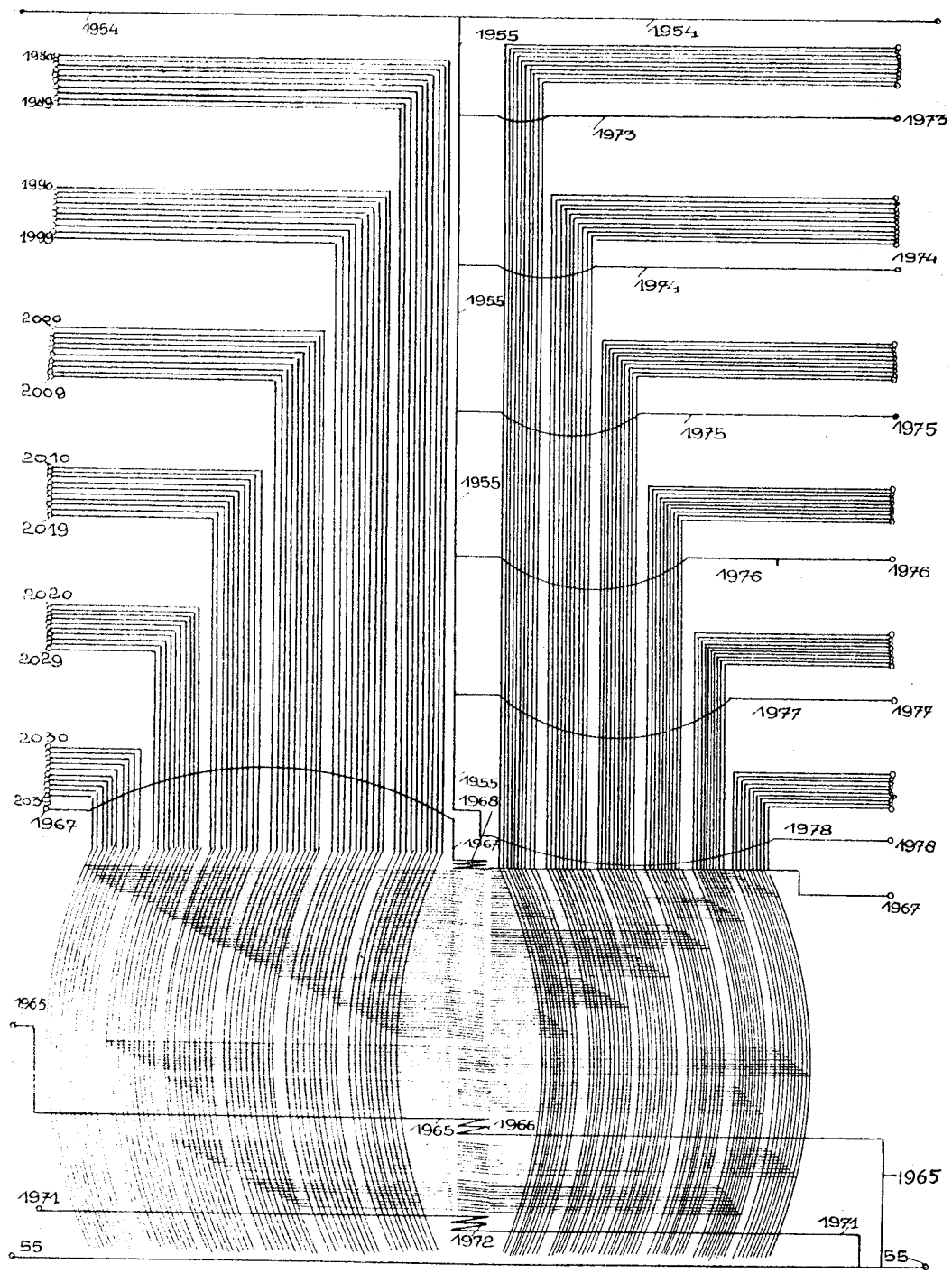

A conductor passes over each second, fifth etc. connecting armature which conductors terminate into a common conductor 1971 (Fig. 34) which leads to the winding of the magnet 1972 (Fig. 33). Similarly, a conductor passes over each third, sixth etc. and each fourth, seventh etc., which conductors terminate each into a conductor 1965 and 1967 which lead to the windings of the magnets 1966 and 1968 (Fig. 33).

That is to say, if a number is set in the group $g$ the number of digits of which can be divided by three, the first highest digit in the first digit value group $d_I$ is transferred to the radicand group during the transmission. If the number of the digit is such, that when divided by three there is one digit over, then the highest digit of the radicand is transferred to the digit value group $d_{III}$, and if two digits are over, then one highest digit of the radicand is set in the group $d_{\text{II}}$.

In addition thereto, in the group $g$ the windings of the magnets $g$ are so connected together in each digit value sub-group in the manner described with reference to the holding magnets $n$ in the groups $c$, $d$, and $f$, with the exception that there is no blank digit in the group $g$, so that "zero" is always set in a digit value group, when no other figure has been set.

It is also to be pointed out that in Figs. 31 to 34, not all the connections between the group $g$ and the group $d$ are illustrated, but only those which lead over the armature 1968, whilst only two digit value connections are indicated for those leading over each of the armatures 1966 and 1972.

2. The radicand group (separately indicated in Fig. 31).

A conductor passes over each attracted armature of the highest digit value group, the numerical value of which considered as a hundreds digit, determines the cube of a sum having one digit, all of which conductors branch off the conductor 1954 (Fig. 33) and each of which is connected with that conductor of the group of nine conductors 2080, 2081 ... 2088 (Fig. 31) in which each conductor corresponds to one figure value from one to nine which value corresponds to the one digit number, the cube of which is determined by the numerical value of the corresponding magnet considered as a hundreds digit.

Over each attracted armature of the first digit value group $d_{\text{I}}$, the numerical value of which considered as a hundreds digit is identical with one of the hundreds digit of the cube of all single digit numbers, there passes a conductor that is branched off from the same conductor 1954, from which former conductor which effects over the attracted armatures of those magnets of the digit value group $d_{\text{II}}$ the numerical value of which considered as a tens digit in connection with the numerical value considered as a hundreds digit of the corresponding magnet of the group $d_{\text{I}}$ determine the cube of a one digit number, the connection with that conductor of the group 2080 ... 2088, the numerical value of which corresponds to that single digit number, the cubical value of which is determined, whilst a conductor is passed over each attracted armature of the group $d_{\text{II}}$, the numerical value of which considered as a tens digit in conjunction with the numerical value of the corresponding magnet of the group $d_{\text{I}}$ considered as a hundreds digit is identical with the tens digit of one of the cubes of the single digit numbers, which conductor effects over the attracted armature of the digit value group $d_{\text{III}}$ the connection with that conductor of the group 2080 ... 2088, the numerical value of which corresponds to that one digit number, the cube of which is determined by the three numerical values, considered as hundreds tens and units that come into question.

Each conductor of the group 2080 ... 2088 leads to the winding of a magnet 2051 ... 2059, each of which corresponds to a numerical value of "one" to "nine." Over each attracted armature of these magnets 2051 ... 2059 conductors are closed which branch off a common conductor 2060 the number of conductors passing over each armature corresponding to the number of digits contained in the cube of the numerical value of the magnet, which conductors terminate in those conductors of the group $631_{d,\text{I}}$ ... $640_{d,\text{I}}$, $631_{d\text{II}}$ ... $640_{d\text{II}}$, $631_{d\text{III}}$ ... $640_{d\text{III}}$ the numerical values of which correspond to the numbers of the cube of the numerical value of the corresponding magnet 2051 ... 2059, whereby the group $631_{d\text{I}}$ ... $640_{d\text{I}}$ corresponds to the hundreds digit, $631_{d\text{II}}$ ... $640_{d\text{II}}$ to the tens digit and $631_{d\text{III}}$ ... $640_{d\text{III}}$ to the units digit.

In addition thereto a conductor is closed over each attracted armature of a magnet of the group $d$ corresponding to one of the numerical values from one to nine, all of which conductors terminate in a common conductor 2040, 2041 ... 2045 separately for each digit value group, which latter conductors lead to the windings of the magnets 1930, 1931 ... 1935 over the attracted armatures of which the connections are established between each two successive digit value groups of the group $d$ on the one hand, and the quotient selector on the other hand, in exactly the same manner as was described and illustrated in the case of division in (Figs. 23, 24) for two such connections, in such a manner that each of the conductors 2040 ... 2045 terminates in the corresponding magnet winding only after passing successively over the armatures of all the magnets connecting the higher digit value groups of the group $d$ with the quotient selector, in such a manner that it is interrupted at these points by these attracted armatures.

Each of these magnets 1930 ... 1935 corresponding to a digit value group of $d$ can be energized only after a zero has been set in the preceding digits.

3. The root group $b$.

Similar to the operation hereinbefore generally described for the extraction of the cube root, connections must be provided in the root group which after the determination of each root digit, determine firstly the first figure of $3x^2$, secondly the number of digits of $3x^2$ and thirdly the number of digits of $x^3$, if $x$ is the root that has been found for a determined number of digits.

If the first digit of the root has been found, it is easy to determine the first digit of $3x^2$.

Each subsequent digit of the root, however, may under circumstances alter the first digit of the new $3\ x^2$. The limit values of all numbers within which the first figure of $3\ x^2$ determined by the first root digit is not altered can be found for any desired number of digits by resolving the eighteen determining equations $3\ x^2 = 10^{2n}$, $3\ x^2 = 2.10^{2n}$, $3\ x^2 = -3.10^{2n} \ldots 3\ x^2 = 9.10^{2n}$, $3\ x^2 = 10^{(2n+1)}$, $3\ x^2 = 2.10^{(2n+1)}$, $3\ x^2 = 3.10^{(2n+1)} \ldots 3\ x^2 = 9.10^{(2n+1)}$.

The resolving of these equations give the following results up to four digits, which results are set out in the form of a table.

| First digit of $3\ z^2$ | $x$ One digit | $x$ Two digits | $x$ Three digits | $x$ Four digits |
|---|---|---|---|---|
| 3 | 1 | 10–11 | 100–115 | 1000–1154 |
| 4 | | 12 | 116–129 | 1155–1291  $3\ x^2 \ldots 2n-1$ |
| 5 | | 13–14 | 130–141 | 1292–1414   digit. |
| 6 | | 15 | 142–152 | 1415–1527 |
| 7 | | 16 | 153–163 | 1528–1632 |
| 8 | | 17 | 164–173 | 1633–1731 |
| 9 | | 18 | 174–182 | 1732–1825 |
| 1 | 2 | 19–25 | 183–258 | 1826–2581 |
| 2 | 3 | 26–31 | 259–316 | 2582–3162 |
| 3 | | 32–36 | 317–365 | 3163–3651  $3\ x^2 \ldots 2n$ |
| 4 | 4 | 37–40 | 366–408 | 3652–4082   digit. |
| 5 | | 41–44 | 409–447 | 4083–4472 |
| 6 | | 45–48 | 448–483 | 4473–4830 |
| 7 | 5 | 49–51 | 484–516 | 4831–5163 |
| 8 | | 52–54 | 517–647 | 5164–5477 |
| 9 | | 55–57 | 548–577 | 5478–5773 |
| 1 | 6, 7, 8 | 58–81 | 578–816 | 5774–8164  $3\ x^2 \ldots 2n+1$ |
| 2 | 9 | 82–99 | 817–999 | 8165–9999   digit. |

The series of periods in the above table indicate the omission of the words " has the digit value of".

The results reveal the following facts:

If by the addition of a new root digit, $3\ x^2$ is converted from a $(2n-1)$ digit number into a $2n$ digit number, or from a $2n$ digit number to a $(2n+1)$ digit number, the addition of any desired number of new root digits does not alter anything in the first digit of $3x^2$, and the latter then remains one.

By the addition of the second root digit to the first one, the first digit of $3\ x^2$ can be changed to the maximum of six, if the case considered in the preceding paragraph is considered separately.

By the addition of any further digit it is possible to effect a change of only one.

A change in the number of digits obtained by the addition of a new root digit is only possible when the first figure of the root is "one" or "five".

When determining the number of digits of $x^3$, it is also necessary to take into consideration whether the first digit of $x^3$ when the powers are formed has been set in the first or in the second active digit value group of the group $c$ (the product group).

If the three equations $x^3 = 10^{(3n-2)}$, $x^3 = 10^{(3n-1)}$, $x^2 = 10^{(2n-1)}$ are resolved, the following table is obtained:

| $x$ | $x^2$ | $x^3$ |
|---|---|---|
| 1000–2154 | $2n-1$ digits | $3n-2$ digits |
| 2155–3162 | $2n-1$ digits | $3n-1$ digits |
| 3163–4641 | $2n$ digits | $3n-1$ digits |
| 4642–9999 | $2n$ digits | $3n$ digits |

From this table we make the following deductions.

If $x^3$ has $(3n-2)$ digits, then in the case of subtraction of $x^3$, the highest digit of $x^3$ must be transferred to the third digit of $d$, that is to say to the group $d_{III}$. However, if $x^3$ has $(3n-2)$ digits, then this highest digit must be set in the second active digit value group, that is to say, in $c_{II}$. Thus the connection must be effected in such a manner that $c_I$ is connected with $d_{II}$, that is to say, $c_{II}$ with $d_{III}$.

If $x^2$ has $(2n-1)$ digits, and $x^3$ has $(3n-1)$ digits, then the highest digit of $x^3$ must be transferred to $d_{II}$; this highest digit is however, set in $c_I$, so that $c_I$ must again be connected with $d_{II}$.

If $x^2$ has $2n$ digits and $x^3$ $(3n-1)$ digits, then the highest digit of $x^3$ must be transferred to $d_{II}$; this highest digit is, however, then set in $c_{II}$, so that $c_{II}$ has to be connected with $d_{II}$, thus $c_I$ with $d_I$.

If $x^2$ has $2n$ digits and $x^3$, $3n$ digits, then the highest digit of $x^3$, which is now set in $c_I$, must be transferred to $d_I$, that is to say, again as in the preceding case.

The transference of $x^3$ to $d$ is thus effected in two ways, viz., either $c_I$ is connected with $d_{II}$ or $c_I$ with $d_I$.

As regards the connection what is important is the first figures of $x$ and the digit value group of $c$, in which the highest digit of the power that has been formed, is set.

In accordance with what has previously been said, the connections for the root group $b$ is the following one, that is to say, in addition to the conductors previously described, the following conductors pass over the armatures of $b$ corresponding to the numerical values of "one" to "nine":

(I) Over each one of the armatures of the group $b_1$ (Fig. 28) corresponding to a numerical value from one to nine, there passes a a conductor 1836, 1837 . . . 1844 branching off a common conductor 1804 which is connected over the attracted armature 1802 with the positive pole 52 of the source of current, in such a manner that these conductors 1836 . . . 1844 are closed by the attracted armatures at these points and are connected with the three conductors 1847, 1849, 1851 which lead to the windings of the magnets 1848, 1850, 1852.

The conductors 1836—1844 lead over the group $b_1$ in such a manner that the attracted armatures, the numerical values of which, as highest figures of the solutions of the eighteen determining equations $$3x^2 = 10^{2n}, \ 3x^2 = 2.10^{2n} \ldots 3x^2 = 9.10^{(2n+1)}$$

determine a $3x^2$ (a) having $(2n-1)$ digits, effect the connection with the magnet winding 1848, (b) having $2n$ digits, effect the connection with the magnet winding 1850 and (c) having $(2n+1)$ digits, effect the connection with the magnet winding 1852.

A conductor 1845, 1846 passes over each armature of the group $b_I$, the numerical value of which, taken as the highest digit, corresponds to one of the upper limit values, which by resolving the above mentioned equations were found to be the numbers which by surpassing even only by one unit the last digit effects a jump in the corresponding $3x^2$ from a number having $(2n-1)$ digits to a number having $2n$ digits, or from a number having $2n$ digits to a number having $(2n+1)$ digits, that is to say $b_{I,1}$ and $b_{I,5}$, which conductor is closed at this point by the attracted armature, from which conductors connections are effected with the windings of the magnets 1868 and 1869 (Fig. 29) over the attracted armatures of those magnets of the group $b_{II}$ the numerical values of which are greater than those figures which taken as the second highest digit in conjunction with the corresponding numerical value of the first digit (one or five) is identical with one of the above mentioned numerical values, that is to say, from the conductor 1845 over the armature $b_{II,9}$ and from the conductor 1846 over the armature $b_{II,8}$ and $b_{II,9}$, in such a manner that the connection with the magnet winding 1868 is effected when the jump in the $3x^2$ takes place from a number having $(2n-1)$ digits to a number having $2n$ digits, and that the connection with the magnet winding 1869 is effected when the jump is effected from a number having $2n$ digits to a number having $(2n+1)$ digits, whilst a conductor passes from each of the mentioned conductors 1845 and 1846 over the attracted armatures of the group $b_{II}$, the numerical values of which taken as the second highest digit in conjunction with the corresponding digit belong to the repeatedly mentioned limit values that is to say, from the conductor 1845 over the armature $b_{II,8}$, and from the conductor 1846 over the armature $b_{II,7}$ from which first mentioned conductor, conductors are passed over the corresponding armatures of the group $b_{III}$ in exactly the same manner as has been described with the group $b_{II}$, the latter conductors leading as before to two magnet windings (1905, 1906) (Fig. 29) which as regards their operation are identical with the magnets 1868 and 1869 whilst conductors are passed over the magnet armatures corresponding to the figures which constitute the third digit in the limit values, from which latter conductors branching off conductors lead over the corresponding armatures of the group $b_{IV}$ in an exactly similar manner. Obviously these connections may be extended to any desired number of digits.

(II) Over each of the armatures of the group $b_I$ (Fig. 28) corresponding to the numerical values from one to nine there passes a conductor branched off the conductor 1804, so that it is closed by the attracted armature, which conductors 1806, 1807 ... 1814 lead to five conductors 1815, 1816, 1817, 1818, 1819 corresponding to the figures one, two, three, four and seven, in such a manner that each conductor 1806 ... 1814 passing over a magnet armature is connected with that conductor of the group 1815 ... 1819, the numerical value of which corresponds to the numerical value of the first digit of $3 x^2$, if $x$ is the numerical of the corresponding magnet.

In addition thereto, a conductor branched off the conductor 1804 passes over each attracted armature of the group $b_I$ the numerical value of which taken as the highest digit is identical with the highest digit of one of the upper limit values, which were found by resolving the repeatedly mentioned eighteen equations $3x^2 = 10^{2n} \ldots 3x^2 = 9.10^{(2n+1)}$, that is to say, the conductor 1820 over the armature $b_{I,1}$, the conductor 1821 over the armature $b_{I,2}$, the conductor 1822 over the armature $b_{I,3}$, the conductor 1823 over the armature $b_{I,4}$, the conductor 1824 over the armature $b_{I,5}$ and the conductor 1825 over the armature $b_{I,8}$. From these conductors there branches off one conductor over each attracted armature of the group $b_{II}$, the numerical value of which is greater than the figure which taken as a second highest digit in conjunction with the first digit belongs to the upper limits that have repeatedly been mentioned, and leads to one of the six conductors 1826, 1827 ... 1831, which conductors correspond to the numerical values from one to six. The magnet armatures of the group $b_{II}$ previously mentioned effect the connection between the conductors 1820 ... 1825 and that conductor of the group 1826 ... 1831, the numerical value of which corresponds to the change by which the first digit of $3x^2$ was increased by the addition of the second digit.

A conductor branched off the conductors 1820 ... 1825 is passed over each attracted armature of the group $b_{II}$, the numerical value of which taken as the second highest digit in conjunction with the first digit corresponding to one of the conductors 1820 ... 1825 agrees with the first two digits of the limit values that have been found by resolving the repeatedly mentioned eighteen determining equations. From these conductors branched off conductors are passed over that magnet armature of the group $b_{III}$ the numerical value of which is greater than the figure of the third digit, which latter figure in conjunction with the first one determined by the corresponding conductor 1820 ... 1825 and the second figure determined by the conductor branched off the latter conductor and passing over an armature of the group $b_{II}$ belong to the repeatedly mentioned limit values. All these branched off conductors terminate in a common conductor 2150 which has the numerical value "one."

Branched off conductors pass over those armatures of the group $b_{III}$ the numerical value of which in conjunction with the corresponding armatures of the groups $b_I$ and $b_{II}$ agrees with the third digit of one of the limit values, from which conductors branched off conductors are led over the armature of the group $b_{IV}$ in an exactly similar manner. Obviously the connection may be continued for any desired numbers of digit value groups of $b$.

A conductor is passed over each one of the armatures of the groups $b_{II}$, $b_{III}$ ... corresponding to the numerical values "zero" to "nine," so that it is closed by the attracted armature, all of which conductors branch off from a conductor 1857, 1860, which is common for each digit value group, and which for each digit value terminate in a common conductor 1858, 1861 each of which conductors lead to a magnet winding 1859, 1862.

4. The quotient selecting group.

The five conductors 1815, 1816 ... 1819 described under (3,II) pass over the open armature 2150' (Fig. 29) which interrupts it when attracted, to the magnet windings of the group $e$ (Fig. 30) each conductor leading to the winding corresponding to its numerical value. Over each armature of the magnet group $e$ the windings of which are connected together in exactly the same manner as the holding magnets $n$ of the group $f$, there passes a conductor branched off a common conductor 1940, which former conductors lead to the windings of nine auxiliary magnets 1900, 1901 ... 1908. Over the attracted armatures of these magnets, conductors which are branched off the conductors 1826 ... 1831 effect the connection with that magnet winding of the group $e$ which corresponds to the numerical value of the sum of the numerical values of the corresponding magnets of the group 1900 ... 1908 and the corresponding conductor of the group 1826 ... 1831.

Figure 28:
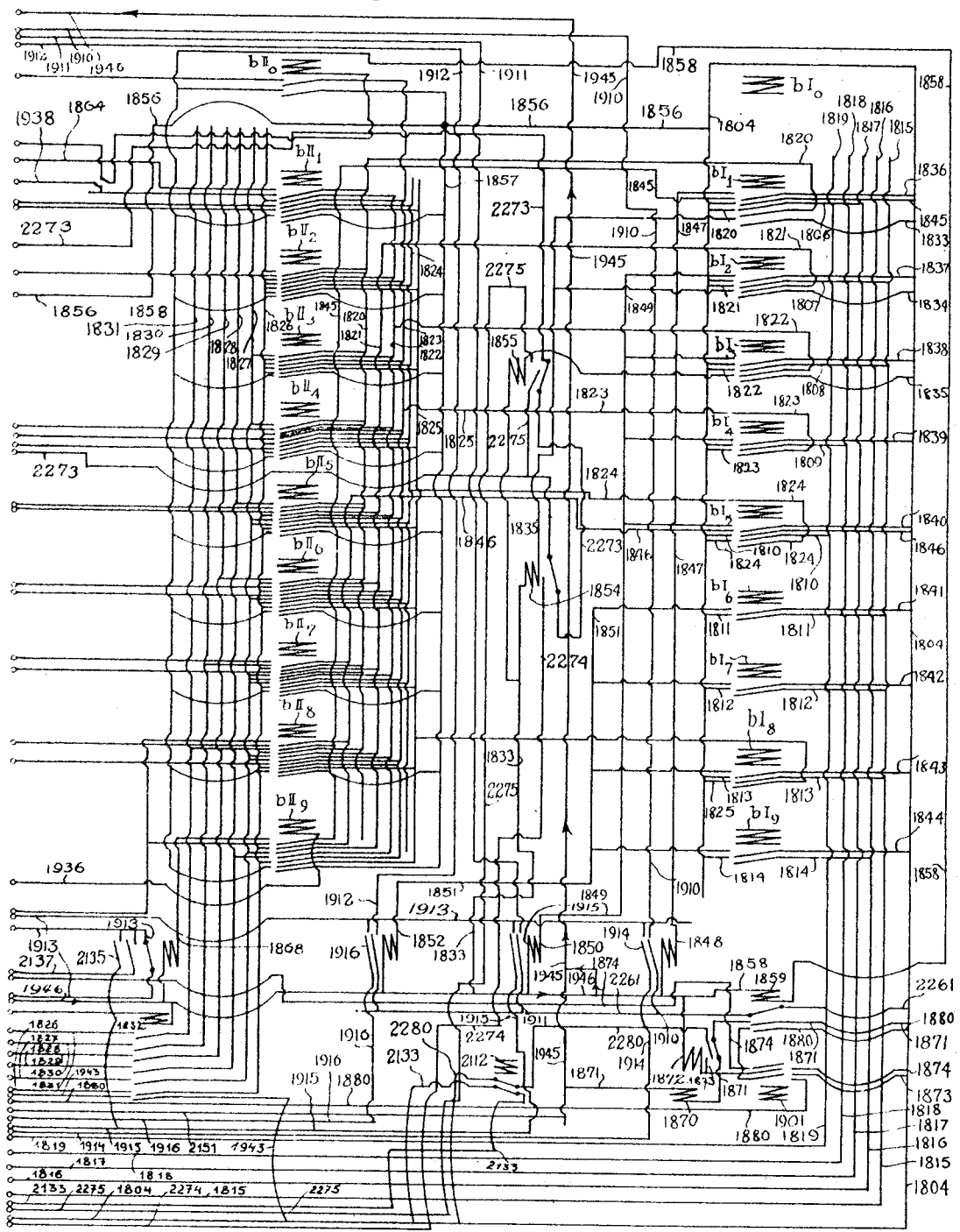
Figs. 28, 29 and 30 show the connections for the root group with all the auxiliary magnets required for the extraction of square roots and cube roots.
Figure 29:
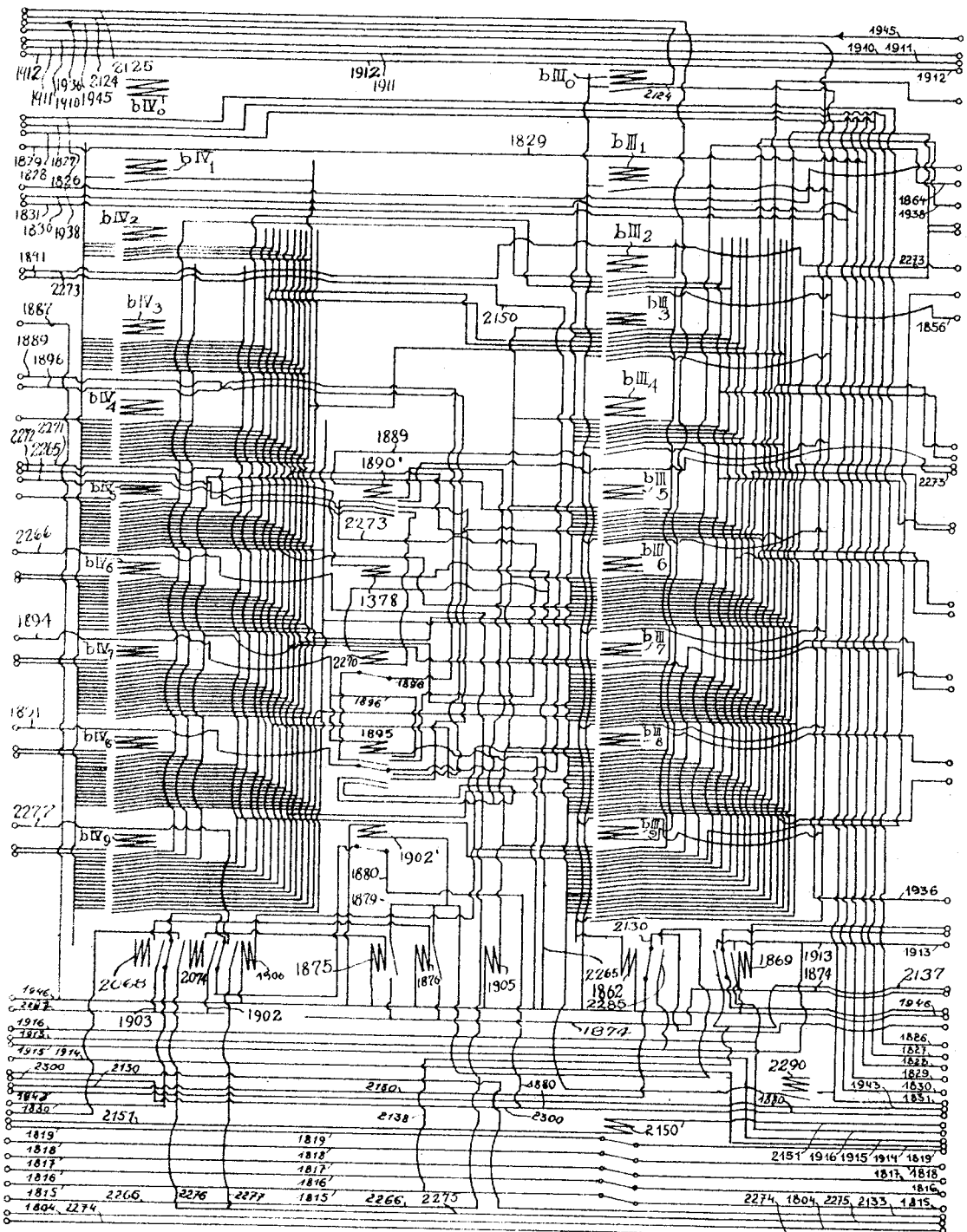

In addition thereto, a conductor passes over each armature of the group $e$, which conductors are branched off the common conductor 1940 and terminate in a common conductor 2151, the latter conductor leading to the winding 2150' (Fig. 29). Corresponding to the resolving of the three equations $x^3 = 10^{(3n-2)}$, $x^3 = 10^{(3n-1)}$, $x^2 = 10^{(2n-1)}$, one conductor branching from the conductor 1804 passes over each of the armatures $b_{I,1}$ and $b_{I,2}$ (Fig. 28), which former conductors are closed at these points by the attracted armatures, the conductors terminating in a common conductor 1833 which leads to the winding of the auxiliary magnet 1854. In addition thereto the conductor 1835 passes over the armature $b_{I,3}$, which conductor leads to the winding of the auxiliary magnet 1855.

Figure 31:
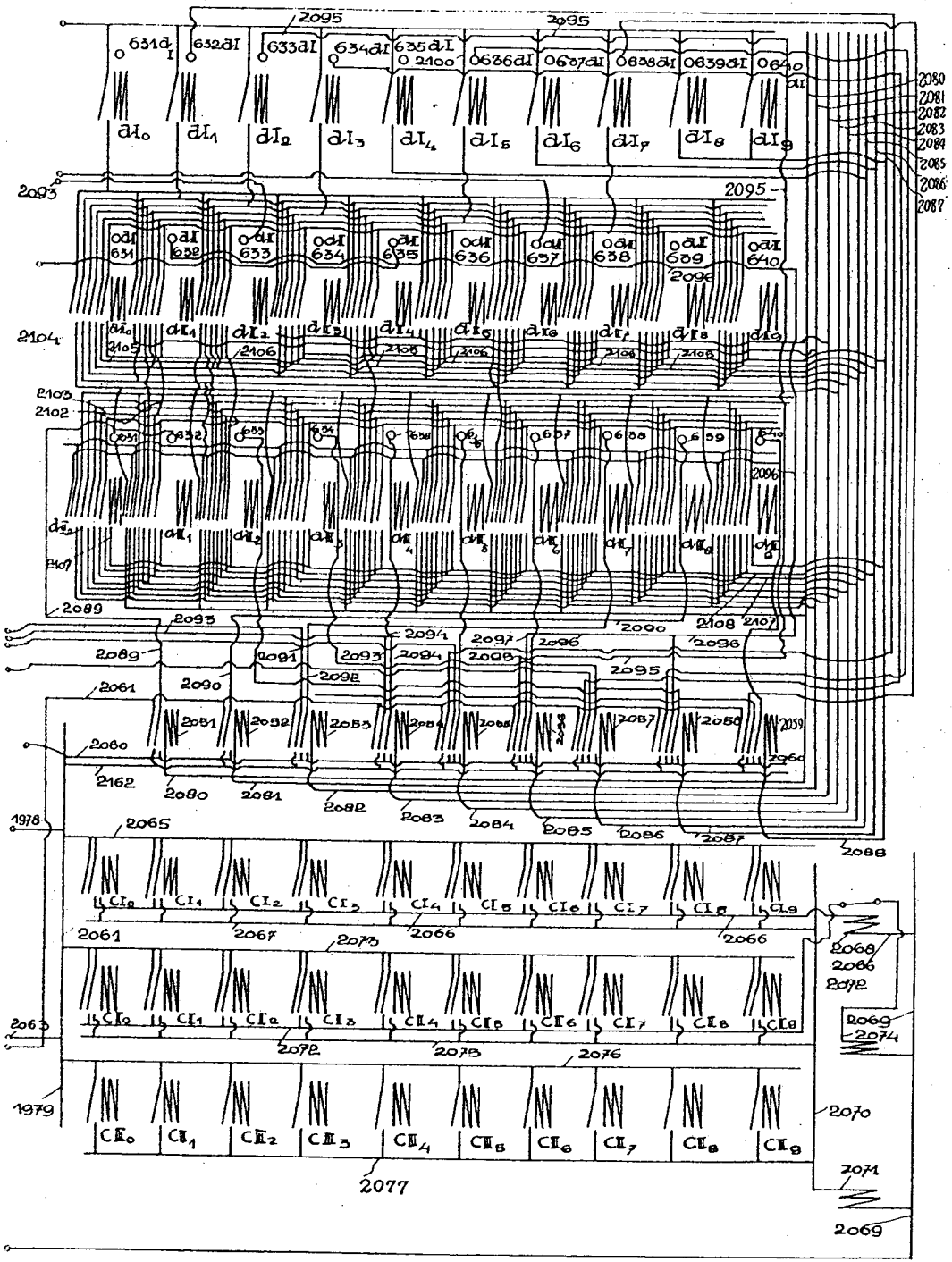
Figs. 31, 32, 33 and 34 show the connections between the setting group and the radicand group
Figure 32:
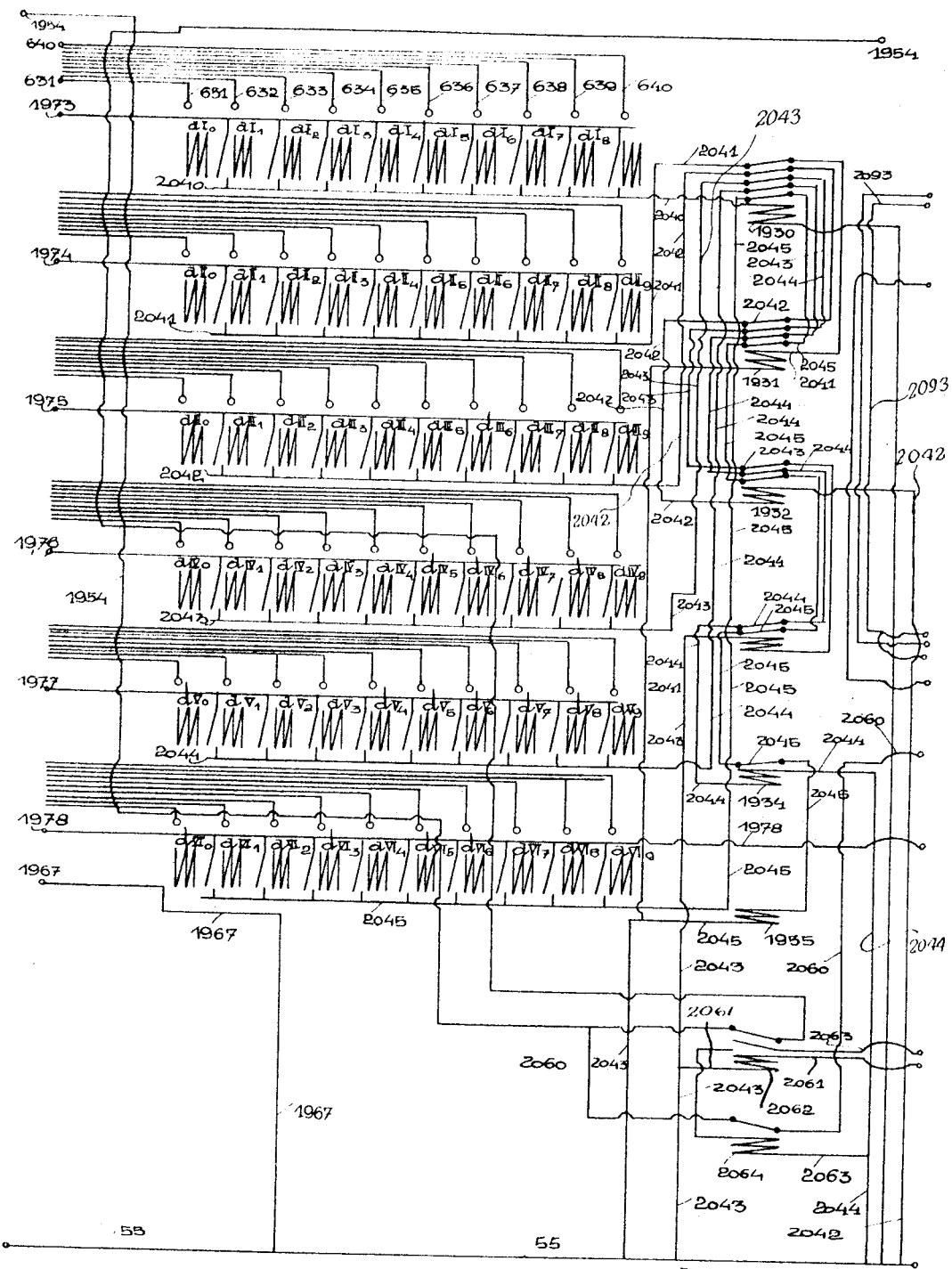

5. The product group (Fig. 31)

A conductor passes over each armature of the group $c$ corresponding to a numerical value of zero to nine, so that it is closed by the attracted armature, all of which conductors terminate in a common conductor 2070, which is connected with a magnet winding 2071. Thus as long as a number is set in the group $c$ the armature 2071 is attracted.

A conductor which is branched off a common conductor 2065, 2073 passes over each armature of the digit value group $c_I$ and $c_{II}$ corresponding to a numerical value of zero to nine, in such a manner that it is closed at this point by the attracted armature. All of the conductors terminate separately for each digit value group in a common conductor 2066, 2072, each of which conductors leads to the winding of an auxiliary magnet 2068, 2074, whereby the conductor 2072 is closed only over the open armature 2068.

Now if a number is set in $c_I$, the armature 2068 is attracted and if the first digit of a number is set in $c_{II}$, the armature 2074 is attracted.

Figure 30:
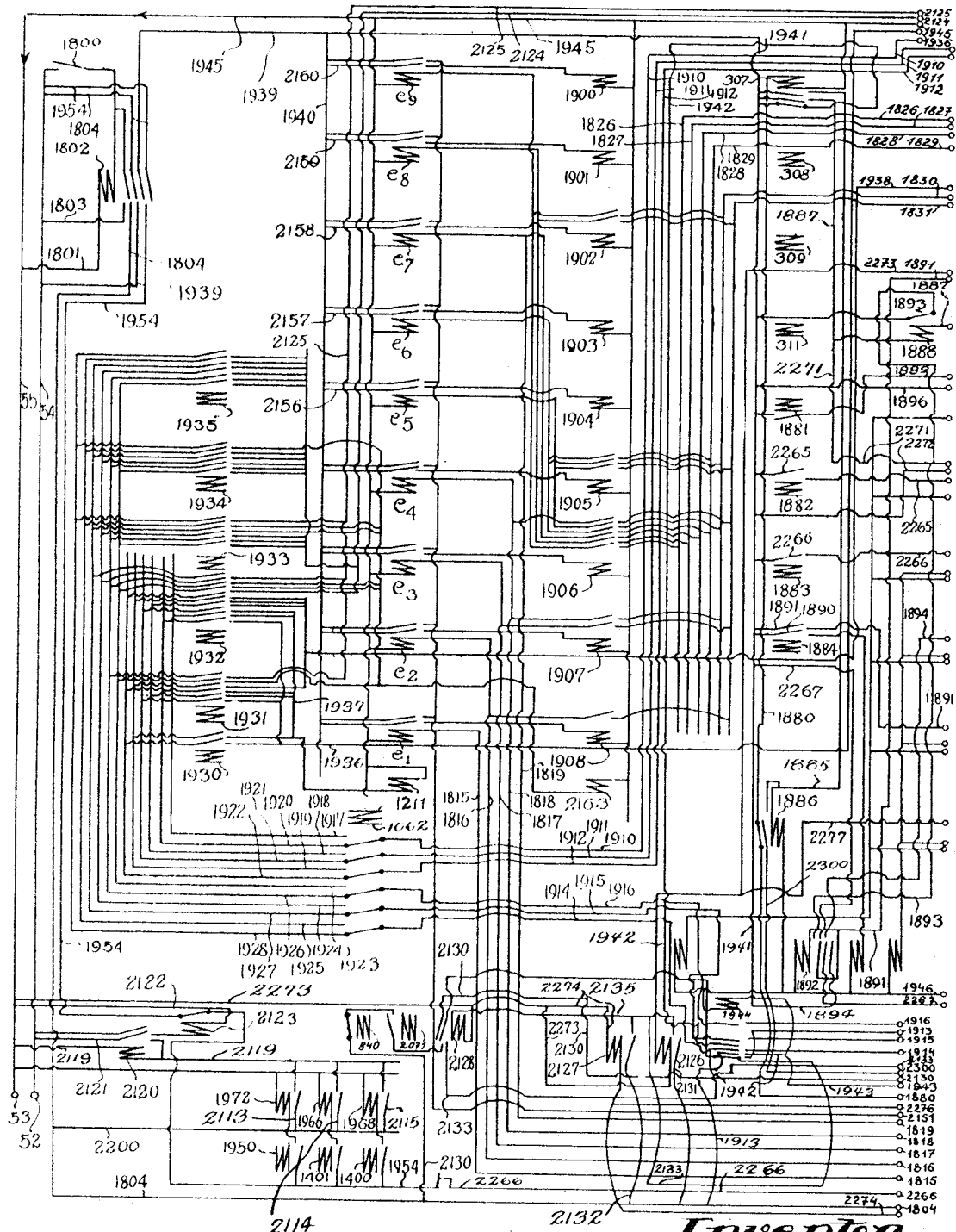

The operation of the machine when extracting the cube root is as follows:

(1) The number of which the root is to be extracted, is set in a known manner in the setting group $g$. If $n$ figures have been set, then the $n+1$st magnet armature of the group 1312, 1400, 1401, 1950, 1951, 1952 is attracted (Figs. 31 to 34). If now the key 1800, which effects the operation for the extraction of the cube root, is pressed down, the following circuit is closed (Figs. 28, 30).

(2) 52—54—1800—1801—winding 1802—1801—55—53.

The armature 1802 remains attracted under the action of the following circuit:

52—54—1803—over the attracted armature 1802—1801 winding 1802—1801—55—53 and closes the following circuit:

(3) (Figs. 30 to 34) 52—54—1953—1954— over the attracted armature 1802—1954— over the open armature 2123—1954—over the $n+1$st armature of the group 1312, 1400, or 1401, over the conductors 1971, 1965 or 1967 corresponding to the remainder of the division $n : 3$—the corresponding magnet winding 1968, 1966 or 1972—55—53.

(4) A connection is established over the attracted armature of the group 1968, 1966, 1972 between the setting group $g$ and the radicand group $d$, that is to say, the number set in $g$ is transferred to the radicand group, that is to say, the highest digit is transferred to $d_I$, $d_{II}$ or $d_{III}$ according as to whether the armature 1968, 1966 or 1972 was attracted (Figs. 31, 34). In addition thereto the following circuit is closed:

(4a) 52—54—1804—over the attracted armature 1802—1804—2200—one of the conductors 2113, 2114, or 2115—2119—winding 2120—2119—55—53.

The armature 2120 closes the following circuit:

(I) 52—54—2121—over the attracted armature 2120—2121—2119—winding 2120—2119—55—53. The armature 2120 thus remains attracted.

(II) 52—54—2122—over the attracted armature 2120—winding 2123—2122—55—53.

The armature 2123 interrupts, when attracted, the conductor 1954, so that the attracted armature of the group 1968, 1966, 1972, remains closed only as long as it is necessary, after it has been attracted, for another armature to be attracted. Thus after the number set in $g$ has been transferred to the radicand group the connection is again released.

(5) After the transference of the number on to the group $d$, a single two or three digit number is formed from the three figures set in the digit value group $d_I$, $d_{II}$ and $d_{III}$ of which figures according to foregoing, the first or the first and second may be zero, and the third root of this number is set in the group of nine magnets 2051 . . . 2059, that is to say, that magnet winding of the group 2051 . . . 2059 is energized over the conductors 1954 and over the attracted armatures of the groups $d_I$, $d_{II}$ and $d_{III}$ and over one of the conductors 2080 . . . 2088 the numerical value of which groups corresponds to the third root of the number formed by the figures set in the group $d_I$, $d_{II}$ and $d_{III}$ (Figs. 31 to 34).

(6) If one of the armatures 2051 . . . 2059 is attracted, the following circuits are closed:

(I) 52—54—1953—1954—over the attracted armature 1802—1954—2060—over the open armature 2064—2060—in a number of electrically parallel conductors, the number of which is equal to the number of digits contained in the cube of the numerical value of the corresponding magnet of the group 2051 . . . 2059, over the corresponding attracted armature of the group 2051 . . . 2059—to that one of the conductors of the group 631 . . . 640 corresponding to the numerical value of the cube of that number, which corresponds to the attracted armature of the group 2051 . . . 2059—and then in a known manner to the negative pole 53 of the source of current.

(II) 52—54—1953—1954—over the attracted armature 1802—1954—1955—1978—1979—2162—over the corresponding attracted armature of the group 2051 to 2059—2061—winding 2062—2061—2043—55—53.

(III) A circuit passing over its own winding and not illustrated.

(Re I) The cube of the first digit of the root is subtracted from the radicand.

(Re II) As the armature 2062 interrupts the conductor 1954, after the subtraction of the cube of the first digit no new magnet of the group 2051 . . . 2059 can be set.

(Re III) The first root digit that has once been set remains set in the magnet group 2051 . . . 2059 until the calculation is completed.

The armature 2062 closes the following circuit:

(7) 52—54—1952—1954—over the attracted armature 1802—1954—1955—1978—1979—2063—over the attracted armature 2062—2063—winding 2064—2063—2044—55—53—and interrupts as already mentioned, the conductor 1954.

The armature 2064 interrupts the conductor 2060—and therewith the circuit described under (6) (I), so that the transfer of the subtraction of the cube of the first root digit is interrupted in time and transfers in a known manner which is not indicated in Figs. 31 to 34, the first figure of the root set in the magnet group 2051 . . . 2059 to the group $b_1$ (Figures 28–30).

Thus the first figure of the root is now set in the first digit value group of $b$, that is to say, an armature of the group $b_1$ is attracted, which closes the following circuit:

(8) (I) 52—54—1804—over the attracted armature 1802—1804—one of the conductors 1806 . . . 1814—over the attracted armature of the group $b_1$—one of the conductors 1815 . . . 1819—over the open armature 2150'—one of the windings $e_1$, $e_2$, $e_3$, $e_4$ or $e_5$—in a known manner to the negative pole 53 of the source of current.

(II) 52—54—1804—over the attracted armature 1802—1804—one of the conductors 1836 . . . 1844—over the attracted armature of the group $b_1$—one of the conductors 1847, 1849, or 1851—the corresponding magnet winding 1848, 1850 or 1852—1946—1945—55—53.

If one of the armatures $b_{1,1}$, $b_{1,2}$ or $b_{1,3}$ is attracted:

(III) 52—54—1804—over the attracted armature 1802—1804—one of the conductors 1833, 1834 or 1835—one of the magnet windings 1854 or 1855—1833—1946—1945—55—53.

(Re 8) (I) The first digit of $3\,x^2$ corresponding to the first root digit (if $x$ is the root) is set in the quotient selector.

(Re 8) (II) According to the number of digits of $3\,x^2$, one of the magnets 1848, 1850 and 1852 is energized and its armature is attracted, viz. 1848 when $3\,x^2$ has $2n-1$ digits, that is to say 1 digit, as long as the root has one digit, 1850 if $3\,x^2$ has $2n$ digits, that is to say, two digits and 1852 if $3\,x^2$ has $2n+1$ digits, that is to say, three digits.

(Re 8) (III) According as to whether $x^3$ has $3n-2$, $3n-1$, $3n$ digits, either the armature 1854 or the armature 1855 or neither of them is attracted.

As has been explained in the description of the radicand group, there corresponds to each digit value group of $d$ one of the magnets 1930 ... 1935, that is to say, as long as a number is set in a higher digit value group, the armature belonging to a lower digit value sub-group can not be attracted, but only the armature of that magnet which belongs to that highest digit value sub-group, in which a number different from 0 is set.

(9) Now the second digit of the root is selected in the quotient selector from the remainder that is left in the radicand group (which was obtained by subtracting $x^3$ from the radicand and from the first figure of $3 x^2$.

The following cases are possible:

(a) $3 x^2$ has $2n-1$ digits, that is to say, one digit viz "one" is set in $b_1$. Then, the highest digit of the remainder that is left in the radicand group must be set in $b_{III}$, that is to say, the armature, 1932 must be attracted. Thus only the two possibilities are to be taken into consideration:

($\alpha$) The first digit of the remainder is greater than or at least equal to the figure (3) set in the quotient selector, and the armature 1062 is in its position of rest or ($\beta$) The first digit of the remainder is smaller than 3 and the armature 1062 (Figs. 21, 22) is attracted.

*Circuits*

(Re $a$) ($\alpha$) 52—54—1804—over the attracted armature 1802—1804—2261—over the open armature 1859—2261—1910—over the attracted armature 1848—1910—over the open armature 1062—1920—over the attracted armature 1932—to the conductor 1936—magnet winding $b_{II,9}$—and thence in a known manner to the negative pole 53 of the source of current.

The selection of the second digit of the root is effected by the division of a number having two digits by a number having one digit, whereby the highest digit of the two digit number is greater than the one digit number. The quotient is thus "nine".

(Re $a$) ($\beta$) 52—54—1804—over the attracted armature 1802—1804—2261—over the open armature 1859—2261—1910—over the attracted armature 1848—1910—over the a tracted armature 1062—1917—over the attracted armature 1932—to the conductor 1937—to the magnet winding 1211—and thence in a known manner to the negative 53 of the source of current. The armature 1211 (see also Figs. 23, 24) connects as has been pointed out in connection with the division the quotient selector with the group $b_{II}$, that is to say now in the case of the division of a two digit number by one digit number, whereby the first figure of the two digit number is smaller than the one digit number, the quotient is formed in the quotient selector and is transferred to the group $b_{II}$.

(b) $3x^2$ has $2n$ digits that is to say two digits. Now the highest digit of the remainder may be set in $d_{II}$ or in $d_{III}$, that is to say, the armature 1931 or 1932 may be attracted. The following cases arise:

($\alpha$) (1) The highest digit of the remainder is set in $d_{II}$ and the armature 1062 is in its position of rest.

(2) The highest position is set in $d_{II}$ and the armature 1062 is attracted.

($\beta$) (1) The highest digit of the remainder is set in $d_{III}$ and the armature 1062 is in its position of rest.

(2) The highest digit of the remainder is set in $d_{III}$ and the armature 1062 is attracted.

*Circuits*

(Re $b$) ($\alpha$) (1) 52—54—1804—over the attracted armature 1802—1804—2261—over the open armature 1859—2261—1911—closed armature 1850—1911—over the open armature 1062—1921—over the attracted armature 1931—to the conductor 1936—magnet winding $b_{II,9}$—and thence in a known manner to the negative pole 53 of the source of current. The second digit of the root is determined by the division of a number having $2n+1$ digits by a number having $2n$ digits, whereby the first digit of the number having $2n+1$ digits is greater than the first digit of the number having $2n$ digits. The quotient is thus nine.

(Re $b$) ($\alpha$) (2) 52—54—1804—over the attracted armature 1802—1804—2261—over the open armature 1859—2261—1911—over the attracted armature 1850—1911—over the attracted armature 1062—1918—over the attracted armature 1931—to the conductor 1937—winding 1211—and in a known manner to the negative pole 53 of the source of current. The second digit of the root is determined by the division of a number having $2n+1$ digits by a number having $2n$ digits, whereby the first digit of the number having $2n+1$ digits is smaller than the first digit of the number having $2n$ digits, that is to say, it takes place as in the case of ($a$) ($\beta$).

(Re $b$) ($\beta$) (1) As in the case is ($b$) ($\alpha$) (1) up to the conductor 1921—over the attracted armature 1932—to the conductor 1937—and further as under ($b$) ($\alpha$) (2). The second digit of the root is determined by the division of a number having $2n$ digits by a number having $2n$ digits, whereby the first digit of the remainder of the radicand is greater than the first digit of $3 x^2$, that is to say it is effected as in the case of ($b$) ($\alpha$) (2).

(Re $b$) ($\beta$) (2). As in the case of ($b$) ($\alpha$) (2) up to the conductor 1918—over the attracted armature 1932—to the conductor 1938—to the winding $b_{II,0}$—and thence in a known manner to the negative pole 53 of the source of current.

The second digit of the root is determined by a division of a number of two digits by a number of $2n$ digits, whereby the first digit of the remainder of the radicand is smaller than the first digit of 3 $x^2$, that is to say it gives 0.

(c) 3 $x^2$ has $2n+1$ digits. The first digit of the remainder of the radicand may be set in $d_I$, $d_{II}$, or $d_{III}$, so that we have six different cases, which shall again be referred to as ($\alpha$) (1) ($\alpha$) (2) ($\beta$) (1) ($\beta$) (2) ($\gamma$) (1) and ($\gamma$) (2).

Circuits (Re c) ($\alpha$) (1). As in the case of (a) ($\alpha$) up to 2261—1912—over the attracted armature 1852—1912—over the open armature 1062—1922—over the attracted armature 1930—to the conductor 1936—winding $b_{II,9}$—and then continued as in the case of (a) ($\alpha$).

The second digit of the root is determined by the division of a number having $2n+2$ digits by a number having $2n+1$ digits, whereby the first digit of the number having $2n+2$ digits is greater than the first digit of the number having $2n+1$ digits, that is to say it gives 9.

(Re c) ($\alpha$) (2). As in the case of (c) ($\alpha$) (1) up to 1912—over the attracted armature 1062—1919—over the attracted armature 1930—to the conductor 1937—and then continued as in the case of (a) ($\beta$). The second digit of the root is determined by the division of a number having $2n+2$ digits by a number having $2n+1$ digits, whereby the first digit of the number having $2n+2$ digits is smaller than the digit of the number having $2n+1$ digits so that the quotient is formed as under (a) ($\beta$).

(Re c) ($\beta$) (1). As in the case of (c) ($\alpha$) (1) up to 1922—over the attracted armature 1931—to the conductor 1937—and continued as in the case of (c) ($\alpha$) (2).

The selection in this case takes place by the division of a number having $2n+1$ digits by a number having $2n+1$ digits, whereby the first digit of the remainder of the radicand is greater than or equal to the first digit of $3x^2$, that is to say, again as under (c) ($\alpha$) (2).

(Re c) ($\beta$) (2). As under (c) ($\alpha$) (2) up to 1919—over the attracted armature 1931—to the conductor 1938 and continued as under (b) ($\beta$) (2).

The selection is effected by the division of a number having $2n+1$ digits by a number having $2n+1$ digits, whereby the first digit of the remainder of the radicand is smaller than the first digit of $3x^2$, that is to say, it gives 0.

(Re c) ($\gamma$). As under (c) ($\alpha$) (1) up to 1922—over the attracted armature 1932—to the conductor 1938—and continued as under (b) ($\beta$) (2).

(Re c) ($\gamma$) (2). As under (c) ($\alpha$) (2) up to 1919—over the attracted armature 1932—and continued as under (c) ($\gamma$) (1).

In both cases the second digit of the root is determined by the division of a number having $2n$ digits by a number having $2n+1$ digits, thus always giving zero.

It is to be pointed out that the operation for each further digit of the root is exactly the same, since the remainder of the radicand that comes into consideration when determining the root, can never be greater than the maximum of $2n+2$ digits since the preceding digit of the root (the $(n-1)$ one) would be too small if the remainder of the radicand that comes into question when determining the root should be a number that has more than $2n+2$ digits. This is out of the question, however, since the machine can select the individual digits of the root too high but never too low.

10. Now, if the second digit of the root is set in $b_{II}$, the following cases are possible.

(I) The first digit of the root that is set in $b_I$ belongs to one of the limit values, the surpassing of which produces a change in the first digit of $3x^2$, as well as a change in the number of digits of a number having $2n+1$ digits into a number having $2n$ digits, or of a number having $2n$ digits into a number having $2n+1$ digits (the first digit of the root is "one" or "five"), and (a) The second digit of the root likewise belongs in conjunction with the first digit to one of the limit values, (b) Taken as the second digit it is smaller than the second digit of the limit value, and (c) It is greater than the second digit of the limit value.

(II) The first digit of the root set in $b_I$ belongs to one of the limit values, the surpassing of which effects a change in the first digit of 3 $x^2$, but no change in the number of digits of 3 $x^2$, and (a) The second digit of the root belongs likewise in conjunction with the first digit to one of these values, (b) It is smaller, and (c) It is greater than the second digit of this limit value.

(III) The first digit belongs to none of these limit values.

(Re 10) (I) (a) and (b). In the first instance no circuit belonging thereto is closed.

(Re 10) (I) (c). The following circuit is closed: 52—54—1804—over the attracted armature 1802—1804—one of the conductors 1845 or 1846—over the attracted armature of the group $b_I$—over the attracted armature of the group $b_{II}$—to one of the magnet windings 1868 or 1869—1946—1945—55—53.

(Re 10) (II) (a) (b) and (c). In the first instance no circuits belonging thereto are closed.

11. At the same time as the circuit described under (10) which may be closed, the following circuit is closed:—52—54—1804—over the attracted armature 1802—1804—1856—1857—over the attracted armature of the group $b_{\text{II}}$—1858—winding 1859—1946—1945—55—53.

The armature 1859 interrupts the conductor 2261 and therewith the circuits described under (9) and closes the following circuit:

12. 52—54—1804—over the attracted armature 1802—1804—1871—over the attracted armature 1859—over the open armature 1872—1871—winding 1870—1871—1945—55—53.

The armature 1870 now connects the group $b$ with the group $a$ (not illustrated) so that the number set in $b$ is transferred to $a$.

In the same way as the armature 2071 is attracted in Figs. 31 to 34, when a number is set in the group $c$, the armature 1901 is attracted when a number is set in the group $a$. These connections are not shown since they are entirely identical with those illustrated in Figs. 31 to 34. The armature 1901 closes the following circuits (after the transference to $a$):

13 (I). 52—54—1804—over the attracted armature 1802—1804—1873—over the attracted armature 1901—winding 1872—1946—1945—55—53.

The armature 1872 interrupts the circuit described under 12 and remains attracted by the following circuit: 52—54—1804—2280—over the open armature 2112—2280—over the attracted armature 1872—2280—1873—winding 1872—1946—1945—55—53.

(II). 52—54—1804—over the attracted armature 1802—1804—1880—over the attracted armature 1859—1880—over the attracted armature 1901—1880—over the open armature 1902′—1880—successively over the open armatures 2074 and 2068—1880—over the open armature 1886—1880—winding 307—and in a known manner over the winding 250 (not shown here)—to the negative pole 53 of the source of current.

In this way the multiplication of the two numbers set in the groups $a$ and $b$ viz. the calculation of $x^2$, is initiated.

In Figs. 28 to 30 the series of magnets 307, 309, 310, 311 has been completed by the magnets 1881, 1882, 1883, 1884, which naturally function, as regards the further digits of the multiplier, in the same way as the magnets 307 ... 311 as regards the first two digits.

The armature 307 now closes the following circuits:

14 (I). 52—54—1939—over the attracted armature 1802—1939—1941—over the attracted armature 307—1887—winding 1888—1887—1946—1945—55—53.

This circuit is in the first instance immaterial.

(II). 52—54—1939—over the attracted armature 1802—1939—1941—1885—over the attracted armature 307—1885—winding—1886—1885—1946—1945—55—53.

The armature 1886 interrupts the conductor 1880 and remains attracted under the action of the following circuit as long as a number is set in the group $a$, that is to say, until the armature 1901 is again released.

15. 52 ... as (13) (II) up to the attracted armature 1901—1880—2300—over the attracted armature 1886—2300—1885—winding 1886—1885—1946—1945—55—53.

During the further operation of the multiplication the armature 1882 closes the following circuit:—

16. 52 ... as (14) (I) up to 1941—over the attracted armature 1882—2265—winding 1378—in a known manner to the negative pole of the source of current. The armature 1378 cancels the number set in the radicand group $d$ (see also Figs. 6 to 9 and Figs. 25, 26) that is to say, the remainder of the radicand.

During the further operation of the multiplication the armature 1883 (or an immediately following one) closes the following circuit:

17. 52 ... as (14) (I) up to 1941—2266—over the attracted armature 1883—2266—over one of the armatures 1400, 1401 or 1950—one of the windings 1968, 1966, or 1972—in a known manner (Figs. 31 to 34) to the negative pole 53 of the source of current.

Thus the radicand, which is still set in the setting group, is now transferred again to the radicand group, as at the beginning of the calculation.

When the last armature of the series 307, 309 ... etc. is attracted, that is to say, when the armature 1884 shown in Figs. 28 to 30 is attracted, the following circuits are closed:—

18 (I). 52 ... as (14) (I) up to 1941—1890—over the attracted armature 1884—1890—winding 125—in a known manner to the negative pole 53 of the source of current. The armature 125 cancels the number set in $a$ (Figs. 6 to 9, and 25, 26). In this way the armature 1901 is released and subsequently the armature 1886.

(II) 52 ... as (14) (I) up to 1941—1891—over the attracted armature 1884—1891—over the open armature 1895—1891—winding 1892—1946—1945—55—53.

The armature 1892 remains closed under the action of the following circuit: 52— ... as (14) (I) up to 1941—1893—over the open armature 1888—1893—over the attracted armature 1892—1891—winding 1892—1946—1945—55—53 and closes the following circuits:

19 (I). 52 ... as (14) (I) up to 1941—2267—over the attracted armature 1892—2267—over one of the armatures 2074 or 2068 (conductor 1902 or 1903) to one of the windings 1875 or 1876—1946—1945—55—53.

That is to say, if the first digit of $x^2$ is set in the first active digit value group of $c$ viz. (according to Figs. 31 to 34) the armature 2068 is attracted, a circuit is closed over the winding 1876 and if the first digit of $x^2$ is set in the second active digit value group of $c$, viz., the armature 2074 is attracted, a circuit is closed over the winding 1875.

Accordingly the armature 1875 transfers the power $x^2$ set in $c$ to $a$, so that $c_{II}$ is connected with $a_I$, and 1876 so that $c_I$ is connected with $a_I$.

(II) 52 ... as (14) (I) up to 1941—1894—over the attracted armature 1892—1894—winding 1895 — 1894 — 1946—1945—55—53.

The armature 1895 remains attracted under the action of the following circuit:—
52 ... as (14) (I) up to 1941—1896—over the open armature 2270—1896—over the attracted armature 1895 — 1894 — winding 1895—1894—1946—1945—55—53.

If now a number ($x^2$) is set in $a$, the armature 1901 is again attracted. The circuit described under (13) (II), however, is not closed in the first instance, since $x^2$ is also set in $c$, that is to say, one of the armatures 2074 or 2068 is still attracted and consequently the conductor 1880 is still interrupted. However, another circuit is closed by the armature 1901:

20. 52—54—1804—1874—over the attracted armature 1901—1874—over one of the armatures 1875 or 1876 — 1879 — winding 1902'—1946—1945—55—53.

The armature 1902' cancels the number (not shown) set in $c$. After the release of the armatures of the group $c$ also the winding 2068 or 2074 become de-energized (only one of them could be energized) and subsequently 1875 and 1876 and finally 1902. Only now is the circuit (13) (II) closed and the multiplication of $x^2$ with $x$ is initiated. Now the multiplication is repeated with the following alterations:

The circuit (14) (I) causes the armature 1888 to be attracted, which armature interrupts the conductor 1893 and therewith releases the armature 1892.

The circuit given in (15) is closed again.

As, however, the armature 1895 is still attracted, in the course of the multiplication operation the following circuit is closed by the armature 1881 before that given in (16):—

21. 52 ... as (14) (I) to 1941—1889—over the attracted armature 1881—1889—over the attracted armature 1895—1889—winding 1890'—1889—1946—1945—55—53.

The armature 1890 remains closed owing to the action of the following circuit:—

22. 52 ... as (14) (I) to 1941—2272—over the attracted armature 1890—2272—over the attracted armature 1895—2272—1889—winding 1890—1889—1946—1945—55—53.

The circuit referred to in (16) is again closed, therefore again cancels the radicand and the circuit referred to in (17) sets it up again.

The circuit referred to in (18) (I) again cancels the numeral ($x^2$) set up in $a$. The circuit referred to in (18) (II) will however no longer be closed, as the armature 1895 is attracted. In place thereof the following circuit is now closed:—

23. Three cases must be differentiated:
(a) The armature 1854 is attracted,
(b) The armature 1855 is attracted
(c) Neither of the two armatures is attracted.

As was stated above the transfer of $x^3$ (which is now set up in the product group $c$ to the radicand group is carried out in two different ways, either by $c_I$ being connected to $d_{II}$ or $c_I$ to $d_I$ (all the following digit value groups of course in their proper order).

*Circuits*

(Re a) 52 ... as (18) (II) to 1891—over the attracted armature 1895—2273— over the attracted armature 1890—2273—over the attracted armature 1854—2274—winding 2127—2274—2273—55—53.

Over the armature 2127 the connection is established in a known manner between the group $c$ and the group $d$ (not shown), $c_I$ being connected to $d_{II}$.

(Re b) (α) $x^2$ has $2n-1$ digits the highest digit of $x^3$ is therefore set up in $c_I$ and the armature 2068 is attracted.

52 ... as (Re a) to 2273—2275—over the attracted armature 1855—2275—2276—over the attracted armature 2068—2276—2274—winding 2127—2274—2273—55—53.

The transfer is carried out as in (Re a).

(β) $x^2$ has $2n$ digits, and $x^3$ still $3n-1$ digits. The first digit of $x^3$ is therefore set up in $c_{II}$ and the armature 2074 is attracted.

Circuit:—52 ... as (Re b) (α) to 2275—2277—over the attracted armature 2074—2277—2273—winding 2126—2273—55—53.

The armature 2126 establishes the connection between the group $c$ and the group $d$ in such a manner that $c_I$ is connected to $d_I$.

(Re c) 52 ... as (Re a) to 2273—over the open armature 1854—2273—over the open armature 1855 — 2273 — winding 2126 — 2273—55—53.

The transfer is carried out as (Re. b) (β).

In the transfer operation two different cases may occur.

I. $x^3$ is greater than the radicand, the second term in the root has therefore been given too high a value, or II. it is equal to or smaller than the radicand.

(Re I). A tens transfer takes place and the armature 840 is attracted and remains attracted until the subtraction is completed. As the subtrahend, however, is greater than the minuend, the conductor 794 is connected to the positive terminal of the source of current, as was explained with reference to the operation of division.

From the conductor 794 the conductor 2109 branches off (Figs. 31–34), which leads over the magnet winding 2110 to the conductor 921, which belongs to a circuit, which in the digit value group belonging to the magnet of the group $b$ last closed carries out the subtraction by one and simultaneously closes a circuit, which causes the "cancellation" of the numeral set up in $c$. With the cancellation of $x^3$ the armature 2071 is released.

The armature 2110 (Figs. 31–34) closes the circuit:—

24. 52—54—1953—2111—over the attracted armature 1802—2111—over the attracted armature 2110—2111—winding 2112—2111—55—53.

The armature 2112 interrupts the circuit leading over the winding 1872 (conductor 2280), so that the circuit referred to in (12) is again closed, the corrected root is again transferred to $a$ and the sequence of operations commences again, which is repeated with the difference that with the armature 307 the following circuit is closed:—

25. 52 ... as (14) (I) to 1887—2271—over the attracted armature 1890—2271—winding 2270—2271—2265—1946—1945—55—53.

The armature 2270 interrupts the circuit leading over the winding 1895, so that the initial situation is re-established.

(Re II) With the attraction of one of the armatures 2126 or 2127 the following circuit was closed:—

26. 52—54—1804—over the attracted armature 1802—1804—one of the conductors 2131 or 2132—over the attracted armature 2126 or 2127—2135—winding 2128—2273—55—53.

The armature 2128 remains attracted through the operation of the following circuit:—

27. 52 ... as (26) to 1804—2133—over the open armature 2112—2133—over the attracted armature 2128—2133—over the open armature 1944—2133—2135—winding 2128—2273—55—53.

While the circuit (26) was also closed in the case dealt with in (I), it remained without effect as the circuit (27) could not be closed or was immediately interrupted again (armature 2112).

As in this case the number set up in $c$ has not been cancelled, the armature 2071 remains attracted. Until the armature 840 is again in its position of rest the following circuit is closed:—

28. 52 ... as (26) to 1804—2130—over the open armature 840—over the attracted armature 2071—over the attracted armature 2128—2130—over the open armature 1862—winding 1832—1946—1945—55—53. With the attraction of the armature 1832 the following two circuits were closed, assuming that the case dealt with in (10) (I) (c) or (10) (II) (c) occurs:—

(29) (I) 52 to 1804—one of the conductors 1830 ... 1825—over the attracted armature of the group $b_I$—over the attracted armature of the group $b_{II}$—one of the conductors 1826 ... 1831—over the attracted armature 1832—one of the conductors 1826 ... 1831—over the attracted armature of the group of auxiliary magnets 1900 ... 1908, which was closed after one of the magnets of the group $e$ had been set—that winding of the group $e$, the numerical value of which corresponds to the alteration of the first digit of $3\ x^2$ determined by the numerical value of the energized conductor of the group 1826 ... 1831—and thence in a known manner to the negative terminal 53 of the source of current.

(II) 52 ... as (29) (I) to 1804—1943—over the attracted magnet 1832—1943—winding 1944—1946—1945—55—53.

(Re I) Only now, after the correctness of the second term of the root has been finally determined, the change in the first place of $3\ x^2$ was effected.

(Re II) The armature 1944 remains closed owing to the operation of the following circuit:— 52 ... as (14) (I) to 1941—1942—over the open armature 307—1942—over the attracted armature 1944—1942—1943—winding 1944—1946—1945—55—53 and interrupts the circuit referred to in (27) and consequently that referred to in (28), so that the armature 1832 is again released and the correction of the first place of $3\ x^2$ cannot be effected repeatedly.

The armature 1944 now closes in the case referred to in (10) (I) (c) the following circuits:—

(30) (I) 52—54—1804—over the attracted armature 1802—1804—1913—over the attracted armature 1944—1913—2137 or 2138 (according as to which of the armatures 1868 and 1869 is attracted)—2138—1815—magnet winding $e_I$—and in a known manner to the negative terminal 53 of the source of current.

(II) 52 ... as (I) to 1913—2135—over the attracted armature 1868—1915—and over one of the armatures 1931 ... 1935 to the selection of the third term of the root in the same manner as was described in connection with the second term of the root.

(III) (Assuming the armature 1869 is attracted):— 52 ... (I) to 1913—2136—over the attracted armature 1869—1916—and thence as (II).

In the cases given in (10) (II) (c) and (10) (III):—

31. 52 ... as (30) (I) to 1913—over the open armature 1868—1913—over the open armature 1869—1913—over the attracted armature of the magnet group 1848, 1850 and 1852—one of the conductors 1914, 1915 or 1916—and thence as in (30) (II) and (III).

The third term of the root has thus been selected and the sequence of operations recommences. After the third term of the root has been set up a circuit is again closed over the auxiliary magnet (1862), which has the same function as the auxiliary magnet 1859 for the second term of the root. Besides the analogous circuits mentioned in that case the auxiliary magnet (1862), just as the corresponding auxiliary magnets of all the other root digit value groups closes a circuit over the winding 1902, so that finally the number set up in the product group is cancelled again.

In a completely analogous manner the connections are made for the square root, only that the conditions in this case are much simpler. If the first term of the root is smaller than 5, then $2x$ (the changing divisor) always has $n$ digits and if the first term of the root is 5 or greater than 5, then $2x$ always has $n+1$ digits and the first numeral of $2x$ is always one. An alteration of the first digit of $2x$ by an additional term of the root is only possible in the second term of the root and only by one, this alteration taking place, when the first term of the root is smaller than five and the second term of the root is equal to five or greater than five.

The extraction of a square root is nothing more than a matter of division, the selection of the first term of the root being entirely analogous to that in the case of the extraction of a cube root.

Hence, it is not necessary to give the exact connections for this type of calculation, as it involves nothing new in view of what has been said above. Higher roots than cube roots may be calculated, as already stated, by the indirect method through the logarithm of the radicand (the square root and cube root may of course be calculated in the same way).

This is done in the following manner:—

$$\sqrt[n]{a} = x = e\left(\frac{1}{n}\log_e a\right)$$

Hence, if both the series for the natural logarithm may be calculated as well as the series for the potential function $e^x$, any root may be automatically calculated with the machine.

L

Before going in greater detail into the connection for the calculation of the natural logarithm, the general principles underlying the system of connections for any simple or compound function shall be discussed.

As already stated, for each magnet group a magnet is provided in the machine, the armature of which is always attracted, when a number is set up in the said group; there is also provided for each magnet group a magnet, the armature of which, when attracted, interrupts all the windings leading over the windings of a magnet group. There are also provided for the primary operations of multiplication and division certain auxiliary magnets, the attraction of which determines the commencement and the end of such a calculating operation. It has also been shown how a number set up in a group was transferred through any number of columns to another group over the armature of one connecting auxiliary magnet, and how any desired constants were set up in a group also over the armature of a single auxiliary magnet.

Each simple or compound function is separated in accordance with what has just been stated into separate successive calculation phases, the transfer of a number from one group to another, the setting up of a constant in a group, the cancellation of a number set up in a group and the commencement or termination of a primary calculating operation, each forming such a calculation phase. Each such phase is initiated by a circuit being closed over the attracted armature of an auxiliary magnet and over the winding of the magnet, which first comes into operation in this phase of the calculation, the said circuit leading over the non-attracted armature of the auxiliary magnet initiating the next phase and the winding of the said auxiliary magnet always becoming energized, when the previous phase is terminated, that is, the magnet armature last actuated in the previous phase closing a circuit over the winding of the said auxiliary magnet. All those auxiliary magnets remain closed to the end of the calculation or of the partial calculation through circuits leading over their own armature and over their own winding, which in the first place do not transfer a number from one group to another and in the second place do not set up a number in a group.

All circuits belonging to one function lead over the armature of the auxiliary magnet, the winding of which becomes energized by the depression of the key carrying out the function and remains energized by a circuit leading over its own armature.

What has just been stated shall be illustrated by an example with respect to the connections for the natural logarithm.

The potential series for the natural logarithm is:—

$$\log_e x = 2\left[\frac{x-1}{x+1} + \frac{1}{3}\left(\frac{x-1}{x+1}\right)^3 + \frac{1}{5}\left(\frac{x-1}{x+1}\right)^5 + \cdots\right]$$

and therefore represents a compound function of $x$. It is converging, as will be seen at the first glance, but in certain circumstances it may be not so rapidly converging that a sufficiently accurate result will be found by calculating out only a few terms of the potential series. A simple conversion however produces a series which converges rapidly in all circumstances:

$$\log_e x = n \cdot \log_e 10 + \log_e a + \log_e \frac{y}{a};$$

$n$ being the exponent of the power $10^n$, with which the number $y$ containing only one whole digit must be multiplied for obtaining the number $x$, and $a$ the whole digit of $y$. In this way for the fraction:

$$\frac{\frac{y}{a}-1}{\frac{y}{a}+1}$$

a value lying considerably below one is always obtained, so that the only potential series to be determined in the calculation converges very rapidly with the terms of:

$$\frac{\frac{y}{a}-1}{\frac{y}{a}+1}$$

Figure 35:
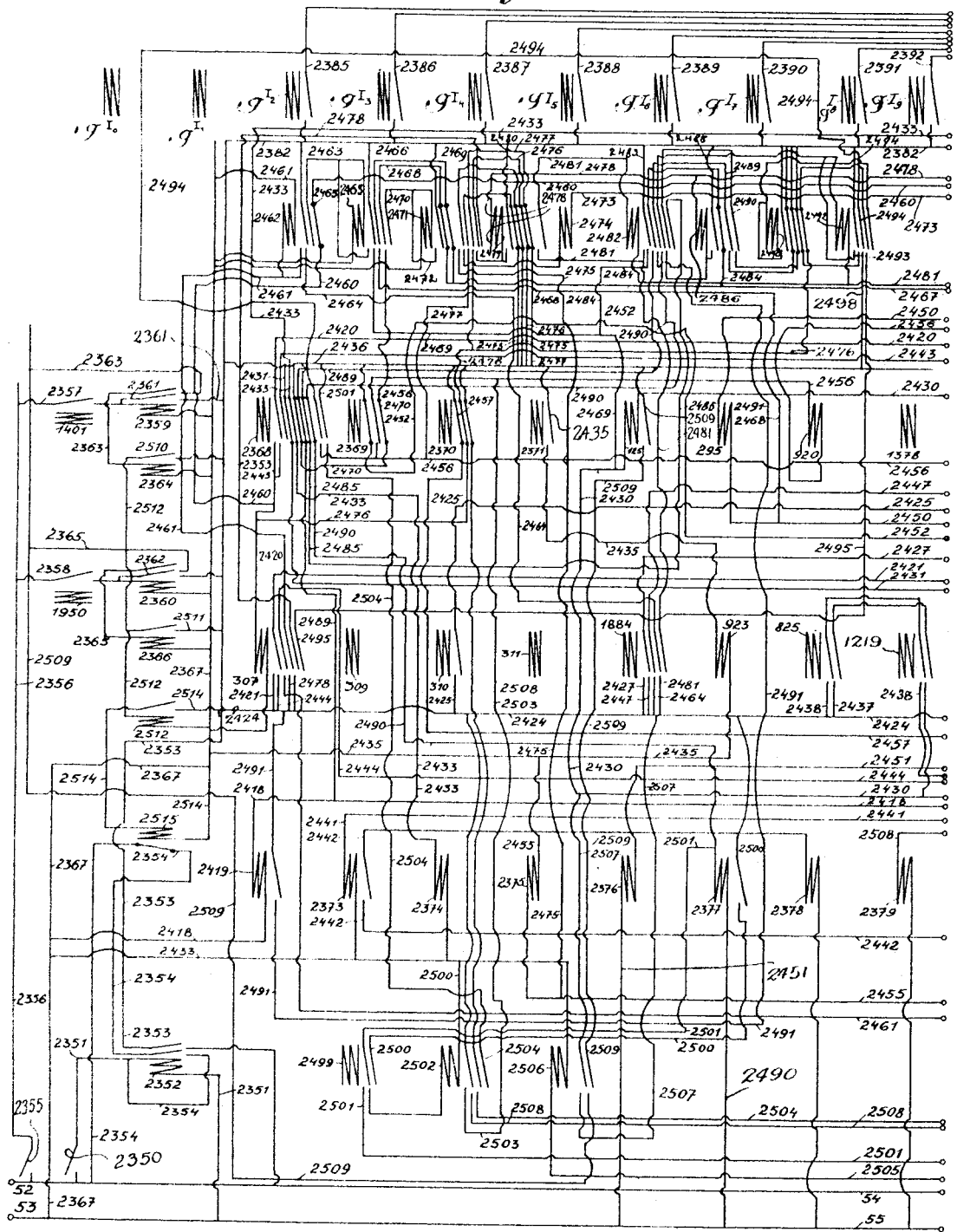
Figs. 35 and 36 show the connections for the numerical calculation of the logarithmic function ($\log_e x$).
Figure 36:
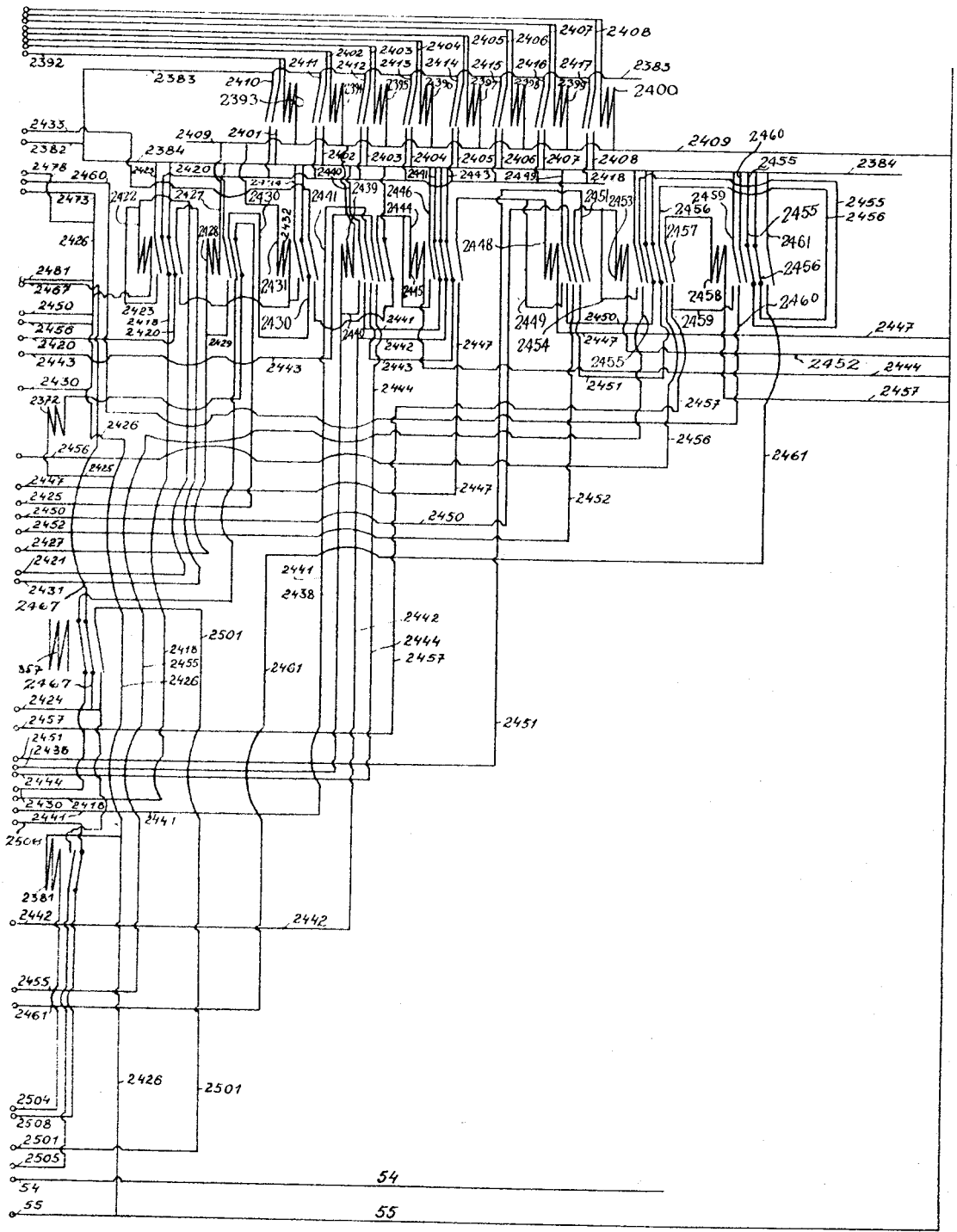

The connections are shown in Figs. 35 and 36 and are described below, together with the way in which they function.

First of all the determined value of $x$, the logarithm of which is to be calculated, is set up in a known manner in the group $g$. Of the connecting auxiliary magnets, over the armatures of which the connections are established between the omnibus conductors 130 ... 140 and the windings of the group $g$, only the magnets 1401 and 1950 are shown in Fig. 35, the armatures of which establish the connection between the omnibus conductors 130 ... 140 and the third and fourth digit value group of the group $g$. While the number is being set up it must of course be written with its decimal point. On the decimal point key 2355 being depressed, a circuit is closed over the attracted armature of the series of connecting auxiliary magnets 1401 ... 1950 etc. and over the winding of an auxiliary magnet 2359, 2360, each auxiliary magnet belonging to one connecting auxiliary magnet. The first two connecting auxiliary magnets of course do not come into operation, as the first is no longer attracted, even after a single numeral has been set up, and the second one requires that the determined value of $x$ is only a single digit.

The winding of one of the auxiliary magnets 2359, 2360 (etc), which has become energized by the depression of the decimal key, remains energized through a circuit leading over its own armature.

On the operating key being depressed, after the number has been set up, the following circuit is closed:—

1. 52 — 54 — key 2350 — 2351 — winding 2352—2351—55—53. The armature 2352 remains attracted through the action of the following circuit:—

52—54—2354—over the open armature 2515—2354—over the attracted armature 2352—2351—winding 2352—2351—55—53, and closes the following circuit:

2. 52—54—2353—over the attracted armature 2352—2353—2382—one of the conductors 2385 ... 2392—over the attracted armature of the group $g_I$—one of the windings 2393 ... 2400 (Fig. 36)—2409—55—53.

The attracted armature of the group 2393 ... 2400 remains attracted owing to the action of the following circuit:—

52—54—etc. as in (2) to 2382—2384—one of the conductors 2401 ... 2408—over the attracted armature of the group 2393 ... 2400 (Fig. 36)—the corresponding conductor of the group 2385 to 2392—and thence as in (2) to 53.

Each magnet of the group 2393 ... 2400 corresponds to one of the numerical values from 2 to 8, as each of them is only closed when an armature of the same numerical value of the group $g_I$ is attracted. Over each of these armatures, as may be at once stated, there lead circuits, which are only closed after the completion of the calculation (not shown), which lead over the windings of those magnets of the group $f$, the numerical and digit values of which correspond to the numerical and digit values of the natural logarithm of that number 2, 3 ... 8, which is determined by the numerical value of the particular magnet 2393 ... 2400.

With the depression of the decimal point key the term $n.\ln 10$ was determined and with one of the armatures 2393—2400 the term $\ln a$.

There still remains the term $$\ln \frac{y}{a}.$$

In the first place the base of the potential series $$\frac{\frac{y}{a}-1}{\frac{y}{a}+1}$$

must be determined.

The attracted armature of the group 2393 ... 2400 closes the following circuit (Fig. 36).

(3) 52—54 ... as (2) to 2382—2383—over the attracted armature 2393 ... 2400—one of the conductors 2410 ... 2417—2418—over the open armature 2422—2418—winding 2419 (Fig. 35)—2418—2367—55—53.

The armature 2419 established the connection between the group $g$ and the group $a$, that is, it transfers the number set up in the group $g$ to the group $a$ (not shown).

On the armature 2352 being attracted, electrically parallel circuits (not shown)

branching off from the conductor 2382 were closed over the attracted armature of the group $g_1$, which circuits lead over the windings of those magnets of the group $b$, the numerical and digit values of which correspond to the successive numerical values of the reciprocal value of the numerical value of the attracted armature of the group $g_1$.

Thus, in the group $a$ $y$ has been set up and in the group $b$ the reciprocal value of $a$, that is $$\frac{1}{a}.$$

It has been stated more than once, that for each magnet group a magnet is provided, which is always closed, when a number has been set up in a magnet group:

In Fig. 35 these magnets are:
For the group $a$ the magnet 2368.
For the group $b$ the magnet 2369.
For the group $c$ the magnet 2370.
For the group $d$ the magnet 2371.

In Fig. 35 are also shown the cancelling magnets of the groups $a$, $b$, $c$, $d$ and $g$, that is, 125,—295—920—1378—2372 (Fig. 36).

$y$ being set up in $a$, the armature 2368 is attracted and closes the following circuit:—

(4) 52—54 . . . as in (2) to 2382—2384 (Fig. 36)—2420—over the open armature 2422—2420—over the attracted armature 2368 (Fig. 35)—2420—magnet winding 307 and thence in a known manner to the negative terminal 53 of the source of current.

The multiplication $y$ times $$\frac{1}{a}$$

is thus initiated.

On the armature 307 being attracted, besides the circuits mentioned in connection with the multiplication, the following circuit is closed:

(5) 52—54—as in (2) to 2353—2424— 2421—over the attracted armature 307—2421 (Fig. 36) — winding 2422 — 2421 — 2426 — 55—53.

The armature 2422 remains attracted through the action of the following circuit:—

52—54— . . . as in (2) to 2382—2384— 2423—over the attracted armature 2422— 2423—2421—winding 2422—and thence as in (5) to 53 and interrupts the circuits (3) and (4).

In the further course of the multiplication operation a circuit is closed by one of the connecting auxiliary magnets of the series 307, 309, 310 . . . etc. (Fig. 35) over the cancelling magnet 2372 of the group $g$, the circuit being as follows:—

(6) 52—54 . . . as in (5) to 2424—2425— over the attracted armature 310—2425—over the open armature 2428 (Fig. 36)—2425— winding 2372—2425—2426—55—53.

The last connecting auxiliary magnet closed during the multiplication (in Fig. 35 this is the magnet 1884) closes the following circuit:—

(7) 52—54 . . . as in (5) to 2424—2427— over the attracted armature 1884—2427— winding 2428—2427—2409—55—53.

The armature 2428 remains attracted through the action of the following circuit:—

52—54— . . . as in (2) to 2382—2384— 2429—over the attracted armature 2428— 2427—winding 2428—thence as in (7) to 53 and after the completion of the multiplication (criterion: the armature 357 is again in its position of rest) closes the following circuit:—

(8) 52—54 . . . as in (2) to 2382—2384— 2430—over the open armature 2432—2430— over the attracted armature 2428—2430— over the open armature 357—2430—cancelling magnet 125 (Fig. 35)—and thence in a known manner to the negative terminal 53 of the source of current.

The number $y$ set up in the group $a$ is now cancelled and consequently the armature 2368 brought into its position of rest. By the open armature 2368 the following circuit is closed:—

(9) 52—54 . . . as in (2) to 2353—2436— 2431—over the open armature 2368—2431— over the attracted armature 2422—2431— winding 2432—2431—2409—55—53.

The armature 2432 interrupts the circuit (8) and remains attracted through the action of the following circuit:—

52—54— . . . as in (2) to 2382—2384— 2434—over the attracted armature 2432— 2431—winding 2432—2431—2409—55—53 and closes the following circuit:—

(10) 52—54— . . . as in (2) to 2382— 2384—2433—over the open armature 2439— 2433—over the attracted armature 2432— 2433—over the open armature 2368—2433— winding 2374—2433—2367—55—53.

The armature 2374 establishes the connection between the group $c$ and the group $d$ and between the group $c$ and the group $a$, from the third digit value group $c_{III}$ to the second digit value group $d_{II}$ and $a_{II}$ etc. and in the digit value group $d_I$ sets up zero and in the digit value group $a_I$ and in $e_I$ sets up two (again not shown). For, after what has been said above, the number $$\frac{y}{a}$$

must be a number with one whole digit, the first digit of which is one, so that, for forming the fraction $$\frac{\frac{y}{a}-1}{\frac{y}{a}+1}$$

zero must always be set up as the first digit in the group $d$ (the dividend group) and two as the first digit in the group $a$ (now the divisor group).

As in the course of the division the first digit of the quotient is always found to be zero and as the number $$\frac{y}{a}$$

set up in the group $c$ is greater than the number $$\frac{y}{a}-1$$

set up in the group $d$, before selecting the second digit of the quotient, the number set up in the group $c$ is cancelled in any case, so that it is not necessary to regard the cancellation in $c$ as a separate phase of the calculation.

With the setting up of a number $a$ the circuit (10) was interrupted and with the setting up of a number in $d$ the following circuit was closed by the armature 2371:—

(11) 52—54— ... as (2) to 2353—2436—2435—over the attracted armature 2371—2435—winding 923—2435—2367—55—53.

The division is thus initiated.—

After the division is complete, that is, until the armatures 825 and 1219 are attracted, the following circuits are closed:—

(12) 52—54— ... as in (5) to 2424—2438—over the attracted armature 825—over the attracted armature 1219—2438—winding 2439—2438—2409—55—53.

(13) 52—54— ... as in (5) to 2424—2437—over the attracted armature 825—over the attracted armature 1219—2437—2430—winding 125—and thence in a known manner to the negative terminal 53 of the source of current.

(Re 12) The armature 2439 remains attracted through the action of the following circuit:—

52—54— ... as in (2) to 2382—2384—2440—over the attracted armature 2439—2440—2438—winding 2439—2438—2409—55—53, and finally interrupts the circuit (10).

(Re 13) The number set up in $a$ is cancelled.

The armature 2439 closes the following circuit:—

(14) 52—54 ... as in (2) to 2382—2384—2441—over the open armature 2445—2441—over the attracted armature 2439—2441—winding 2373—2433—2367—55—53.

The armature 2373 transfers the number $$\frac{\frac{y}{a}-1}{\frac{y}{a}+1}$$

set up in $b$ to $a$ and closes the following circuits:

(15) 52—54— ... as in (2) to 2382—2384—2442—over the open armature 2445—2442—over the attracted armature 2373—2442—winding 2378—2442—55—53.

The armature 2378 transfers the number set up in $b$ to the group $f$, namely to the magnets $f_n$.

This completes the setting up of the first term of the potential series $$\frac{\frac{y}{a}-1}{\frac{y}{a}+1}$$

in the group $f$.

When the transfer from $b$ to $a$ has been carried out, the armature 2368 being therefore attracted, the following circuit is closed:

(16) 52—54— ... as in (2) to 2382—2384—2443—over the open armature 2445—over the attracted armature 2439—2443—over the attracted armature 2368—2443—2420—winding 307—in a known manner to the negative terminal 53 of the source of current. This initiates the squaring of $$\frac{\frac{y}{a}-1}{\frac{y}{a}+1}.$$

The armature 307 closes the following circuit:

(17) 52—54— ... as in (5) to 2424—2444—over the attracted armature 307—2444—over the attracted armature 2439—2444—winding 2445—2444—55—53.

The armature 2445 remains attracted through the action of the following circuit:

52—54— ... as in (2) to 2382—2384—2446—over the attracted armature 2445—2444—winding 2445—2444—55—53, and interrupts the circuits (14), (15), (16).

On the connecting auxiliary magnet 1884 last actuated in connection with the multiplication being closed, its armature closes the following circuit

(18) 52—54— ... as in (5) to 2424—2447—over the attracted armature 1884—2447—over the attracted armature 2445—2447—winding 2448—2447—55—53.

The armature 2448 remains attracted through the action of the following circuit:

52—54— ... as in (2) to 2382—2384—2449—over the attracted armature 2448—2449—2447—winding 2448—2447—55—53 and closes the following circuits:—

(19) 52—54— ... as in (2) to 2382—2384—2450—over the open armature 2453—2450—over the attracted armature 2448—2450—winding 295—and in a known manner to the negative terminal 53 of the source of current.

The number set up in $b$ is therefore now cancelled.

(20) 52—54— ... as in (2) to 2382—

2384—2451—over the open armature 2453—2451—over the attracted armature 2448—2451—winding 2376—2451—55—53.

The armature 2376 transfers the number $$\left(\dfrac{\dfrac{y}{a}-1}{\dfrac{y}{a}+1}\right)^2$$

set up in $c$ to the setting-up group $g$.

The circuits (19) and (20) are simultaneously closed.

When the number set up in the group $b$ is cancelled and the armature 2369 is therefore in its position of rest, the following circuit is closed:—

(21) 52—54— ... as in (2) to 2353—2436—2452—over the open armature 2369—2452—over the attracted armature 2448—2452—winding 2453—2452—55—53.

The armature 2453 remains closed through the action of the following circuit:—

52—54— ... as in (2) to 2382—2384—2454 over the attracted armature 2453—2452—winding 2453—2452—55—53 and interrupts the circuits (19) and (20) and closes the following circuits:—

(22) 52—54— ... as in (2) to 2382—2384—2455—over the open armature 2458—2455—over the attracted armature 2453—2455—winding 2375—2455—2435—2367—55—53.

The armature 2375 transfers the number set up in $c$ to $b$. There is now set up in $a$ and in $b$ the square of this number $$\left(\dfrac{\dfrac{y}{a}-1}{\dfrac{y}{a}+1}\right)$$

As soon as the setting up in $b$ is completed and the armature 2369 is therefore again attracted, the following circuit is closed:—

(23) 52—54— ... as in (2) to 2382—2384—2456—over the open armature 2458—2456—over the attracted armature 2453—2456—over the attracted armature 2369—2456—winding 920—in a known manner to the negative terminal 53 of the source of current.

The armature 920 cancels the number set up in $c$.

When the cancellation is finished and the armature 2370 is therefore in its position of rest, the following circuit is closed:—

(24) 52—54— ... as in (2) to 2353—2436—2457—over the open armature 2370—2457—over the attracted armature 2453—winding 2458—2457—55—53.

The armature 2458 interrupts the circuits (22) and (23) and remains attracted through the action of the following circuit: 52—54— ... as in (2) to 2382—2384—2459—over the attracted armature 2458 — 2457 — winding 2458—2457—55—53 and closes the following circuit:—

(25) 52—54— ... as in (2) to 2382—2384—2460—over the attracted armature 2458—2460—over the open armature 2462—2460—2420—winding 307—in a known manner to the negative terminal 53 of the source of current.

The cubing of $$\dfrac{\dfrac{y}{a}-1}{\dfrac{y}{a}+1}$$

is thus initiated.

The armature 307 closes the following circuit:—

(26) 52—54— ... as in (2) to 2382—2384—2461—over the attracted armature 2458—2461—over the attracted armature 307—2461—winding 2462—2461—2367—55—53.

The armature 2462 interrupts the circuit (25) and remains attracted through the action of the following circuit:—52—54— ... as in (2) to 2382—2463—over the attracted armature 2462—2461—winding 2462—2461—2367—55—53 and closes the following circuit when the last connecting auxiliary magnet, which becomes operative in the operation of multiplication is energized.

(27) 52—54— ... as in (5) to 2424—2464—over the attracted armature 1884—2464—over the attracted armature 2462—2464—winding 2465—2464—2367—55—53.

The armature 2465 remains attracted through the action of the following circuit:—52—54— ... as in (2) to 2382—2466—over the attracted armature 2465—2464—winding 2465—2464—2367—55—53 and, after the multiplication has been completed, that is, when the armature 357 is again in its position of rest, closes the following circuit.

(28) 52—54— ... as in (5) to 2424—2467—over the open armature 357—2467—2468—over the open armature 2471—2468—over the attracted armature 2465—2468—2450—winding 295—and in a known manner to the negative terminal 53 of the source of current.

(29) 52—54— ... as in (28) to 2467—2469—over the open armature 2471—2469—over the attracted armature 2465—2469—2430—winding 125—and in a known manner to the negative terminal 53 of the source of current.

The numbers set up in the group $a$ and the group $b$ are now cancelled.

When the cancelling is completed, that is, when the two armatures 2368 and 2369 are in their position of rest, the following circuit is closed:—

(30) 52—54— ... as in (2) to 2353—2436—2470—over the open armature 2368—2470—over the open armature 2369—2470—over the attracted armature 2465—2470 — winding 2471—2470—2367—55—53.

The armature 2471 interrupts the circuits (28) and (29) and remains closed through the action of the following circuit:— 52—54— ... as in (2) to 2382—2472—over the attracted armature 2471—2472—2470—winding 2471—2470—2367—55—53 and closes consecutively the following circuits:—

(31) 52—54— ... as in (2) to 2353—2436—2473—over the open armature 2479—2473—over the attracted armature 2471—2473—winding 2474—2473—2426—55—53.

The armature 2471 sets up the number 0,3 in the group $a$, closing circuits over all the magnet windings of the group $a$, the numerical value of which is 3, with the exception of the first digit value group, in which it sets up zero.

(32) 52—54— ... as in (31)—to 2436—2475—over the open armature 2479—2475—over the attracted armature 2471—2475—2455 — winding 2375 — 2455—2435—2367—55—53.

The armature 2375 transfers the number $$\left(\frac{\frac{y}{a}-1}{\frac{y}{a}+1}\right)^3$$

set up in the group $c$ to the group $b$.

When the transfer is completed and the armature 2369 is therefore attracted, the following circuit is closed:

(33) 52—54— ... as in (31) to 2436—2477—over the open armature 2479—2477—over the attracted armature 2471—2477—2456—over the attracted armature 2369—2456—winding 920—and in a known manner to the negative terminal 53 of the source of current.

The number set up in $c$ is now cancelled.

When the cancellation has been carried out and the armature 2370 is therefore in its position of rest, the following circuit is closed:—

(34) 52—54— ... as in (31) to 2436—2476—over the open armature 2479—2476—over the attracted armature 2471—2476—over the open armature 2370—2476—2420—winding 307—and in a known manner to the negative terminal 53 of the source of current.

The multiplication $$\left(\frac{\frac{y}{a}-1}{\frac{y}{a}+1}\right)^3$$

times $\frac{1}{3}$ is now initiated.

The attracted armature 307 closes the following circuit:—

(35) 52—54— ... as in (2) to 2353—2424—2478—over the attracted armature 307—2478—over the attracted armature 2471—2478—winding 2479—2478—2426—55—53.

The winding 2479 remains closed through the action of the following circuit:— 52—54— ... as in (2) to 2382—2480—over the attracted armature 2479—2478—winding 2479—2478—2426—55—53—and interrupts the circuits (31), (32), (33), (34).

The connecting auxiliary magnet 1884, which is the last one closed in the multiplication, closes the following circuit:—

(36) 52—54— ... as in (5) to 2424—2481—over the attracted armature—1884—2481—over the attracted armature 2479—2481—winding 2482—2481—2426—55—53.

The armature 2482 remains attracted by the action of the following circuits: 52—54— ... as in (2) to 2382—2483—over the attracted armature 2482—2483—over the attracted armature 2479—2483—2481—winding 2482—2481—2426—55—53 and closes the following circuits:—

(37) until the multiplication is finished and the armature 357 is therefore in its position of rest:

52—54— ... as in (5) to 2424—2467—over the open armature 357—2467—2484—over the open armature 2486—2484—over the attracted armature 2482—2484—2469—2430—winding 125—and in a known manner to the negative terminal 53 of the source of current.

The number set up in the group $a$ is now cancelled.

When the cancellation is completed and the armature 2368 is therefore in its position of rest, the following circuit is closed:—

(38) 52—54— ... as in (2) to 2353—2436—2485—over the open armature 2368—2485—over the attracted armature 2482—2485—winding 2486—2478—2426—55—53.

The armature 2486 interrupts the circuit (37) and remains attracted through the action of the following circuit:— 52—54— ... as in (2) to 2382—2488—over the attracted armature 2486—2488—2485—winding 2486—2478—2426—55—43 and closes the following circuits:—

(39) 52—54— ... as in (2) to 2382—2489—over the open armature 2496—2489—over the attracted armature 2486—2489—over the open armature 2368—2489—2418—winding 2419—2418—2367—55—53.

(40) 52—54— ... as in (2) to 2382—2490—over the open armature 2496—2490—over the attracted armature 2486—2490—over the open armature 2368—2490—winding 2377—2490—55—53.

The circuits (39) and (40) are simultaneously closed and are also simultaneously interrupted by the attraction of the armature 2368.

The armature 2419 transfers the number set up in the group $g$, that is, the number $$\left(\frac{\frac{y}{a}-1}{\frac{y}{a}+1}\right)^2$$

to the group $a$ and the armature 2377 transfers the number set up in $c$, that is, $$\frac{1}{3} \cdot \left(\frac{\frac{y}{a}-1}{\frac{y}{a}+1}\right)^3$$

to the group $f$.

Thus two terms of the potential series are already set up in $f$. After the transfer to $a$ has been completed, the circuits (39) and (40) are interrupted by the armature 2368. Before this interruption, the armature 2419 has (simultaneously with the transfer) closed the following circuit:

(41) 52—54— . . . as in (5) to 2424—2491— over the attracted armature 2419—2491— over the attracted armature 2482—2491 winding 2492—2481—2426—55—53.

The armature 2492 remains attracted through the action of the following circuit:—52—54— . . . as in (2) to 2382—2493— over the attracted armature 2492—2493—2491—winding 2492 — 2481 — 2426 — 55—53—and closes the following circuit:

(42) 52—54— . . . as in (2) to 2382—2494—over the open armature 2496—2494— over the attracted armature 2492—2494—over the attracted armature 2368—2494—2456— and thence as in (23)—over the winding 920 to the negative terminal 53 of the source of current.

The number set up in $c$ is now cancelled and, until the armature 2370 is in its position of rest, the following circuit is closed:—

(43) 52—54— . . . as in (2) to 2353—2436—2498—over the attracted armature 2492—2498—over the open armature 2496—2498—2476—over the open armature 2370— and thence as in (34) over the winding 307 to the negative terminal 53 of the source of current.

Thus the multiplication of $$\left(\frac{\frac{y}{a}-1}{\frac{y}{a}+1}\right)^3$$

set up in $b$ by $$\left(\frac{\frac{y}{a}-1}{\frac{y}{a}+1}\right)^2$$

set up in $a$ is initiated.

The connections may be made acording to the general principles laid down at the commencement of this description of the connections up to the calculation of a term of any magnitude of the potential series.

When the potential series has been calculated, the logarithm of the first digit of the number $x$, assumed to be a one-digit number, which was set up in the magnet series 2393 . . . 2400, and the values $n$ times $\log_e 10$ set up in the magnets 2359, 2360 (both are constants, which are once for all set up in the system of connections) must be transferred to the group $f$, after the potential series set up in the group $f$ has been multiplied by two.

This multiplication can be carried out either in an absolutely analogous manner to that already described, that is, by a transfer from $f$ to one of the groups $a$ or $b$ and by setting up two in the other multiplication group or by transferring the value set up in $f$ to any group (for instance $a$) and transferring it back again from there to the group $f$, as a transfer to a sum group ($c$ or $f$) always takes the form of an addition.

The Briggs logarithm is easily found from the natural logarithm by multiplication with $$\frac{1}{\log_e 10}$$

(also a constant). This multiplication can also of course be done automatically.

The potential function $e^x$ can also be broken up by a simple resolution into a series, which converges rapidly in all circumstances, namely:

$$e^x = 10^a e^{(x-a \cdot \log_e 10)} = 10^a \cdot e^a e^{(x-a \cdot \log_e 10-a)}$$

in other words, the logarithm is first divided by the $\log_e 10$, the division being carried out only as to the digits of the integer. The quotient of this division gives the $n$ in the above formula and after the completion of the calculation indicates the number of digits.

The remainder of the division results in $x - n.\log_e 10$, that is, a number which has no more than one digit and is smaller than three.

In the above formula its integer is the $a$.

In the remaining potential function the exponent $x-1. \log_e 10-a=y$ is a number, which is smaller than one, and the series:

$$1+\frac{y}{1'}\times\frac{y}{2'}+\frac{y^3}{3'}+\frac{y^4}{4'}+ \cdots$$

is of necessity a rapidly converging one.

Thus the result of the series need only be multiplied by $e$ or $e^2$, according to whether the first digit of $x-n. \log_e 10$ is a one or a two.

The separation of this calculating operation into separate calculating phases provides no difficulties, in view of what has been said above, and the connections for the potential function are made in the manner generally laid down at the commencement of the discussion of the connections for the logarithmic function.

With the potential function the hyperbolic functions may of course be automatically calculated and with the $\log_e$ the inverse functions thereof Ar. sin, Ar. cos., Ar. tan.

In view of what has been said above it is obvious, that for each function that is at all capable of being calculated numerically the connections are so arranged that the said function is numerically calculated by the machine automatically in such a manner that the entire calculation is divided up into calculation phases, which follow one another automatically.

The windings of the connecting auxiliary magnets, over the armatures of which the transfer from one magnet to another is effected, may be energized from the keyboard, so that any sequence of calculations can be made without setting up afresh each intermediate result.

The calculating machine is thus applicable to the entire field of real numbers.

I claim:

1. An electrical calculating and typewriting machine, comprising a plurality of writing mechanisms, a keyboard, a number of groups of main relays and a number of auxiliary relays, each ten main relays in individual groups being collected into an order value sub-group, so that each individual main relay is allotted to a definite numerical value, said auxiliary relays transferring numbers between groups of main relays.

2. An electrical calculating and typewriting machine, comprising a plurality of writing mechanisms, a keyboard, a number of groups of relays and a number of auxiliary relays, wherein by means of keys each of which corresponds to one of the numerical values from zero to nine and relays, circuits can be closed which lead through those members of said auxiliary relays which close or open circuits and through those windings of the relays in the individual order value sub-groups of the groups of relays which correspond to the numerical values of the keys.

3. An electrical calculating and typewriting machine, comprising a plurality of writing mechanisms, a keyboard, a number of groups of relays and a number of auxiliary relays, wherein in the keyboard, a calculation key is provided for each kind of calculation which closes circuits through the windings of said auxiliary relays to transfer numbers between the groups of main relays.

4. An electrical calculating and typewriting machine, comprising a number of groups of relays and a number of auxiliary relays, each relay of the individual groups corresponding to a definite number closing circuits through the armatures of said auxiliary relays which transfer the numbers by closing circuits through the windings of relays of other groups, corresponding to the same numerical value and to the same order value as those of the relay closing the circuit.

5. An electrical calculating and typewriting machine, comprising a number of groups of relays and a number of auxiliary relays, each relay of the individual groups corresponding to a definite number closing circuits through the armature of said auxiliary relays which transfer the numbers by closing circuits through the windings of relays of other groups, which relays correspond to the same numerical value and belong to order value sub-groups which correspond to an order value other than the order value sub-group of the relay closing the circuit.

6. An electrical calculating and typewriting machine, comprising a number of groups of relays and a number of auxiliary relays, wherein one winding of all the relays of one group are led collectively through the armatures of one of said auxiliary relays to interrupt the connection of the windings with the source of current.

7. An electrical calculating and typewriting machine, comprising a number of groups of relays and a number of auxiliary relays, wherein all the relays of one group each close a circuit which lead through the winding of one relay of said auxiliary relays allotted to each group.

8. An electrical calculating and typewriting machine, comprising a number of groups of relays and a number of auxiliary relays, wherein when the windings of one relay in each order value sub-group of a group become energized, a number is set up in this group the individual numerals of which corresponding to their order values are set up in their related order value sub-groups.

9. An electrical calculating and typewriting machine, comprising a number of groups of relays and a number of auxiliary relays, wherein any number set up in a group is cancelled by one of said auxiliary relays coming into operation.

10. An electrical calculating and typewriting machine, comprising a number of groups of relays and a number of auxiliary relays, said auxiliary relays transferring any number set up in one group to another group of relays by means of circuits led through the armatures of the relays of the one group and the windings of relays of the second group.

11. An electrical calculating and typewriting machine, comprising a number of groups of relays and a number of auxiliary relays, certain of said auxiliary relays transferring any number set up in one group of relays through another group of relays and through other auxiliary relays to a third group of relays.

12. An electrical calculating and typewriting machine, comprising a number of groups of relays and a number of auxiliary relays, a mathematical control key and means wherein any number set up in one group of relays can be transferred by the auxiliary relays to another group of relays with such alteration of its numerical value and order value as is determined by the mathematical operation indicated by the control key.

13. An electrical calculating and typewriting machine, comprising a number of groups of relays and a number of auxiliary relays, means for determining a definite sequence which is fixed for each fundamental kind of calculation, of automatically successive transferences of numbers set up in certain groups of relays to other groups of relays, each fundamental type of calculation being carried out with the numbers set in one group until the result is set up in another group of relays.

14. An electrical calculating and typewriting machine, comprising a number of groups of relays for receiving numbers for calculation, and a number of auxiliary relays, and means whereby the commencement of each calculation is initiated through actuation of an auxiliary relay.

15. In a calculating machine, in combination, relay means for receiving numbers, a second relay means for receiving numbers, a mathematical calculation control key, and relay means which select a number according to the numbers received and the mathematical operation controlled by said key.

16. In a calculating machine, in combination, means for receiving numbers, a second means for receiving numbers, a mathematical calculation control key, means for transferring numbers received by said first means to said second means, other means which select a number according to the numbers received by both said receiving means and the mathematical operation controlled by said key, selecting means being initiated by said transfer means, and means initiated by the transfer operation completion to initiate another transfer operation.

17. In a calculating machine, in combination, means for receiving numbers, a second means for receiving numbers, a mathematical calculation control key, means for transferring numbers received by said first means to said second means, other means which select a number according to the numbers received by both said receiving means and the mathematical operation controlled by said key, means for indicating the selected number, and means for cancelling the numbers out of said receiving means.

18. In a calculating machine, in combination, means for receiving numbers for subtraction, a second means for receiving numbers, a subtraction control key, means for selecting numbers representing the absolute difference between the numbers received for subtraction, and means for indicating whether this difference is positive or negative, at least one of said means comprising electrical relays.

In testimony whereof I have signed my name to this specification.

BERNHARD WEINER.